US012663875B2

(12) United States Patent
Lindmeier et al.

(10) Patent No.: US 12,663,875 B2
(45) Date of Patent: Jun. 23, 2026

(54) METHODS FOR MANIPULATING A VIRTUAL OBJECT

(71) Applicant: Apple Inc., Cupertino, CA (US)

(72) Inventors: William D. Lindmeier, San Francisco, CA (US); Tony Kobayashi, Berkeley, CA (US); Alexis H. Palangie, Palo Alto, CA (US); Carmine Elvezio, San Francisco, CA (US); Matthew J. Sundstrom, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 19/092,989

(22) Filed: Mar. 27, 2025

(65) Prior Publication Data

US 2025/0224811 A1      Jul. 10, 2025

Related U.S. Application Data

(63) Continuation of application No. 18/473,180, filed on Sep. 22, 2023, now Pat. No. 12,287,921.

(60) Provisional application No. 63/505,409, filed on May 31, 2023, provisional application No. 63/376,913, filed on Sep. 23, 2022.

(51) Int. Cl.
| | |
|---|---|
| *G06F 3/01* | (2006.01) |
| *G06F 3/0346* | (2013.01) |
| *G06F 3/04815* | (2022.01) |
| *G06F 3/04845* | (2022.01) |

(52) U.S. Cl.
CPC ............ *G06F 3/017* (2013.01); *G06F 3/0346* (2013.01); *G06F 3/04815* (2013.01); *G06F 3/04845* (2013.01)

(58) Field of Classification Search
CPC ...... G06F 3/04815; G06F 3/011; G06F 3/017; G06F 3/04845; G06F 3/0346
See application file for complete search history.

(56) References Cited

U.S. PATENT DOCUMENTS

| | | | |
|---|---|---|---|
| 1,173,824 | A | 2/1916 | Mckee |
| 5,422,812 | A | 6/1995 | Knoll et al. |
| 5,515,488 | A | 5/1996 | Hoppe et al. |
| 5,524,195 | A | 6/1996 | Clanton et al. |
| 5,610,828 | A | 3/1997 | Kodosky et al. |
| 5,731,805 | A | 3/1998 | Tognazzini et al. |

(Continued)

FOREIGN PATENT DOCUMENTS

| | | |
|---|---|---|
| CA | 3033344 A1 | 2/2018 |
| CN | 102298493 A | 12/2011 |

(Continued)

OTHER PUBLICATIONS

Extended European Search Report received for European Patent Application No. 25179367.5, mailed on Jul. 1, 2025, 10 pages.

(Continued)

*Primary Examiner* — Vinh T Lam

(74) *Attorney, Agent, or Firm* — Kubota & Basol LLP

(57) ABSTRACT

In some embodiments, a computer system performs virtual object manipulation operations using respective portions of the user's body and/or input device(s). In some embodiments, a computer system manipulates a virtual object based on input from a hand of a user and/or a handheld device. In some embodiments, a computer system manipulates a virtual object directly or indirectly.

35 Claims, 59 Drawing Sheets

(56) References Cited

U.S. PATENT DOCUMENTS

| | | | |
|---|---|---|---|
| 5,737,553 A | 4/1998 | Bartok |
| 5,740,440 A | 4/1998 | West |
| 5,751,287 A | 5/1998 | Hahn et al. |
| 5,758,122 A | 5/1998 | Corda et al. |
| 5,794,178 A | 8/1998 | Caid et al. |
| 5,877,766 A | 3/1999 | Bates et al. |
| 5,900,849 A | 5/1999 | Gallery |
| 5,933,143 A | 8/1999 | Kobayashi |
| 5,990,886 A | 11/1999 | Serdy et al. |
| 6,061,060 A | 5/2000 | Berry et al. |
| 6,078,310 A | 6/2000 | Tognazzini |
| 6,108,004 A | 8/2000 | Medl |
| 6,112,015 A | 8/2000 | Planas et al. |
| 6,154,559 A | 11/2000 | Beardsley |
| 6,456,296 B1 | 9/2002 | Cataudella et al. |
| 6,584,465 B1 | 6/2003 | Zhu et al. |
| 6,714,201 B1 | 3/2004 | Grinstein et al. |
| 6,756,997 B1 | 6/2004 | Ward et al. |
| 7,035,903 B1 | 4/2006 | Baldonado |
| 7,096,120 B2 | 8/2006 | Hull |
| 7,134,130 B1 | 11/2006 | Thomas |
| 7,137,074 B1 | 11/2006 | Newton et al. |
| 7,230,629 B2 | 6/2007 | Reynolds et al. |
| 7,580,576 B2 | 8/2009 | Wang et al. |
| 7,634,718 B2 | 12/2009 | Nakajima |
| 7,706,579 B2 | 4/2010 | Oijer |
| 7,721,226 B2 | 5/2010 | Barabe et al. |
| 8,341,541 B2 | 12/2012 | Holecek et al. |
| 8,436,872 B2 | 5/2013 | Wright et al. |
| 8,593,558 B2 | 11/2013 | Gardiner et al. |
| 8,724,856 B1 | 5/2014 | King |
| 8,730,156 B2 | 5/2014 | Weising et al. |
| 8,767,045 B2 | 7/2014 | Kitazato et al. |
| 8,793,620 B2 | 7/2014 | Stafford |
| 8,793,729 B2 | 7/2014 | Adimatyam et al. |
| 8,803,873 B2 | 8/2014 | Yoo et al. |
| 8,866,880 B2 | 10/2014 | Tan et al. |
| 8,896,632 B2 | 11/2014 | Macdougall et al. |
| 8,947,323 B1 | 2/2015 | Raffle et al. |
| 8,970,478 B2 | 3/2015 | Johansson |
| 8,970,629 B2 | 3/2015 | Kim et al. |
| 8,994,718 B2 | 3/2015 | Latta et al. |
| 9,007,301 B1 | 4/2015 | Raffle et al. |
| 9,108,109 B2 | 8/2015 | Pare et al. |
| 9,158,115 B1 | 10/2015 | Worley et al. |
| 9,164,975 B2 | 10/2015 | Milewski et al. |
| 9,185,062 B1 | 11/2015 | Yang et al. |
| 9,189,611 B2 | 11/2015 | Wssingbo |
| 9,196,072 B2 | 11/2015 | Oh et al. |
| 9,201,500 B2 | 12/2015 | Srinivasan et al. |
| 9,214,137 B2 | 12/2015 | Bala et al. |
| 9,230,368 B2 | 1/2016 | Keane et al. |
| 9,237,334 B2 | 1/2016 | Cheng et al. |
| 9,241,149 B2 | 1/2016 | Redmann |
| 9,245,388 B2 | 1/2016 | Poulos et al. |
| 9,256,785 B2 | 2/2016 | Qvarfordt |
| 9,293,118 B2 | 3/2016 | Matsui |
| 9,316,827 B2 | 4/2016 | Lindley et al. |
| 9,384,594 B2 | 7/2016 | Maciocci et al. |
| 9,400,559 B2 | 7/2016 | Latta et al. |
| 9,426,193 B2 | 8/2016 | Goodman |
| 9,436,357 B2 | 9/2016 | Pallakoff et al. |
| 9,437,047 B2 | 9/2016 | Chang et al. |
| 9,448,635 B2 | 9/2016 | Macdougall et al. |
| 9,448,687 B1 | 9/2016 | Mckenzie et al. |
| 9,465,479 B2 | 10/2016 | Cho et al. |
| 9,491,374 B1 | 11/2016 | Avrahami et al. |
| 9,526,127 B1 | 12/2016 | Taubman et al. |
| 9,544,257 B2 | 1/2017 | Ogundokun et al. |
| 9,563,331 B2 | 2/2017 | Poulos et al. |
| 9,575,559 B2 | 2/2017 | Andrysco |
| 9,588,651 B1 | 3/2017 | Buchanan et al. |
| 9,612,722 B2 | 4/2017 | Miller et al. |
| 9,619,105 B1 | 4/2017 | Dal Mutto |
| 9,619,519 B1 | 4/2017 | Dorner |

| | | | |
|---|---|---|---|
| 9,672,588 B1 | 6/2017 | Doucette et al. |
| 9,681,112 B2 | 6/2017 | Son |
| 9,684,372 B2 | 6/2017 | Xun et al. |
| 9,734,402 B2 | 8/2017 | Jang et al. |
| 9,778,814 B2 | 10/2017 | Ambrus et al. |
| 9,829,708 B1 | 11/2017 | Asada |
| 9,851,866 B2 | 12/2017 | Goossens et al. |
| 9,864,498 B2 | 1/2018 | Olsson et al. |
| 9,870,130 B2 | 1/2018 | Schubert et al. |
| 9,886,087 B1 | 2/2018 | Wald et al. |
| 9,933,833 B2 | 4/2018 | Tu et al. |
| 9,934,614 B2 | 4/2018 | Ramsby et al. |
| 9,952,042 B2 | 4/2018 | Abovitz et al. |
| 10,026,209 B1 | 7/2018 | Dagley et al. |
| 10,049,460 B2 | 8/2018 | Romano et al. |
| 10,101,803 B2 | 10/2018 | Faaborg et al. |
| 10,175,483 B2 | 1/2019 | Salter et al. |
| 10,192,347 B2 | 1/2019 | Bui et al. |
| 10,203,764 B2 | 2/2019 | Katz et al. |
| 10,210,664 B1 | 2/2019 | Chaturvedi |
| 10,307,671 B2 | 6/2019 | Barney et al. |
| 10,318,034 B1 | 6/2019 | Hauenstein et al. |
| 10,339,721 B1 | 7/2019 | Dascola et al. |
| 10,353,532 B1 | 7/2019 | Holz et al. |
| 10,373,381 B2 | 8/2019 | Nuernberger et al. |
| 10,394,320 B2 | 8/2019 | George-svahn et al. |
| 10,401,958 B2 | 9/2019 | Peana et al. |
| 10,424,124 B2 | 9/2019 | Takahashi |
| 10,448,189 B2 | 10/2019 | Link |
| 10,484,641 B2 | 11/2019 | Zhou et al. |
| 10,499,044 B1 | 12/2019 | Giokaris et al. |
| 10,534,439 B2 | 1/2020 | Raffa et al. |
| 10,545,584 B2 | 1/2020 | Tome et al. |
| 10,564,714 B2 | 2/2020 | Marggraff et al. |
| 10,565,448 B2 | 2/2020 | Bell et al. |
| 10,573,067 B1 | 2/2020 | Naik et al. |
| 10,645,332 B2 | 5/2020 | Zhang |
| 10,664,048 B2 | 5/2020 | Cieplinski et al. |
| 10,664,050 B2 | 5/2020 | Alcaide et al. |
| 10,678,403 B2 | 6/2020 | Duarte et al. |
| 10,698,562 B1 | 6/2020 | Zhou et al. |
| 10,699,488 B1 | 6/2020 | Terrano |
| 10,701,661 B1 | 6/2020 | Coelho et al. |
| 10,708,965 B1 | 7/2020 | Subramanian et al. |
| 10,712,900 B2 | 7/2020 | Osman et al. |
| 10,732,721 B1 | 8/2020 | Clements |
| 10,754,434 B2 | 8/2020 | Hall et al. |
| 10,768,421 B1 | 9/2020 | Rosenberg et al. |
| 10,768,693 B2 | 9/2020 | Powderly et al. |
| 10,776,933 B2 | 9/2020 | Faulkner |
| 10,852,814 B1 * | 12/2020 | Caron .................. G06T 19/006 |
| 10,861,242 B2 | 12/2020 | Lacey et al. |
| 10,885,701 B1 | 1/2021 | Patel |
| 10,890,967 B2 | 1/2021 | Stellmach et al. |
| 10,922,744 B1 | 2/2021 | Mahajan |
| 10,929,099 B2 | 2/2021 | Querze et al. |
| 10,936,148 B1 | 3/2021 | Merkl et al. |
| 10,956,724 B1 | 3/2021 | Terrano |
| 10,983,663 B2 | 4/2021 | Iglesias |
| 11,003,308 B1 | 5/2021 | Dryer et al. |
| 11,017,611 B1 | 5/2021 | Mount et al. |
| 11,023,035 B1 * | 6/2021 | Atlas ...................... G06F 3/014 |
| 11,055,920 B1 | 7/2021 | Bramwell et al. |
| 11,079,995 B1 | 8/2021 | Hulbert et al. |
| 11,082,463 B2 | 8/2021 | Felman |
| 11,095,857 B1 | 8/2021 | Krol et al. |
| 11,112,875 B1 | 9/2021 | Zhou et al. |
| 11,126,850 B1 | 9/2021 | Ichim et al. |
| 11,138,798 B2 * | 10/2021 | Paul ...................... G06F 3/013 |
| 11,146,909 B1 | 10/2021 | Pinto et al. |
| 11,175,791 B1 | 11/2021 | Patnaikuni et al. |
| 11,176,755 B1 | 11/2021 | Tichenor et al. |
| 11,199,898 B2 | 12/2021 | Blume et al. |
| 11,200,742 B1 | 12/2021 | Post et al. |
| 11,232,643 B1 | 1/2022 | Stevens et al. |
| 11,243,734 B2 | 2/2022 | Boissière et al. |
| 11,294,472 B2 | 4/2022 | Tang et al. |
| 11,294,475 B1 | 4/2022 | Pinchon et al. |
| 11,307,653 B1 | 4/2022 | Qian et al. |

(56) References Cited

U.S. PATENT DOCUMENTS

| | | | |
|---|---|---|---|
| 11,340,756 B2 * | 5/2022 | Faulkner | G06F 1/1643 |
| 11,343,420 B1 | 5/2022 | Herz et al. | |
| 11,348,300 B2 | 5/2022 | Zimmermann et al. | |
| 11,379,033 B2 | 7/2022 | O'hern et al. | |
| 11,380,323 B2 | 7/2022 | Shin et al. | |
| 11,432,095 B1 | 8/2022 | Satongar et al. | |
| 11,461,973 B2 | 10/2022 | Pinchon | |
| 11,496,571 B2 | 11/2022 | Berliner et al. | |
| 11,567,625 B2 | 1/2023 | Faulkner et al. | |
| 11,573,363 B2 | 2/2023 | Zou et al. | |
| 11,574,452 B2 | 2/2023 | Berliner et al. | |
| 11,599,239 B2 | 3/2023 | Rockel et al. | |
| 11,720,171 B2 | 8/2023 | Pastrana Vicente et al. | |
| 11,726,577 B2 | 8/2023 | Katz | |
| 11,730,226 B2 | 8/2023 | Stolarz et al. | |
| 11,733,824 B2 | 8/2023 | Iskandar et al. | |
| 11,762,457 B1 | 9/2023 | Ikkai et al. | |
| 11,861,136 B1 | 1/2024 | Faulkner et al. | |
| 11,875,013 B2 | 1/2024 | Lemay et al. | |
| 11,922,588 B2 | 3/2024 | Fillhardt et al. | |
| 11,934,569 B2 | 3/2024 | Pastrana Vicente et al. | |
| 11,954,242 B2 | 4/2024 | Dascola et al. | |
| 11,988,832 B2 | 5/2024 | Singh et al. | |
| 11,995,301 B2 | 5/2024 | Hylak et al. | |
| 12,062,127 B2 | 8/2024 | Park et al. | |
| 12,099,653 B2 | 9/2024 | Chawda et al. | |
| 12,099,695 B1 | 9/2024 | Smith et al. | |
| 12,112,011 B2 * | 10/2024 | Smith | G06F 3/011 |
| 12,113,948 B1 | 10/2024 | Smith et al. | |
| 12,118,200 B1 | 10/2024 | Shutzberg et al. | |
| 12,154,236 B1 | 11/2024 | Herman et al. | |
| 12,236,546 B1 | 2/2025 | Lipton | |
| 2001/0047250 A1 | 11/2001 | Schuller et al. | |
| 2002/0024675 A1 | 2/2002 | Foxlin | |
| 2002/0044152 A1 | 4/2002 | Abbott et al. | |
| 2002/0065778 A1 | 5/2002 | Bouet et al. | |
| 2003/0038754 A1 | 2/2003 | Goldstein et al. | |
| 2003/0151611 A1 | 8/2003 | Turpin et al. | |
| 2003/0222924 A1 | 12/2003 | Baron | |
| 2004/0059784 A1 | 3/2004 | Caughey | |
| 2004/0104806 A1 | 6/2004 | Yui et al. | |
| 2004/0230912 A1 | 11/2004 | Clow et al. | |
| 2004/0243926 A1 | 12/2004 | Trenbeath et al. | |
| 2005/0044510 A1 | 2/2005 | Yi | |
| 2005/0073136 A1 | 4/2005 | Larsson et al. | |
| 2005/0100210 A1 | 5/2005 | Rice et al. | |
| 2005/0138572 A1 | 6/2005 | Good et al. | |
| 2005/0144570 A1 | 6/2005 | Loverin et al. | |
| 2005/0144571 A1 | 6/2005 | Loverin et al. | |
| 2005/0175218 A1 | 8/2005 | Vertegaal et al. | |
| 2005/0198143 A1 | 9/2005 | Moody et al. | |
| 2005/0216866 A1 | 9/2005 | Rosen et al. | |
| 2005/0231532 A1 | 10/2005 | Suzuki et al. | |
| 2006/0028400 A1 | 2/2006 | Lapstun et al. | |
| 2006/0034590 A1 | 2/2006 | Teramoto | |
| 2006/0080702 A1 | 4/2006 | Diez et al. | |
| 2006/0156228 A1 | 7/2006 | Gallo et al. | |
| 2006/0256083 A1 | 11/2006 | Rosenberg | |
| 2006/0283214 A1 | 12/2006 | Donadon et al. | |
| 2007/0172112 A1 | 7/2007 | Paley et al. | |
| 2007/0259716 A1 | 11/2007 | Mattice et al. | |
| 2008/0181502 A1 | 7/2008 | Yang | |
| 2008/0186255 A1 | 8/2008 | Cohen et al. | |
| 2008/0211771 A1 | 9/2008 | Richardson | |
| 2008/0222710 A1 | 9/2008 | Blagsvedt et al. | |
| 2009/0037844 A1 | 2/2009 | Kim et al. | |
| 2009/0049408 A1 | 2/2009 | Naaman et al. | |
| 2009/0064035 A1 | 3/2009 | Shibata et al. | |
| 2009/0146779 A1 | 6/2009 | Kumar et al. | |
| 2009/0231356 A1 | 9/2009 | Barnes et al. | |
| 2009/0254843 A1 | 10/2009 | Van et al. | |
| 2009/0319181 A1 | 12/2009 | Khosravy et al. | |
| 2010/0097375 A1 | 4/2010 | Tadaishi et al. | |
| 2010/0115459 A1 | 5/2010 | Kinnunen et al. | |
| 2010/0177049 A1 | 7/2010 | Levy et al. | |
| 2010/0185949 A1 | 7/2010 | Jaeger | |
| 2010/0188503 A1 | 7/2010 | Tsai et al. | |
| 2010/0188572 A1 | 7/2010 | Card | |
| 2010/0269145 A1 | 10/2010 | Ingrassia et al. | |
| 2010/0293504 A1 | 11/2010 | Hachiya | |
| 2010/0328432 A1 | 12/2010 | Tanaka | |
| 2011/0018895 A1 | 1/2011 | Buzyn et al. | |
| 2011/0018896 A1 | 1/2011 | Buzyn et al. | |
| 2011/0029185 A1 | 2/2011 | Aoki et al. | |
| 2011/0098029 A1 | 4/2011 | Rhoads et al. | |
| 2011/0156879 A1 | 6/2011 | Matsushita et al. | |
| 2011/0164163 A1 | 7/2011 | Bilbrey et al. | |
| 2011/0169927 A1 | 7/2011 | Mages et al. | |
| 2011/0175932 A1 | 7/2011 | Yu et al. | |
| 2011/0216060 A1 | 9/2011 | Weising et al. | |
| 2011/0243448 A1 | 10/2011 | Kawabuchi et al. | |
| 2011/0254865 A1 | 10/2011 | Yee et al. | |
| 2011/0289691 A1 | 12/2011 | Laflèche et al. | |
| 2011/0304557 A1 | 12/2011 | Wilburn et al. | |
| 2011/0310001 A1 | 12/2011 | Madau et al. | |
| 2011/0320969 A1 | 12/2011 | Hwang et al. | |
| 2012/0038751 A1 | 2/2012 | Yuan et al. | |
| 2012/0066638 A1 | 3/2012 | Ohri | |
| 2012/0075496 A1 | 3/2012 | Akifusa et al. | |
| 2012/0086624 A1 | 4/2012 | Thompson et al. | |
| 2012/0124525 A1 | 5/2012 | Kang | |
| 2012/0131631 A1 | 5/2012 | Bhogal et al. | |
| 2012/0170840 A1 | 7/2012 | Caruso et al. | |
| 2012/0184372 A1 | 7/2012 | Laarakkers et al. | |
| 2012/0194547 A1 | 8/2012 | Johnson et al. | |
| 2012/0223885 A1 | 9/2012 | Perez | |
| 2012/0256956 A1 | 10/2012 | Kasahara | |
| 2012/0256967 A1 | 10/2012 | Baldwin et al. | |
| 2012/0257035 A1 | 10/2012 | Larsen | |
| 2012/0272179 A1 | 10/2012 | Stafford | |
| 2012/0290401 A1 | 11/2012 | Neven | |
| 2012/0304087 A1 | 11/2012 | Walkin et al. | |
| 2013/0010062 A1 | 1/2013 | Redmann | |
| 2013/0027860 A1 | 1/2013 | Masaki et al. | |
| 2013/0088516 A1 | 4/2013 | Ota et al. | |
| 2013/0093727 A1 | 4/2013 | Eriksson et al. | |
| 2013/0127850 A1 | 5/2013 | Bindon | |
| 2013/0148850 A1 | 6/2013 | Matsuda et al. | |
| 2013/0169533 A1 | 7/2013 | Jahnke | |
| 2013/0190044 A1 | 7/2013 | Kulas | |
| 2013/0211843 A1 | 8/2013 | Clarkson | |
| 2013/0222410 A1 | 8/2013 | Kameyama et al. | |
| 2013/0229345 A1 | 9/2013 | Day et al. | |
| 2013/0232430 A1 | 9/2013 | Reitan | |
| 2013/0246955 A1 | 9/2013 | Schwesig et al. | |
| 2013/0249922 A1 | 9/2013 | Hachiya | |
| 2013/0263016 A1 | 10/2013 | Lehtiniemi et al. | |
| 2013/0265227 A1 | 10/2013 | Julian | |
| 2013/0271397 A1 | 10/2013 | Hildreth et al. | |
| 2013/0278501 A1 | 10/2013 | Bulzacki | |
| 2013/0286004 A1 | 10/2013 | Mcculloch et al. | |
| 2013/0293456 A1 | 11/2013 | Son et al. | |
| 2013/0300648 A1 | 11/2013 | Kim et al. | |
| 2013/0300654 A1 | 11/2013 | Seki | |
| 2013/0307945 A1 | 11/2013 | Cheng et al. | |
| 2013/0325326 A1 | 12/2013 | Blumenberg et al. | |
| 2013/0326341 A1 | 12/2013 | Nonaka | |
| 2013/0326364 A1 | 12/2013 | Latta et al. | |
| 2013/0328925 A1 | 12/2013 | Latta et al. | |
| 2013/0335301 A1 | 12/2013 | Wong et al. | |
| 2013/0342564 A1 | 12/2013 | Kinnebrew et al. | |
| 2013/0342570 A1 | 12/2013 | Kinnebrew et al. | |
| 2013/0345975 A1 | 12/2013 | Vulcano et al. | |
| 2014/0002338 A1 | 1/2014 | Raffa et al. | |
| 2014/0002444 A1 | 1/2014 | Bennett et al. | |
| 2014/0028548 A1 | 1/2014 | Bychkov et al. | |
| 2014/0049462 A1 | 2/2014 | Weinberger et al. | |
| 2014/0063058 A1 | 3/2014 | Fialho et al. | |
| 2014/0068692 A1 | 3/2014 | Archibong et al. | |
| 2014/0071241 A1 | 3/2014 | Yang et al. | |
| 2014/0075361 A1 | 3/2014 | Reynolds et al. | |
| 2014/0108942 A1 | 4/2014 | Freeman et al. | |
| 2014/0114845 A1 | 4/2014 | Rogers et al. | |
| 2014/0125584 A1 | 5/2014 | Xun et al. | |

(56)	References Cited

U.S. PATENT DOCUMENTS

| 2014/0125585 A1 | 5/2014 | Song et al. |
|---|---|---|
| 2014/0126782 A1 | 5/2014 | Takai et al. |
| 2014/0132499 A1 | 5/2014 | Schwesinger et al. |
| 2014/0132633 A1 | 5/2014 | Fekete et al. |
| 2014/0139426 A1 | 5/2014 | Kryze et al. |
| 2014/0164928 A1 | 6/2014 | Kim |
| 2014/0168267 A1 | 6/2014 | Kim et al. |
| 2014/0168453 A1 | 6/2014 | Shoemake et al. |
| 2014/0198017 A1 | 7/2014 | Lamb et al. |
| 2014/0232639 A1 | 8/2014 | Hayashi et al. |
| 2014/0237366 A1 | 8/2014 | Poulos et al. |
| 2014/0247208 A1 | 9/2014 | Henderek et al. |
| 2014/0247210 A1 | 9/2014 | Henderek et al. |
| 2014/0258942 A1 | 9/2014 | Kutliroff et al. |
| 2014/0267046 A1 | 9/2014 | Ellsworth et al. |
| 2014/0267400 A1 | 9/2014 | Mabbutt et al. |
| 2014/0268054 A1 | 9/2014 | Olsson et al. |
| 2014/0282272 A1 | 9/2014 | Kies et al. |
| 2014/0285641 A1 | 9/2014 | Kato et al. |
| 2014/0298273 A1 | 10/2014 | Blackstone et al. |
| 2014/0304612 A1 | 10/2014 | Collin |
| 2014/0320404 A1 | 10/2014 | Kasahara |
| 2014/0331187 A1 | 11/2014 | Hicks et al. |
| 2014/0347391 A1 | 11/2014 | Keane et al. |
| 2014/0351727 A1 | 11/2014 | Danton et al. |
| 2014/0351753 A1 | 11/2014 | Shin et al. |
| 2014/0362111 A1 | 12/2014 | Kim |
| 2014/0363074 A1 | 12/2014 | Dolfing et al. |
| 2014/0368537 A1 | 12/2014 | Salter et al. |
| 2014/0372957 A1 | 12/2014 | Keane et al. |
| 2014/0375541 A1 | 12/2014 | Nister et al. |
| 2014/0375683 A1 | 12/2014 | Salter et al. |
| 2015/0009118 A1 | 1/2015 | Thomas et al. |
| 2015/0035822 A1 | 2/2015 | Arsan et al. |
| 2015/0042679 A1 | 2/2015 | Järvenpää |
| 2015/0058718 A1 | 2/2015 | Kim et al. |
| 2015/0077335 A1 | 3/2015 | Taguchi et al. |
| 2015/0082180 A1 | 3/2015 | Ames et al. |
| 2015/0095844 A1 | 4/2015 | Cho et al. |
| 2015/0123890 A1 | 5/2015 | Kapur et al. |
| 2015/0128075 A1 | 5/2015 | Kempinski |
| 2015/0131850 A1 | 5/2015 | Qvarfordt |
| 2015/0135108 A1 | 5/2015 | Pope et al. |
| 2015/0145887 A1 | 5/2015 | Forutanpour et al. |
| 2015/0149929 A1 | 5/2015 | Shepherd et al. |
| 2015/0169506 A1 | 6/2015 | Leventhal et al. |
| 2015/0177937 A1 | 6/2015 | Poletto et al. |
| 2015/0193982 A1 | 7/2015 | Mihelich et al. |
| 2015/0205106 A1 | 7/2015 | Norden |
| 2015/0212576 A1 | 7/2015 | Ambrus et al. |
| 2015/0220152 A1 | 8/2015 | Tait et al. |
| 2015/0221132 A1 | 8/2015 | Kruglick |
| 2015/0242095 A1 | 8/2015 | Sonnenberg |
| 2015/0254905 A1 | 9/2015 | Ramsby et al. |
| 2015/0262428 A1 | 9/2015 | Tatzgern et al. |
| 2015/0312561 A1 | 10/2015 | Hoof et al. |
| 2015/0317832 A1 | 11/2015 | Ebstyne et al. |
| 2015/0331240 A1 | 11/2015 | Poulos et al. |
| 2015/0332091 A1 | 11/2015 | Kim et al. |
| 2015/0370323 A1 | 12/2015 | Cieplinski et al. |
| 2015/0381974 A1 | 12/2015 | Hoffman et al. |
| 2016/0012642 A1 | 1/2016 | Lee et al. |
| 2016/0015470 A1 | 1/2016 | Border |
| 2016/0018898 A1 | 1/2016 | Tu et al. |
| 2016/0018900 A1 | 1/2016 | Tu et al. |
| 2016/0025971 A1 | 1/2016 | Crow et al. |
| 2016/0026242 A1 | 1/2016 | Burns et al. |
| 2016/0026243 A1 | 1/2016 | Bertram et al. |
| 2016/0026253 A1 | 1/2016 | Bradski et al. |
| 2016/0041391 A1 | 2/2016 | Van et al. |
| 2016/0050642 A1 | 2/2016 | Brown et al. |
| 2016/0062636 A1 | 3/2016 | Jung et al. |
| 2016/0085301 A1 | 3/2016 | Lopez |
| 2016/0093108 A1 | 3/2016 | Mao et al. |
| 2016/0098094 A1 | 4/2016 | Minkkinen |
| 2016/0098972 A1 | 4/2016 | Feit et al. |
| 2016/0127690 A1 | 5/2016 | Kaehler et al. |
| 2016/0133044 A1 | 5/2016 | Lynch |
| 2016/0133052 A1 | 5/2016 | Choi et al. |
| 2016/0171304 A1 | 6/2016 | Golding et al. |
| 2016/0179191 A1 | 6/2016 | Kim et al. |
| 2016/0179336 A1 | 6/2016 | Ambrus et al. |
| 2016/0193104 A1 | 7/2016 | Du |
| 2016/0196692 A1 | 7/2016 | Kjallstrom et al. |
| 2016/0210784 A1 | 7/2016 | Ramsby et al. |
| 2016/0216768 A1 | 7/2016 | Goetz et al. |
| 2016/0224122 A1 | 8/2016 | Dietz et al. |
| 2016/0225012 A1 | 8/2016 | Ha et al. |
| 2016/0227267 A1 | 8/2016 | Tsurutani et al. |
| 2016/0253063 A1 | 9/2016 | Critchlow |
| 2016/0253821 A1 | 9/2016 | Romano et al. |
| 2016/0275702 A1 | 9/2016 | Reynolds et al. |
| 2016/0306434 A1 | 10/2016 | Ferrin |
| 2016/0309081 A1 | 10/2016 | Frahm et al. |
| 2016/0313890 A1 | 10/2016 | Walline et al. |
| 2016/0334940 A1 | 11/2016 | Kandadai et al. |
| 2016/0350973 A1 | 12/2016 | Shapira et al. |
| 2016/0357266 A1 | 12/2016 | Patel et al. |
| 2016/0370858 A1 | 12/2016 | Leppänen et al. |
| 2016/0373647 A1 | 12/2016 | García Morate et al. |
| 2016/0373714 A1 | 12/2016 | Lee et al. |
| 2016/0379409 A1 | 12/2016 | Gavriliuc et al. |
| 2017/0038829 A1 | 2/2017 | Lanier et al. |
| 2017/0038837 A1 | 2/2017 | Faaborg et al. |
| 2017/0038849 A1 | 2/2017 | Hwang |
| 2017/0039770 A1 | 2/2017 | Lanier et al. |
| 2017/0052393 A1 | 2/2017 | Kweon |
| 2017/0060230 A1 | 3/2017 | Faaborg et al. |
| 2017/0061694 A1 | 3/2017 | Giraldi et al. |
| 2017/0090566 A1 | 3/2017 | George-svahn et al. |
| 2017/0109930 A1 | 4/2017 | Holzer et al. |
| 2017/0115728 A1 | 4/2017 | Park et al. |
| 2017/0123487 A1 | 5/2017 | Hazra et al. |
| 2017/0131964 A1 | 5/2017 | Baek et al. |
| 2017/0132694 A1 | 5/2017 | Damy |
| 2017/0132822 A1 | 5/2017 | Marschke et al. |
| 2017/0146801 A1 | 5/2017 | Stempora |
| 2017/0147180 A1 | 5/2017 | Yoon et al. |
| 2017/0148339 A1 | 5/2017 | Van Curen et al. |
| 2017/0153866 A1 | 6/2017 | Grinberg et al. |
| 2017/0154326 A1 | 6/2017 | Jo et al. |
| 2017/0162177 A1 | 6/2017 | Lebeck et al. |
| 2017/0169616 A1 | 6/2017 | Wiley et al. |
| 2017/0206691 A1 | 7/2017 | Harrises et al. |
| 2017/0206692 A1 | 7/2017 | Sheaffer et al. |
| 2017/0212583 A1 | 7/2017 | Krasadakis |
| 2017/0228130 A1 | 8/2017 | Palmaro |
| 2017/0236332 A1 | 8/2017 | Kipman et al. |
| 2017/0256096 A1 | 9/2017 | Faaborg et al. |
| 2017/0285737 A1 | 10/2017 | Khalid et al. |
| 2017/0302903 A1 | 10/2017 | Ng et al. |
| 2017/0308163 A1 | 10/2017 | Cieplinski et al. |
| 2017/0315715 A1 | 11/2017 | Fujita et al. |
| 2017/0326457 A1 | 11/2017 | Tilton et al. |
| 2017/0344223 A1 | 11/2017 | Holzer et al. |
| 2017/0357389 A1 | 12/2017 | Fleizach et al. |
| 2017/0358141 A1 | 12/2017 | Stafford et al. |
| 2017/0364198 A1 | 12/2017 | Yoganandan et al. |
| 2018/0024681 A1 | 1/2018 | Bernstein et al. |
| 2018/0045963 A1 | 2/2018 | Hoover et al. |
| 2018/0046363 A1 | 2/2018 | Miller et al. |
| 2018/0075658 A1 | 3/2018 | Lanier et al. |
| 2018/0077383 A1 | 3/2018 | Akao et al. |
| 2018/0081519 A1 | 3/2018 | Kim |
| 2018/0084287 A1 | 3/2018 | Shimura |
| 2018/0095634 A1 | 4/2018 | Alexander |
| 2018/0095636 A1 | 4/2018 | Valdivia et al. |
| 2018/0095649 A1 | 4/2018 | Valdivia et al. |
| 2018/0101223 A1 | 4/2018 | Ishihara et al. |
| 2018/0114364 A1 | 4/2018 | Mcphee et al. |
| 2018/0120944 A1 | 5/2018 | Wang et al. |
| 2018/0122043 A1 | 5/2018 | Energin et al. |
| 2018/0136815 A1 | 5/2018 | Tomizuka et al. |
| 2018/0150204 A1 | 5/2018 | Macgillivray |

(56) References Cited

U.S. PATENT DOCUMENTS

| | | |
|---|---|---|
| 2018/0150997 A1 | 5/2018 | Austin |
| 2018/0157332 A1 | 6/2018 | Nie |
| 2018/0158222 A1 | 6/2018 | Hayashi |
| 2018/0165853 A1 | 6/2018 | Inagi et al. |
| 2018/0181199 A1 | 6/2018 | Harvey et al. |
| 2018/0181272 A1 | 6/2018 | Olsson et al. |
| 2018/0188802 A1 | 7/2018 | Okumura |
| 2018/0190003 A1 | 7/2018 | Upadhyay et al. |
| 2018/0197336 A1 | 7/2018 | Rochford et al. |
| 2018/0210628 A1 | 7/2018 | Mcphee et al. |
| 2018/0218214 A1 | 8/2018 | Pestun et al. |
| 2018/0220195 A1 | 8/2018 | Panchaksharaiah et al. |
| 2018/0239144 A1 | 8/2018 | Woods et al. |
| 2018/0247449 A1 | 8/2018 | Park et al. |
| 2018/0275753 A1 | 9/2018 | Publicover et al. |
| 2018/0286126 A1 | 10/2018 | Schwarz et al. |
| 2018/0300023 A1 | 10/2018 | Hein |
| 2018/0300952 A1 | 10/2018 | Evans et al. |
| 2018/0302687 A1 | 10/2018 | Bhattacharjee et al. |
| 2018/0315248 A1 | 11/2018 | Bastov et al. |
| 2018/0322701 A1 | 11/2018 | Pahud et al. |
| 2018/0330544 A1 | 11/2018 | Corso et al. |
| 2018/0330550 A1 | 11/2018 | Takahashi |
| 2018/0348861 A1 | 12/2018 | Uscinski et al. |
| 2018/0350099 A1 | 12/2018 | Yerkes et al. |
| 2018/0350119 A1 | 12/2018 | Kocharlakota et al. |
| 2018/0373412 A1* | 12/2018 | Reif .................... G06F 3/04815 |
| 2019/0012060 A1 | 1/2019 | Moore et al. |
| 2019/0034076 A1 | 1/2019 | Vinayak et al. |
| 2019/0043259 A1 | 2/2019 | Wang et al. |
| 2019/0056785 A1 | 2/2019 | Suk |
| 2019/0065027 A1 | 2/2019 | Hauenstein et al. |
| 2019/0073109 A1 | 3/2019 | Zhang et al. |
| 2019/0080572 A1 | 3/2019 | Kim et al. |
| 2019/0088149 A1 | 3/2019 | Fink et al. |
| 2019/0094963 A1 | 3/2019 | Nijs |
| 2019/0094979 A1 | 3/2019 | Hall et al. |
| 2019/0096134 A1 | 3/2019 | Amacker et al. |
| 2019/0101991 A1 | 4/2019 | Brennan |
| 2019/0102953 A1 | 4/2019 | Lindsay et al. |
| 2019/0130633 A1 | 5/2019 | Haddad et al. |
| 2019/0138183 A1 | 5/2019 | Rosas et al. |
| 2019/0146128 A1 | 5/2019 | Cao et al. |
| 2019/0172261 A1 | 6/2019 | Alt et al. |
| 2019/0172262 A1 | 6/2019 | Mchugh et al. |
| 2019/0188895 A1 | 6/2019 | Miller et al. |
| 2019/0188918 A1 | 6/2019 | Brewer et al. |
| 2019/0204906 A1 | 7/2019 | Ross et al. |
| 2019/0212827 A1 | 7/2019 | Kin et al. |
| 2019/0213389 A1 | 7/2019 | Peruch et al. |
| 2019/0227763 A1 | 7/2019 | Kaufthal |
| 2019/0228503 A1 | 7/2019 | Tokuchi |
| 2019/0238818 A1 | 8/2019 | Held et al. |
| 2019/0244434 A1 | 8/2019 | Pahud et al. |
| 2019/0251884 A1 | 8/2019 | Burns et al. |
| 2019/0258365 A1 | 8/2019 | Zurmoehle et al. |
| 2019/0265828 A1 | 8/2019 | Hauenstein et al. |
| 2019/0266774 A1 | 8/2019 | Sommerlade et al. |
| 2019/0278432 A1 | 9/2019 | Bennett et al. |
| 2019/0279407 A1 | 9/2019 | Mchugh et al. |
| 2019/0287307 A1 | 9/2019 | Rogers et al. |
| 2019/0294312 A1 | 9/2019 | Rohrbacher |
| 2019/0302977 A1 | 10/2019 | Pendergast et al. |
| 2019/0310757 A1 | 10/2019 | Lee et al. |
| 2019/0311547 A1 | 10/2019 | Ohmori |
| 2019/0324529 A1 | 10/2019 | Stellmach et al. |
| 2019/0325654 A1 | 10/2019 | Stisser et al. |
| 2019/0332244 A1 | 10/2019 | Beszteri et al. |
| 2019/0333278 A1* | 10/2019 | Palangie .................. G06T 19/20 |
| 2019/0339770 A1 | 11/2019 | Kurlethimar et al. |
| 2019/0340816 A1 | 11/2019 | Rogers |
| 2019/0346678 A1 | 11/2019 | Nocham |
| 2019/0346922 A1 | 11/2019 | Young et al. |
| 2019/0354259 A1 | 11/2019 | Park |
| 2019/0361521 A1 | 11/2019 | Stellmach et al. |
| 2019/0362560 A1 | 11/2019 | Choi et al. |
| 2019/0369569 A1 | 12/2019 | Olsen et al. |
| 2019/0370492 A1 | 12/2019 | Falchuk et al. |
| 2019/0371072 A1 | 12/2019 | Lindberg et al. |
| 2019/0371279 A1 | 12/2019 | Mak |
| 2019/0377487 A1 | 12/2019 | Bailey et al. |
| 2019/0379765 A1 | 12/2019 | Fajt et al. |
| 2019/0384406 A1 | 12/2019 | Smith et al. |
| 2020/0004401 A1 | 1/2020 | Hwang et al. |
| 2020/0012341 A1 | 1/2020 | Stellmach et al. |
| 2020/0020157 A1 | 1/2020 | Powers et al. |
| 2020/0026349 A1 | 1/2020 | Fontanel et al. |
| 2020/0038120 A1 | 2/2020 | Ziraknejad et al. |
| 2020/0043243 A1 | 2/2020 | Bhushan et al. |
| 2020/0051527 A1 | 2/2020 | Ngo |
| 2020/0073521 A1 | 3/2020 | Peebler et al. |
| 2020/0081526 A1 | 3/2020 | Walker et al. |
| 2020/0082602 A1 | 3/2020 | Jones |
| 2020/0089314 A1 | 3/2020 | Poupyrev et al. |
| 2020/0092537 A1 | 3/2020 | Sutter et al. |
| 2020/0098140 A1 | 3/2020 | Jagnow et al. |
| 2020/0098173 A1 | 3/2020 | Mccall |
| 2020/0099989 A1 | 3/2020 | Niemirska et al. |
| 2020/0106965 A1 | 4/2020 | Malia et al. |
| 2020/0117213 A1 | 4/2020 | Tian et al. |
| 2020/0126291 A1 | 4/2020 | Nguyen et al. |
| 2020/0128232 A1 | 4/2020 | Hwang et al. |
| 2020/0129850 A1 | 4/2020 | Ohashi |
| 2020/0159017 A1 | 5/2020 | Lin et al. |
| 2020/0218074 A1 | 7/2020 | Hoover et al. |
| 2020/0225735 A1 | 7/2020 | Schwarz |
| 2020/0225746 A1 | 7/2020 | Bar-zeev et al. |
| 2020/0225747 A1 | 7/2020 | Bar-zeev et al. |
| 2020/0225830 A1 | 7/2020 | Tang et al. |
| 2020/0226814 A1 | 7/2020 | Tang et al. |
| 2020/0226823 A1 | 7/2020 | Stachniak et al. |
| 2020/0242844 A1 | 7/2020 | Bae et al. |
| 2020/0257245 A1 | 8/2020 | Linville et al. |
| 2020/0257484 A1 | 8/2020 | Qian et al. |
| 2020/0267326 A1 | 8/2020 | Yim |
| 2020/0272303 A1 | 8/2020 | Jia et al. |
| 2020/0285314 A1 | 9/2020 | Cieplinski et al. |
| 2020/0318955 A1 | 10/2020 | Sharapov et al. |
| 2020/0319704 A1 | 10/2020 | Kathuria et al. |
| 2020/0322178 A1 | 10/2020 | Wang et al. |
| 2020/0322575 A1 | 10/2020 | Valli |
| 2020/0328913 A1 | 10/2020 | Wyas et al. |
| 2020/0356221 A1 | 11/2020 | Behzadi et al. |
| 2020/0357374 A1 | 11/2020 | Verweij et al. |
| 2020/0363867 A1 | 11/2020 | Azimi et al. |
| 2020/0371602 A1 | 11/2020 | Kanda |
| 2020/0371673 A1 | 11/2020 | Faulkner |
| 2020/0387214 A1 | 12/2020 | Ravasz et al. |
| 2020/0387228 A1 | 12/2020 | Ravasz et al. |
| 2020/0387287 A1 | 12/2020 | Ravasz et al. |
| 2020/0410960 A1 | 12/2020 | Saito et al. |
| 2021/0011556 A1 | 1/2021 | Atlas et al. |
| 2021/0049826 A1 | 2/2021 | Takahashi |
| 2021/0055789 A1 | 2/2021 | Tsai et al. |
| 2021/0056748 A1 | 2/2021 | Pritchett |
| 2021/0067418 A1 | 3/2021 | Ely et al. |
| 2021/0074062 A1 | 3/2021 | Madonna et al. |
| 2021/0090222 A1 | 3/2021 | Lee et al. |
| 2021/0090337 A1 | 3/2021 | Ravasz et al. |
| 2021/0090348 A1 | 3/2021 | Croxford et al. |
| 2021/0096726 A1 | 4/2021 | Faulkner et al. |
| 2021/0097766 A1 | 4/2021 | Palangie et al. |
| 2021/0097776 A1 | 4/2021 | Faulkner et al. |
| 2021/0102820 A1 | 4/2021 | Le et al. |
| 2021/0103333 A1 | 4/2021 | Cieplinski et al. |
| 2021/0125414 A1 | 4/2021 | Berkebile |
| 2021/0132687 A1 | 5/2021 | Luo et al. |
| 2021/0142552 A1 | 5/2021 | Kimura et al. |
| 2021/0158624 A1 | 5/2021 | Moon et al. |
| 2021/0165484 A1 | 6/2021 | Suguhara et al. |
| 2021/0165923 A1 | 6/2021 | Johnston |
| 2021/0166437 A1 | 6/2021 | Legendre et al. |
| 2021/0173340 A1 | 6/2021 | Kim |
| 2021/0173536 A1 | 6/2021 | Kondo |

(56) References Cited

U.S. PATENT DOCUMENTS

| | | |
|---|---|---|
| 2021/0191600 A1 | 6/2021 | Lemay et al. |
| 2021/0227601 A1 | 7/2021 | Eom et al. |
| 2021/0248674 A1 | 8/2021 | Ogunbunmi |
| 2021/0272367 A1 | 9/2021 | Richter |
| 2021/0272537 A1 | 9/2021 | Mak |
| 2021/0286502 A1 | 9/2021 | Lemay et al. |
| 2021/0287439 A1 | 9/2021 | Goodrich et al. |
| 2021/0295602 A1 | 9/2021 | Scapel et al. |
| 2021/0303074 A1 | 9/2021 | Vanblon et al. |
| 2021/0303107 A1 | 9/2021 | Pla I Conesa et al. |
| 2021/0312684 A1 | 10/2021 | Zimmermann et al. |
| 2021/0312713 A1 | 10/2021 | Peri et al. |
| 2021/0312717 A1 | 10/2021 | Mao |
| 2021/0326094 A1 | 10/2021 | Buerli et al. |
| 2021/0327140 A1 | 10/2021 | Rothkopf et al. |
| 2021/0331069 A1 | 10/2021 | Gustafson et al. |
| 2021/0333864 A1 | 10/2021 | Harvey et al. |
| 2021/0350564 A1 | 11/2021 | Peuhkurinen et al. |
| 2021/0350604 A1 | 11/2021 | Pejsa et al. |
| 2021/0358294 A1 | 11/2021 | Parashar et al. |
| 2021/0365108 A1 | 11/2021 | Burns et al. |
| 2021/0366440 A1 | 11/2021 | Burns et al. |
| 2021/0368136 A1 | 11/2021 | Chalmers et al. |
| 2021/0375022 A1 | 12/2021 | Lee et al. |
| 2021/0400744 A1 | 12/2021 | Chen et al. |
| 2021/0402306 A1 | 12/2021 | Huang |
| 2021/0405760 A1 | 12/2021 | Schoen |
| 2022/0011577 A1 | 1/2022 | Lawver et al. |
| 2022/0011855 A1 | 1/2022 | Hazra et al. |
| 2022/0012002 A1 | 1/2022 | Bar-zeev et al. |
| 2022/0028108 A1 | 1/2022 | Haapoja et al. |
| 2022/0030197 A1 | 1/2022 | Ishimoto |
| 2022/0070241 A1 | 3/2022 | Yerli |
| 2022/0076496 A1 | 3/2022 | Palangie et al. |
| 2022/0083197 A1 | 3/2022 | Rockel et al. |
| 2022/0091722 A1 | 3/2022 | Faulkner et al. |
| 2022/0091723 A1 | 3/2022 | Faulkner et al. |
| 2022/0092862 A1 | 3/2022 | Faulkner et al. |
| 2022/0100265 A1 | 3/2022 | Kies et al. |
| 2022/0100270 A1 | 3/2022 | Pastrana Vicente et al. |
| 2022/0101593 A1 | 3/2022 | Rockel et al. |
| 2022/0101612 A1 | 3/2022 | Palangie et al. |
| 2022/0104910 A1 | 4/2022 | Shelton et al. |
| 2022/0121275 A1 | 4/2022 | Balaji et al. |
| 2022/0124286 A1 | 4/2022 | Punwani et al. |
| 2022/0130107 A1 | 4/2022 | Lindh |
| 2022/0130126 A1 | 4/2022 | Delgado et al. |
| 2022/0137701 A1 | 5/2022 | Bowman et al. |
| 2022/0137705 A1 | 5/2022 | Hashimoto et al. |
| 2022/0155853 A1 | 5/2022 | Fan et al. |
| 2022/0155909 A1 | 5/2022 | Kawashima et al. |
| 2022/0157029 A1 | 5/2022 | Horita et al. |
| 2022/0157083 A1 | 5/2022 | Jandhyala et al. |
| 2022/0165013 A1 | 5/2022 | Velez et al. |
| 2022/0179503 A1 | 6/2022 | Timonen et al. |
| 2022/0187907 A1 | 6/2022 | Lee et al. |
| 2022/0191570 A1 | 6/2022 | Reid et al. |
| 2022/0197403 A1 | 6/2022 | Hughes et al. |
| 2022/0198755 A1 | 6/2022 | Pinchon |
| 2022/0206298 A1 | 6/2022 | Goodman |
| 2022/0214743 A1 | 7/2022 | Dascola et al. |
| 2022/0221976 A1 | 7/2022 | Agarwal et al. |
| 2022/0229524 A1 | 7/2022 | Mckenzie et al. |
| 2022/0229534 A1 | 7/2022 | Terre et al. |
| 2022/0232191 A1 | 7/2022 | Kawakami et al. |
| 2022/0239718 A1 | 7/2022 | Song et al. |
| 2022/0244536 A1 | 8/2022 | Sha et al. |
| 2022/0245888 A1 | 8/2022 | Singh et al. |
| 2022/0253125 A1 | 8/2022 | Wallen et al. |
| 2022/0253149 A1 | 8/2022 | Berliner et al. |
| 2022/0253194 A1* | 8/2022 | Berliner .................... G06F 3/14 |
| 2022/0255995 A1 | 8/2022 | Berliner et al. |
| 2022/0276720 A1 | 9/2022 | Yasui |
| 2022/0277533 A1 | 9/2022 | Park |
| 2022/0279303 A1 | 9/2022 | Marculescu et al. |
| 2022/0287676 A1 | 9/2022 | Steines et al. |
| 2022/0291808 A1 | 9/2022 | Stevens et al. |
| 2022/0292783 A1 | 9/2022 | Jayaram et al. |
| 2022/0292784 A1 | 9/2022 | Jayaram et al. |
| 2022/0292785 A1 | 9/2022 | Jayaram et al. |
| 2022/0295032 A1 | 9/2022 | Jayaram et al. |
| 2022/0295040 A1 | 9/2022 | Jayaram et al. |
| 2022/0295139 A1 | 9/2022 | Jayaram et al. |
| 2022/0301264 A1 | 9/2022 | O'leary et al. |
| 2022/0303680 A1 | 9/2022 | Ahmed et al. |
| 2022/0311950 A1 | 9/2022 | Ith et al. |
| 2022/0319453 A1 | 10/2022 | Llull et al. |
| 2022/0350463 A1 | 11/2022 | Walkin et al. |
| 2022/0365595 A1 | 11/2022 | Cieplinski et al. |
| 2022/0365740 A1 | 11/2022 | Chang et al. |
| 2022/0374136 A1 | 11/2022 | Chang et al. |
| 2022/0383592 A1 | 12/2022 | Hare et al. |
| 2022/0414999 A1 | 12/2022 | Ravasz et al. |
| 2023/0004216 A1 | 1/2023 | Rodgers et al. |
| 2023/0007335 A1 | 1/2023 | Gupta et al. |
| 2023/0008537 A1 | 1/2023 | Henderson et al. |
| 2023/0009683 A1 | 1/2023 | Biran et al. |
| 2023/0021861 A1 | 1/2023 | Fujiwara et al. |
| 2023/0032545 A1 | 2/2023 | Mindlin et al. |
| 2023/0068660 A1 | 3/2023 | Brent et al. |
| 2023/0069764 A1 | 3/2023 | Jonker et al. |
| 2023/0074080 A1 | 3/2023 | Miller et al. |
| 2023/0086766 A1 | 3/2023 | Olwal et al. |
| 2023/0092282 A1 | 3/2023 | Boesel et al. |
| 2023/0092874 A1 | 3/2023 | Krivoruchko et al. |
| 2023/0093979 A1 | 3/2023 | Stauber et al. |
| 2023/0094522 A1 | 3/2023 | Stauber et al. |
| 2023/0100610 A1 | 3/2023 | Pastrana Vicente et al. |
| 2023/0100689 A1 | 3/2023 | Chiu et al. |
| 2023/0114080 A1 | 4/2023 | Yang et al. |
| 2023/0120052 A1 | 4/2023 | Wallen et al. |
| 2023/0130520 A1 | 4/2023 | Kaptelinin |
| 2023/0133579 A1 | 5/2023 | Chang et al. |
| 2023/0152889 A1 | 5/2023 | Cieplinski et al. |
| 2023/0154122 A1 | 5/2023 | Dascola et al. |
| 2023/0163987 A1 | 5/2023 | Young et al. |
| 2023/0168788 A1 | 6/2023 | Faulkner et al. |
| 2023/0176806 A1 | 6/2023 | Chen et al. |
| 2023/0185426 A1 | 6/2023 | Rockel et al. |
| 2023/0186577 A1 | 6/2023 | Rockel et al. |
| 2023/0206572 A1 | 6/2023 | Pazmino et al. |
| 2023/0221833 A1 | 7/2023 | Holder et al. |
| 2023/0236660 A1 | 7/2023 | Kundu |
| 2023/0244857 A1 | 8/2023 | Weiss et al. |
| 2023/0259265 A1 | 8/2023 | Krivoruchko et al. |
| 2023/0260240 A1 | 8/2023 | Jayaram et al. |
| 2023/0266859 A1 | 8/2023 | Day et al. |
| 2023/0273706 A1 | 8/2023 | Smith et al. |
| 2023/0274504 A1 | 8/2023 | Ren et al. |
| 2023/0308610 A1 | 9/2023 | Henderson et al. |
| 2023/0308630 A1 | 9/2023 | Delgado |
| 2023/0315270 A1 | 10/2023 | Hylak et al. |
| 2023/0316634 A1* | 10/2023 | Chiu .................. G06F 3/04815 345/156 |
| 2023/0316658 A1 | 10/2023 | Smith et al. |
| 2023/0325004 A1 | 10/2023 | Burns et al. |
| 2023/0325046 A1 | 10/2023 | De Almeida E De Vincenzo et al. |
| 2023/0333646 A1 | 10/2023 | Pastrana Vicente et al. |
| 2023/0334808 A1 | 10/2023 | Sundstrom et al. |
| 2023/0341932 A1 | 10/2023 | Silva et al. |
| 2023/0343049 A1 | 10/2023 | Boesel et al. |
| 2023/0351702 A1 | 11/2023 | Tan et al. |
| 2023/0353398 A1 | 11/2023 | White |
| 2023/0359199 A1 | 11/2023 | Adachi et al. |
| 2023/0377268 A1 | 11/2023 | Hopkins et al. |
| 2023/0377295 A1 | 11/2023 | Angevine et al. |
| 2023/0384907 A1 | 11/2023 | Boesel et al. |
| 2023/0385532 A1 | 11/2023 | Mcveigh et al. |
| 2023/0388357 A1 | 11/2023 | Faulkner et al. |
| 2023/0394755 A1 | 12/2023 | Negoita et al. |
| 2023/0396854 A1 | 12/2023 | Sanders et al. |
| 2024/0012530 A1 | 1/2024 | Lin et al. |
| 2024/0062279 A1 | 2/2024 | Scully et al. |

(56) References Cited

U.S. PATENT DOCUMENTS

| | | |
|---|---|---|
| 2024/0070948 A1 | 2/2024 | Bradley et al. |
| 2024/0086031 A1 | 3/2024 | Palangie et al. |
| 2024/0086032 A1 | 3/2024 | Palangie et al. |
| 2024/0087256 A1 | 3/2024 | Hylak et al. |
| 2024/0094863 A1 | 3/2024 | Smith et al. |
| 2024/0094866 A1 | 3/2024 | Lemay et al. |
| 2024/0094882 A1 | 3/2024 | Brewer et al. |
| 2024/0095984 A1 | 3/2024 | Ren et al. |
| 2024/0102821 A1 | 3/2024 | Vallet et al. |
| 2024/0103613 A1 | 3/2024 | Chawda et al. |
| 2024/0103616 A1 | 3/2024 | Yerkes et al. |
| 2024/0103676 A1 | 3/2024 | Pastrana Vicente et al. |
| 2024/0103684 A1 | 3/2024 | Yu et al. |
| 2024/0103685 A1 | 3/2024 | Pazmino et al. |
| 2024/0103686 A1 | 3/2024 | Pazmino et al. |
| 2024/0103687 A1 | 3/2024 | Pastrana Vicente et al. |
| 2024/0103701 A1 | 3/2024 | Pastrana Vicente et al. |
| 2024/0103704 A1 | 3/2024 | Pastrana Vicente et al. |
| 2024/0103707 A1 | 3/2024 | Henderson et al. |
| 2024/0103716 A1 | 3/2024 | Pastrana Vicente et al. |
| 2024/0103803 A1 | 3/2024 | Krivoruchko et al. |
| 2024/0104836 A1 | 3/2024 | Dessero et al. |
| 2024/0104843 A1 | 3/2024 | Mckenzie et al. |
| 2024/0104870 A1 | 3/2024 | Fuste Lleixa et al. |
| 2024/0104873 A1 | 3/2024 | Pastrana Vicente et al. |
| 2024/0104876 A1* | 3/2024 | Couche .................... G06T 19/20 |
| 2024/0104877 A1 | 3/2024 | Henderson et al. |
| 2024/0119682 A1* | 4/2024 | Rudman ............... G06T 19/006 |
| 2024/0135612 A1 | 4/2024 | Hold-Geoffroy et al. |
| 2024/0152256 A1 | 5/2024 | Dascola et al. |
| 2024/0185514 A1 | 6/2024 | Singh et al. |
| 2024/0192764 A1 | 6/2024 | Dascola et al. |
| 2024/0193892 A1 | 6/2024 | Lutter et al. |
| 2024/0200967 A1 | 6/2024 | Arroyo et al. |
| 2024/0203066 A1 | 6/2024 | Kawashima et al. |
| 2024/0205509 A1 | 6/2024 | Kim et al. |
| 2024/0221273 A1 | 7/2024 | Dusseau et al. |
| 2024/0221291 A1 | 7/2024 | Henderson et al. |
| 2024/0233288 A1 | 7/2024 | Stauber et al. |
| 2024/0256032 A1 | 8/2024 | Holder et al. |
| 2024/0265656 A1 | 8/2024 | Victor-faichney et al. |
| 2024/0265796 A1 | 8/2024 | Ippadi Veerabhadre Gowda et al. |
| 2024/0272722 A1 | 8/2024 | Gitter et al. |
| 2024/0272782 A1 | 8/2024 | Pastrana Vicente et al. |
| 2024/0273838 A1 | 8/2024 | Palangie et al. |
| 2024/0281108 A1 | 8/2024 | Krivoruchko et al. |
| 2024/0281109 A1 | 8/2024 | Manjunath et al. |
| 2024/0291953 A1 | 8/2024 | Cerra et al. |
| 2024/0302948 A1 | 9/2024 | Hylak et al. |
| 2024/0310971 A1 | 9/2024 | Kawashima et al. |
| 2024/0338104 A1 | 10/2024 | Salter et al. |
| 2024/0338921 A1 | 10/2024 | Burgner et al. |
| 2024/0361832 A1 | 10/2024 | Calderone et al. |
| 2024/0361833 A1 | 10/2024 | Calderone et al. |
| 2024/0361835 A1 | 10/2024 | Hylak et al. |
| 2024/0361901 A1 | 10/2024 | Ravasz et al. |
| 2024/0393876 A1 | 11/2024 | Chawda et al. |
| 2024/0402800 A1 | 12/2024 | Shutzberg et al. |
| 2024/0402821 A1 | 12/2024 | Meyer et al. |
| 2024/0403080 A1 | 12/2024 | Laurita et al. |
| 2024/0404206 A1 | 12/2024 | Chiu et al. |
| 2024/0404207 A1 | 12/2024 | Laurita et al. |
| 2024/0404232 A1 | 12/2024 | Rockwell et al. |
| 2024/0404233 A1 | 12/2024 | Boesel et al. |
| 2024/0411444 A1 | 12/2024 | Shutzberg et al. |
| 2024/0420435 A1 | 12/2024 | Gitter et al. |
| 2024/0428488 A1 | 12/2024 | Ren et al. |
| 2025/0005855 A1 | 1/2025 | Holder et al. |
| 2025/0005864 A1 | 1/2025 | Dessero et al. |
| 2025/0008057 A1 | 1/2025 | Chiu et al. |
| 2025/0013343 A1 | 1/2025 | Smith et al. |
| 2025/0013344 A1 | 1/2025 | Smith et al. |
| 2025/0024008 A1 | 1/2025 | Cerra et al. |
| 2025/0028423 A1 | 1/2025 | Dessero et al. |
| 2025/0029319 A1 | 1/2025 | Boesel et al. |
| 2025/0029328 A1 | 1/2025 | Smith et al. |
| 2025/0031002 A1 | 1/2025 | Hawkins et al. |
| 2025/0036253 A1 | 1/2025 | Stauber et al. |
| 2025/0036255 A1 | 1/2025 | Pastrana Vicente et al. |
| 2025/0069328 A1 | 2/2025 | Herscher et al. |
| 2025/0077060 A1 | 3/2025 | Becker et al. |
| 2025/0077066 A1 | 3/2025 | Lutter |
| 2025/0078420 A1 | 3/2025 | Dessero et al. |
| 2025/0078429 A1 | 3/2025 | Dascola et al. |
| 2025/0103132 A1 | 3/2025 | Rickwald et al. |
| 2025/0104335 A1 | 3/2025 | Huang et al. |
| 2025/0104367 A1 | 3/2025 | Huang et al. |
| 2025/0106581 A1 | 3/2025 | Lutter et al. |
| 2025/0106582 A1 | 3/2025 | Lutter et al. |
| 2025/0110605 A1 | 4/2025 | Huang et al. |
| 2025/0111472 A1 | 4/2025 | Lutter et al. |
| 2025/0111605 A1 | 4/2025 | Huang et al. |
| 2025/0111622 A1 | 4/2025 | Stern et al. |
| 2025/0117079 A1 | 4/2025 | Chiu et al. |
| 2025/0118038 A1 | 4/2025 | Sorrentino et al. |
| 2025/0130707 A1 | 4/2025 | Stauber et al. |
| 2025/0156031 A1* | 5/2025 | Holder .................... G06F 3/017 |
| 2025/0157136 A1* | 5/2025 | Lindmeier .............. G06F 3/016 |
| 2025/0165069 A1 | 5/2025 | Calderone et al. |
| 2025/0199656 A1 | 6/2025 | Lipton et al. |
| 2025/0200901 A1 | 6/2025 | Ren et al. |
| 2025/0209744 A1 | 6/2025 | Piemonte et al. |
| 2025/0209753 A1 | 6/2025 | Piemonte et al. |
| 2025/0232541 A1 | 7/2025 | Chand et al. |

FOREIGN PATENT DOCUMENTS

| | | |
|---|---|---|
| CN | 104714771 A | 6/2015 |
| CN | 104981681 A | 10/2015 |
| CN | 105264461 A | 1/2016 |
| CN | 105264478 A | 1/2016 |
| CN | 106990838 A | 7/2017 |
| CN | 108519818 A | 9/2018 |
| CN | 108633307 A | 10/2018 |
| CN | 110413171 A | 11/2019 |
| CN | 110476142 A | 11/2019 |
| CN | 110543230 A | 12/2019 |
| CN | 110673718 A | 1/2020 |
| CN | 111580652 A | 8/2020 |
| CN | 111641843 A | 9/2020 |
| CN | 111913565 A | 11/2020 |
| CN | 112068757 A | 12/2020 |
| CN | 109491508 B | 8/2022 |
| CN | 115309271 A | 11/2022 |
| CN | 116132905 A | 5/2023 |
| CN | 117043722 A | 11/2023 |
| CN | 117857981 A | 4/2024 |
| CN | 118102204 A | 5/2024 |
| DE | 102016125811 A1 | 11/2017 |
| DE | 102020128536 A1 | 5/2021 |
| EP | 0816983 A2 | 1/1998 |
| EP | 1530115 A2 | 5/2005 |
| EP | 1562021 A1 | 8/2005 |
| EP | 2393056 A1 | 12/2011 |
| EP | 2458486 A1 | 5/2012 |
| EP | 2551763 A1 | 1/2013 |
| EP | 2741175 A2 | 6/2014 |
| EP | 2893297 A1 | 7/2015 |
| EP | 2947545 A1 | 11/2015 |
| EP | 3088997 A1 | 11/2016 |
| EP | 3249497 A1 | 11/2017 |
| EP | 3316075 A1 | 5/2018 |
| EP | 3336805 A1 | 6/2018 |
| EP | 3451135 A1 | 3/2019 |
| EP | 3503101 A1 | 6/2019 |
| EP | 3506151 A1 | 7/2019 |
| EP | 3570144 A1 | 11/2019 |
| EP | 3588255 A1 | 1/2020 |
| EP | 3654147 A1 | 5/2020 |
| EP | 4155867 A1 | 3/2023 |
| EP | 3688726 B1 | 8/2023 |
| JP | H06-4596 A | 1/1994 |
| JP | H10-51711 A | 2/1998 |
| JP | H10-78845 A | 3/1998 |

(56) References Cited

FOREIGN PATENT DOCUMENTS

| | | | |
|---|---|---|---|
| JP | H11-289555 | A | 10/1999 |
| JP | 2005-215144 | A | 8/2005 |
| JP | 2005-333524 | A | 12/2005 |
| JP | 2006-4093 | A | 1/2006 |
| JP | 2006-107048 | A | 4/2006 |
| JP | 2006-146803 | A | 6/2006 |
| JP | 2006-295236 | A | 10/2006 |
| JP | 2011-203880 | A | 10/2011 |
| JP | 2012-234550 | A | 11/2012 |
| JP | 2013-178639 | A | 9/2013 |
| JP | 2013-196158 | A | 9/2013 |
| JP | 2013-254358 | A | 12/2013 |
| JP | 2013-257716 | A | 12/2013 |
| JP | 2014-21565 | A | 2/2014 |
| JP | 2014-59840 | A | 4/2014 |
| JP | 2014-71663 | A | 4/2014 |
| JP | 2014-99184 | A | 5/2014 |
| JP | 2014-514652 | A | 6/2014 |
| JP | 2014-514653 | A | 6/2014 |
| JP | 2015-56173 | A | 3/2015 |
| JP | 2015-515040 | A | 5/2015 |
| JP | 2015-118332 | A | 6/2015 |
| JP | 2016-96513 | A | 5/2016 |
| JP | 2016-194744 | A | 11/2016 |
| JP | 2017-27206 | A | 2/2017 |
| JP | 2017-58528 | A | 3/2017 |
| JP | 2017-126009 | A | 7/2017 |
| JP | 2017-531221 | A | 10/2017 |
| JP | 2018-5516 | A | 1/2018 |
| JP | 2018-5517 | A | 1/2018 |
| JP | 2018-41477 | A | 3/2018 |
| JP | 2018-514005 | A | 5/2018 |
| JP | 2018-88118 | A | 6/2018 |
| JP | 2018-101019 | A | 6/2018 |
| JP | 2018-106499 | A | 7/2018 |
| JP | 6438869 | B2 | 12/2018 |
| JP | 2019-40333 | A | 3/2019 |
| JP | 2019-169154 | A | 10/2019 |
| JP | 2019-175449 | A | 10/2019 |
| JP | 2019-527881 | A | 10/2019 |
| JP | 2019-532382 | A | 11/2019 |
| JP | 2019-536131 | A | 12/2019 |
| JP | 2020-503595 | A | 1/2020 |
| JP | 2020-86913 | A | 6/2020 |
| JP | 2022-53334 | A | 4/2022 |
| JP | 2022-175629 | A | 11/2022 |
| JP | 2023-52278 | A | 4/2023 |
| KR | 10-2011-0017236 | A | 2/2011 |
| KR | 10-2016-0012139 | A | 2/2016 |
| KR | 10-2019-0100957 | A | 8/2019 |
| KR | 10-2020-0010296 | A | 1/2020 |
| KR | 10-2020-0035103 | A | 4/2020 |
| KR | 10-2021-0083016 | A | 7/2021 |
| WO | 2010/026519 | A1 | 3/2010 |
| WO | 2011/008638 | A1 | 1/2011 |
| WO | 2012/145180 | A1 | 10/2012 |
| WO | 2014/203301 | A1 | 12/2014 |
| WO | 2015/130150 | A1 | 9/2015 |
| WO | 2015/192117 | A1 | 12/2015 |
| WO | 2015/195216 | A1 | 12/2015 |
| WO | 2016/118344 | A1 | 7/2016 |
| WO | 2017/024142 | A1 | 2/2017 |
| WO | 2017/088487 | A1 | 6/2017 |
| WO | 2018/046957 | A2 | 3/2018 |
| WO | 2018/090060 | A1 | 5/2018 |
| WO | 2018/106299 | A1 | 6/2018 |
| WO | 2018/175735 | A1 | 9/2018 |
| WO | 2019/067902 | A1 | 4/2019 |
| WO | 2019/074771 | A1 | 4/2019 |
| WO | 2019/142560 | A1 | 7/2019 |
| WO | 2019/217163 | A1 | 11/2019 |
| WO | 2020/066682 | A1 | 4/2020 |
| WO | 2020/121483 | A1 | 6/2020 |
| WO | 2020/179027 | A1 | 9/2020 |
| WO | 2020/247256 | A1 | 12/2020 |
| WO | 2021/061349 | A1 | 4/2021 |
| WO | 2021/061351 | A1 | 4/2021 |
| WO | 2021/133053 | A1 | 7/2021 |
| WO | 2021/173839 | A1 | 9/2021 |
| WO | 2021/202783 | A1 | 10/2021 |
| WO | 2022/046340 | A1 | 3/2022 |
| WO | 2022/055821 | A1 | 3/2022 |
| WO | 2022/055822 | A1 | 3/2022 |
| WO | 2022/066399 | A1 | 3/2022 |
| WO | 2022/066535 | A2 | 3/2022 |
| WO | 2022/067075 | A1 | 3/2022 |
| WO | 2022/067343 | A2 | 3/2022 |
| WO | 2022/072187 | A2 | 4/2022 |
| WO | 2022/146936 | A1 | 7/2022 |
| WO | 2022/146938 | A1 | 7/2022 |
| WO | 2022/164881 | A1 | 8/2022 |
| WO | 2022/192040 | A1 | 9/2022 |
| WO | 2022/208797 | A1 | 10/2022 |
| WO | 2022/225795 | A1 | 10/2022 |
| WO | 2023/043646 | A1 | 3/2023 |
| WO | 2023/096940 | A2 | 6/2023 |
| WO | 2023/141535 | A1 | 7/2023 |

OTHER PUBLICATIONS

Extended European Search Report received for European Patent Application No. 25169059.0, mailed on May 12, 2025, 11 pages.
Extended European Search Report received for European Patent Application No. 25174955.2, mailed on Jun. 25, 2025, 12 pages.
Non-Final Office Action received for U.S. Appl. No. 18/473,198, mailed on Jul. 15, 2025, 13 pages.
Non-Final Office Action received for U.S. Appl. No. 18/896,227, mailed on May 29, 2025, 14 pages.
Notice of Allowance received for U.S. Appl. No. 18/322,469, mailed on Jul. 7, 2025, 14 pages.
Non-Final Office Action received for U.S. Appl. No. 18/473,187, mailed on May 16, 2025, 15 pages.
Non-Final Office Action received for U.S. Appl. No. 18/473,195, mailed on Jun. 27, 2025, 16 pages.
Non-Final Office Action received for U.S. Appl. No. 18/467,523, mailed on Jun. 17, 2025, 19 pages.
Non-Final Office Action received for U.S. Appl. No. 18/471,729, mailed on Jun. 17, 2025, 19 pages.
Corrected Notice of Allowability received for U.S. Appl. No. 18/988,115, mailed on Jul. 15, 2025, 2 pages.
Corrected Notice of Allowability received for U.S. Appl. No. 18/424,644, mailed on Jun. 24, 2025, 2 pages.
Final Office Action received for U.S. Appl. No. 18/473,196, mailed on Jul. 16, 2025, 20 pages.
Non-Final Office Action received for U.S. Appl. No. 17/905,483, mailed on Jul. 15, 2025, 20 pages.
Non-Final Office Action received for U.S. Appl. No. 18/473,176, mailed on May 14, 2025, 23 pages.
Final Office Action received for U.S. Appl. No. 18/149,640, mailed on May 21, 2025, 24 pages.
Final Office Action received for U.S. Appl. No. 17/933,020, mailed on May 21, 2025, 28 pages.
Non-Final Office Action received for U.S. Appl. No. 18/473,260, mailed on Jun. 27, 2025, 35 pages.
European Search Report received for European Patent Application No. 22723527.2, mailed on May 12, 2025, 4 pages.
International Search Report received for PCT Patent Application No. PCT/US2023/074978, mailed on Apr. 4, 2024, 4 pages.
International Search Report received for PCT Patent Application No. PCT/US2024/043470, mailed on Oct. 29, 2024, 4 pages.
Non-Final Office Action received for U.S. Appl. No. 17/202,034, mailed on Jun. 4, 2025, 40 pages.
Final Office Action received for U.S. Appl. No. 18/645,292, mailed on Jun. 2, 2025, 41 pages.
Non-Final Office Action received for U.S. Appl. No. 18/473,155, mailed on Jul. 10, 2025, 47 pages.
International Search Report received for PCT Patent Application No. PCT/US2023/074960, mailed on Feb. 12, 2024, 6 pages.

(56) References Cited

OTHER PUBLICATIONS

Notice of Allowance received for U.S. Appl. No. 18/152,656, mailed on Jun. 25, 2025, 6 pages.

Notice of Allowance received for U.S. Appl. No. 18/424,644, mailed on Jun. 11, 2025, 6 pages.

Extended European Search Report received for European Patent Application No. 24221722.2, mailed on Apr. 17, 2025, 7 pages.

International Search Report received for PCT Patent Application No. PCT/US2023/074973, mailed on Mar. 7, 2024, 7 pages.

Notice of Allowance received for U.S. Appl. No. 18/153,943, mailed on Jun. 17, 2025, 7 pages.

Notice of Allowance received for U.S. Appl. No. 18/988,115, mailed on Jun. 30, 2025, 7 pages.

Non-Final Office Action received for U.S. Appl. No. 18/882,622, mailed on May 22, 2025, 8 pages.

Notice of Allowance received for U.S. Appl. No. 17/655,521, mailed on Apr. 16, 2025, 8 pages.

Notice of Allowance received for U.S. Appl. No. 18/896,227, mailed on Jul. 11, 2025, 8 pages.

Notice of Allowance received for U.S. Appl. No. 18/157,040, mailed on Jun. 24, 2025, 9 pages.

Notice of Allowance received for U.S. Appl. No. 18/471,850, mailed on Jun. 10, 2025, 9 pages.

Notice of Allowance received for U.S. Appl. No. 18/473,262, mailed on Jun. 10, 2025, 9 pages.

Final Office Action received for U.S. Appl. No. 17/655,521, mailed on Apr. 10, 2024, 18 pages.

International Search Report received for PCT Patent Application No. PCT/US2022/071228, mailed on Aug. 25, 2022, 6 pages.

International Search Report received for PCT Patent Application No. PCT/US2024/032140, mailed on Sep. 10, 2024, 4 pages.

International Search Report received for PCT Patent Application No. PCT/US2024/032423, mailed on Sep. 25, 2024, 5 pages.

Non-Final Office Action received for U.S. Appl. No. 17/655,521, mailed on Aug. 23, 2023, 13 pages.

Non-Final Office Action received for U.S. Appl. No. 17/655,521, mailed on Nov. 27, 2024, 17 pages.

Banta et al., "A Next-Best-View System for Autonomous 3-D Object Reconstruction", IEEE Transactions on Systems, Man, and Cybernetics—Part A: Systems and Humans vol. 30, No. 5, Sep. 30, 2000, pp. 589-598.

Berard Francois, "A Study on Two-Dimensional Scrolling with Head Motion", CLIPS-IMAG Technical Report. France, Ref: <TR-IMAG-CLIPS-IHM-199901>, Retrieved from: <http://iihm.imag.fr/publs/1999/TR199901_PWindowRate.pdf>, Retrieved on Dec. 26, 2024, Jan. 8, 1999, 7 pages.

Dhakal et al., "SLAM-Share: Visual Simultaneous Localization and Mapping for Real-time Multi-user Augmented Reality", CoNEXT '22, Dec. 6-9, 2022, Roma, Italy, 14 pages.

Headmaster Introduction, "If You Can Move Your Head, You Can Move Your World", Retrieved from: <https://www.microsoft.com/buxtoncollection/a/pdf/HeadMaster%20Introduction.pdf>, Retrieved on Dec. 26, 2024, 4 pages.

Kim et al., "Virtual Object Sizes for Efficient and Convenient Mid-air Manipulation", The Visual Computer, vol. 38, No. 9, Jul. 1, 2022, pp. 3463-3474.

Mendes et al., "Mid-Air Interactions Above Stereoscopic Interactive Tables", IEEE Symposium on 3D User Interfaces (3DUI), Mar. 29-30, 2014, pp. 3-10.

Nunez Angulo et al., "Manual for the Design of Didactic Units in Augmented Reality Using the Cospaces EDU Application", 2020, 75 pages.

Ran et al., "Multi-User Augmented Reality with Communication Efficient and Spatially Consistent Virtual Objects", CoNEXT '20, Dec. 1-4, 2020, Barcelona, Spain, 13 pages.

Tolle et al., "Design of Head Movement Controller System (HEMOCS) for Control Mobile Application through Head Pose Movement Detection", Retrieved from:<https://www.google.com/url?sa=t&source=web&rct=j&opi=89978449&url=https://online-journals.org/index.php/i-jim/article/download/5552/4029/19224&ved=2ahUKEwj-w86vga-HAxUJJDQIHYMNDNw4HhAWegQILhAB&usg=AOvVaw3HR1t7v8Rx7osc1lp0UfOh>, DOI: <httpdx.doi.org/10.3991/ijim.v10i3.5552>, Retrieved on Dec. 26, 2024, 2016, 5 pages.

Non-Final Office Action received for U.S. Appl. No. 18/473,197, mailed on May 1, 2025, 14 pages.

Notice of Allowance received for U.S. Appl. No. 18/322,469, mailed on Mar. 19, 2025, 14 pages.

Corrected Notice of Allowability received for U.S. Appl. No. 18/146,234, mailed on Mar. 20, 2025, 2 pages.

Non-Final Office Action received for U.S. Appl. No. 18/174,403, mailed on Mar. 20, 2025, 26 pages.

Non-Final Office Action received for U.S. Appl. No. 18/317,890, mailed on Apr. 17, 2025, 26 pages.

Non-Final Office Action received for U.S. Appl. No. 18/327,844, mailed on Mar. 24, 2025, 27 pages.

Non-Final Office Action received for U.S. Appl. No. 18/317,886, mailed on Apr. 30, 2025, 34 pages.

International Search Report received for PCT Patent Application No. PCT/US2024/012828, mailed on May 6, 2024, 4 pages.

International Search Report received for PCT Patent Application No. PCT/US2024/032109, mailed on Sep. 13, 2024, 4 pages.

International Search Report received for PCT Patent Application No. PCT/US2024/032153, mailed on Nov. 11, 2024, 6 pages.

Notice of Allowance received for U.S. Appl. No. 18/473,182, mailed on Apr. 23, 2025, 8 pages.

Notice of Allowance received for U.S. Appl. No. 18/427,434, mailed on Apr. 17, 2025, 9 pages.

Notice of Allowance received for U.S. Appl. No. 18/515,188, mailed on Mar. 20, 2025, 9 pages.

Applicant-Initiated Interview Summary received for U.S. Appl. No. 18/119,219, mailed on May 21, 2024, 3 pages.

AquaSnap Window Manager: dock, snap, tile, organize [online], Nurgo Software, Available online at: <https://www.nurgo-software.com/products/aquasnap>, [retrieved on Jun. 27, 2023], 5 pages.

Corrected Notice of Allowability received for U.S. Appl. No. 17/448,875, mailed on Apr. 24, 2024, 4 pages.

Corrected Notice of Allowability received for U.S. Appl. No. 17/469,788, mailed on Feb. 12, 2025, 2 pages.

Corrected Notice of Allowability received for U.S. Appl. No. 17/479,791, mailed on May 19, 2023, 2 pages.

Corrected Notice of Allowability received for U.S. Appl. No. 17/659,147, mailed on Feb. 14, 2024, 6 pages.

Corrected Notice of Allowability received for U.S. Appl. No. 17/932,655, mailed on Oct. 12, 2023, 2 pages.

Corrected Notice of Allowability received for U.S. Appl. No. 17/932,999, mailed on Feb. 20, 2025, 2 pages.

Corrected Notice of Allowability received for U.S. Appl. No. 17/932,999, mailed on Jan. 23, 2025, 9 pages.

Corrected Notice of Allowability received for U.S. Appl. No. 17/935,095, mailed on Oct. 18, 2024, 3 pages.

Corrected Notice of Allowability received for U.S. Appl. No. 18/146,234, mailed on Feb. 6, 2025, 2 pages.

Corrected Notice of Allowability received for U.S. Appl. No. 18/154,757, mailed on Aug. 30, 2024, 2 pages.

Corrected Notice of Allowability received for U.S. Appl. No. 18/174,337, mailed on Jan. 15, 2025, 2 pages.

Corrected Notice of Allowability received for U.S. Appl. No. 18/421,827, mailed on Aug. 29, 2024, 2 pages.

Corrected Notice of Allowability received for U.S. Appl. No. 18/463,739, mailed on Oct. 4, 2024, 2 pages.

Corrected Notice of Allowability received for U.S. Appl. No. 18/465,098, mailed on Mar. 13, 2024, 3 pages.

Corrected Notice of Allowance received for U.S. Appl. No. 17/407,675, mailed on Dec. 24, 2024, 2 pages.

Corrected Notice of Allowance received for U.S. Appl. No. 17/478,593, mailed on Dec. 21, 2022, 2 pages.

Corrected Notice of Allowance received for U.S. Appl. No. 18/119,219, mailed on Sep. 11, 2024, 2 pages.

Corrected Notice of Allowance received for U.S. Appl. No. 18/152,656, mailed on Dec. 20, 2024, 5 pages.

European Search Report received for European Patent Application No. 21791153.6, mailed on Mar. 22, 2024, 5 pages.

(56) References Cited

OTHER PUBLICATIONS

European Search Report received for European Patent Application No. 21801378.7, mailed on Jul. 10, 2024, 5 pages.
European Search Report received for European Patent Application No. 22703771.0, mailed on Feb. 26, 2025, 4 pages.
Extended European Search Report received for European Patent Application No. 23158818.7, mailed on Jul. 3, 2023, 12 pages.
Extended European Search Report received for European Patent Application No. 23158929.2, mailed on Jun. 27, 2023, 12 pages.
Extended European Search Report received for European Patent Application No. 23197572.3, mailed on Feb. 19, 2024, 7 pages.
Extended European Search Report received for European Patent Application No. 24158036.4, mailed on Jul. 18, 2024, 12 pages.
Extended European Search Report received for European Patent Application No. 24159868.9, mailed on Oct. 9, 2024, 13 pages.
Extended European Search Report received for European Patent Application No. 24171800.6, mailed on Sep. 5, 2024, 15 pages.
Extended European Search Report received for European Patent Application No. 24171804.8, mailed on Sep. 5, 2024, 13 pages.
Extended European Search Report received for European Patent Application No. 24178730.8, mailed on Oct. 14, 2024, 8 pages.
Extended European Search Report received for European Patent Application No. 24178752.2, mailed on Oct. 4, 2024, 8 pages.
Extended European Search Report received for European Patent Application No. 24179233.2, mailed on Oct. 2, 2024, 10 pages.
Extended European Search Report received for European Patent Application No. 24179830.5, mailed on Nov. 5, 2024, 11 pages.
Extended European Search Report received for European Patent Application No. 24190323.6, mailed on Dec. 12, 2024, 9 pages.
Extended European Search Report received for European Patent Application No. 24217335.9, mailed on Feb. 24, 2025, 8 pages.
Eye-supported target positioning in MRTK, Mixed Reality Toolkit Documentation [online]. Features and Architecture [retrieved on Mar. 21, 2025]. Retrieved from the Internet: <URL: https://microsoft.github.io/MixedRealityToolkit-Unity/Documentation/EyeTracking/EyeTracking_Positioning.html>, 2 pages.
Final Office Action received for U.S. Appl. No. 14/531,874, mailed on Nov. 4, 2016, 10 pages.
Final Office Action received for U.S. Appl. No. 15/644,639, mailed on Sep. 19, 2019, 12 pages.
Final Office Action received for U.S. Appl. No. 17/202,034, mailed on May 4, 2023, 41 pages.
Final Office Action received for U.S. Appl. No. 17/202,034, mailed on Nov. 4, 2024, 50 pages.
Final Office Action received for U.S. Appl. No. 17/407,675, mailed on May 22, 2024, 18 pages.
Final Office Action received for U.S. Appl. No. 17/448,875, mailed on Mar. 16, 2023, 24 pages.
Final Office Action received for U.S. Appl. No. 17/580,495, mailed on Feb. 12, 2025, 29 pages.
Final Office Action received for U.S. Appl. No. 17/580,495, mailed on May 13, 2024, 29 pages.
Final Office Action received for U.S. Appl. No. 17/659,147, mailed on Oct. 4, 2023, 17 pages.
Final Office Action received for U.S. Appl. No. 17/816,314, mailed on Jan. 20, 2023, 11 pages.
Final Office Action received for U.S. Appl. No. 17/905,483, mailed on Jan. 8, 2025, 19 pages.
Final Office Action received for U.S. Appl. No. 17/934,104, mailed on Oct. 18, 2024, 28 pages.
Final Office Action received for U.S. Appl. No. 17/935,095, mailed on Dec. 29, 2023, 15 pages.
Final Office Action received for U.S. Appl. No. 18/157,040, mailed on Dec. 2, 2024, 25 pages.
Final Office Action received for U.S. Appl. No. 18/182,300, mailed on Feb. 16, 2024, 32 pages.
Final Office Action received for U.S. Appl. No. 18/182,300, mailed on Oct. 31, 2024, 34 pages.
Final Office Action received for U.S. Appl. No. 18/327,844, mailed on Nov. 29, 2024, 25 pages.

Final Office Action received for U.S. Appl. No. 18/375,280, mailed on Jul. 12, 2024, 19 pages.
Final Office Action received for U.S. Appl. No. 18/473,196, mailed on Dec. 6, 2024, 22 pages.
Home | Virtual Desktop [online], Virtual Desktop, Available online at: <https://www.vrdesktop.net>, [retrieved on Jun. 29, 2023], 4 pages.
How to Use Your Phone or Tablet in VR! | iOS and Android, YouTube [online]. YouTube, Dec. 20, 2017, Available online at <https://www.youtube.com/watch?v=QhfZjbVUxZE>, [Retrieved from Internet on Dec. 23, 2022], 4 pages.
International Search Report received for PCT Application No. PCT/US2022/076603, mailed on Jan. 9, 2023, 4 pages.
International Search Report received for PCT Application No. PCT/US2022/076719, mailed on Mar. 3, 2023, 8 pages.
International Search Report received for PCT Application No. PCT/US2023/018213, mailed on Jul. 26, 2023, 6 pages.
International Search Report received for PCT Application No. PCT/US2023/060052, mailed on May 24, 2023, 6 pages.
International Search Report received for PCT Application No. PCT/US2023/060943, mailed on Jun. 6, 2023, 7 pages.
International Search Report received for PCT Application No. PCT/US2023/074962, mailed on Jan. 19, 2024, 9 pages.
International Search Report received for PCT Application No. PCT/US2024/030107, mailed on Oct. 23, 2024, 9 pages.
International Search Report received for PCT Application No. PCT/US2024/032314, mailed on Nov. 11, 2024, 6 pages.
International Search Report received for PCT Application No. PCT/US2024/032451, mailed on Nov. 15, 2024, 6 pages.
International Search Report received for PCT Application No. PCT/US2024/032456, mailed on Nov. 14, 2024, 6 pages.
International Search Report received for PCT Patent Application No. PCT/US2015/029727, mailed on Nov. 2, 2015, 6 pages.
International Search Report received for PCT Patent Application No. PCT/US2021/022413, mailed on Aug. 13, 2021, 7 pages.
Notice of Allowance received for U.S. Appl. No. 18/473,179, mailed on May 8, 2025, 9 pages.
International Search Report received for PCT Patent Application No. PCT/US2021/050948, mailed on Mar. 4, 2022, 6 pages.
International Search Report received for PCT Patent Application No. PCT/US2021/071518, mailed on Feb. 25, 2022, 7 pages.
International Search Report received for PCT Patent Application No. PCT/US2021/071595, mailed on Mar. 17, 2022, 7 pages.
International Search Report received for PCT Patent Application No. PCT/US2021/071596, mailed on Apr. 8, 2022, 7 pages.
International Search Report received for PCT Patent Application No. PCT/US2022/013208, mailed on Apr. 26, 2022, 7 pages.
International Search Report received for PCT Patent Application No. PCT/US2022/071704, mailed on Aug. 26, 2022, 6 pages.
International Search Report received for PCT Patent Application No. PCT/US2022/076808, mailed on Mar. 28, 2023, 6 pages.
International Search Report received for PCT Patent Application No. PCT/US2022/076985, mailed on Feb. 20, 2023, 5 pages.
International Search Report received for PCT Patent Application No. PCT/US2022/082379, mailed on May 30, 2023, 7 pages.
International Search Report received for PCT Patent Application No. PCT/US2023/019309, mailed on Sep. 1, 2023, 6 pages.
International Search Report received for PCT Patent Application No. PCT/US2023/060429, mailed on Jun. 28, 2023, 7 pages.
International Search Report received for PCT Patent Application No. PCT/US2023/060592, mailed on Jun. 14, 2023, 7 pages.
International Search Report received for PCT Patent Application No. PCT/US2023/074257, mailed on Nov. 21, 2023, 5 pages.
International Search Report received for PCT Patent Application No. PCT/US2023/074793, mailed on Feb. 6, 2024, 6 pages.
International Search Report received for PCT Patent Application No. PCT/US2023/074950, mailed on Jan. 3, 2024, 7 pages.
International Search Report received for PCT Patent Application No. PCT/US2023/074957, mailed on Jan. 30, 2024, 7 pages.
International Search Report received for PCT Patent Application No. PCT/US2023/074968, mailed on Feb. 26, 2024, 7 pages.
International Search Report received for PCT Patent Application No. PCT/US2023/074979, mailed on Feb. 26, 2024, 6 pages.

(56) References Cited

OTHER PUBLICATIONS

International Search Report received for PCT Patent Application No. PCT/US2024/013602, mailed on Apr. 29, 2024, 4 pages.
International Search Report received for PCT Patent Application No. PCT/US2024/026102, mailed on Aug. 26, 2024, 5 pages.
International Search Report received for PCT Patent Application No. PCT/US2024/030661, mailed on Nov. 4, 2024, 5 pages.
International Search Report received for PCT Patent Application No. PCT/US2024/032455, mailed on Sep. 25, 2024, 4 pages.
International Search Report received for PCT Patent Application No. PCT/US2024/039190, mailed on Nov. 22, 2024, 5 pages.
International Search Report received for PCT Patent Application No. PCT/US2024/039204, mailed on Nov. 14, 2024, 4 pages.
Letter Restarting Period for Response received for U.S. Appl. No. 15/644,639, mailed on Sep. 28, 2018, 8 pages.
Non-Final Office Action received for U.S. Appl. No. 14/531,874, mailed on May 18, 2016, 11 pages.
Non-Final Office Action received for U.S. Appl. No. 15/644,639, mailed on Apr. 12, 2019, 11 pages.
Non-Final Office Action received for U.S. Appl. No. 15/644,639, mailed on Sep. 10, 2018, 9 pages.
Non-Final Office Action received for U.S. Appl. No. 16/881,599, mailed on Apr. 28, 2021, 8 pages.
Non-Final Office Action received for U.S. Appl. No. 17/123,000, mailed on Nov. 12, 2021, 8 pages.
Non-Final Office Action received for U.S. Appl. No. 17/202,034, mailed on Jan. 19, 2024, 44 pages.
Non-Final Office Action received for U.S. Appl. No. 17/202,034, mailed on Jul. 20, 2022, 38 pages.
Non-Final Office Action received for U.S. Appl. No. 17/407,675, mailed on Sep. 11, 2023, 16 pages.
Non-Final Office Action received for U.S. Appl. No. 17/448,875, mailed on Oct. 6, 2022, 25 pages.
Non-Final Office Action received for U.S. Appl. No. 17/448,875, mailed on Sep. 29, 2023, 30 pages.
Non-Final Office Action received for U.S. Appl. No. 17/479,791, mailed on May 11, 2022, 18 pages.
Non-Final Office Action received for U.S. Appl. No. 17/580,495, mailed on Aug. 15, 2024, 28 pages.
Non-Final Office Action received for U.S. Appl. No. 17/580,495, mailed on Dec. 11, 2023, 27 pages.
Non-Final Office Action received for U.S. Appl. No. 17/659,147, mailed on Mar. 16, 2023, 19 pages.
Non-Final Office Action received for U.S. Appl. No. 17/816,314, mailed on Jul. 6, 2023, 10 pages.
Non-Final Office Action received for U.S. Appl. No. 17/816,314, mailed on Sep. 23, 2022, 10 pages.
Non-Final Office Action received for U.S. Appl. No. 17/932,655, mailed on Apr. 20, 2023, 10 pages.
Non-Final Office Action received for U.S. Appl. No. 17/932,999, mailed on Feb. 23, 2024, 22 pages.
Non-Final Office Action received for U.S. Appl. No. 17/933,020, mailed on Jan. 30, 2025, 26 pages.
Non-Final Office Action received for U.S. Appl. No. 17/934,104, mailed on Mar. 25, 2024, 26 pages.
Non-Final Office Action received for U.S. Appl. No. 17/935,095, mailed on Jun. 22, 2023, 15 pages.
Non-Final Office Action received for U.S. Appl. No. 18/119,219, mailed on Mar. 28, 2024, 15 pages.
Non-Final Office Action received for U.S. Appl. No. 18/149,640, mailed on Jan. 15, 2025, 17 pages.
Non-Final Office Action received for U.S. Appl. No. 18/153,943, mailed on Dec. 31, 2024, 33 pages.
Non-Final Office Action received for U.S. Appl. No. 18/154,697, mailed on Nov. 24, 2023, 10 pages.
Non-Final Office Action received for U.S. Appl. No. 18/157,040, mailed on May 2, 2024, 25 pages.
Non-Final Office Action received for U.S. Appl. No. 18/182,300, mailed on May 29, 2024, 33 pages.
Non-Final Office Action received for U.S. Appl. No. 18/182,300, mailed on Oct. 26, 2023, 29 pages.
Non-Final Office Action received for U.S. Appl. No. 18/298,994, mailed on Mar. 7, 2025, 26 pages.
Non-Final Office Action received for U.S. Appl. No. 18/304,290, mailed on Mar. 5, 2025, 111 pages.
Non-Final Office Action received for U.S. Appl. No. 18/322,469, mailed on Nov. 15, 2024, 34 pages.
Non-Final Office Action received for U.S. Appl. No. 18/327,844, mailed on May 17, 2024, 20 pages.
Non-Final Office Action received for U.S. Appl. No. 18/336,770, mailed on Jun. 5, 2024, 12 pages.
Non-Final Office Action received for U.S. Appl. No. 18/375,280, mailed on Nov. 27, 2024, 17 pages.
Non-Final Office Action received for U.S. Appl. No. 18/424,644, mailed on Jan. 29, 2025, 18 pages.
Non-Final Office Action received for U.S. Appl. No. 18/427,434, mailed on Nov. 21, 2024, 17 pages.
Non-Final Office Action received for U.S. Appl. No. 18/429,301, mailed on Jun. 12, 2024, 28 pages.
Non-Final Office Action received for U.S. Appl. No. 18/473,196, mailed on Aug. 16, 2024, 21 pages.
Non-Final Office Action received for U.S. Appl. No. 18/473,196, mailed on Feb. 28, 2025, 20 pages.
Non-Final Office Action received for U.S. Appl. No. 18/645,292, mailed on Feb. 21, 2025, 39 pages.
Non-Final Office Action received for U.S. Appl. No. 18/988,115, mailed on Feb. 24, 2025, 40 pages.
Notice of Allowability received for U.S. Appl. No. 17/812,965, mailed on Jan. 15, 2025, 3 pages.
Notice of Allowability received for U.S. Appl. No. 17/814,455, mailed on Jan. 13, 2025, 7 pages.
Notice of Allowance received for U.S. Appl. No. 17/407,675, mailed on Aug. 20, 2024, 7 pages.
Notice of Allowance received for U.S. Appl. No. 18/154,757, mailed on Aug. 26, 2024, 12 pages.
Notice of Allowance received for U.S. Appl. No. 14/531,874, mailed on Mar. 28, 2017, 9 pages.
Notice of Allowance received for U.S. Appl. No. 15/644,639, mailed on Jan. 16, 2020, 16 pages.
Notice of Allowance received for U.S. Appl. No. 16/881,599, mailed on Dec. 17, 2021, 7 pages.
Notice of Allowance received for U.S. Appl. No. 17/123,000, mailed on May 27, 2022, 8 pages.
Notice of Allowance received for U.S. Appl. No. 17/123,000, mailed on Sep. 19, 2022, 7 pages.
Notice of Allowance received for U.S. Appl. No. 17/407,675, mailed on Dec. 11, 2024, 8 pages.
Notice of Allowance received for U.S. Appl. No. 17/448,875, mailed on Apr. 17, 2024, 8 pages.
Notice of Allowance received for U.S. Appl. No. 17/448,875, mailed on Jul. 12, 2024, 8 pages.
Notice of Allowance received for U.S. Appl. No. 17/448,876, mailed on Apr. 7, 2022, 9 pages.
Notice of Allowance received for U.S. Appl. No. 17/448,876, mailed on Jul. 20, 2022, 8 pages.
Notice of Allowance received for U.S. Appl. No. 17/469,788, mailed on Feb. 5, 2025, 5 pages.
Notice of Allowance received for U.S. Appl. No. 17/478,593, mailed on Aug. 31, 2022, 10 pages.
Notice of Allowance received for U.S. Appl. No. 17/479,791, mailed on Mar. 13, 2023, 9 pages.
Notice of Allowance received for U.S. Appl. No. 17/479,791, mailed on Nov. 17, 2022, 9 pages.
Notice of Allowance received for U.S. Appl. No. 17/580,495, mailed on Jun. 6, 2023, 6 pages.
Notice of Allowance received for U.S. Appl. No. 17/580,495, mailed on Nov. 30, 2022, 12 pages.
Notice of Allowance received for U.S. Appl. No. 17/650,775, mailed on Jan. 25, 2024, 10 pages.
Notice of Allowance received for U.S. Appl. No. 17/650,775, mailed on Sep. 18, 2023, 10 pages.

(56)         References Cited

OTHER PUBLICATIONS

Notice of Allowance received for U.S. Appl. No. 17/655,347, mailed on Feb. 20, 2025, 7 pages.
Notice of Allowance received for U.S. Appl. No. 17/659,147, mailed on Jan. 26, 2024, 13 pages.
Notice of Allowance received for U.S. Appl. No. 17/659,147, mailed on May 29, 2024, 13 pages.
Notice of Allowance received for U.S. Appl. No. 17/814,462, mailed on Feb. 26, 2025, 8 pages.
Notice of Allowance received for U.S. Appl. No. 17/816,314, mailed on Jan. 4, 2024, 6 pages.
Notice of Allowance received for U.S. Appl. No. 17/932,655, mailed on Jan. 24, 2024, 7 pages.
Notice of Allowance received for U.S. Appl. No. 17/932,655, mailed on Sep. 29, 2023, 7 pages.
Notice of Allowance received for U.S. Appl. No. 17/932,999, mailed on Sep. 12, 2024, 9 pages.
Notice of Allowance received for U.S. Appl. No. 17/933,707, mailed on Jun. 28, 2024, 8 pages.
Notice of Allowance received for U.S. Appl. No. 17/933,707, mailed on Mar. 6, 2024, 9 pages.
Notice of Allowance received for U.S. Appl. No. 17/935,095, mailed on Jul. 3, 2024, 9 pages.
Notice of Allowance received for U.S. Appl. No. 18/119,219, mailed on Jul. 22, 2024, 7 pages.
Notice of Allowance received for U.S. Appl. No. 18/146,234, mailed on Jan. 24, 2025, 12 pages.
Notice of Allowance received for U.S. Appl. No. 18/152,656, mailed on Dec. 17, 2024, 12 pages.
Notice of Allowance received for U.S. Appl. No. 18/154,697, mailed on Aug. 6, 2024, 8 pages.
Notice of Allowance received for U.S. Appl. No. 18/154,697, mailed on Dec. 3, 2024, 7 pages.
Notice of Allowance received for U.S. Appl. No. 18/154,757, mailed on Jan. 23, 2024, 10 pages.
Notice of Allowance received for U.S. Appl. No. 18/154,757, mailed on Jan. 23, 2025, 12 pages.
Notice of Allowance received for U.S. Appl. No. 18/154,757, mailed on May 10, 2024, 12 pages.
Notice of Allowance received for U.S. Appl. No. 18/174,337, mailed on Jan. 2, 2025, 8 pages.
Notice of Allowance received for U.S. Appl. No. 18/182,304, mailed on Jan. 24, 2024, 9 pages.
Notice of Allowance received for U.S. Appl. No. 18/182,304, mailed on Oct. 2, 2023, 9 pages.
Notice of Allowance received for U.S. Appl. No. 18/317,893, mailed on Jan. 13, 2025, 11 pages.
Notice of Allowance received for U.S. Appl. No. 18/336,770, mailed on Nov. 29, 2024, 9 pages.
Notice of Allowance received for U.S. Appl. No. 18/421,675, mailed on Apr. 11, 2024, 9 pages.
Notice of Allowance received for U.S. Appl. No. 18/421,675, mailed on Jul. 31, 2024, 8 pages.
Notice of Allowance received for U.S. Appl. No. 18/421,827, mailed on Aug. 14, 2024, 10 pages.
Notice of Allowance received for U.S. Appl. No. 18/423,187, mailed on Jun. 5, 2024, 9 pages.
Notice of Allowance received for U.S. Appl. No. 18/429,294, mailed on Jun. 21, 2024, 10 pages.
Notice of Allowance received for U.S. Appl. No. 18/429,294, mailed on Oct. 31, 2024, 10 pages.
Notice of Allowance received for U.S. Appl. No. 18/429,301, mailed on Nov. 22, 2024, 8 pages.
Notice of Allowance received for U.S. Appl. No. 18/463,739, mailed on Feb. 1, 2024, 10 pages.
Notice of Allowance received for U.S. Appl. No. 18/463,739, mailed on Jun. 17, 2024, 9 pages.
Notice of Allowance received for U.S. Appl. No. 18/463,739, mailed on Oct. 30, 2023, 11 pages.

Notice of Allowance received for U.S. Appl. No. 18/465,098, mailed on Jun. 20, 2024, 8 pages.
Notice of Allowance received for U.S. Appl. No. 18/465,098, mailed on Mar. 4, 2024, 6 pages.
Notice of Allowance received for U.S. Appl. No. 18/465,098, mailed on Nov. 17, 2023, 8 pages.
Notice of Allowance received for U.S. Appl. No. 18/515,188, mailed on Nov. 27, 2024, 9 pages.
Notice of Allowance received for U.S. Appl. No. 18/668,032, mailed on Jan. 16, 2025, 9 pages.
Notice of Allowance received for U.S. Appl. No. 18/671,936, mailed on Jan. 15, 2025, 9 pages.
Notice of Allowance received for U.S. Appl. No. 18/671,936, mailed on Mar. 5, 2025, 7 pages.
Restriction Requirement received for U.S. Appl. No. 17/932,999, mailed on Oct. 3, 2023, 6 pages.
Restriction Requirement received for U.S. Appl. No. 18/473,187, mailed on Dec. 30, 2024, 5 pages.
Search Report received for Chinese Patent Application No. 202310873465.7, mailed on Feb. 1, 2024, 5 pages (2 pages of English Translation and 3 pages of Official Copy).
Sliders, Mixed Reality Toolkit Documentation [online]. Features and Architecture [retrieved on Mar. 21, 2025]. Retrieved from the Internet: <URL: https://microsoft.github.io/MixedRealityToolkit-Unity/Documentation/README_Sliders.html>, 3 pages.
Spatial Audio Head Tracking on Apple Tv Automatically Resets when You Get Up from the Couc . . . , AppleInsider [online]. Jun. 10, 2021 [retrieved on Dec. 20, 2024]. Retrieved from the Internet: <https://forums.appleinsider.com/discussion/222259/spatial-audio-head-tracking-on-apple-tv-automatically-resets-when-you-get-up-from-the-couc>, 2024, 6 pages.
Supplemental Notice of Allowability received for U.S. Appl. No. 18/317,893, mailed on Jan. 29, 2025, 3 pages.
Supplemental Notice of Allowance received for U.S. Appl. No. 14/531,874, mailed on Jul. 26, 2017, 5 pages.
Supplemental Notice of Allowance received for U.S. Appl. No. 18/515,188, mailed on Dec. 12, 2024, 2 pages.
Your PC in VR, Virtual Desktop [online]. Virtual Desktop, Inc., 2023 [retrieved on Apr. 17, 2024]. Retrieved from the Internet: <URL: https://www.vrdesktop.net/>, 4 pages.
Coloring a Point Cloud Using 3DF Zephyr Pro, Wayback Machine, https://web.archive.org/web/20170522233043/http://www.3dflow.net:80/technology/documents/3df-zephyr-tutorials/point-cloud-coloring-using-3df-zephyr/, May 22, 2017, 1 page.
Apple, "Use Continuity to Connect Your Mac, iPhone, iPad, and Apple Watch", Apple Support, Available online at <https://support.apple.com/en-us/HT204681>, [Retrieved from Internet on Dec. 23, 2022], 4 pages.
Apple, "Use Message Effects with iMessage on Your iPhone, iPad, and iPod Touch", Apple Support, Available online at: https://support.apple.com/en-us/HT206894>, [retrieved on Feb. 22, 2024], 5 pages.
Bhowmick Shimmila, "Explorations on Body-Gesture Based Object Selection on HMD Based VR Interfaces for Dense and Occluded Dense Virtual Environments", Report: State of the Art Seminar, Department of Design Indian Institute of Technology, Guwahati, Nov. 2018, 25 pages.
Bohn Dieter, "Rebooting WebOS: How LG Rethought The Smart TV", The Verge, Available online at: <http://www.theverge.com/2014/1/6/5279220/rebooting-webos-how-lg-rethought-the-smart-tv>, [Retrieved Aug. 26, 2019], Jan. 6, 2014, 5 pages.
Bolt et al., "Two-Handed Gesture in Multi-Modal Natural Dialog", Uist '92, 5th Annual Symposium on User Interface Software And Technology. Proceedings Of the ACM Symposium on User Interface Software And Technology, Monterey, Nov. 15-18, 1992, pp. 7-14.
Brennan Dominic, "4 Virtual Reality Desktops for Vive, Rift, and Windows VR Compared", [online]. Road to VR, Available online at: <https://www.roadtovr.com/virtual-reality-desktop-compared-oculus-rift-htc-vive/>, [retrieved on Jun. 29, 2023], Jan. 3, 2018, 4 pages.
Capturing Reality, "Data Sheet RealityCapture TARASQUE 1.2", Wayback Machine, https://web.archive.org/web/20220327110303/

(56)　　　　　References Cited

OTHER PUBLICATIONS https://www.capturingreality.com/assets/Documents/datasheet_TARASQUE_1.2.pdf, Mar. 27, 2022, 5 pages.

Capturing Reality, "RealityCapture tutorial: Complete model in PPI", Youtube, https://www.youtube.com/watch?v=tw6wNNEbH_M, Oct. 14, 2021, 2 pages.

Chatterjee et al., "Gaze+Gesture: Expressive, Precise and Targeted Free-Space Interactions", ICMI '15, Nov. 9-13, 2015, 8 pages.

Choe et al., "Augmented-Reality-Based 3D Emotional Messenger for Dynamic User Communication with Smart Devices", Electronics, vol. 9, No. 1127, Jul. 10, 2020, 15 pages.

Didehkhorshid et al., "Text Input in Virtual Reality Using a Tracked Drawing Tablet", HCII 2020, LNCS 12428, 2020, pp. 314-329.

Edmiston et al., "Touch-Enabled Input Devices for Controlling Virtual Environments", 12th IFAC Symposium on Analysis, Design and Evaluation of Human-Machine Systems, Las Vegas, NV, USA, Aug. 11-15, 2013, pp. 349-356.

Fatima et al., "Eye Movement Based Human Computer Interaction", 3rd International Conference On Recent Advances In Information Technology (RAIT), Mar. 3, 2016, pp. 489-494.

Grey Melissa, "Comcast's New X2 Platform Moves your DVR Recordings from the Box to the Cloud", Engadget, Available online at: <http://www.engadget.com/2013/06/11/comcast-x2-platform/>, Jun. 11, 2013, 15 pages.

Huang et al., "Proxy-Based Security Audit System for Remote Desktop Access", Computer Communications And Networks, ICCCN 2009. Proceedings of 18th International Conference On, IEEE, Piscataway, NJ, USA, Aug. 3, 2009, 5 pages.

Lachambre et al., "Unity Photogrammetry Workflow", https://unity3d.com/files/solutions/photogrammetry/Unity-Photogrammetry-Workflow_2017-07_v2.pdf, Jun. 23, 2017, pp. 55-64.

Lin et al., "Towards Naturally Grabbing and Moving Objects in VR", IS&T International Symposium on Electronic Imaging and The Engineering Reality of Virtual Reality, 2016, 6 pages.

Lin et al., "Ubii: Physical World Interaction Through Augmented Reality", Publisher: IEEE, vol. 16, No. 3, DOI:10.1109/TMC.2016.2567378, May 13, 2016, pp. 872-885.

Lor Cas, "Reality Capture: Exporting Mesh", Youtube, https://www.youtube.com/watch?v=PdvTRa2B_s0, Dec. 10, 2020, 2 pages.

Macmostvideo, "A Beginner's Guide to Selecting Items On Your Mac (#1566)", Bibliographic Information, Jan. 4, 2018, Retrieved from <URL:https://www.youtube.com/watch?v=a6MDAuh7MOQ&ab_channel=macmostvideo/>, [retrieved on Feb. 19, 2025], Most relevant passage of the video is 00:10 to 00:30, 2 pages.

Mcgill et al., "Expanding The Bounds Of Seated Virtual Workspaces", University of Glasgow, Available online at: <https://core.ac.uk/download/pdf/323988271.pdf>, [retrieved on Jun. 27, 2023], Jun. 5, 2020, 44 pages.

Metalnwood, "Using a Tablet for Touch Control, with VR Headset On. (Demo Vid)", Virtual Reality, ED Forums, Jun. 12, 2020, Available online at <https://forum.dcs.world/topic/237992-using-a-tablet-for-touch-control-with-vr-headset-on-demo-vid/>, [Retrieved from Internet on Jan. 2, 2024], 9 pages.

Pfeuffer et al., "Gaze + Pinch Interaction in Virtual Reality", In Proceedings of SUI '17, Brighton, United Kingdom, Oct. 16-17, 2017, pp. 99-108.

Pfeuffer et al., "Gaze and Touch Interaction on Tablets", UIST '16, Tokyo, Japan, ACM, Oct. 16-19, 2016, pp. 301-311.

Process a 3D Scan With Projection in Reality Capture (RC), Wayback Machine, https://web.archive.org/web/20200116135047/http:/www.pi3dscan.com/index.php/instructi ons/item/process-a-3d-scan-with-projection-in-reality-capture-rc, Jan. 16, 2020, 1 page.

Schenk et al., "SPOCK: A Smooth Pursuit Oculomotor Control Kit", CHI'16 Extended Abstracts, San Jose, CA, USA, ACM, May 7-12, 2016, pp. 2681-2687.

Schubert Martin, "Design Sprints at Leap Motion: A Playground of 3D User Interfaces", Ultraleap For Developers [online]. Nov. 8, 2017 [retrieved on Mar. 21, 2025]. Retrieved from the Internet: <URL: https://blog.leapmotion.com/design-playground-3d-user-interfaces/>, 17 pages.

Schuetz Markus, "Interactive Exploration of Point Clouds", Technische Universitat Wien, reposiTUm, https://doi.org/10.34726/hss.2021.91668, Mar. 8, 2021, 119 pages.

Sun et al., "MagicHand: Interact with IoT Devices in Augmented Reality Environment", 2019 IEEE Conference on Virtual Reality and 3D User Interfaces, Osaka, Japan, Mar. 23-27, 2019, [retrieved on Dec. 4, 2020], 6 pages.

Simple Modal Window With Background Blur Effect, Available online at: <http://web.archive.org/web/20160313233427/https://www.cssscript.com/simple-modal-window-with-background-blur-effect/>, Mar. 13, 2016, 5 pages.

Wood Tyriel, "The HoloLens 2 Tour!—Discovering a World of Holograms", YouTube [online]. YouTube, Mar. 23, 2021 [retrieved on Dec. 7, 2023], Retrieved from the Internet: <URL: https://www.youtube.com/watch?v=rMks7sMzPxI>, 2 pages.

Writtenhouse Sandy, "How to Use Live View on Google Maps", Available online at <https://www.lifewire.com/use-live-view-google-maps-5323691>, [Retrieved from Internet on Jun. 27, 2024], Jul. 5, 2022, 6 pages.

Yamada Yoshihiro, "How to Generate a Modal Window with ModalPopup Control", Available online at: <http://web.archive.org/web/20210920015801/https://atmarkit.itmedia.co.jp/fdotnet/dotnettips/580aspajaxmodalpopup/aspajaxmodalpopup.html> [Search Date Aug. 22, 2023], Sep. 20, 2021, 8 pages (1 page of English Abstract and 7 pages of Official Copy).

Yue et al., "Optimal Region Selection for Stereoscopic Video Subtitle Insertion", IEEE Transactions on Circuits and Systems for Video Technology, vol. 28, No. 11, Nov. 2018, 13 pages.

Extended European Search Report received for European Patent Application No. 25169060.8, mailed on May 12, 2025, 10 pages.

* cited by examiner

Figure 1A

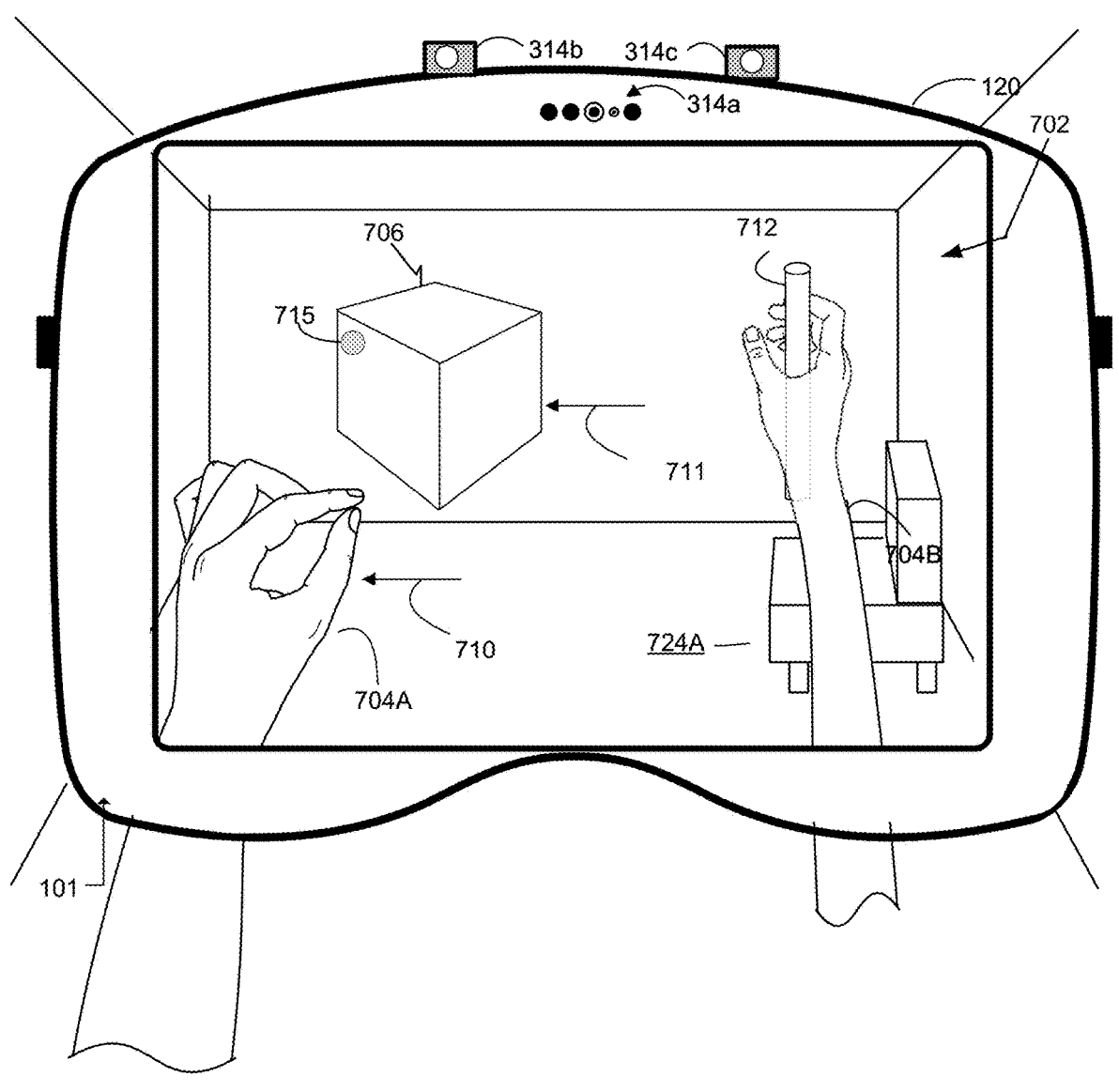
FIG. 7A1

800

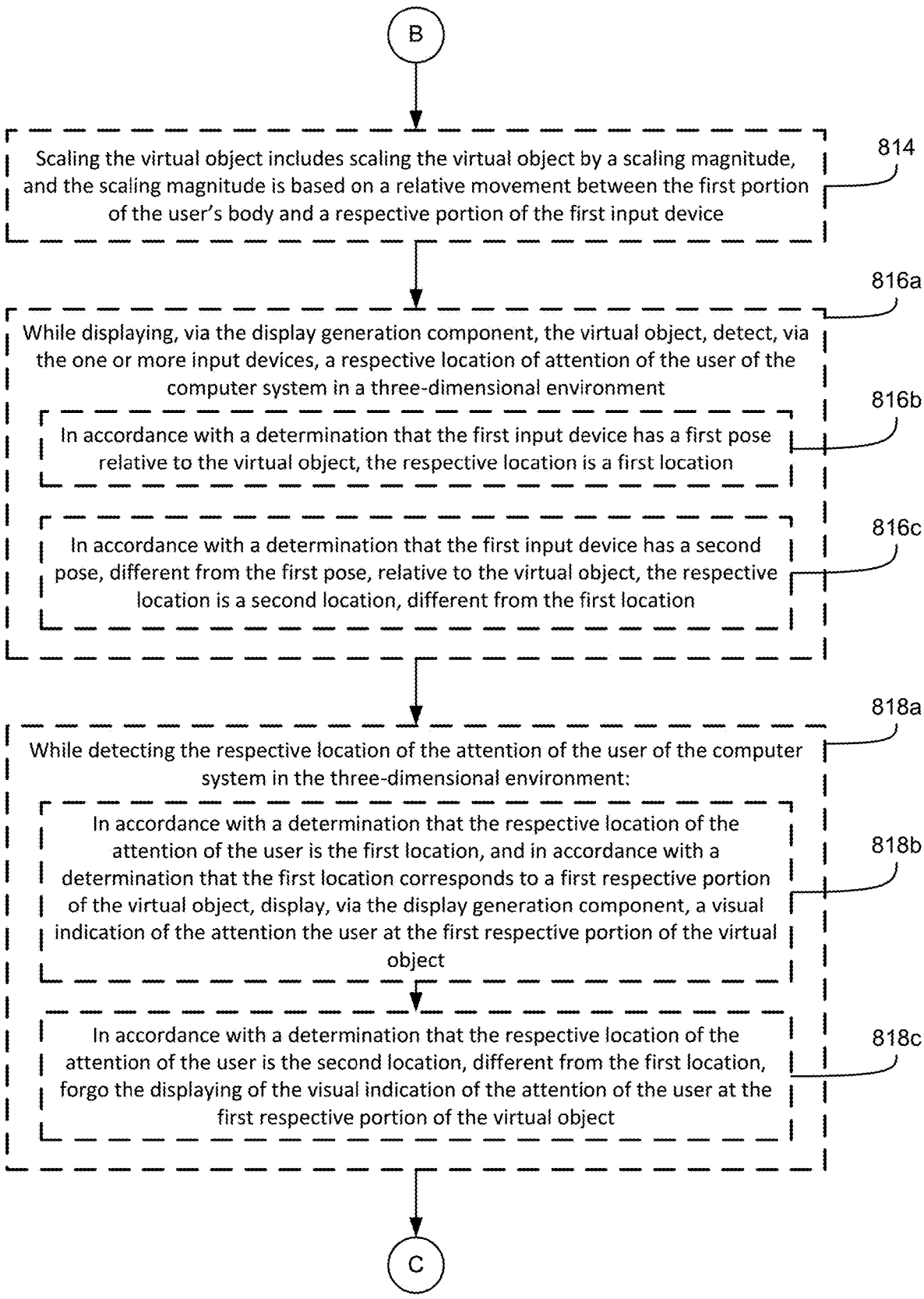

B

Scaling the virtual object includes scaling the virtual object by a scaling magnitude, and the scaling magnitude is based on a relative movement between the first portion of the user's body and a respective portion of the first input device          814

While displaying, via the display generation component, the virtual object, detect, via the one or more input devices, a respective location of attention of the user of the computer system in a three-dimensional environment          816a In accordance with a determination that the first input device has a first pose relative to the virtual object, the respective location is a first location          816b In accordance with a determination that the first input device has a second pose, different from the first pose, relative to the virtual object, the respective location is a second location, different from the first location          816c While detecting the respective location of the attention of the user of the computer system in the three-dimensional environment:          818a In accordance with a determination that the respective location of the attention of the user is the first location, and in accordance with a determination that the first location corresponds to a first respective portion of the virtual object, display, via the display generation component, a visual indication of the attention the user at the first respective portion of the virtual object          818b In accordance with a determination that the respective location of the attention of the user is the second location, different from the first location, forgo the displaying of the visual indication of the attention of the user at the first respective portion of the virtual object          818c

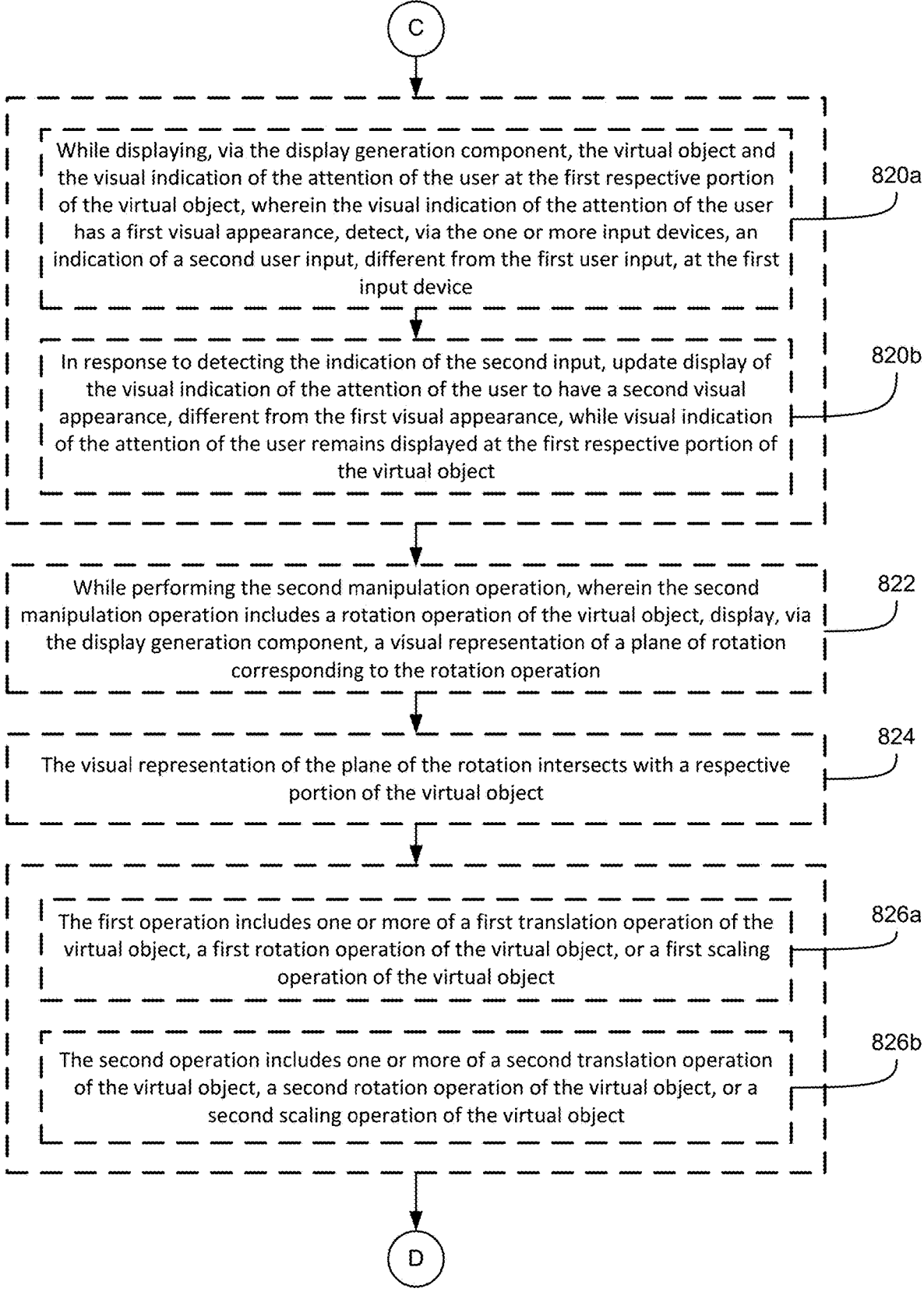

C

While displaying, via the display generation component, the virtual object and the visual indication of the attention of the user at the first respective portion of the virtual object, wherein the visual indication of the attention of the user has a first visual appearance, detect, via the one or more input devices, an indication of a second user input, different from the first user input, at the first input device          820a In response to detecting the indication of the second input, update display of the visual indication of the attention of the user to have a second visual appearance, different from the first visual appearance, while visual indication of the attention of the user remains displayed at the first respective portion of the virtual object          820b While performing the second manipulation operation, wherein the second manipulation operation includes a rotation operation of the virtual object, display, via the display generation component, a visual representation of a plane of rotation corresponding to the rotation operation          822

The visual representation of the plane of the rotation intersects with a respective portion of the virtual object          824

The first operation includes one or more of a first translation operation of the virtual object, a first rotation operation of the virtual object, or a first scaling operation of the virtual object          826a The second operation includes one or more of a second translation operation of the virtual object, a second rotation operation of the virtual object, or a second scaling operation of the virtual object          826b

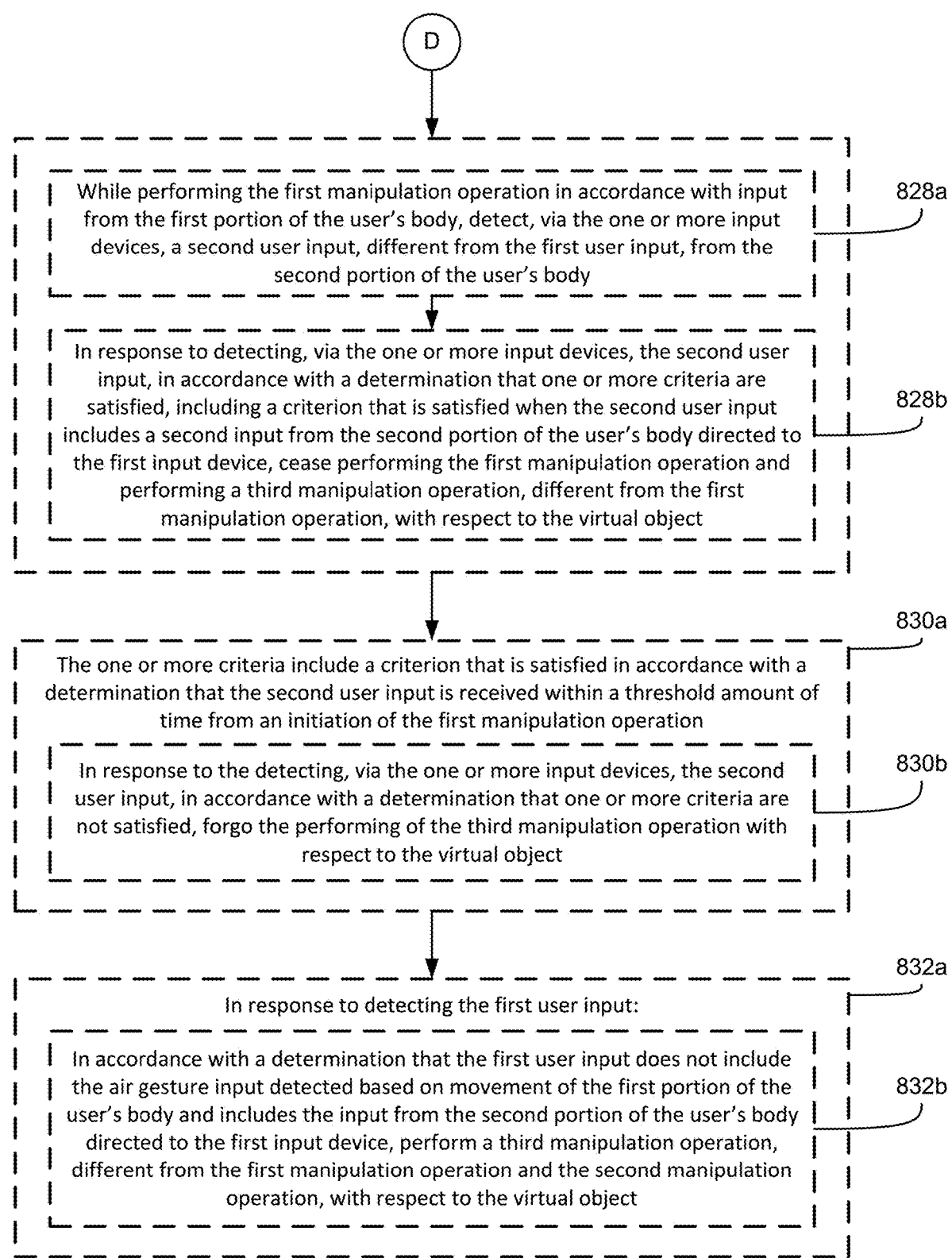

D

While performing the first manipulation operation in accordance with input from the first portion of the user's body, detect, via the one or more input devices, a second user input, different from the first user input, from the second portion of the user's body 828a In response to detecting, via the one or more input devices, the second user input, in accordance with a determination that one or more criteria are satisfied, including a criterion that is satisfied when the second user input includes a second input from the second portion of the user's body directed to the first input device, cease performing the first manipulation operation and performing a third manipulation operation, different from the first manipulation operation, with respect to the virtual object 828b The one or more criteria include a criterion that is satisfied in accordance with a determination that the second user input is received within a threshold amount of time from an initiation of the first manipulation operation 830a In response to the detecting, via the one or more input devices, the second user input, in accordance with a determination that one or more criteria are not satisfied, forgo the performing of the third manipulation operation with respect to the virtual object 830b In response to detecting the first user input:

832a

In accordance with a determination that the first user input does not include the air gesture input detected based on movement of the first portion of the user's body and includes the input from the second portion of the user's body directed to the first input device, perform a third manipulation operation, different from the first manipulation operation and the second manipulation operation, with respect to the virtual object 832b

FIG. 8E

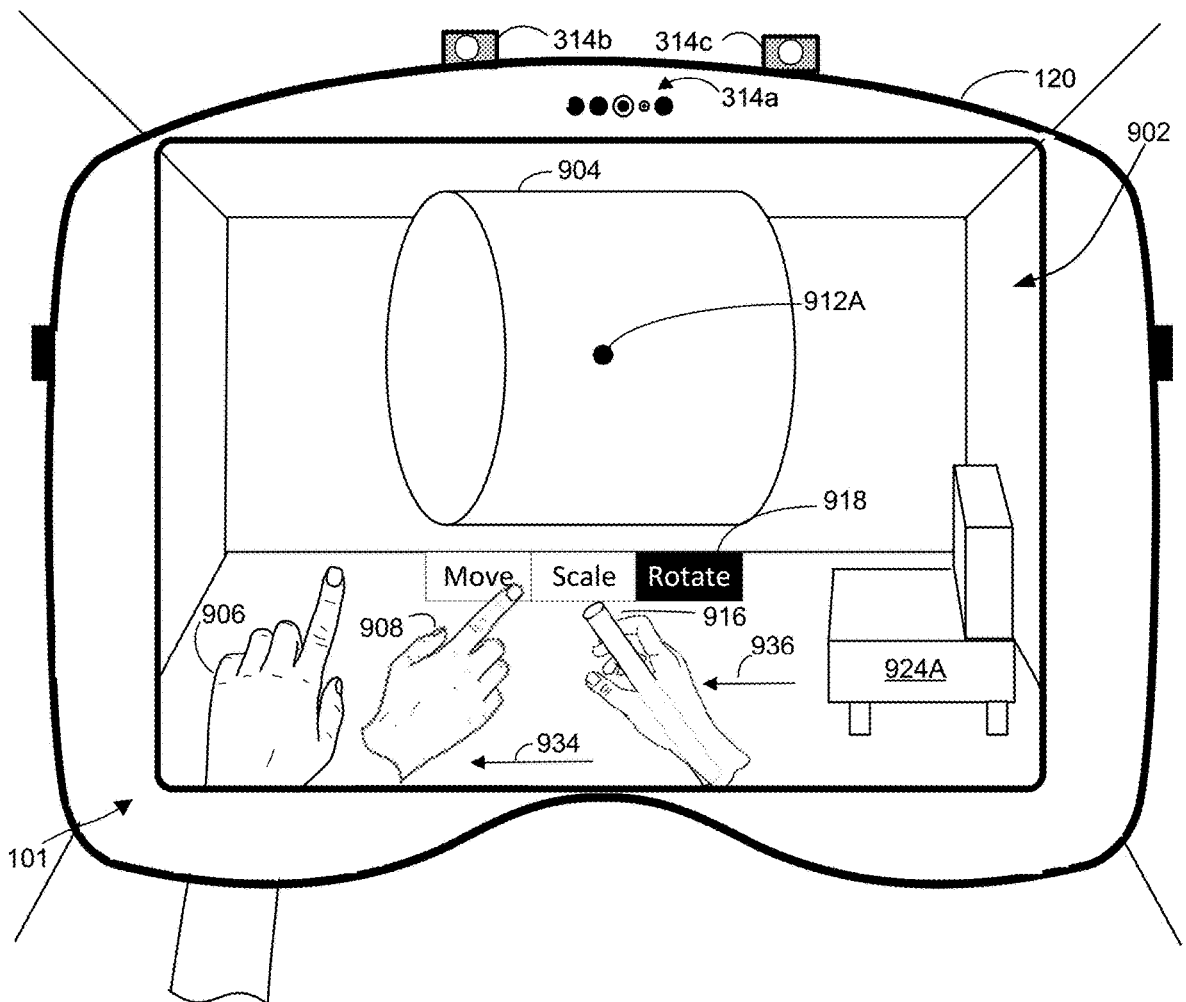
FIG. 9F1

1000

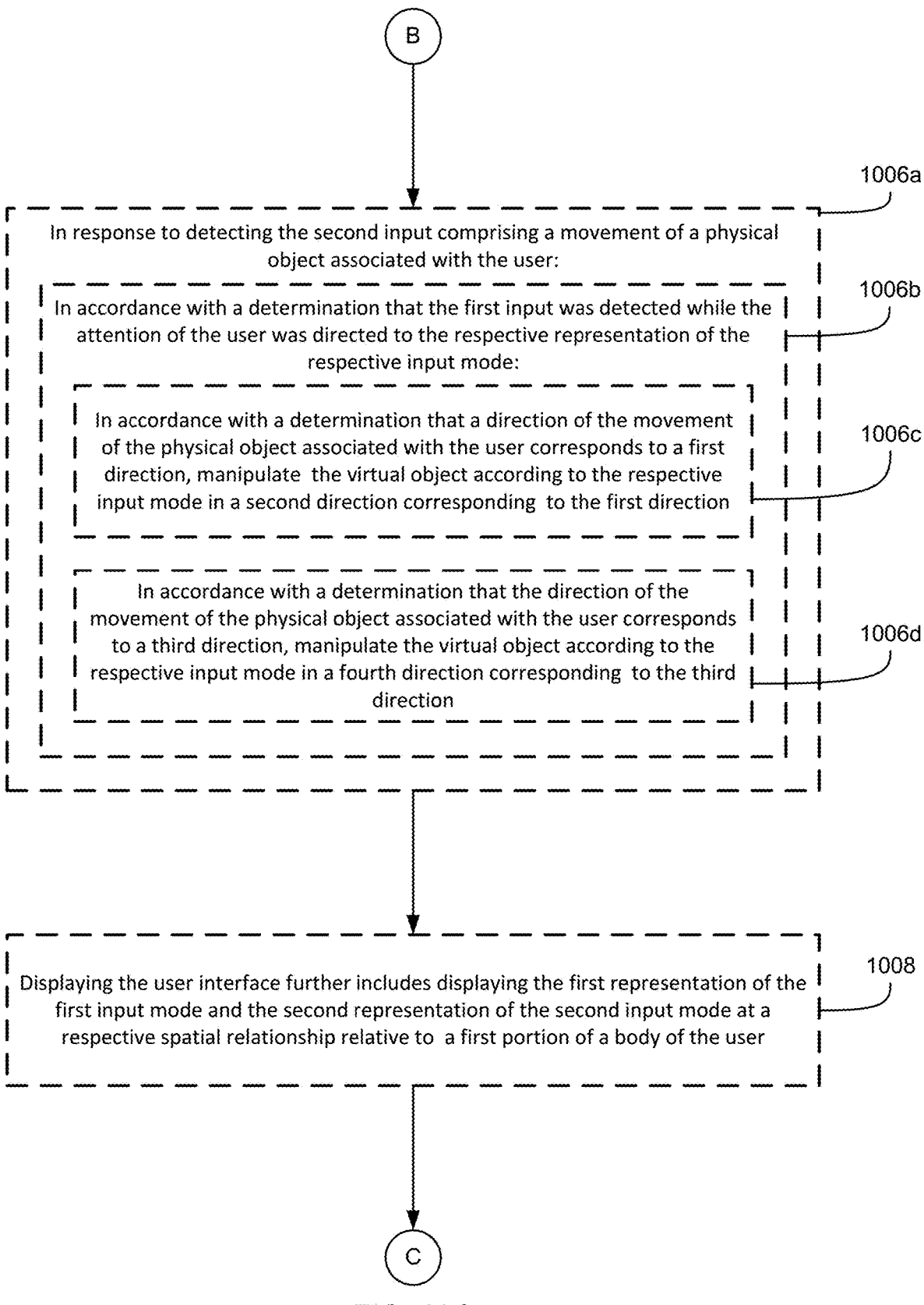

B

1006a

In response to detecting the second input comprising a movement of a physical object associated with the user:

1006b

In accordance with a determination that the first input was detected while the attention of the user was directed to the respective representation of the respective input mode:

1006c

In accordance with a determination that a direction of the movement of the physical object associated with the user corresponds to a first direction, manipulate the virtual object according to the respective input mode in a second direction corresponding to the first direction 1006d In accordance with a determination that the direction of the movement of the physical object associated with the user corresponds to a third direction, manipulate the virtual object according to the respective input mode in a fourth direction corresponding to the third direction

1008

Displaying the user interface further includes displaying the first representation of the first input mode and the second representation of the second input mode at a respective spatial relationship relative to a first portion of a body of the user

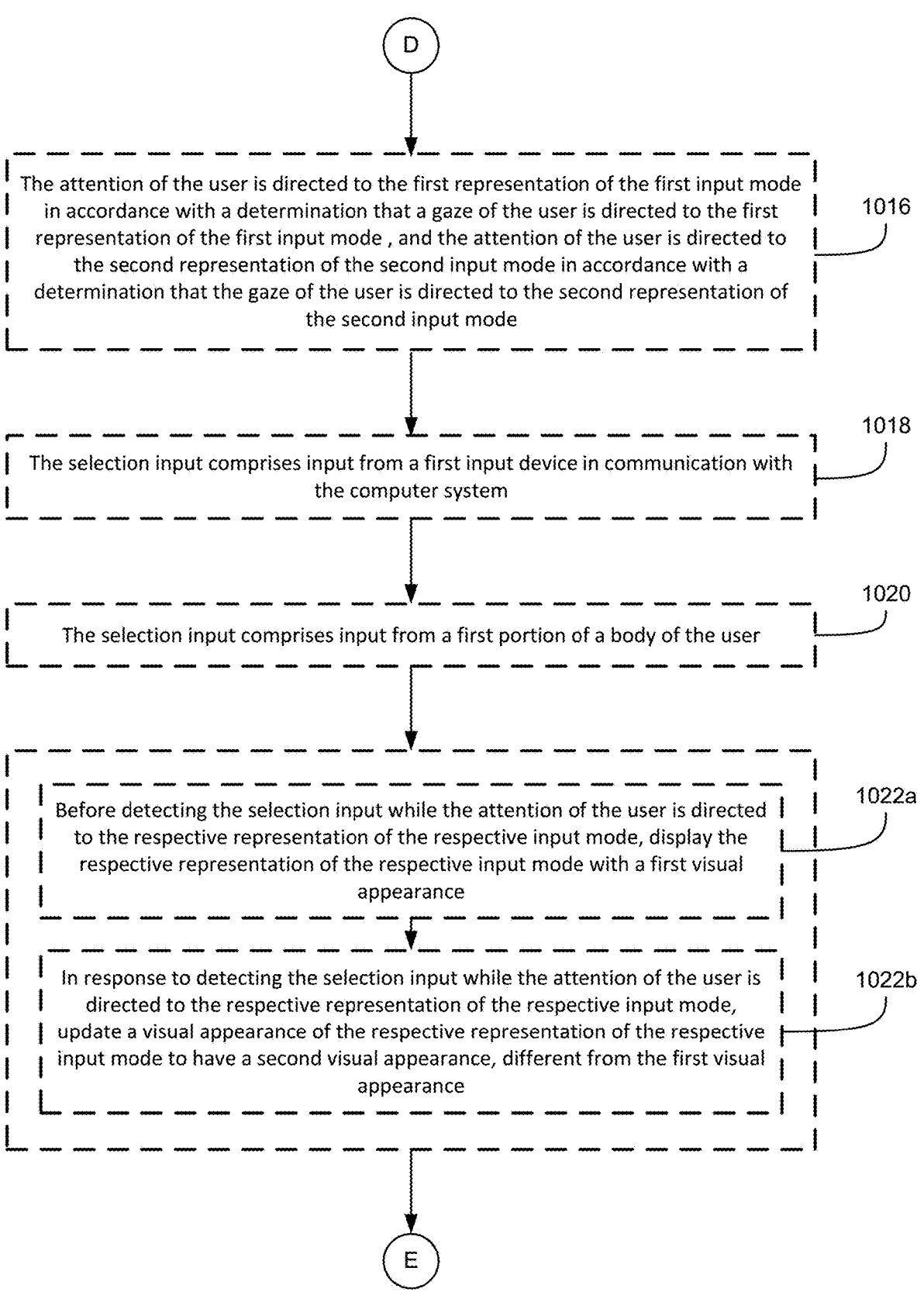

The attention of the user is directed to the first representation of the first input mode in accordance with a determination that a gaze of the user is directed to the first representation of the first input mode , and the attention of the user is directed to the second representation of the second input mode in accordance with a determination that the gaze of the user is directed to the second representation of the second input mode — 1016

The selection input comprises input from a first input device in communication with the computer system — 1018

The selection input comprises input from a first portion of a body of the user — 1020

Before detecting the selection input while the attention of the user is directed to the respective representation of the respective input mode, display the respective representation of the respective input mode with a first visual appearance — 1022a In response to detecting the selection input while the attention of the user is directed to the respective representation of the respective input mode, update a visual appearance of the respective representation of the respective input mode to have a second visual appearance, different from the first visual appearance — 1022b

FIG. 10E

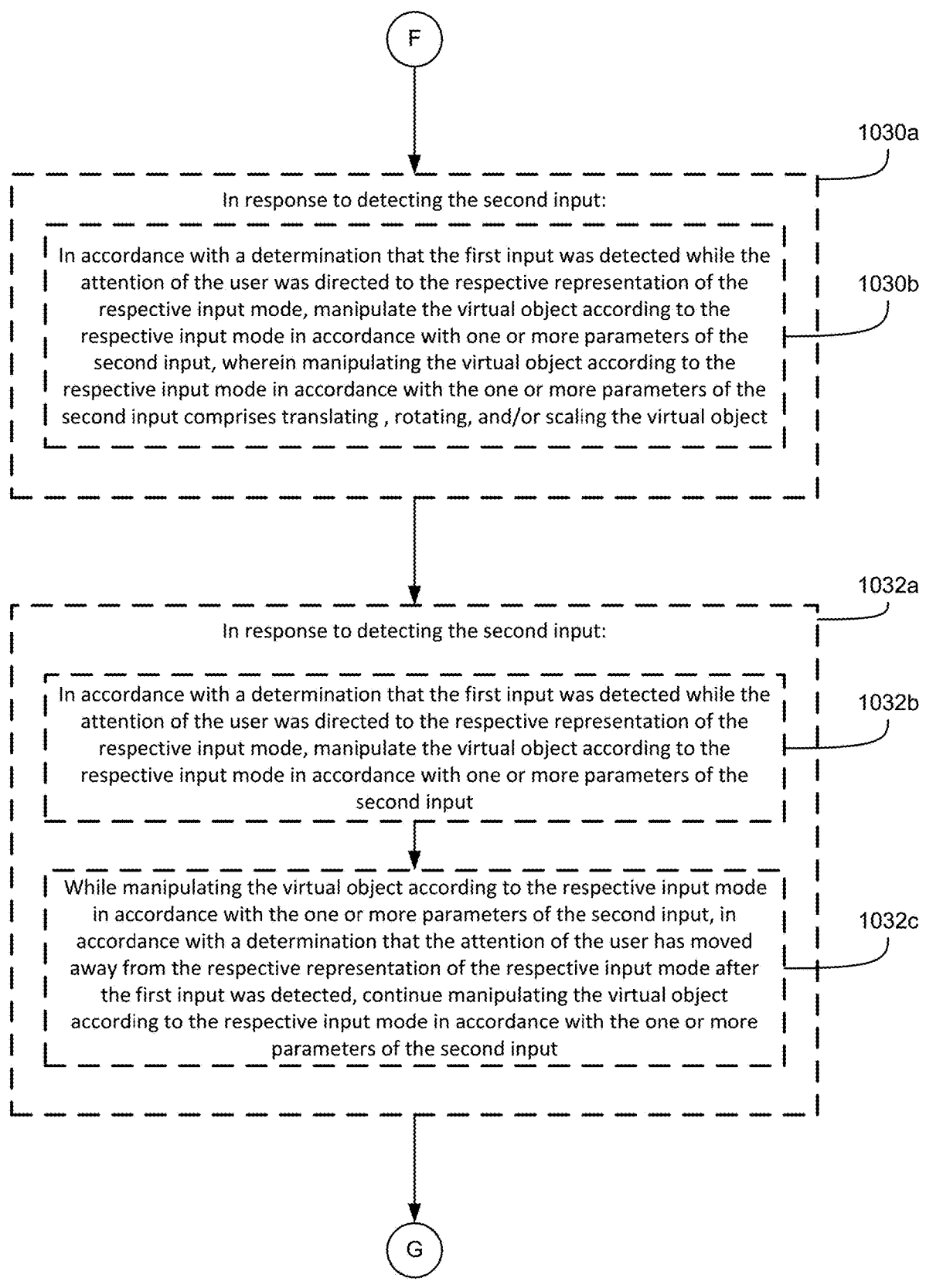

F

In response to detecting the second input:

In accordance with a determination that the first input was detected while the attention of the user was directed to the respective representation of the respective input mode, manipulate the virtual object according to the respective input mode in accordance with one or more parameters of the second input, wherein manipulating the virtual object according to the respective input mode in accordance with the one or more parameters of the second input comprises translating , rotating, and/or scaling the virtual object 1030a 1030b In response to detecting the second input:

In accordance with a determination that the first input was detected while the attention of the user was directed to the respective representation of the respective input mode, manipulate the virtual object according to the respective input mode in accordance with one or more parameters of the second input While manipulating the virtual object according to the respective input mode in accordance with the one or more parameters of the second input, in accordance with a determination that the attention of the user has moved away from the respective representation of the respective input mode after the first input was detected, continue manipulating the virtual object according to the respective input mode in accordance with the one or more parameters of the second input 1032a 1032b 1032c

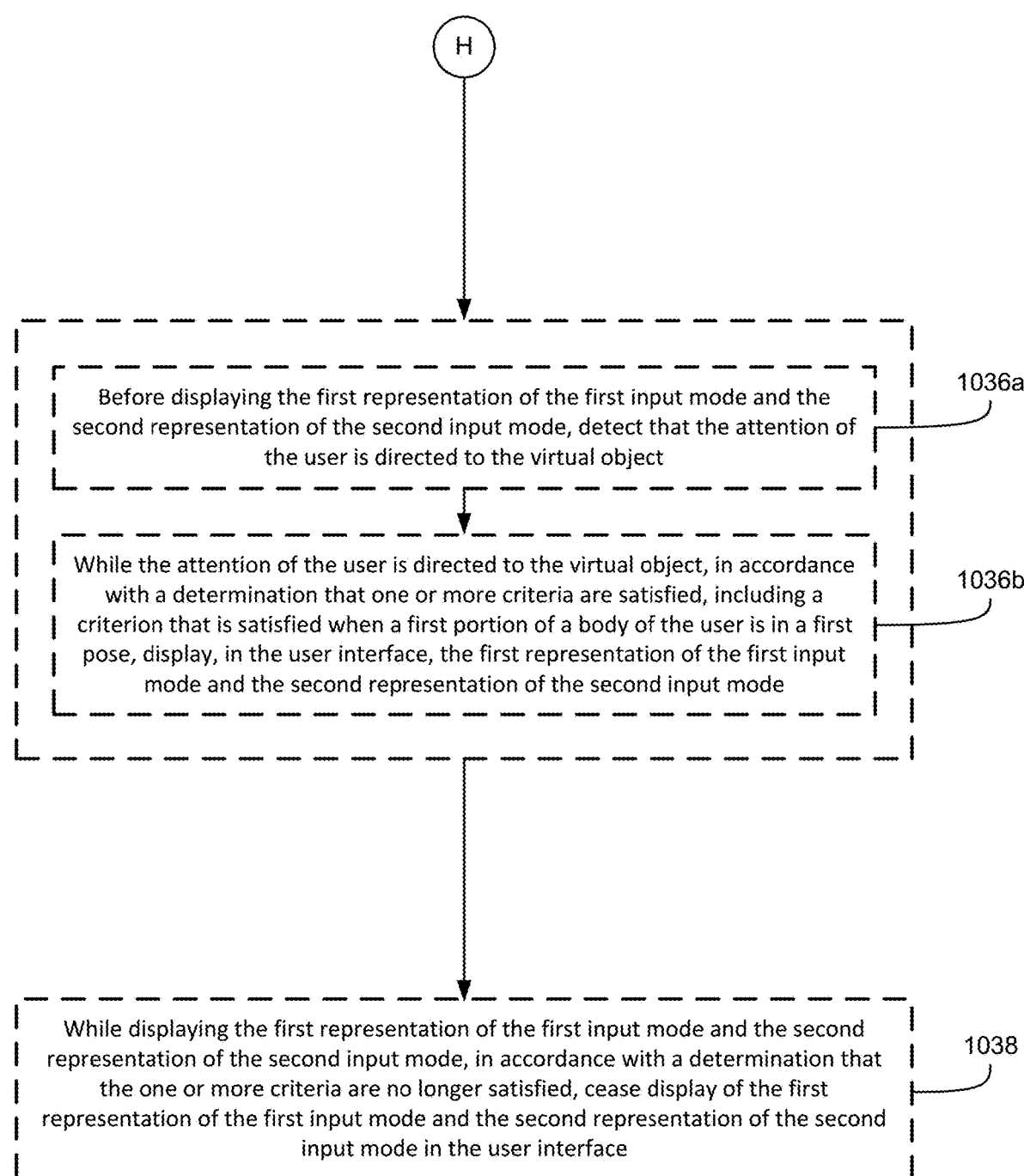

Before displaying the first representation of the first input mode and the second representation of the second input mode, detect that the attention of the user is directed to the virtual object 1036a While the attention of the user is directed to the virtual object, in accordance with a determination that one or more criteria are satisfied, including a criterion that is satisfied when a first portion of a body of the user is in a first pose, display, in the user interface, the first representation of the first input mode and the second representation of the second input mode 1036b While displaying the first representation of the first input mode and the second representation of the second input mode, in accordance with a determination that the one or more criteria are no longer satisfied, cease display of the first representation of the first input mode and the second representation of the second input mode in the user interface

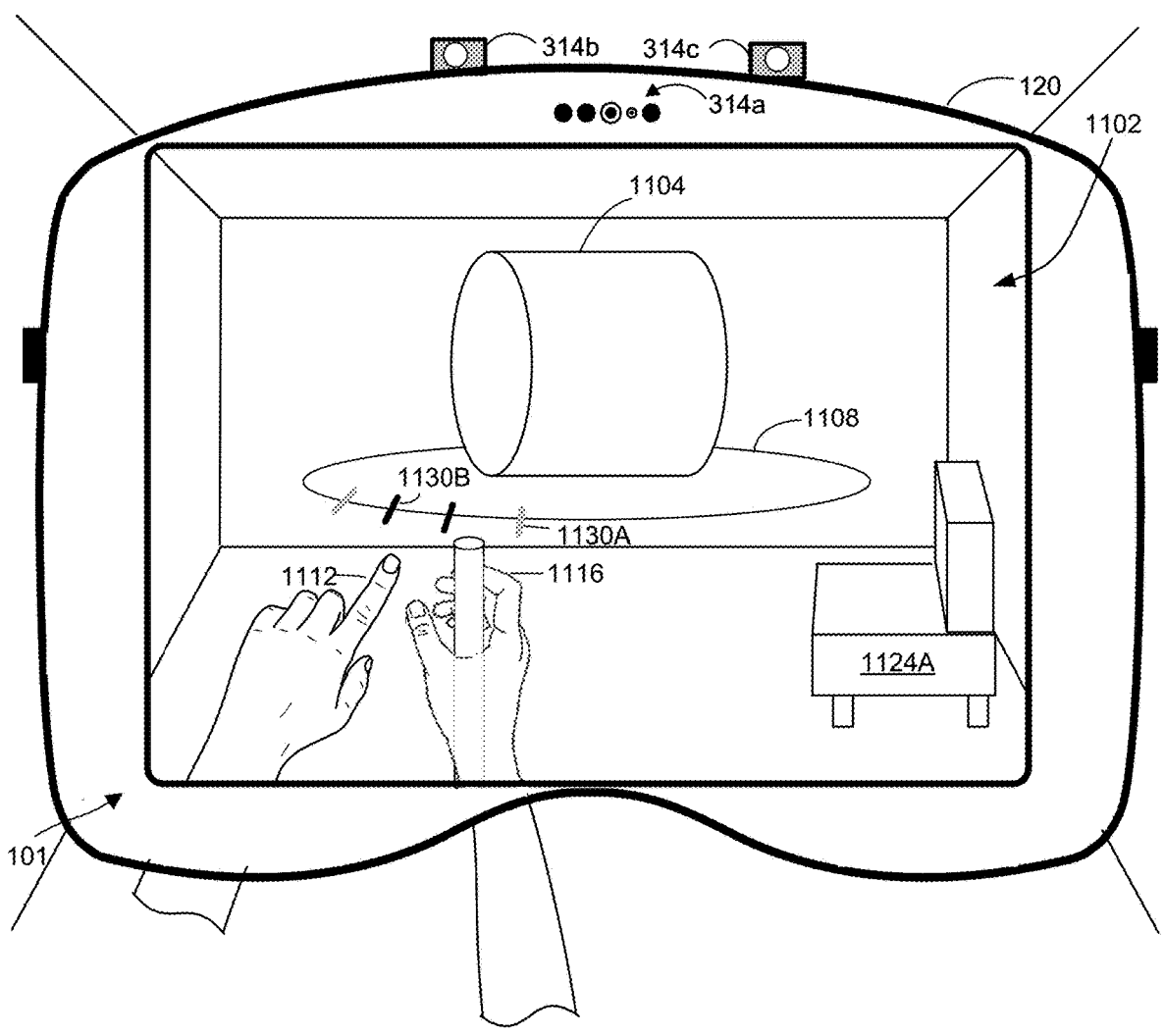
FIG. 11E1

1200

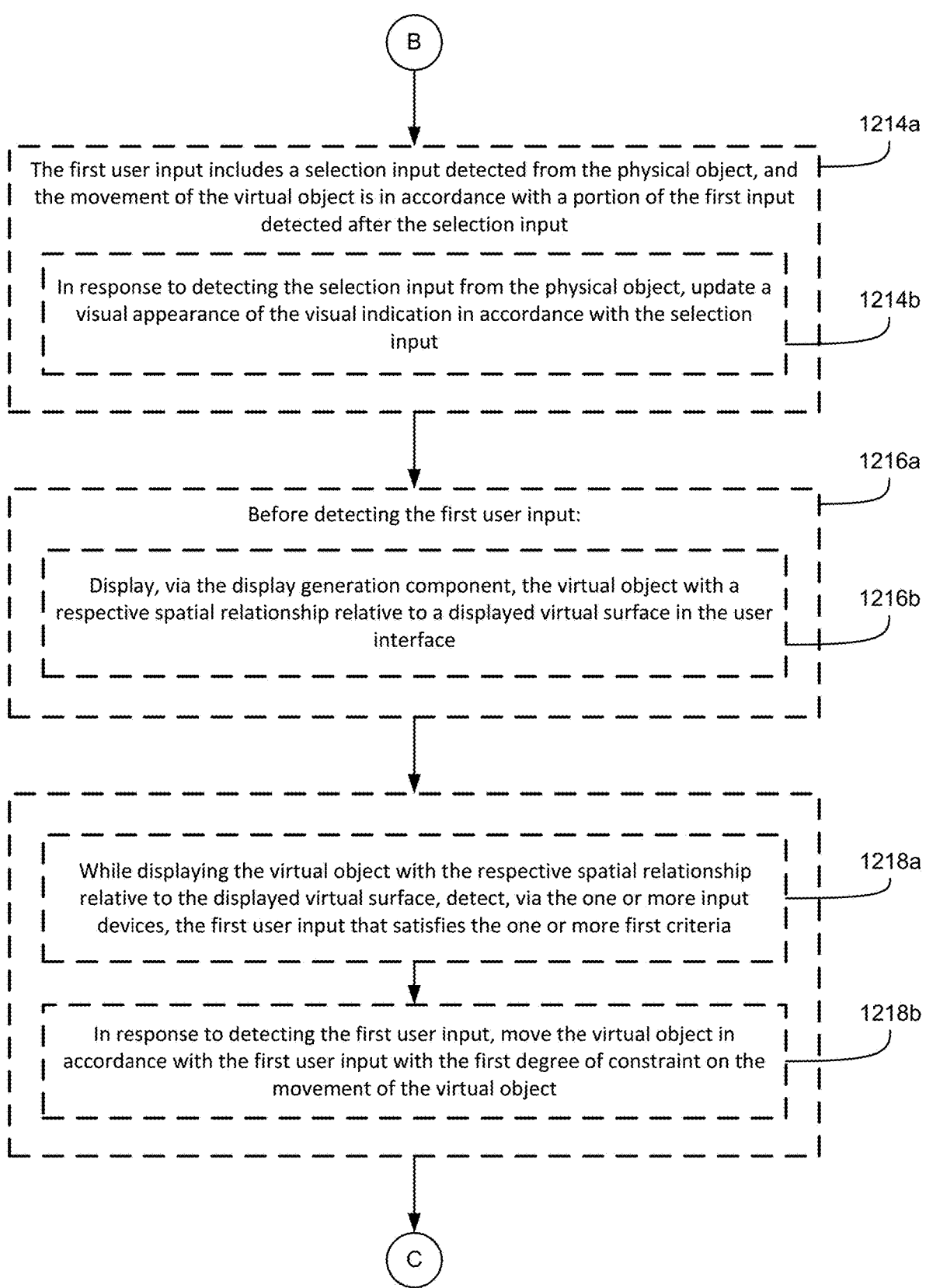

B

The first user input includes a selection input detected from the physical object, and the movement of the virtual object is in accordance with a portion of the first input detected after the selection input                                                                          1214a In response to detecting the selection input from the physical object, update a visual appearance of the visual indication in accordance with the selection input                                                                          1214b Before detecting the first user input:                                                                          1216a Display, via the display generation component, the virtual object with a respective spatial relationship relative to a displayed virtual surface in the user interface                                                                          1216b While displaying the virtual object with the respective spatial relationship relative to the displayed virtual surface, detect, via the one or more input devices, the first user input that satisfies the one or more first criteria                                                                          1218a In response to detecting the first user input, move the virtual object in accordance with the first user input with the first degree of constraint on the movement of the virtual object                                                                          1218b

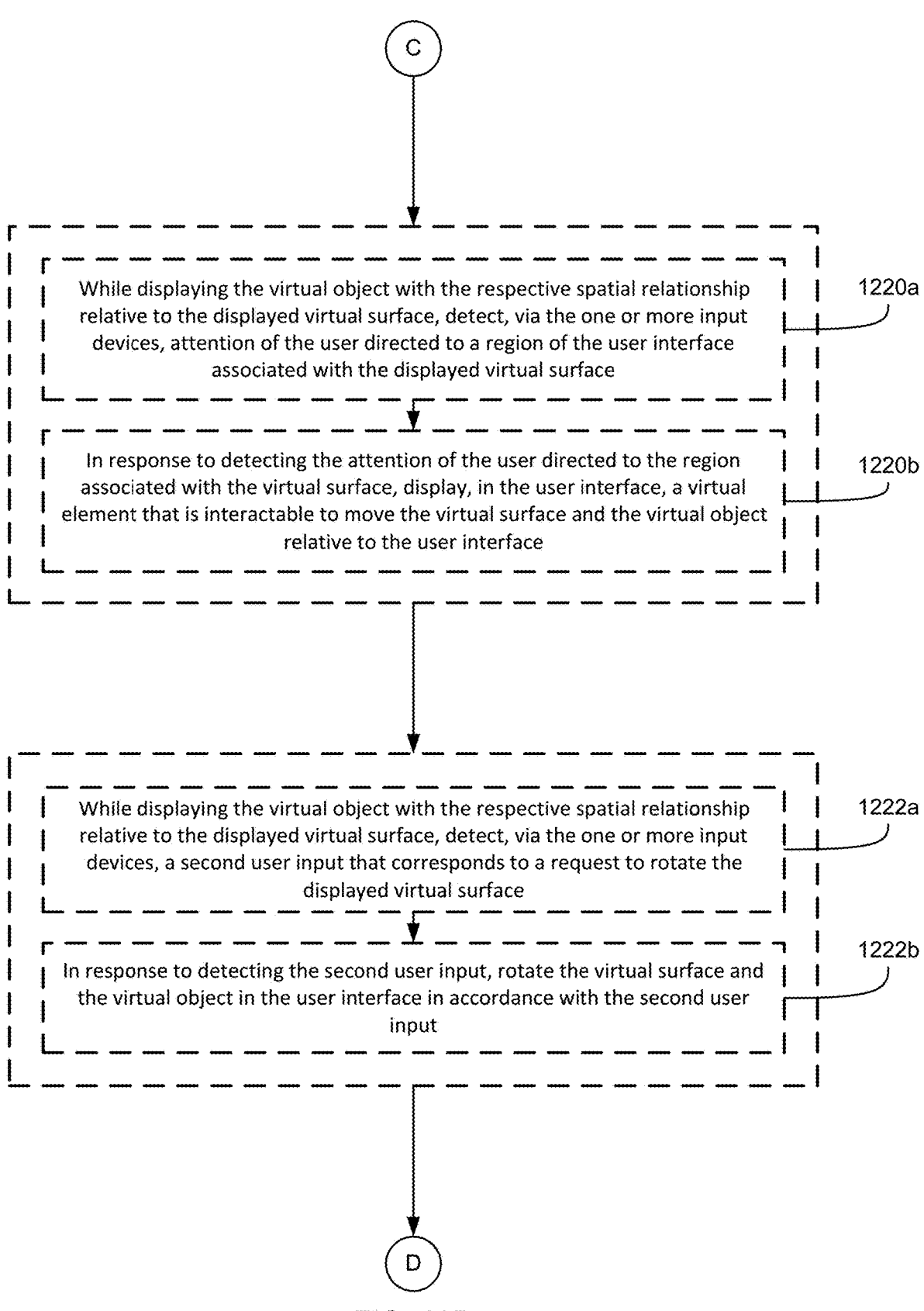

C

While displaying the virtual object with the respective spatial relationship relative to the displayed virtual surface, detect, via the one or more input devices, attention of the user directed to a region of the user interface associated with the displayed virtual surface 1220a In response to detecting the attention of the user directed to the region associated with the virtual surface, display, in the user interface, a virtual element that is interactable to move the virtual surface and the virtual object relative to the user interface 1220b While displaying the virtual object with the respective spatial relationship relative to the displayed virtual surface, detect, via the one or more input devices, a second user input that corresponds to a request to rotate the displayed virtual surface 1222a In response to detecting the second user input, rotate the virtual surface and the virtual object in the user interface in accordance with the second user input 1222b

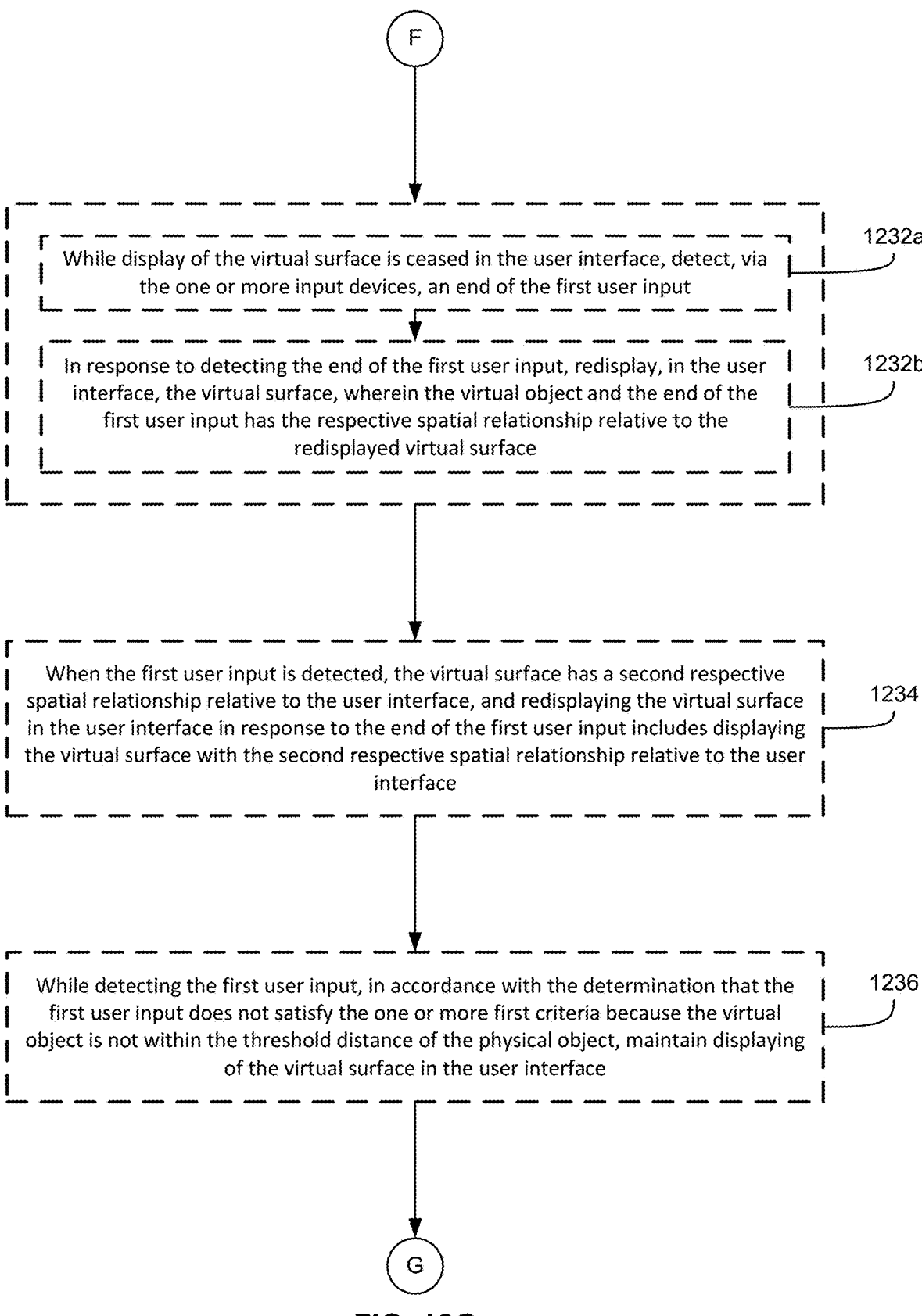

F

While display of the virtual surface is ceased in the user interface, detect, via the one or more input devices, an end of the first user input        1232a In response to detecting the end of the first user input, redisplay, in the user interface, the virtual surface, wherein the virtual object and the end of the first user input has the respective spatial relationship relative to the redisplayed virtual surface        1232b When the first user input is detected, the virtual surface has a second respective spatial relationship relative to the user interface, and redisplaying the virtual surface in the user interface in response to the end of the first user input includes displaying the virtual surface with the second respective spatial relationship relative to the user interface        1234

While detecting the first user input, in accordance with the determination that the first user input does not satisfy the one or more first criteria because the virtual object is not within the threshold distance of the physical object, maintain displaying of the virtual surface in the user interface        1236

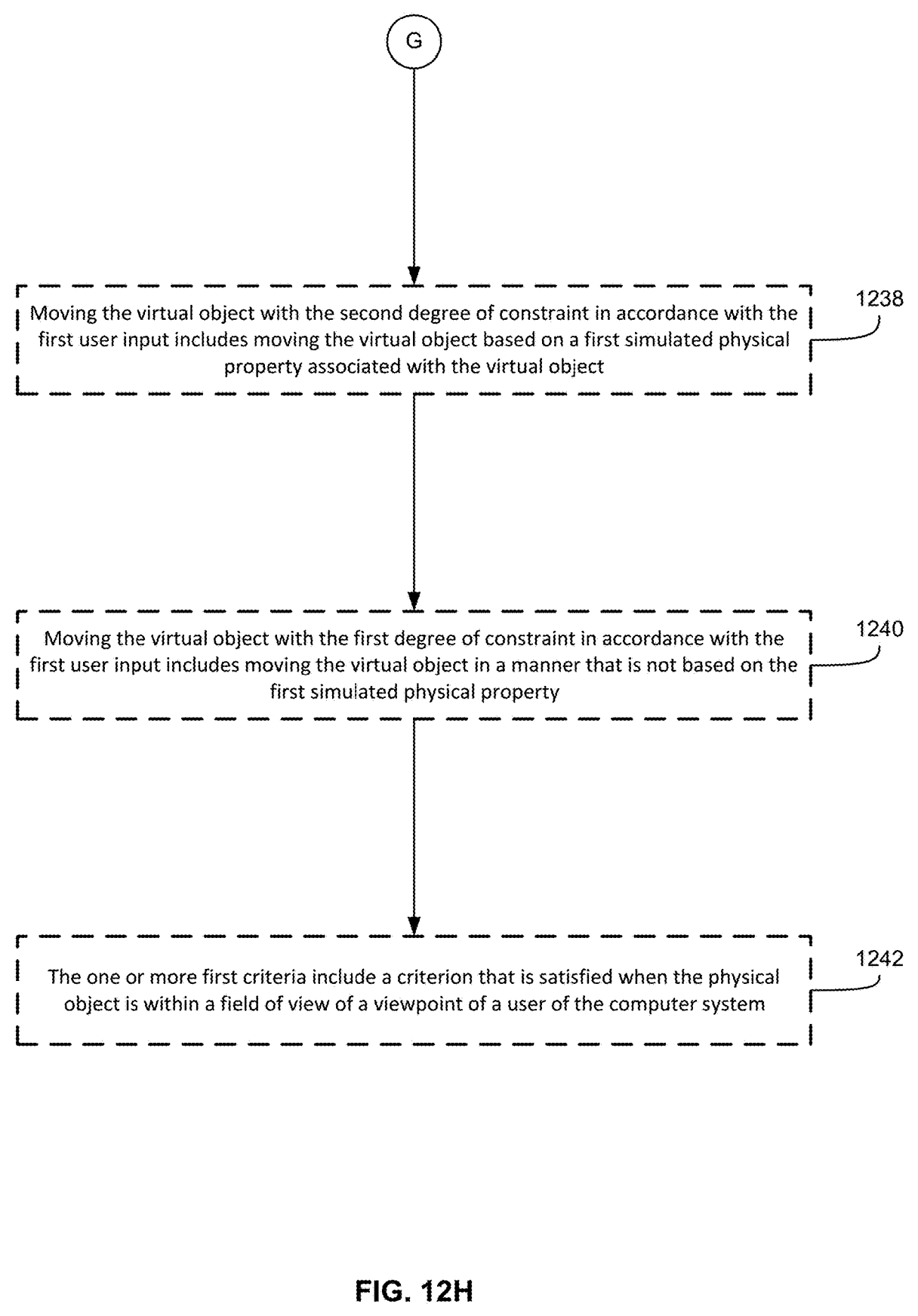

Moving the virtual object with the second degree of constraint in accordance with the first user input includes moving the virtual object based on a first simulated physical property associated with the virtual object — 1238

Moving the virtual object with the first degree of constraint in accordance with the first user input includes moving the virtual object in a manner that is not based on the first simulated physical property — 1240

The one or more first criteria include a criterion that is satisfied when the physical object is within a field of view of a viewpoint of a user of the computer system — 1242

FIG. 12H

METHODS FOR MANIPULATING A VIRTUAL OBJECT

CROSS REFERENCE TO RELATED APPLICATIONS

This application is a continuation of U.S. patent application Ser. No. 18/473,180, filed Sep. 22, 2023, published on Mar. 28, 2024 as U.S. Publication No. US 2024-0103636, which claims the benefit of U.S. Provisional Application No. 63/376,913, filed Sep. 23, 2022, and U.S. Provisional Application No. 63/505,409, filed May 31, 2023, the contents of which are herein incorporated by reference in their entireties for all purposes.

TECHNICAL FIELD

This relates generally to computer systems that provide computer-generated experiences, including, but no limited to, electronic devices that provide virtual reality and mixed reality experiences via a display generation component.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for providing computer-generated experiences to users that make interaction with the computer systems more efficient and intuitive for a user. Such methods and interfaces optionally complement or replace conventional methods for providing extended reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for interacting with content in a three-dimensional environment. Such methods and interfaces may complement or replace conventional methods for interacting with content in a three-dimensional environment. Such methods and interfaces reduce the number, extent, and/or the nature of the inputs from a user and produce a more efficient human-machine interface. For battery-operated computing devices, such methods and interfaces conserve power and increase the time between battery charges.

In some embodiments, a computer system performs virtual object manipulation operations using respective portions of the user's body and/or input device(s). In some embodiments, a computer system manipulates a virtual object based on input from a hand of a user and/or a handheld device. In some embodiments, a computer system manipulates a virtual object directly or indirectly.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the Figs.

FIGS. 8A-8E is a flowchart illustrating an exemplary method of performing virtual object manipulation operations using respective portions of the user's body and/or input device(s) in accordance with some embodiments.

FIGS. 10A-10I is a flowchart illustrating an exemplary method of manipulating a virtual object based on input from a hand of a user and/or a handheld device in accordance with some embodiments.

FIGS. 12A-12H is a flowchart illustrating an exemplary method of manipulating a virtual object directly or indirectly in accordance with some embodiments.

DESCRIPTION OF EMBODIMENTS

Figure 1B:
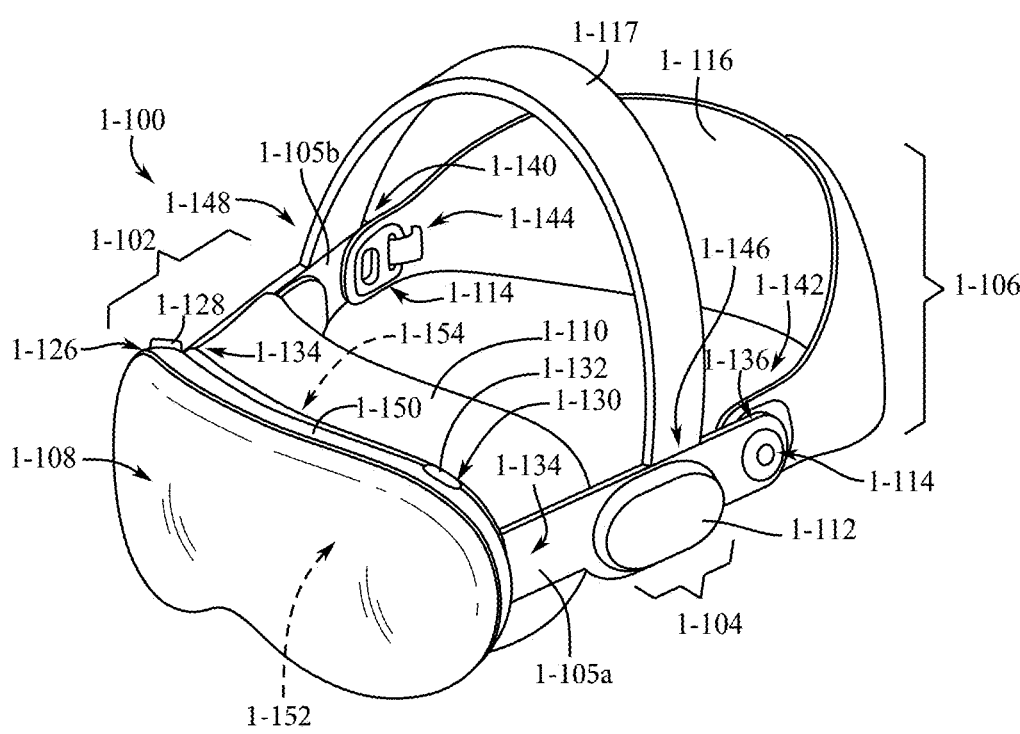
FIGS. 1B-1P are examples of a computer system for providing XR experiences in the operating environment of FIG. 1A.

The present disclosure relates to user interfaces for providing a computer generated (CGR) experience to a user, in accordance with some embodiments.

The systems, methods, and GUIs described herein provide improved ways for an electronic device to facilitate interaction with and manipulate objects in a three-dimensional environment.

In some embodiments, a computer system performs virtual object manipulation operations using respective portions of the user's body and/or input device(s). In some embodiments, a computer system manipulates a virtual object based on input from a hand of a user and/or a handheld device. In some embodiments, a computer system manipulates a virtual object directly or indirectly.

FIGS. 1A-6 provide a description of example computer systems for providing XR experiences to users (such as described below with respect to methods 800, 1000, and/or 1200). FIGS. 7A-7D illustrate example techniques for performing virtual object manipulation operations using respective portions of the user's body and/or input device(s). FIGS. 8A-8E is a flow diagram of methods of performing virtual object manipulation operations using respective portions of the user's body and/or input device(s). The user interfaces in FIGS. 7A-7D are used to illustrate the processes in FIGS. 8A-8E. FIGS. 9A-9F illustrate example techniques for manipulating a virtual object based on input from a hand of a user and/or a handheld device. FIGS. 10A-10I is a flow diagram of methods of manipulating a virtual object based on input from a hand of a user and/or a handheld device. The user interfaces in FIGS. 9A-9F are used to illustrate the processes in FIGS. 10A-10I. FIGS. 11A-11H illustrate example techniques for manipulating a virtual object directly or indirectly. FIGS. 12A-12H is a flow diagram of methods of manipulating a virtual object directly or indirectly. The user interfaces in FIGS. 11A-11H are used to illustrate the processes in FIGS. 12A-12H.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less-precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1A, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing an XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality. Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

In an augmented reality, mixed reality, or virtual reality environment, a view of a three-dimensional environment is visible to a user. The view of the three-dimensional environment is typically visible to the user via one or more display generation components (e.g., a display or a pair of display modules that provide stereoscopic content to different eyes of the same user) through a virtual viewport that has a viewport boundary that defines an extent of the three-dimensional environment that is visible to the user via the one or more display generation components. In some embodiments, the region defined by the viewport boundary is smaller than a range of vision of the user in one or more dimensions (e.g., based on the range of vision of the user, size, optical properties or other physical characteristics of the one or more display generation components, and/or the location and/or orientation of the one or more display generation components relative to the eyes of the user). In some embodiments, the region defined by the viewport boundary is larger than a range of vision of the user in one or more dimensions (e.g., based on the range of vision of the user, size, optical properties or other physical characteristics of the one or more display generation components, and/or the location and/or orientation of the one or more display generation components relative to the eyes of the user). The viewport and viewport boundary typically move as the one or more display generation components move (e.g., moving with a head of the user for a head mounted device or moving with a hand of a user for a handheld device such as a tablet or smartphone). A viewpoint of a user determines what content is visible in the viewport, a viewpoint generally specfies a location and a direction relative to the three-dimensional environment, and as the viewpoint shifts, the view of the three-dimensional environment will also shift in the viewport. For a head mounted device, a viewpoint is typically based on a location an direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include display generation components with virtual passthrough, portions of the physical environment that are visible (e.g., displayed, and/or projected) via the one or more display generation components are based on a field of view of one or more cameras in communication with the display generation components which typcially move with the display generation components (e.g., moving with a head of the user for a head mounted device or moving with a hand of a user for a handheld device such as a tablet or smartphone) because the viewpoint of the user moves as the field of view of the one or more cameras moves (and the appearance of one or more virtual objects displayed via the one or more display generation components is updated based on the viewpoint of the user (e.g., displayed positions and poses of the virtual objects are updated based on the movement of the viewpoint of the user)). For display generation components with optical passthrough, portions of the physical environment that are visible (e.g., optically visible through one or more partially or fully transparent portions of the display generation component) via the one or more display generation components are based on a field of view of a user through the partially or fully transparent portion(s) of the display generation component (e.g., moving with a head of the user for a head mounted device or moving with a hand of a user for a handheld device such as a tablet or smartphone) because the viewpoint of the user moves as the field of view of the user through the partially or fully transparent portions of the display generation components moves (and the appearance of one or more virtual objects is updated based on the viewpoint of the user).

In some embodiments a representation of a physical environment (e.g., displayed via virtual passthrough or optical passthrough) can be partially or fully obscured by a virtual environment. In some embodiments, the amount of virtual environment that is displayed (e.g., the amount of physical environment that is not displayed) is based on an immersion level for the virtual environment (e.g., with respect to the representation of the physical environment). For example, increasing the immersion level optionally causes more of the virtual environment to be displayed, replacing and/or obscuring more of the physical environment, and reducing the immersion level optionally causes less of the virtual environment to be displayed, revealing portions of the physical environment that were previously not displayed and/or obscured. In some embodiments, at a particular immersion level, one or more first background objects (e.g., in the representation of the physical environment) are visually de-emphasized (e.g., dimmed, blurred, and/or displayed with increased transparency) more than one or more second background objects, and one or more third background objects cease to be displayed. In some embodiments, a level of immersion includes an associated degree to which the virtual content displayed by the computer system (e.g., the virtual environment and/or the virtual content) obscures background content (e.g., content other than the virtual environment and/or the virtual content) around/behind the virtual content, optionally including the number of items of background content displayed and/or the visual characteristics (e.g., colors, contrast, and/or opacity) with which the background content is displayed, the angular range of the virtual content displayed via the display generation component (e.g., 60 degrees of content displayed at low immersion, 120 degrees of content displayed at medium immersion, or 180 degrees of content displayed at high immersion), and/or the proportion of the field of view displayed via the display generation component that is consumed by the virtual content (e.g., 33% of the field of view consumed by the virtual content at low immersion, 66% of the field of view consumed by the virtual content at medium immersion, or 100% of the field of view consumed by the virtual content at high immersion). In some embodiments, the background content is included in a background over which the virtual content is displayed (e.g., background content in the representation of the physical environment). In some embodiments, the background content includes user interfaces (e.g., user interfaces generated by the computer system corresponding to applications), virtual objects (e.g., files or representations of other users generated by the computer system) not associated with or included in the virtual environment and/or virtual content, and/or real objects (e.g., pass-through objects representing real objects in the physical environment around the user that are visible such that they are displayed via the display generation component and/or a visible via a transparent or translucent component of the display generation component because the computer system does not obscure/prevent visibility of them through the display generation component). In some embodiments, at a low level of immersion (e.g., a first level of immersion), the background, virtual and/or real objects are displayed in an unobscured manner. For example, a virtual environment with a low level of immersion is optionally displayed concurrently with the background content, which is optionally displayed with full brightness, color, and/or translucency. In some embodiments, at a higher level of immersion (e.g., a second level of immersion higher than the first level of immersion), the background, virtual and/or real objects are displayed in an obscured manner (e.g., dimmed, blurred, or removed from display). For example, a respective virtual environment with a high level of immersion is displayed without concurrently displaying the background content (e.g., in a full screen or fully immersive mode). As another example, a virtual environment displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed. In some embodiments, a null or zero level of immersion corresponds to the virtual environment ceasing to be displayed and instead a representation of a physical environment is displayed (optionally with one or more virtual objects such as application, windows, or virtual three-dimensional objects) without the representation of the physical environment being obscured by the virtual environment. Adjusting the level of immersion using a physical input element provides for quick and efficient method of adjusting immersion, which enhances the operability of the computer system and makes the user-device interface more efficient.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/ earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides an XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1A, those of ordinary skill in the art will appreciate from the present disclosure that various other features have not been illustrated for the sake of brevity and so as not to obscure more pertinent aspects of the example embodiments disclosed herein.

Figure 1A:
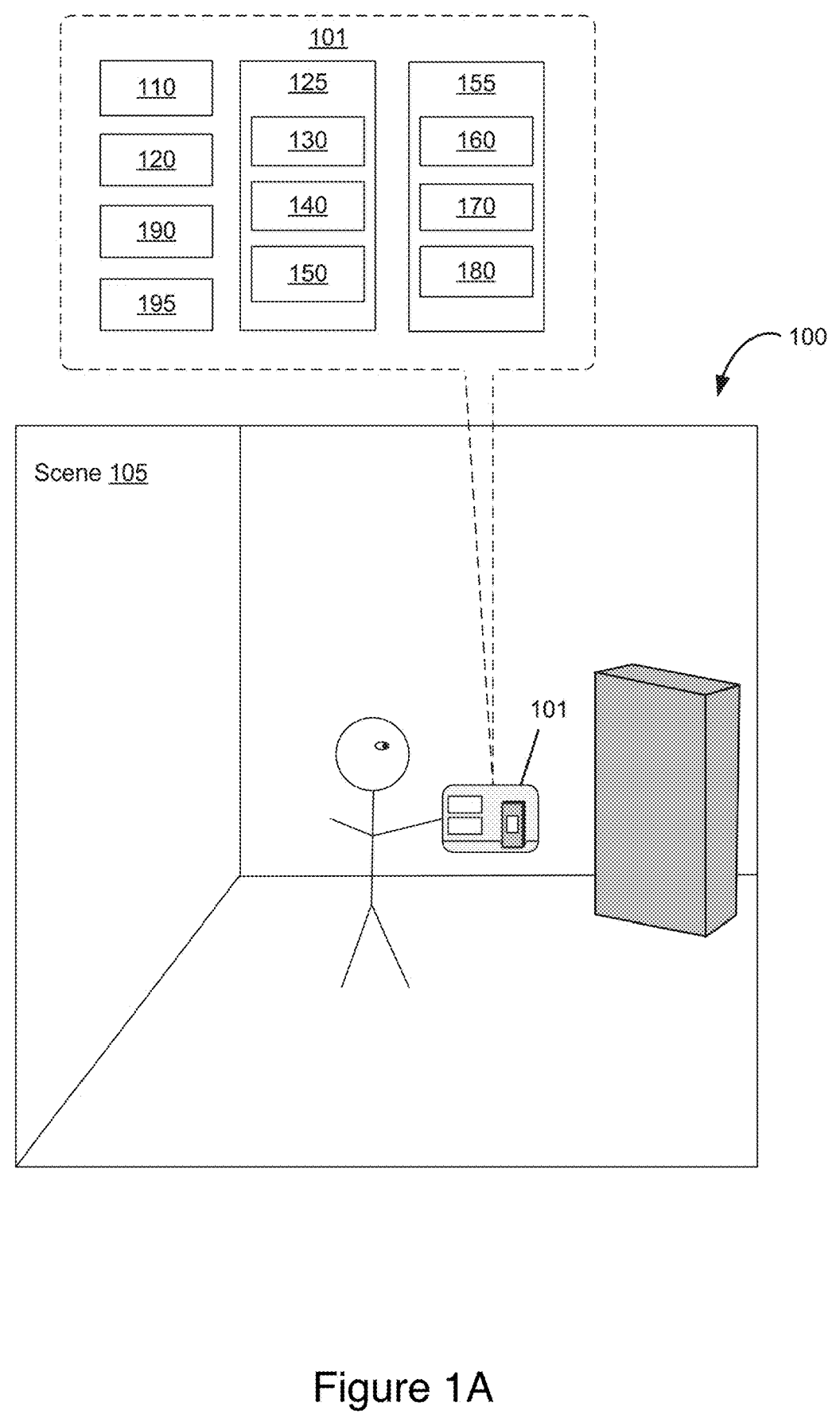
Figure 1C:
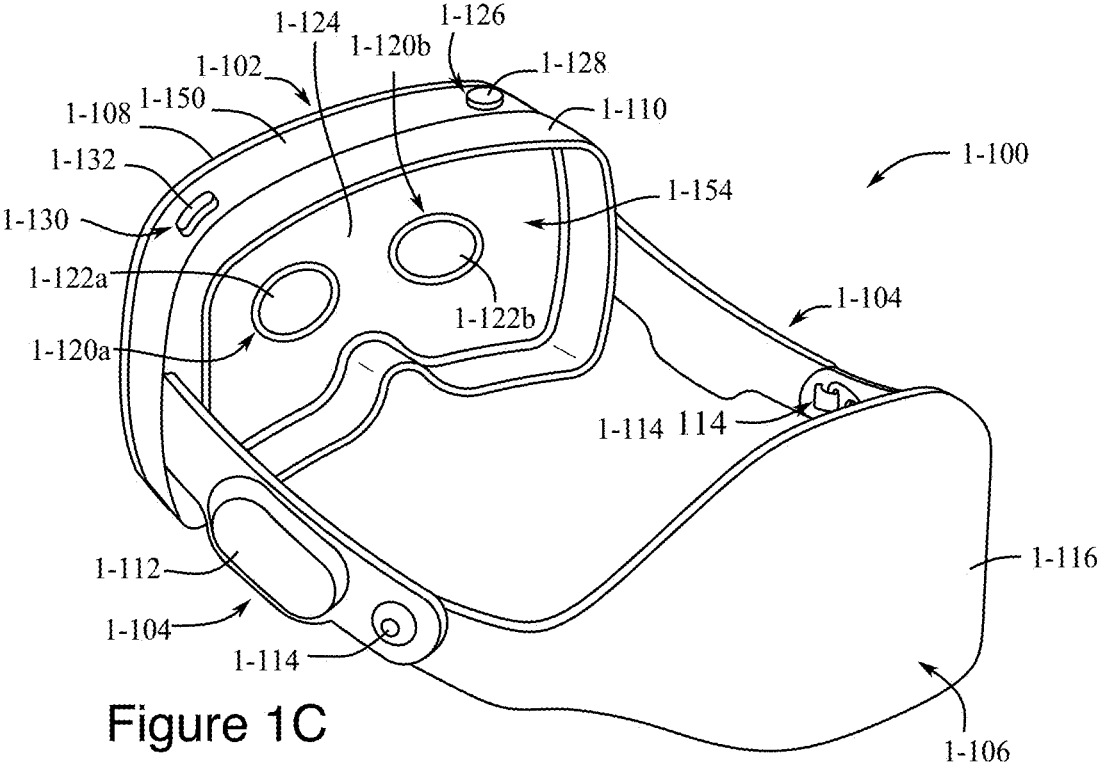
FIG. 1A is a block diagram illustrating an operating environment of a computer system for providing XR experiences in accordance with some embodiments.
FIGS. 9A-9F1 illustrate manipulating a virtual object based on input from a hand of a user and/or a handheld device in accordance with some embodiments.
Figure 1D:
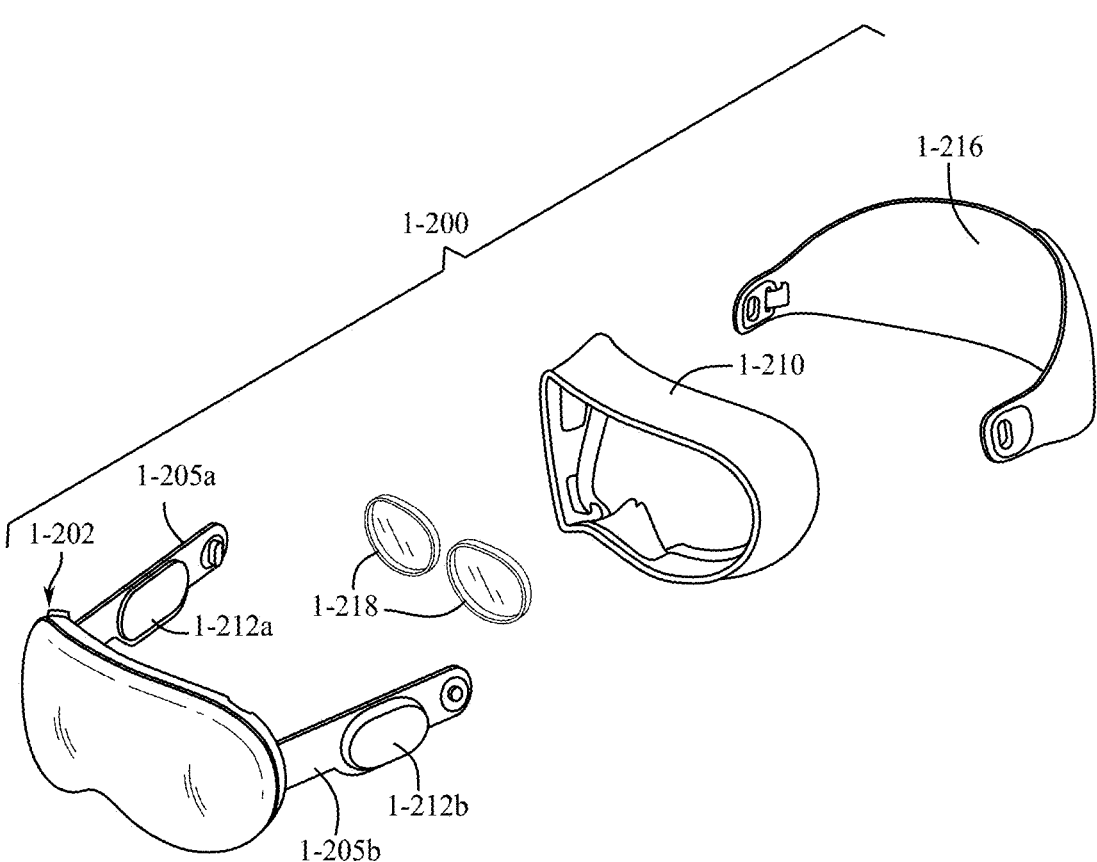
Figure 1E:
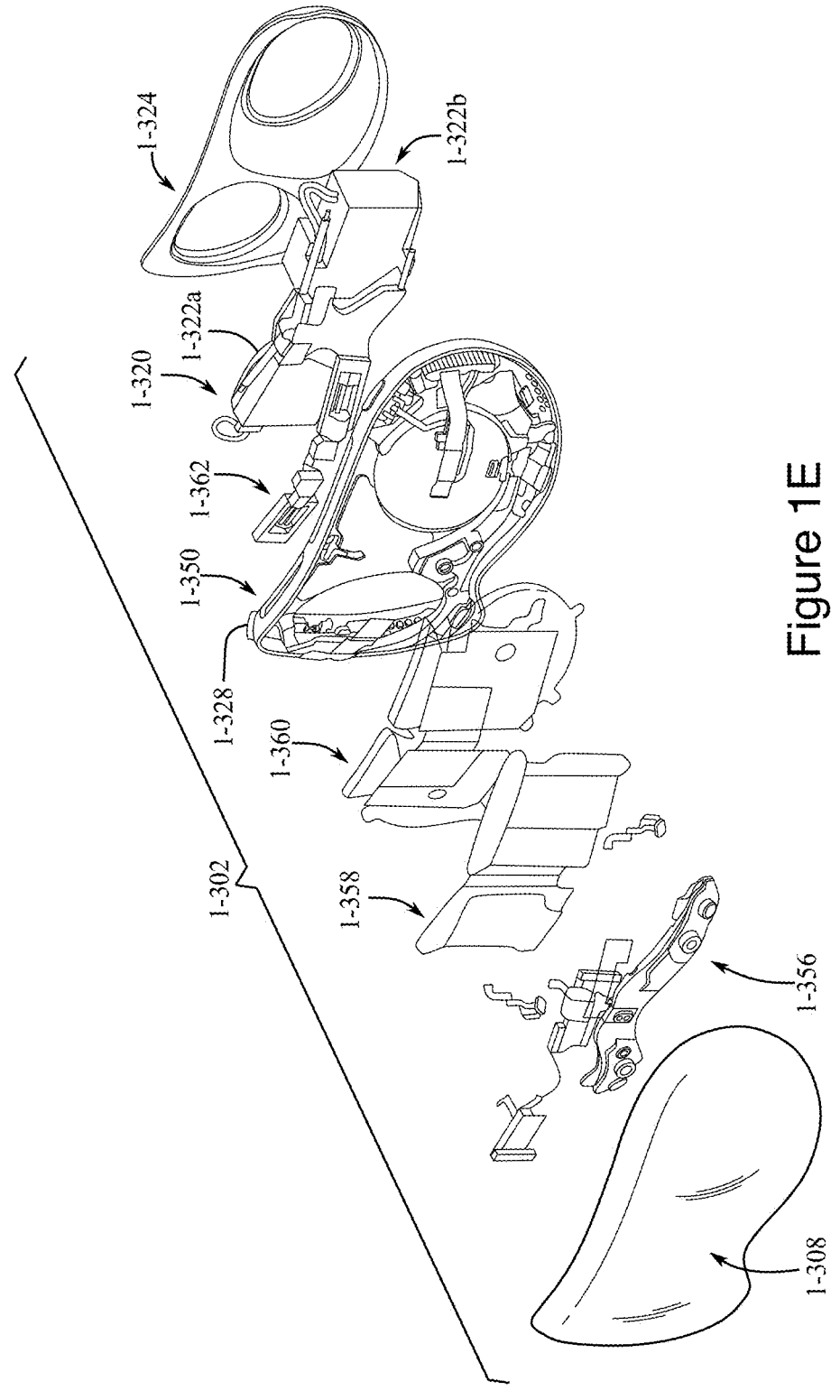
Figure 1F:
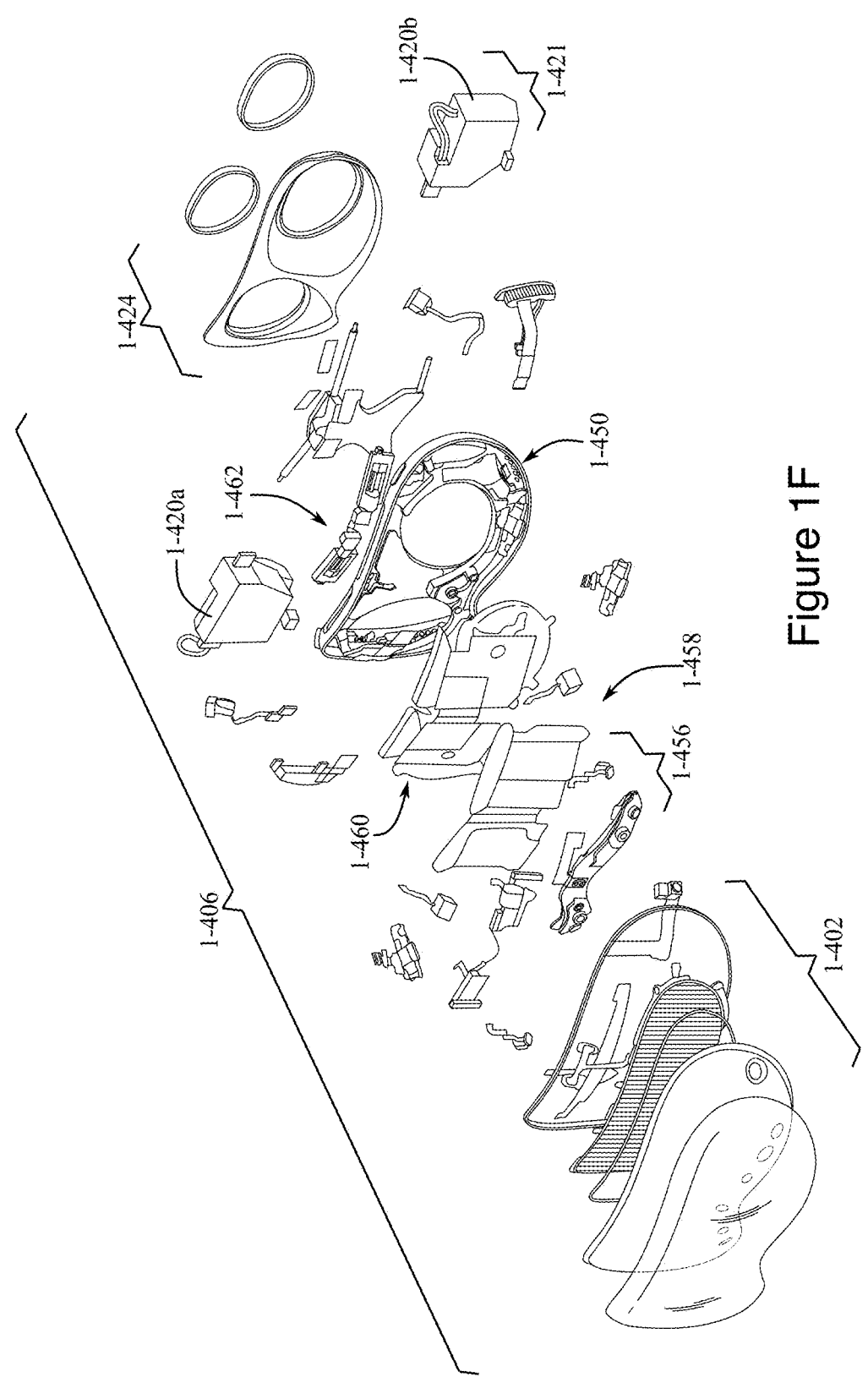
Figure 1G:
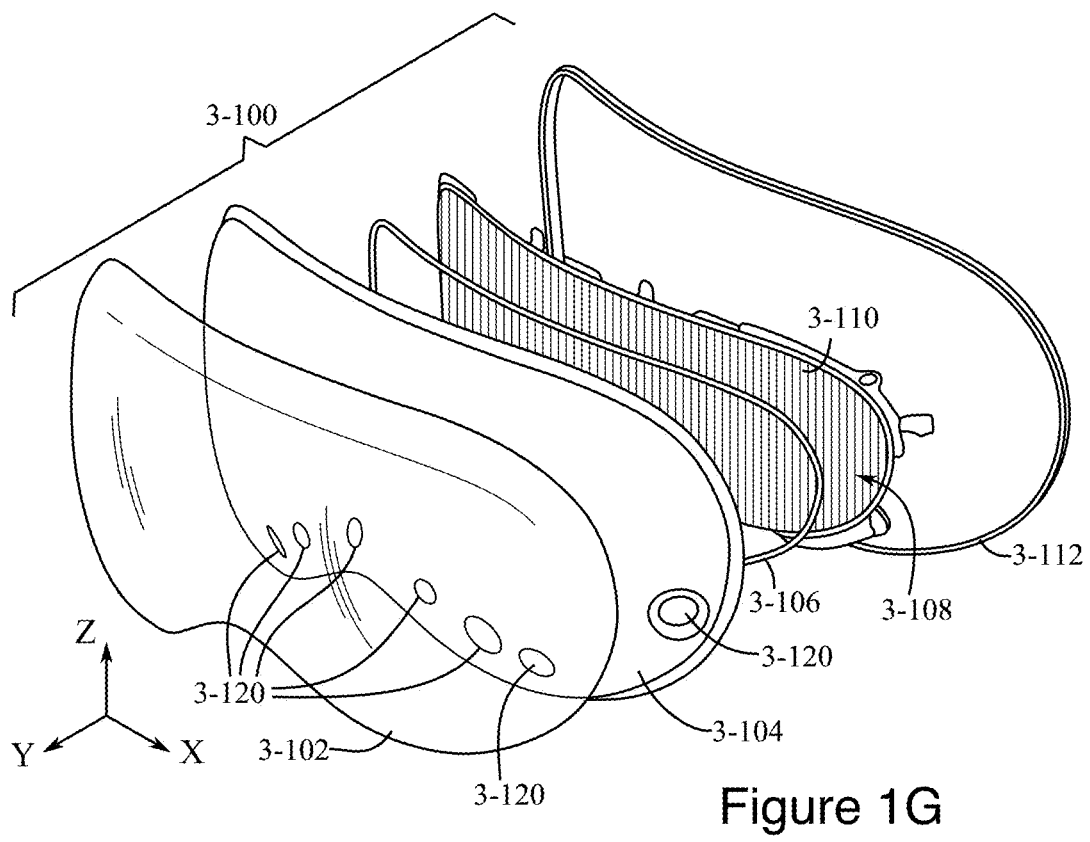
Figure 1H:
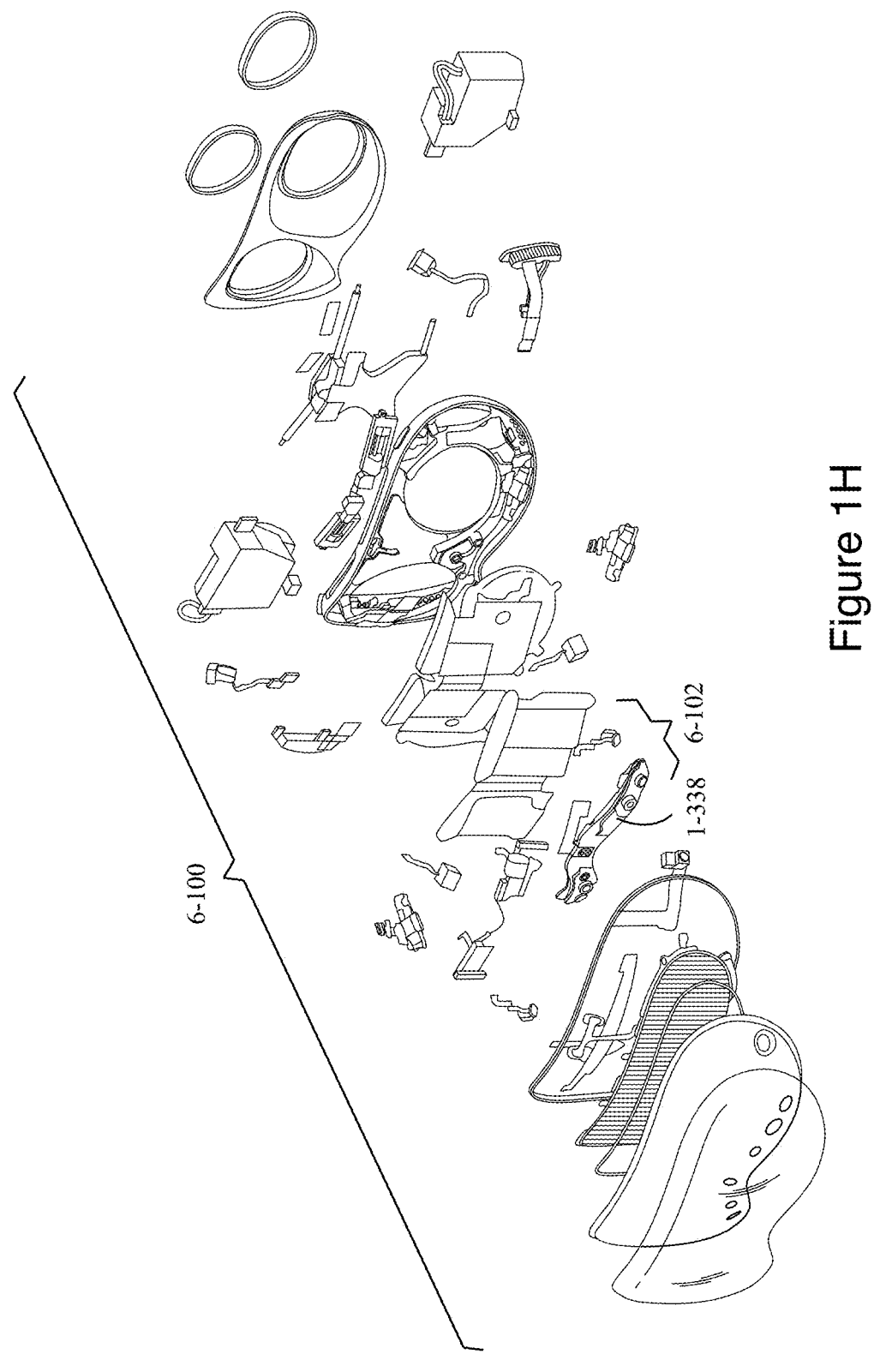
Figure 1I:
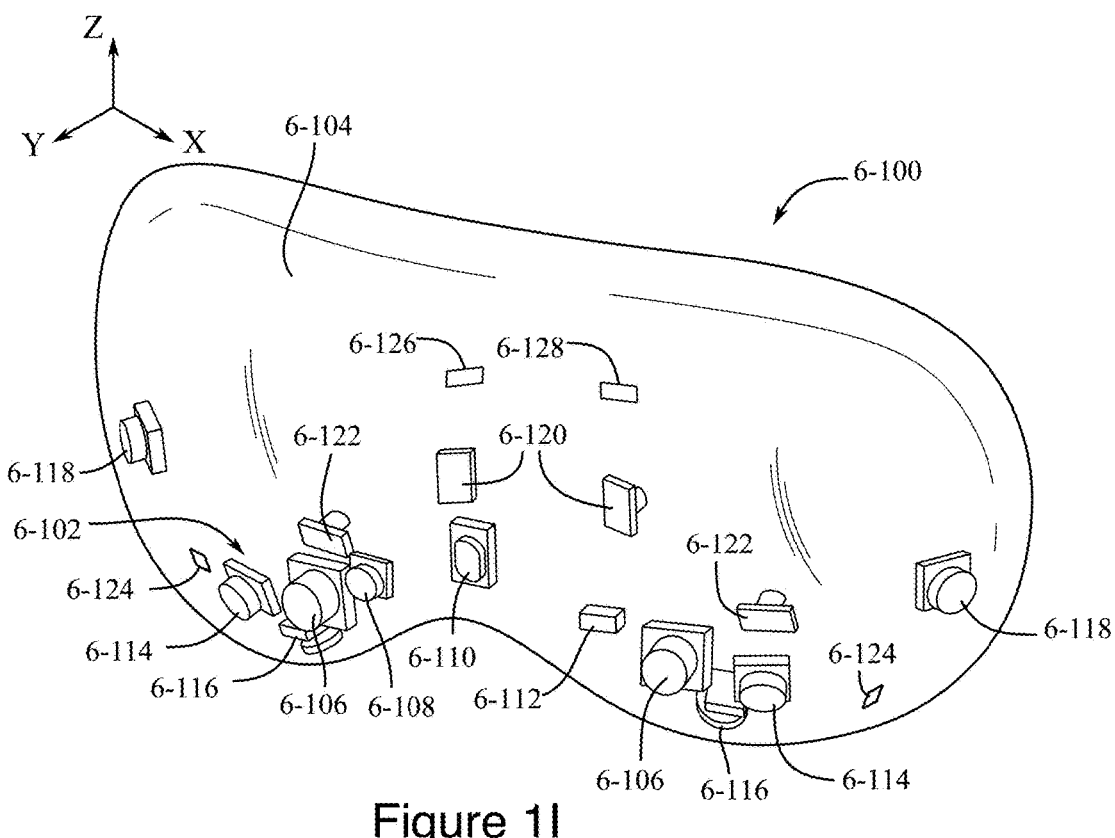
Figure 1J:
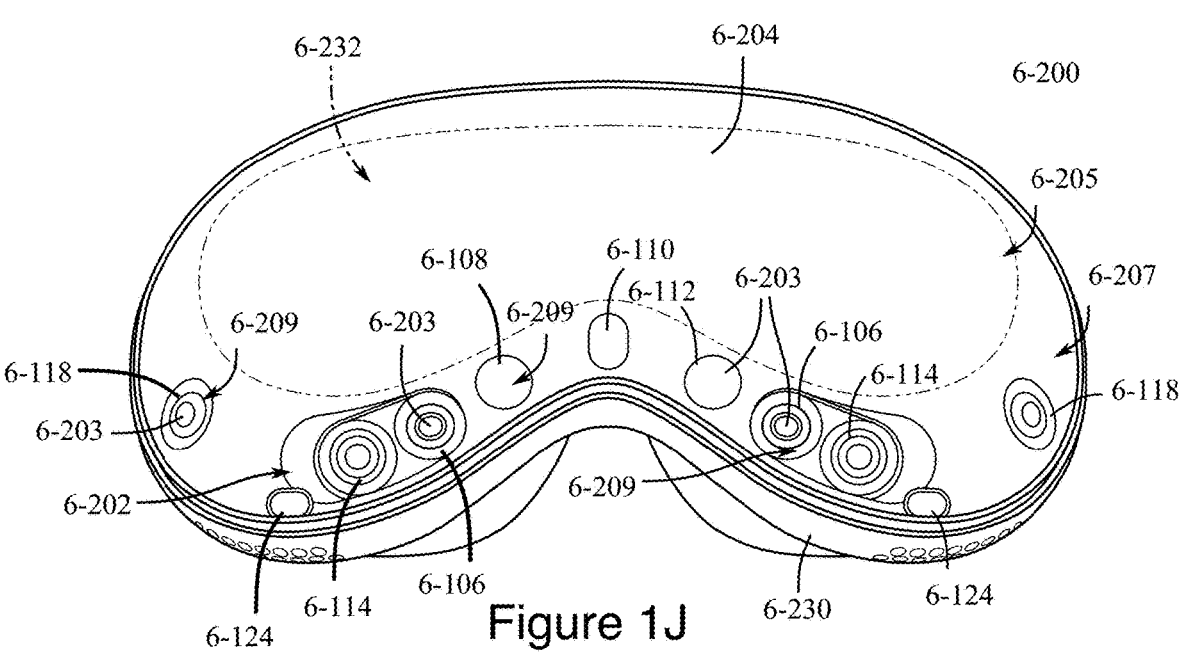
Figure 1K:
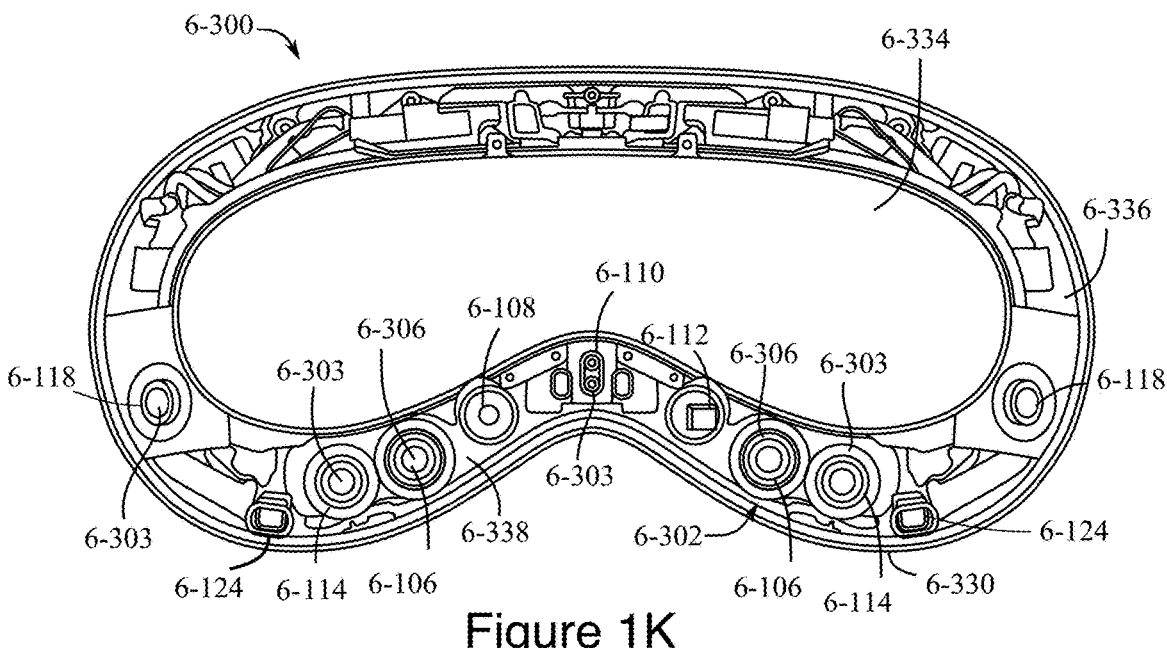
Figure 1L:
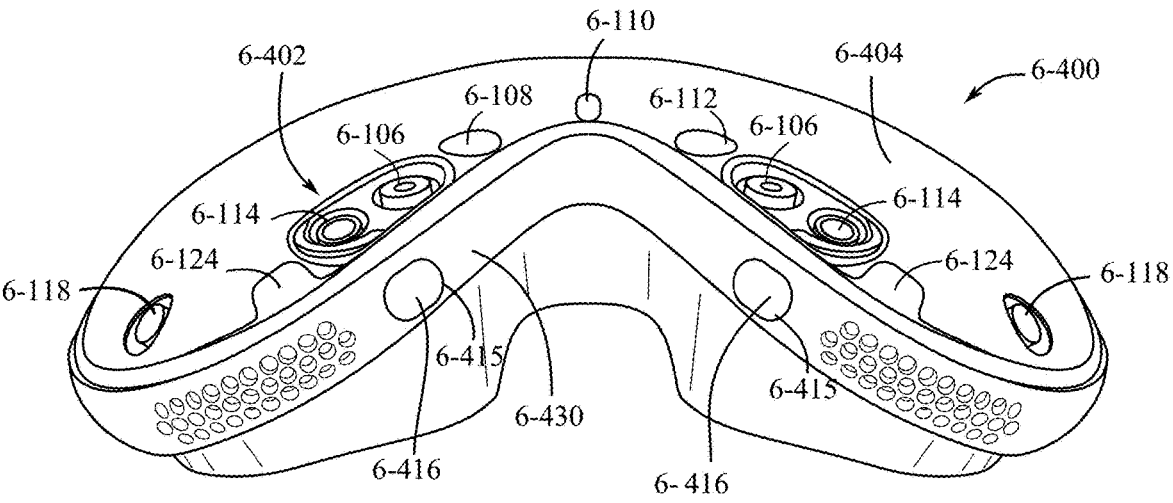
Figure 1M:
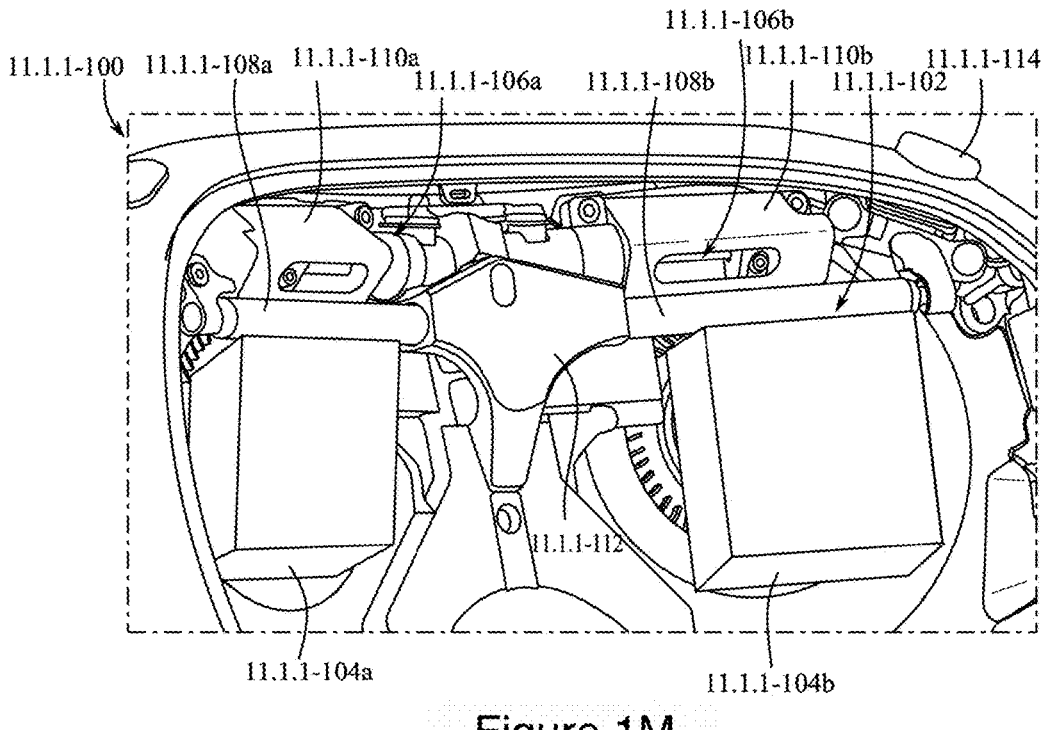
Figure 1N:
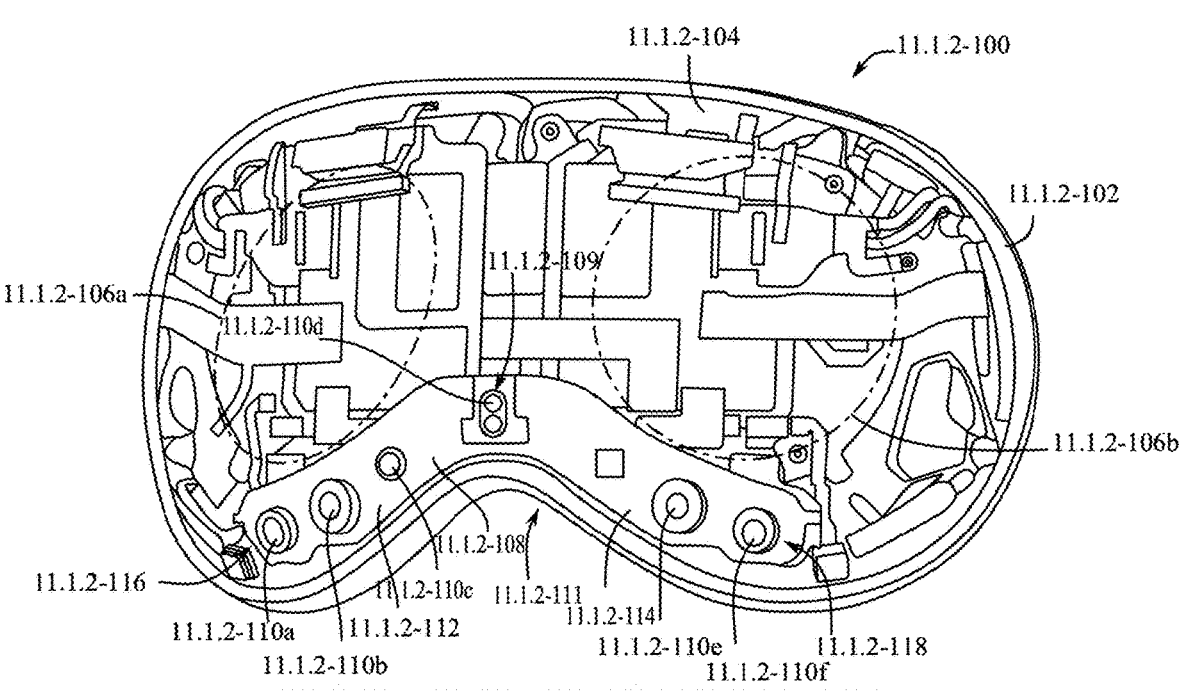
Figure 1O:
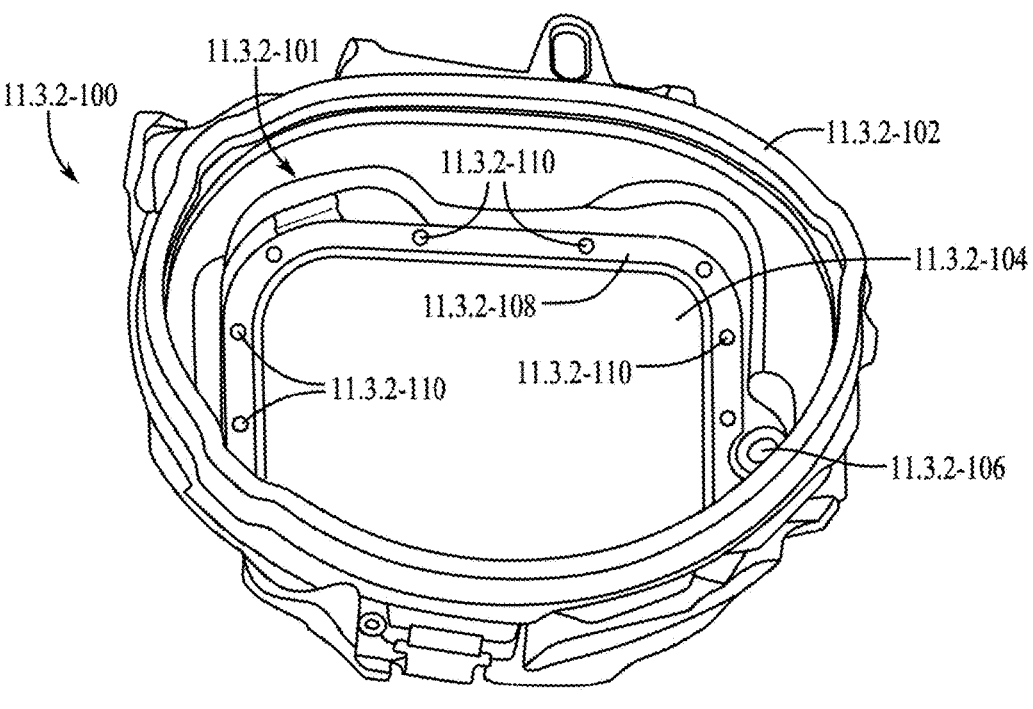
Figure 1P:
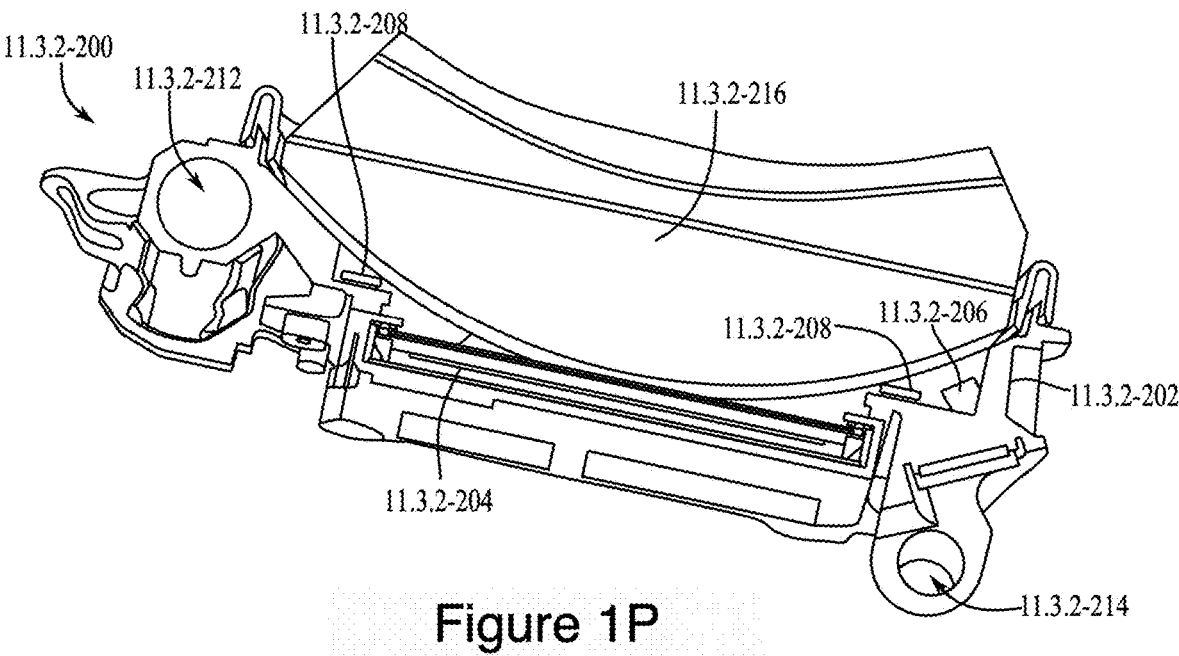

FIGS. 1A-1P illustrate various examples of a computer system that is used to perform the methods and provide audio, visual and/or haptic feedback as part of user interfaces described herein. In some embodiments, the computer system includes one or more display generation components (e.g., first and second display assemblies 1-120a, 1-120b and/or first and second optical modules 11.1.1-104a and 11.1.1-104b) for displaying virtual elements and/or a representation of a physical environment to a user of the computer system, optionally generated based on detected events and/or user inputs detected by the computer system. User interfaces generated by the computer system are optionally corrected by one or more corrective lenses 11.3.2-216 that are optionally removably attached to one or more of the optical modules to enable the user interfaces to be more easily viewed by users who would otherwise use glasses or contacts to correct their vision. While many user interfaces illustrated herein show a single view of a user interface, user interfaces in a HMD are optionally displayed using two optical modules (e.g., first and second display assemblies 1-120a, 1-120b and/or first and second optical modules 11.1.1-104a and 11.1.1-104b), one for a user's right eye and a different one for a user's left eye, and slightly different images are presented to the two different eyes to generate the illusion of stereoscopic depth, the single view of the user interface would typically be either a right-eye or left-eye view and the depth effect is explained in the text or using other schematic charts or views. In some embodiments, the computer system includes one or more external displays (e.g., display assembly 1-108) for displaying status information for the computer system to the user of the computer system (when the computer system is not being worn) and/or to other people who are near the computer system, optionally generated based on detected events and/or user inputs detected by the computer system. In some embodiments, the computer system includes one or more audio output components (e.g., electronic component 1-112) for generating audio feedback, optionally generated based on detected events and/or user inputs detected by the computer system. In some embodiments, the computer system includes one or more input devices for detecting input such as one or more sensors (e.g., one or more sensors in sensor assembly 1-356, and/or FIG. 1I) for detecting information about a physical environment of the device which can be used (optionally in conjunction with one or more illuminators such as the illuminators described in FIG. 1I) to generate a digital passthrough image, capture visual media corresponding to the physical environment (e.g., photos and/or video), or determine a pose (e.g., position and/or orientation) of physical objects and/or surfaces in the physical environment so that virtual objects ban be placed based on a detected pose of physical objects and/or surfaces. In some embodiments, the computer system includes one or more input devices for detecting input such as one or more sensors for detecting hand position and/or movement (e.g., one or more sensors in sensor assembly 1-356, and/or FIG. 1I) that can be used (optionally in conjunction with one or more illuminators such as the illuminators 6-124 described in FIG. 1I) to determine when one or more air gestures have been performed. In some embodiments, the computer system includes one or more input devices for detecting input such as one or more sensors for detecting eye movement (e.g., eye tracking and gaze tracking sensors in FIG. 1I) which can be used (optionally in conjunction with one or more lights such as lights 11.3.2-110 in FIG. 1O) to determine attention or gaze position and/or gaze movement which can optionally be used to detect gaze-only inputs based on gaze movement and/or dwell. A combination of the various sensors described above can be used to determine user facial expressions and/or hand movements for use in generating an avatar or representation of the user such as an anthropomorphic avatar or representation for use in a real-time communication session where the avatar has facial expressions, hand movements, and/or body movements that are based on or similar to detected facial expressions, hand movements, and/or body movements of a user of the device. Gaze and/or attention information is, optionally, combined with hand tracking information to determine interactions between the user and one or more user interfaces based on direct and/or indirect inputs such as air gestures or inputs that use one or more hardware input devices such as one or more buttons (e.g., first button 1-128, button 11.1.1-114, second button 1-132, and or dial or button 1-328), knobs (e.g., first button 1-128, button 11.1.1-114, and/or dial or button 1-328), digital crowns (e.g., first button 1-128 which is depressible and twistable or rotatable, button 11.1.1-114, and/or dial or button 1-328), trackpads, touch screens, keyboards, mice and/or other input devices. One or more buttons (e.g., first button 1-128, button 11.1.1-114, second button 1-132, and or dial or button 1-328) are optionally used to perform system operations such as recentering content in three-dimensional environment that is visible to a user of the device, displaying a home user interface for launching applications, starting real-time communication sessions, or initiating display of virtual three-dimensional backgrounds. Knobs or digital crowns (e.g., first button 1-128 which is depressible and twistable or rotatable, button 11.1.1-114, and/or dial or button 1-328) are optionally rotatable to adjust parameters of the visual content such as a level of immersion of a virtual three-dimensional environment (e.g., a degree to which virtual-content occupies the viewport of the user into the three-dimensional environment) or other parameters associated with the three-dimensional environment and the virtual content that is displayed via the optical modules (e.g., first and second display assemblies 1-120a, 1-120b and/or first and second optical modules 11.1.1-104a and 11.1.1-104b).

FIG. 1B illustrates a front, top, perspective view of an example of a head-mountable display (HMD) device 1-100 configured to be donned by a user and provide virtual and altered/mixed reality (VR/AR) experiences. The HMD 1-100 can include a display unit 1-102 or assembly, an electronic strap assembly 1-104 connected to and extending from the display unit 1-102, and a band assembly 1-106 secured at either end to the electronic strap assembly 1-104. The electronic strap assembly 1-104 and the band 1-106 can be part of a retention assembly configured to wrap around a user's head to hold the display unit 1-102 against the face of the user.

In at least one example, the band assembly 1-106 can include a first band 1-116 configured to wrap around the rear side of a user's head and a second band 1-117 configured to extend over the top of a user's head. The second strap can extend between first and second electronic straps 1-105a, 1-105b of the electronic strap assembly 1-104 as shown. The strap assembly 1-104 and the band assembly 1-106 can be part of a securement mechanism extending rearward from the display unit 1-102 and configured to hold the display unit 1-102 against a face of a user.

In at least one example, the securement mechanism includes a first electronic strap 1-105a including a first proximal end 1-134 coupled to the display unit 1-102, for example a housing 1-150 of the display unit 1-102, and a first distal end 1-136 opposite the first proximal end 1-134. The securement mechanism can also include a second electronic strap 1-105b including a second proximal end 1-138 coupled to the housing 1-150 of the display unit 1-102 and a second distal end 1-140 opposite the second proximal end 1-138. The securement mechanism can also include the first band 1-116 including a first end 1-142 coupled to the first distal end 1-136 and a second end 1-144 coupled to the second distal end 1-140 and the second band 1-117 extending between the first electronic strap 1-105a and the second electronic strap 1-105b. The straps 1-105a-b and band 1-116 can be coupled via connection mechanisms or assemblies 1-114. In at least one example, the second band 1-117 includes a first end 1-146 coupled to the first electronic strap 1-105a between the first proximal end 1-134 and the first distal end 1-136 and a second end 1-148 coupled to the second electronic strap 1-105b between the second proximal end 1-138 and the second distal end 1-140.

In at least one example, the first and second electronic straps 1-105a-b include plastic, metal, or other structural materials forming the shape the substantially rigid straps 1-105a-b. In at least one example, the first and second bands 1-116, 1-117 are formed of elastic, flexible materials including woven textiles, rubbers, and the like. The first and second bands 1-116, 1-117 can be flexible to conform to the shape of the user' head when donning the HMD 1-100.

In at least one example, one or more of the first and second electronic straps 1-105a-b can define internal strap volumes and include one or more electronic components disposed in the internal strap volumes. In one example, as shown in FIG. 1B, the first electronic strap 1-105a can include an electronic component 1-112. In one example, the electronic component 1-112 can include a speaker. In one example, the electronic component 1-112 can include a computing component such as a processor.

In at least one example, the housing 1-150 defines a first, front-facing opening 1-152. The front-facing opening is labeled in dotted lines at 1-152 in FIG. 1B because the display assembly 1-108 is disposed to occlude the first opening 1-152 from view when the HMD 1-100 is assembled. The housing 1-150 can also define a rear-facing second opening 1-154. The housing 1-150 also defines an internal volume between the first and second openings 1-152, 1-154. In at least one example, the HMD 1-100 includes the display assembly 1-108, which can include a front cover and display screen (shown in other figures) disposed in or across the front opening 1-152 to occlude the front opening 1-152. In at least one example, the display screen of the display assembly 1-108, as well as the display assembly 1-108 in general, has a curvature configured to follow the curvature of a user's face. The display screen of the display assembly 1-108 can be curved as shown to compliment the user's facial features and general curvature from one side of the face to the other, for example from left to right and/or from top to bottom where the display unit 1-102 is pressed.

In at least one example, the housing 1-150 can define a first aperture 1-126 between the first and second openings 1-152, 1-154 and a second aperture 1-130 between the first and second openings 1-152, 1-154. The HMD 1-100 can also include a first button 1-128 disposed in the first aperture 1-126 and a second button 1-132 disposed in the second aperture 1-130. The first and second buttons 1-128, 1-132 can be depressible through the respective apertures 1-126, 1-130. In at least one example, the first button 1-126 and/or second button 1-132 can be twistable dials as well as depressible buttons. In at least one example, the first button 1-128 is a depressible and twistable dial button and the second button 1-132 is a depressible button.

FIG. 1C illustrates a rear, perspective view of the HMD 1-100. The HMD 1-100 can include a light seal 1-110 extending rearward from the housing 1-150 of the display assembly 1-108 around a perimeter of the housing 1-150 as shown. The light seal 1-110 can be configured to extend from the housing 1-150 to the user's face around the user's eyes to block external light from being visible. In one example, the HMD 1-100 can include first and second display assemblies 1-120a, 1-120b disposed at or in the rearward facing second opening 1-154 defined by the housing 1-150 and/or disposed in the internal volume of the housing 1-150 and configured to project light through the second opening 1-154. In at least one example, each display assembly 1-120a-b can include respective display screens 1-122a, 1-122b configured to project light in a rearward direction through the second opening 1-154 toward the user's eyes.

In at least one example, referring to both FIGS. 1B and 1C, the display assembly 1-108 can be a front-facing, forward display assembly including a display screen configured to project light in a first, forward direction and the rear facing display screens 1-122a-b can be configured to project light in a second, rearward direction opposite the first direction. As noted above, the light seal 1-110 can be configured to block light external to the HMD 1-100 from reaching the user's eyes, including light projected by the forward facing display screen of the display assembly 1-108 shown in the front perspective view of FIG. 1B. In at least one example, the HMD 1-100 can also include a curtain 1-124 occluding the second opening 1-154 between the housing 1-150 and the rear-facing display assemblies 1-120*a-b*. In at least one example, the curtain 1-124 can be elastic or at least partially elastic.

Any of the features, components, and/or parts, including the arrangements and configurations thereof shown in FIGS. 1B and 1C can be included, either alone or in any combination, in any of the other examples of devices, features, components, and parts shown in FIGS. 1D-1F and described herein. Likewise, any of the features, components, and/or parts, including the arrangements and configurations thereof shown and described with reference to FIGS. 1D-1F can be included, either alone or in any combination, in the example of the devices, features, components, and parts shown in FIGS. 1B and 1C.

FIG. 1D illustrates an exploded view of an example of an HMD 1-200 including various portions or parts thereof separated according to the modularity and selective coupling of those parts. For example, the HMD 1-200 can include a band 1-216 which can be selectively coupled to first and second electronic straps 1-205*a*, 1-205*b*. The first securement strap 1-205*a* can include a first electronic component 1-212*a* and the second securement strap 1-205*b* can include a second electronic component 1-212*b*. In at least one example, the first and second straps 1-205*a-b* can be removably coupled to the display unit 1-202.

In addition, the HMD 1-200 can include a light seal 1-210 configured to be removably coupled to the display unit 1-202. The HMD 1-200 can also include lenses 1-218 which can be removably coupled to the display unit 1-202, for example over first and second display assemblies including display screens. The lenses 1-218 can include customized prescription lenses configured for corrective vision. As noted, each part shown in the exploded view of FIG. 1D and described above can be removably coupled, attached, re-attached, and changed out to update parts or swap out parts for different users. For example, bands such as the band 1-216, light seals such as the light seal 1-210, lenses such as the lenses 1-218, and electronic straps such as the straps 1-205*a-b* can be swapped out depending on the user such that these parts are customized to fit and correspond to the individual user of the HMD 1-200.

Any of the features, components, and/or parts, including the arrangements and configurations thereof shown in FIG. 1D can be included, either alone or in any combination, in any of the other examples of devices, features, components, and parts shown in FIGS. 1B, 1C, and 1E-1F and described herein. Likewise, any of the features, components, and/or parts, including the arrangements and configurations thereof shown and described with reference to FIGS. 1B, 1C, and 1E-1F can be included, either alone or in any combination, in the example of the devices, features, components, and parts shown in FIG. 1D.

FIG. 1E illustrates an exploded view of an example of a display unit 1-306 of a HMD. The display unit 1-306 can include a front display assembly 1-308, a frame/housing assembly 1-350, and a curtain assembly 1-324. The display unit 1-306 can also include a sensor assembly 1-356, logic board assembly 1-358, and cooling assembly 1-360 disposed between the frame assembly 1-350 and the front display assembly 1-308. In at least one example, the display unit 1-306 can also include a rear-facing display assembly 1-320 including first and second rear-facing display screens 1-322*a*, 1-322*b* disposed between the frame 1-350 and the curtain assembly 1-324.

In at least one example, the display unit 1-306 can also include a motor assembly 1-362 configured as an adjustment mechanism for adjusting the positions of the display screens 1-322*a-b* of the display assembly 1-320 relative to the frame 1-350. In at least one example, the display assembly 1-320 is mechanically coupled to the motor assembly 1-362, with at least one motor for each display screen 1-322*a-b*, such that the motors can translate the display screens 1-322*a-b* to match an interpupillary distance of the user's eyes.

In at least one example, the display unit 1-306 can include a dial or button 1-328 depressible relative to the frame 1-350 and accessible to the user outside the frame 1-350. The button 1-328 can be electronically connected to the motor assembly 1-362 via a controller such that the button 1-328 can be manipulated by the user to cause the motors of the motor assembly 1-362 to adjust the positions of the display screens 1-322*a-b*.

Any of the features, components, and/or parts, including the arrangements and configurations thereof shown in FIG. 1E can be included, either alone or in any combination, in any of the other examples of devices, features, components, and parts shown in FIGS. 1B-1D and 1F and described herein. Likewise, any of the features, components, and/or parts, including the arrangements and configurations thereof shown and described with reference to FIGS. 1B-1D and 1F can be included, either alone or in any combination, in the example of the devices, features, components, and parts shown in FIG. 1E.

FIG. 1F illustrates an exploded view of another example of a display unit 1-406 of a HMD device similar to other HMD devices described herein. The display unit 1-406 can include a front display assembly 1-402, a sensor assembly 1-456, a logic board assembly 1-458, a cooling assembly 1-460, a frame assembly 1-450, a rear-facing display assembly 1-421, and a curtain assembly 1-424. The display unit 1-406 can also include a motor assembly 1-462 for adjusting the positions of first and second display sub-assemblies 1-420*a*, 1-420*b* of the rear-facing display assembly 1-421, including first and second respective display screens for interpupillary adjustments, as described above.

The various parts, systems, and assemblies shown in the exploded view of FIG. 1F are described in greater detail herein with reference to FIGS. 1B-1E as well as subsequent figures referenced in the present disclosure. The display unit 1-406 shown in FIG. 1F can be assembled and integrated with the securement mechanisms shown in FIGS. 1B-1E, including the electronic straps, bands, and other components including light seals, connection assemblies, and so forth.

Any of the features, components, and/or parts, including the arrangements and configurations thereof shown in FIG. 1F can be included, either alone or in any combination, in any of the other examples of devices, features, components, and parts shown in FIGS. 1B-1E and described herein. Likewise, any of the features, components, and/or parts, including the arrangements and configurations thereof shown and described with reference to FIGS. 1B-1E can be included, either alone or in any combination, in the example of the devices, features, components, and parts shown in FIG. 1F.

FIG. 1G illustrates a perspective, exploded view of a front cover assembly 3-100 of an HMD device described herein, for example the front cover assembly 3-1 of the HMD 3-100 shown in FIG. 1G or any other HMD device shown and described herein. The front cover assembly 3-100 shown in FIG. 1G can include a transparent or semi-transparent cover 3-102, shroud 3-104 (or "canopy"), adhesive layers 3-106, display assembly 3-108 including a lenticular lens panel or array 3-110, and a structural trim 3-112. The adhesive layer 3-106 can secure the shroud 3-104 and/or transparent cover 3-102 to the display assembly 3-108 and/or the trim 3-112. The trim 3-112 can secure the various components of the front cover assembly 3-100 to a frame or chassis of the HMD device.

In at least one example, as shown in FIG. 1G, the transparent cover 3-102, shroud 3-104, and display assembly 3-108, including the lenticular lens array 3-110, can be curved to accommodate the curvature of a user's face. The transparent cover 3-102 and the shroud 3-104 can be curved in two or three dimensions, e.g., vertically curved in the Z-direction in and out of the Z-X plane and horizontally curved in the X-direction in and out of the Z-X plane. In at least one example, the display assembly 3-108 can include the lenticular lens array 3-110 as well as a display panel having pixels configured to project light through the shroud 3-104 and the transparent cover 3-102. The display assembly 3-108 can be curved in at least one direction, for example the horizontal direction, to accommodate the curvature of a user's face from one side (e.g., left side) of the face to the other (e.g., right side). In at least one example, each layer or component of the display assembly 3-108, which will be shown in subsequent figures and described in more detail, but which can include the lenticular lens array 3-110 and a display layer, can be similarly or concentrically curved in the horizontal direction to accommodate the curvature of the user's face.

In at least one example, the shroud 3-104 can include a transparent or semi-transparent material through which the display assembly 3-108 projects light. In one example, the shroud 3-104 can include one or more opaque portions, for example opaque ink-printed portions or other opaque film portions on the rear surface of the shroud 3-104. The rear surface can be the surface of the shroud 3-104 facing the user's eyes when the HMD device is donned. In at least one example, opaque portions can be on the front surface of the shroud 3-104 opposite the rear surface. In at least one example, the opaque portion or portions of the shroud 3-104 can include perimeter portions visually hiding any components around an outside perimeter of the display screen of the display assembly 3-108. In this way, the opaque portions of the shroud hide any other components, including electronic components, structural components, and so forth, of the HMD device that would otherwise be visible through the transparent or semi-transparent cover 3-102 and/or shroud 3-104.

In at least one example, the shroud 3-104 can define one or more apertures transparent portions 3-120 through which sensors can send and receive signals. In one example, the portions 3-120 are apertures through which the sensors can extend or send and receive signals. In one example, the portions 3-120 are transparent portions, or portions more transparent than surrounding semi-transparent or opaque portions of the shroud, through which sensors can send and receive signals through the shroud and through the transparent cover 3-102. In one example, the sensors can include cameras, IR sensors, LUX sensors, or any other visual or non-visual environmental sensors of the HMD device.

Any of the features, components, and/or parts, including the arrangements and configurations thereof shown in FIG. 1G can be included, either alone or in any combination, in any of the other examples of devices, features, components, and parts described herein. Likewise, any of the features, components, and/or parts, including the arrangements and configurations thereof shown and described herein can be included, either alone or in any combination, in the example of the devices, features, components, and parts shown in FIG. 1G.

FIG. 1H illustrates an exploded view of an example of an HMD device 6-100.

The HMD device 6-100 can include a sensor array or system 6-102 including one or more sensors, cameras, projectors, and so forth mounted to one or more components of the HMD 6-100. In at least one example, the sensor system 6-102 can include a bracket 1-338 on which one or more sensors of the sensor system 6-102 can be fixed/secured.

FIG. 1I illustrates a portion of an HMD device 6-100 including a front transparent cover 6-104 and a sensor system 6-102. The sensor system 6-102 can include a number of different sensors, emitters, receivers, including cameras, IR sensors, projectors, and so forth. The transparent cover 6-104 is illustrated in front of the sensor system 6-102 to illustrate relative positions of the various sensors and emitters as well as the orientation of each sensor/emitter of the system 6-102. As referenced herein, "sideways," "side," "lateral," "horizontal," and other similar terms refer to orientations or directions as indicated by the X-axis shown in FIG. 1J. Terms such as "vertical," "up," "down," and similar terms refer to orientations or directions as indicated by the Z-axis shown in FIG. 1J. Terms such as "frontward," "rearward," "forward," backward," and similar terms refer to orientations or directions as indicated by the Y-axis shown in FIG. 1J.

In at least one example, the transparent cover 6-104 can define a front, external surface of the HMD device 6-100 and the sensor system 6-102, including the various sensors and components thereof, can be disposed behind the cover 6-104 in the Y-axis/direction. The cover 6-104 can be transparent or semi-transparent to allow light to pass through the cover 6-104, both light detected by the sensor system 6-102 and light emitted thereby.

As noted elsewhere herein, the HMD device 6-100 can include one or more controllers including processors for electrically coupling the various sensors and emitters of the sensor system 6-102 with one or more mother boards, processing units, and other electronic devices such as display screens and the like. In addition, as will be shown in more detail below with reference to other figures, the various sensors, emitters, and other components of the sensor system 6-102 can be coupled to various structural frame members, brackets, and so forth of the HMD device 6-100 not shown in FIG. 1I. FIG. 1I shows the components of the sensor system 6-102 unattached and un-coupled electrically from other components for the sake of illustrative clarity.

In at least one example, the device can include one or more controllers having processors configured to execute instructions stored on memory components electrically coupled to the processors. The instructions can include, or cause the processor to execute, one or more algorithms for self-correcting angles and positions of the various cameras described herein overtime with use as the initial positions, angles, or orientations of the cameras get bumped or deformed due to unintended drop events or other events.

In at least one example, the sensor system 6-102 can include one or more scene cameras 6-106. The system 6-102 can include two scene cameras 6-102 disposed on either side of the nasal bridge or arch of the HMD device 6-100 such that each of the two cameras 6-106 correspond generally in position with left and right eyes of the user behind the cover 6-103. In at least one example, the scene cameras 6-106 are oriented generally forward in the Y-direction to capture images in front of the user during use of the HMD 6-100. In at least one example, the scene cameras are color cameras and provide images and content for MR video pass through to the display screens facing the user's eyes when using the HMD device 6-100. The scene cameras 6-106 can also be used for environment and object reconstruction.

In at least one example, the sensor system 6-102 can include a first depth sensor 6-108 pointed generally forward in the Y-direction. In at least one example, the first depth sensor 6-108 can be used for environment and object reconstruction as well as user hand and body tracking. In at least one example, the sensor system 6-102 can include a second depth sensor 6-110 disposed centrally along the width (e.g., along the X-axis) of the HMD device 6-100. For example, the second depth sensor 6-110 can be disposed above the central nasal bridge or accommodating features over the nose of the user when donning the HMD 6-100. In at least one example, the second depth sensor 6-110 can be used for environment and object reconstruction as well as hand and body tracking. In at least one example, the second depth sensor can include a LIDAR sensor.

In at least one example, the sensor system 6-102 can include a depth projector 6-112 facing generally forward to project electromagnetic waves, for example in the form of a predetermined pattern of light dots, out into and within a field of view of the user and/or the scene cameras 6-106 or a field of view including and beyond the field of view of the user and/or scene cameras 6-106. In at least one example, the depth projector can project electromagnetic waves of light in the form of a dotted light pattern to be reflected off objects and back into the depth sensors noted above, including the depth sensors 6-108, 6-110. In at least one example, the depth projector 6-112 can be used for environment and object reconstruction as well as hand and body tracking.

In at least one example, the sensor system 6-102 can include downward facing cameras 6-114 with a field of view pointed generally downward relative to the HDM device 6-100 in the Z-axis. In at least one example, the downward cameras 6-114 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The downward cameras 6-114, for example, can be used to capture facial expressions and movements for the face of the user below the HMD device 6-100, including the cheeks, mouth, and chin.

In at least one example, the sensor system 6-102 can include jaw cameras 6-116. In at least one example, the jaw cameras 6-116 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The jaw cameras 6-116, for example, can be used to capture facial expressions and movements for the face of the user below the HMD device 6-100, including the user's jaw, cheeks, mouth, and chin. for hand and body tracking, headset tracking, and facial avatar In at least one example, the sensor system 6-102 can include side cameras 6-118. The side cameras 6-118 can be oriented to capture side views left and right in the X-axis or direction relative to the HMD device 6-100. In at least one example, the side cameras 6-118 can be used for hand and body tracking, headset tracking, and facial avatar detection and re-creation.

In at least one example, the sensor system 6-102 can include a plurality of eye tracking and gaze tracking sensors for determining an identity, status, and gaze direction of a user's eyes during and/or before use. In at least one example, the eye/gaze tracking sensors can include nasal eye cameras 6-120 disposed on either side of the user's nose and adjacent the user's nose when donning the HMD device 6-100. The eye/gaze sensors can also include bottom eye cameras 6-122 disposed below respective user eyes for capturing images of the eyes for facial avatar detection and creation, gaze tracking, and iris identification functions.

In at least one example, the sensor system 6-102 can include infrared illuminators 6-124 pointed outward from the HMD device 6-100 to illuminate the external environment and any object therein with IR light for IR detection with one or more IR sensors of the sensor system 6-102. In at least one example, the sensor system 6-102 can include a flicker sensor 6-126 and an ambient light sensor 6-128. In at least one example, the flicker sensor 6-126 can detect overhead light refresh rates to avoid display flicker. In one example, the infrared illuminators 6-124 can include light emitting diodes and can be used especially for low light environments for illuminating user hands and other objects in low light for detection by infrared sensors of the sensor system 6-102.

In at least one example, multiple sensors, including the scene cameras 6-106, the downward cameras 6-114, the jaw cameras 6-116, the side cameras 6-118, the depth projector 6-112, and the depth sensors 6-108, 6-110 can be used in combination with an electrically coupled controller to combine depth data with camera data for hand tracking and for size determination for better hand tracking and object recognition and tracking functions of the HMD device 6-100. In at least one example, the downward cameras 6-114, jaw cameras 6-116, and side cameras 6-118 described above and shown in FIG. 1I can be wide angle cameras operable in the visible and infrared spectrums. In at least one example, these cameras 6-114, 6-116, 6-118 can operate only in black and white light detection to simplify image processing and gain sensitivity.

Any of the features, components, and/or parts, including the arrangements and configurations thereof shown in FIG. 1I can be included, either alone or in any combination, in any of the other examples of devices, features, components, and parts shown in FIGS. 1J-1L and described herein. Likewise, any of the features, components, and/or parts, including the arrangements and configurations thereof shown and described with reference to FIGS. 1J-1L can be included, either alone or in any combination, in the example of the devices, features, components, and parts shown in FIG. 1I.

FIG. 1J illustrates a lower perspective view of an example of an HMD 6-200 including a cover or shroud 6-204 secured to a frame 6-230. In at least one example, the sensors 6-203 of the sensor system 6-202 can be disposed around a perimeter of the HDM 6-200 such that the sensors 6-203 are outwardly disposed around a perimeter of a display region or area 6-232 so as not to obstruct a view of the displayed light. In at least one example, the sensors can be disposed behind the shroud 6-204 and aligned with transparent portions of the shroud allowing sensors and projectors to allow light back and forth through the shroud 6-204. In at least one example, opaque ink or other opaque material or films/layers can be disposed on the shroud 6-204 around the display area 6-232 to hide components of the HMD 6-200 outside the display area 6-232 other than the transparent portions defined by the opaque portions, through which the sensors and projectors send and receive light and electromagnetic signals during operation. In at least one example, the shroud 6-204 allows light to pass therethrough from the display (e.g., within the display region 6-232) but not radially outward from the display region around the perimeter of the display and shroud 6-204.

In some examples, the shroud 6-204 includes a transparent portion 6-205 and an opaque portion 6-207, as described above and elsewhere herein. In at least one example, the opaque portion 6-207 of the shroud 6-204 can define one or more transparent regions 6-209 through which the sensors 6-203 of the sensor system 6-202 can send and receive signals. In the illustrated example, the sensors 6-203 of the sensor system 6-202 sending and receiving signals through the shroud 6-204, or more specifically through the transparent regions 6-209 of the (or defined by) the opaque portion 6-207 of the shroud 6-204 can include the same or similar sensors as those shown in the example of FIG. 1I, for example depth sensors 6-108 and 6-110, depth projector 6-112, first and second scene cameras 6-106, first and second downward cameras 6-114, first and second side cameras 6-118, and first and second infrared illuminators 6-124. These sensors are also shown in the examples of FIGS. 1K and 1L. Other sensors, sensor types, number of sensors, and relative positions thereof can be included in one or more other examples of HMDs.

Any of the features, components, and/or parts, including the arrangements and configurations thereof shown in FIG. 1J can be included, cither alone or in any combination, in any of the other examples of devices, features, components, and parts shown in FIGS. 1I and 1K-1L and described herein. Likewise, any of the features, components, and/or parts, including the arrangements and configurations thereof shown and described with reference to FIGS. 1I and 1K-1L can be included, cither alone or in any combination, in the example of the devices, features, components, and parts shown in FIG. 1J.

FIG. 1K illustrates a front view of a portion of an example of an HMD device 6-300 including a display 6-334, brackets 6-336, 6-338, and frame or housing 6-330. The example shown in FIG. 1K does not include a front cover or shroud in order to illustrate the brackets 6-336, 6-338. For example, the shroud 6-204 shown in FIG. 1J includes the opaque portion 6-207 that would visually cover/block a view of anything outside (e.g., radially/peripherally outside) the display/display region 6-334, including the sensors 6-303 and bracket 6-338.

In at least one example, the various sensors of the sensor system 6-302 are coupled to the brackets 6-336, 6-338. In at least one example, the scene cameras 6-306 include tight tolerances of angles relative to one another. For example, the tolerance of mounting angles between the two scene cameras 6-306 can be 0.5 degrees or less, for example 0.3 degrees or less. In order to achieve and maintain such a tight tolerance, in one example, the scene cameras 6-306 can be mounted to the bracket 6-338 and not the shroud. The bracket can include cantilevered arms on which the scene cameras 6-306 and other sensors of the sensor system 6-302 can be mounted to remain un-deformed in position and orientation in the case of a drop event by a user resulting in any deformation of the other bracket 6-226, housing 6-330, and/or shroud.

Any of the features, components, and/or parts, including the arrangements and configurations thereof shown in FIG.

1K can be included, either alone or in any combination, in any of the other examples of devices, features, components, and parts shown in FIGS. 11-1J and 1L and described herein. Likewise, any of the features, components, and/or parts, including the arrangements and configurations thereof shown and described with reference to FIGS. 11-1J and 1L can be included, either alone or in any combination, in the example of the devices, features, components, and parts shown in FIG. 1K.

FIG. 1L illustrates a bottom view of an example of an HMD 6-400 including a front display/cover assembly 6-404 and a sensor system 6-402. The sensor system 6-402 can be similar to other sensor systems described above and elsewhere herein, including in reference to FIGS. 1I-1K. In at least one example, the jaw cameras 6-416 can be facing downward to capture images of the user's lower facial features. In one example, the jaw cameras 6-416 can be coupled directly to the frame or housing 6-430 or one or more internal brackets directly coupled to the frame or housing 6-430 shown. The frame or housing 6-430 can include one or more apertures/openings 6-415 through which the jaw cameras 6-416 can send and receive signals.

Any of the features, components, and/or parts, including the arrangements and configurations thereof shown in FIG. 1L can be included, either alone or in any combination, in any of the other examples of devices, features, components, and parts shown in FIGS. 11-1K and described herein. Likewise, any of the features, components, and/or parts, including the arrangements and configurations thereof shown and described with reference to FIGS. 11-1K can be included, either alone or in any combination, in the example of the devices, features, components, and parts shown in FIG. 1L.

FIG. 1M illustrates a rear perspective view of an inter-pupillary distance (IPD) adjustment system 11.1.1-102 including first and second optical modules 11.1.1-104*a-b* slidably engaging/coupled to respective guide-rods 11.1.1-108*a-b* and motors 11.1.1-110*a-b* of left and right adjustment subsystems 11.1.1-106*a-b*. The IPD adjustment system 11.1.1-102 can be coupled to a bracket 11.1.1-112 and include a button 11.1.1-114 in electrical communication with the motors 11.1.1-110*a-b*. In at least one example, the button 11.1.1-114 can electrically communicate with the first and second motors 11.1.1-110*a-b* via a processor or other circuitry components to cause the first and second motors 11.1.1-110*a-b* to activate and cause the first and second optical modules 11.1.1-104*a-b*, respectively, to change position relative to one another.

In at least one example, the first and second optical modules 11.1.1-104*a-b* can include respective display screens configured to project light toward the user's eyes when donning the HMD 11.1.1-100. In at least one example, the user can manipulate (e.g., depress and/or rotate) the button 11.1.1-114 to activate a positional adjustment of the optical modules 11.1.1-104*a-b* to match the inter-pupillary distance of the user's eyes. The optical modules 11.1.1-104*a-b* can also include one or more cameras or other sensors/sensor systems for imaging and measuring the IPD of the user such that the optical modules 11.1.1-104*a-b* can be adjusted to match the IPD.

In one example, the user can manipulate the button 11.1.1-114 to cause an automatic positional adjustment of the first and second optical modules 11.1.1-104*a-b*. In one example, the user can manipulate the button 11.1.1-114 to cause a manual adjustment such that the optical modules 11.1.1-104*a-b* move further or closer away, for example when the user rotates the button 11.1.1-114 one way or the other, until the user visually matches her/his own IPD. In one example, the manual adjustment is electronically communicated via one or more circuits and power for the movements of the optical modules 11.1.1-104*a-b* via the motors 11.1.1-110*a-b* is provided by an electrical power source. In one example, the adjustment and movement of the optical modules 11.1.1-104*a-b* via a manipulation of the button 11.1.1-114 is mechanically actuated via the movement of the button 11.1.1-114.

Any of the features, components, and/or parts, including the arrangements and configurations thereof shown in FIG. 1M can be included, either alone or in any combination, in any of the other examples of devices, features, components, and parts shown in any other figures shown and described herein. Likewise, any of the features, components, and/or parts, including the arrangements and configurations thereof shown and described with reference to any other figure shown and described herein, either alone or in any combination, in the example of the devices, features, components, and parts shown in FIG. 1M.

FIG. 1N illustrates a front perspective view of a portion of an HMD 11.1.2-100, including an outer structural frame 11.1.2-102 and an inner or intermediate structural frame 11.1.2-104 defining first and second apertures 11.1.2-106*a*, 11.1.2-106*b*. The apertures 11.1.2-106*a-b* are shown in dotted lines in FIG. 1N because a view of the apertures 11.1.2-106*a-b* can be blocked by one or more other components of the HMD 11.1.2-100 coupled to the inner frame 11.1.2-104 and/or the outer frame 11.1.2-102, as shown. In at least one example, the HMD 11.1.2-100 can include a first mounting bracket 11.1.2-108 coupled to the inner frame 11.1.2-104. In at least one example, the mounting bracket 11.1.2-108 is coupled to the inner frame 11.1.2-104 between the first and second apertures 11.1.2-106*a-b*.

The mounting bracket 11.1.2-108 can include a middle or central portion 11.1.2-109 coupled to the inner frame 11.1.2-104. In some examples, the middle or central portion 11.1.2-109 may not be the geometric middle or center of the bracket 11.1.2-108. Rather, the middle/central portion 11.1.2-109 can be disposed between first and second cantilevered extension arms extending away from the middle portion 11.1.2-109. In at least one example, the mounting bracket 108 includes a first cantilever arm 11.1.2-112 and a second cantilever arm 11.1.2-114 extending away from the middle portion 11.1.2-109 of the mount bracket 11.1.2-108 coupled to the inner frame 11.1.2-104.

As shown in FIG. 1N, the outer frame 11.1.2-102 can define a curved geometry on a lower side thereof to accommodate a user's nose when the user dons the HMD 11.1.2-100. The curved geometry can be referred to as a nose bridge 11.1.2-111 and be centrally located on a lower side of the HMD 11.1.2-100 as shown. In at least one example, the mounting bracket 11.1.2-108 can be connected to the inner frame 11.1.2-104 between the apertures 11.1.2-106*a-b* such that the cantilevered arms 11.1.2-112, 11.1.2-114 extend downward and laterally outward away from the middle portion 11.1.2-109 to compliment the nose bridge 11.1.2-111 geometry of the outer frame 11.1.2-102. In this way, the mounting bracket 11.1.2-108 is configured to accommodate the user's nose as noted above. The nose bridge 11.1.2-111 geometry accommodates the nose in that the nose bridge 11.1.2-111 provides a curvature that curves with, above, over, and around the user's nose for comfort and fit.

The first cantilever arm 11.1.2-112 can extend away from the middle portion 11.1.2-109 of the mounting bracket 11.1.2-108 in a first direction and the second cantilever arm 11.1.2-114 can extend away from the middle portion 11.1.2-

109 of the mounting bracket 11.1.2-10 in a second direction opposite the first direction. The first and second cantilever arms 11.1.2-112, 11.1.2-114 are referred to as "cantilevered" or "cantilever" arms because each arm 11.1.2-112, 11.1.2-114, includes a distal free end 11.1.2-116, 11.1.2-118, respectively, which are free of affixation from the inner and outer frames 11.1.2-102, 11.1.2-104. In this way, the arms 11.1.2-112, 11.1.2-114 are cantilevered from the middle portion 11.1.2-109, which can be connected to the inner frame 11.1.2-104, with distal ends 11.1.2-102, 11.1.2-104 unattached.

In at least one example, the HMD 11.1.2-100 can include one or more components coupled to the mounting bracket 11.1.2-108. In one example, the components include a plurality of sensors 11.1.2-110*a-f*. Each sensor of the plurality of sensors 11.1.2-110*a-f* can include various types of sensors, including cameras, IR sensors, and so forth. In some examples, one or more of the sensors 11.1.2-110*a-f* can be used for object recognition in three-dimensional space such that it is important to maintain a precise relative position of two or more of the plurality of sensors 11.1.2-110*a-f*. The cantilevered nature of the mounting bracket 11.1.2-108 can protect the sensors 11.1.2-110*a-f* from damage and altered positioning in the case of accidental drops by the user. Because the sensors 11.1.2-110*a-f* are cantilevered on the arms 11.1.2-112, 11.1.2-114 of the mounting bracket 11.1.2-108, stresses and deformations of the inner and/or outer frames 11.1.2-104, 11.1.2-102 are not transferred to the cantilevered arms 11.1.2-112, 11.1.2-114 and thus do not affect the relative positioning of the sensors 11.1.2-110*a-f* coupled/mounted to the mounting bracket 11.1.2-108.

Any of the features, components, and/or parts, including the arrangements and configurations thereof shown in FIG. 1N can be included, either alone or in any combination, in any of the other examples of devices, features, components, and described herein. Likewise, any of the features, components, and/or parts, including the arrangements and configurations thereof shown and described herein can be included, either alone or in any combination, in the example of the devices, features, components, and parts shown in FIG. 1N.

FIG. 1O illustrates an example of an optical module 11.3.2-100 for use in an electronic device such as an HMD, including HDM devices described herein. As shown in one or more other examples described herein, the optical module 11.3.2-100 can be one of two optical modules within an HMD, with each optical module aligned to project light toward a user's eye. In this way, a first optical module can project light via a display screen toward a user's first eye and a second optical module of the same device can project light via another display screen toward the user's second eye.

In at least one example, the optical module 11.3.2-100 can include an optical frame or housing 11.3.2-102, which can also be referred to as a barrel or optical module barrel. The optical module 11.3.2-100 can also include a display 11.3.2-104, including a display screen or multiple display screens, coupled to the housing 11.3.2-102. The display 11.3.2-104 can be coupled to the housing 11.3.2-102 such that the display 11.3.2-104 is configured to project light toward the eye of a user when the HMD of which the display module 11.3.2-100 is a part is donned during use. In at least one example, the housing 11.3.2-102 can surround the display 11.3.2-104 and provide connection features for coupling other components of optical modules described herein.

In one example, the optical module 11.3.2-100 can include one or more cameras 11.3.2-106 coupled to the housing 11.3.2-102. The camera 11.3.2-106 can be positioned relative to the display 11.3.2-104 and housing 11.3.2-102 such that the camera 11.3.2-106 is configured to capture one or more images of the user's eye during use. In at least one example, the optical module 11.3.2-100 can also include a light strip 11.3.2-108 surrounding the display 11.3.2-104.

In one example, the light strip 11.3.2-108 is disposed between the display 11.3.2-104 and the camera 11.3.2-106. The light strip 11.3.2-108 can include a plurality of lights 11.3.2-110. The plurality of lights can include one or more light emitting diodes (LEDs) or other lights configured to project light toward the user's eye when the HMD is donned. The individual lights 11.3.2-110 of the light strip 11.3.2-108 can be spaced about the strip 11.3.2-108 and thus spaced about the display 11.3.2-104 uniformly or non-uniformly at various locations on the strip 11.3.2-108 and around the display 11.3.2-104.

In at least one example, the housing 11.3.2-102 defines a viewing opening 11.3.2-101 through which the user can view the display 11.3.2-104 when the HMD device is donned. In at least one example, the LEDs are configured and arranged to emit light through the viewing opening 11.3.2-101 and onto the user's eye. In one example, the camera 11.3.2-106 is configured to capture one or more images of the user's eye through the viewing opening 11.3.2-101.

As noted above, each of the components and features of the optical module 11.3.2-100 shown in FIG. 1O can be replicated in another (e.g., second) optical module disposed with the HMD to interact (e.g., project light and capture images) of another eye of the user.

Any of the features, components, and/or parts, including the arrangements and configurations thereof shown in FIG. 1O can be included, either alone or in any combination, in any of the other examples of devices, features, components, and parts shown in FIG. 1P or otherwise described herein. Likewise, any of the features, components, and/or parts, including the arrangements and configurations thereof shown and described with reference to FIG. 1P or otherwise described herein can be included, either alone or in any combination, in the example of the devices, features, components, and parts shown in FIG. 1O.

FIG. 1P illustrates a cross-sectional view of an example of an optical module 11.3.2-200 including a housing 11.3.2-202, display assembly 11.3.2-204 coupled to the housing 11.3.2-202, and a lens 11.3.2-216 coupled to the housing 11.3.2-202. In at least one example, the housing 11.3.2-202 defines a first aperture or channel 11.3.2-212 and a second aperture or channel 11.3.2-214. The channels 11.3.2-212, 11.3.2-214 can be configured to slidably engage respective rails or guide rods of an HMD device to allow the optical module 11.3.2-200 to adjust in position relative to the user's eyes for match the user's interpapillary distance (IPD). The housing 11.3.2-202 can slidably engage the guide rods to secure the optical module 11.3.2-200 in place within the HMD.

In at least one example, the optical module 11.3.2-200 can also include a lens 11.3.2-216 coupled to the housing 11.3.2-202 and disposed between the display assembly 11.3.2-204 and the user's eyes when the HMD is donned. The lens 11.3.2-216 can be configured to direct light from the display assembly 11.3.2-204 to the user's eye. In at least one example, the lens 11.3.2-216 can be a part of a lens assembly including a corrective lens removably attached to the optical module 11.3.2-200. In at least one example, the lens 11.3.2-216 is disposed over the light strip 11.3.2-208 and the one or more eye-tracking cameras 11.3.2-206 such that the camera 11.3.2-206 is configured to capture images of the user's eye through the lens 11.3.2-216 and the light strip 11.3.2-208 includes lights configured to project light through the lens 11.3.2-216 to the users' eye during use.

Any of the features, components, and/or parts, including the arrangements and configurations thereof shown in FIG. 1P can be included, either alone or in any combination, in any of the other examples of devices, features, components, and parts and described herein. Likewise, any of the features, components, and/or parts, including the arrangements and configurations thereof shown and described herein can be included, either alone or in any combination, in the example of the devices, features, components, and parts shown in FIG. 1P.

Figure 2:
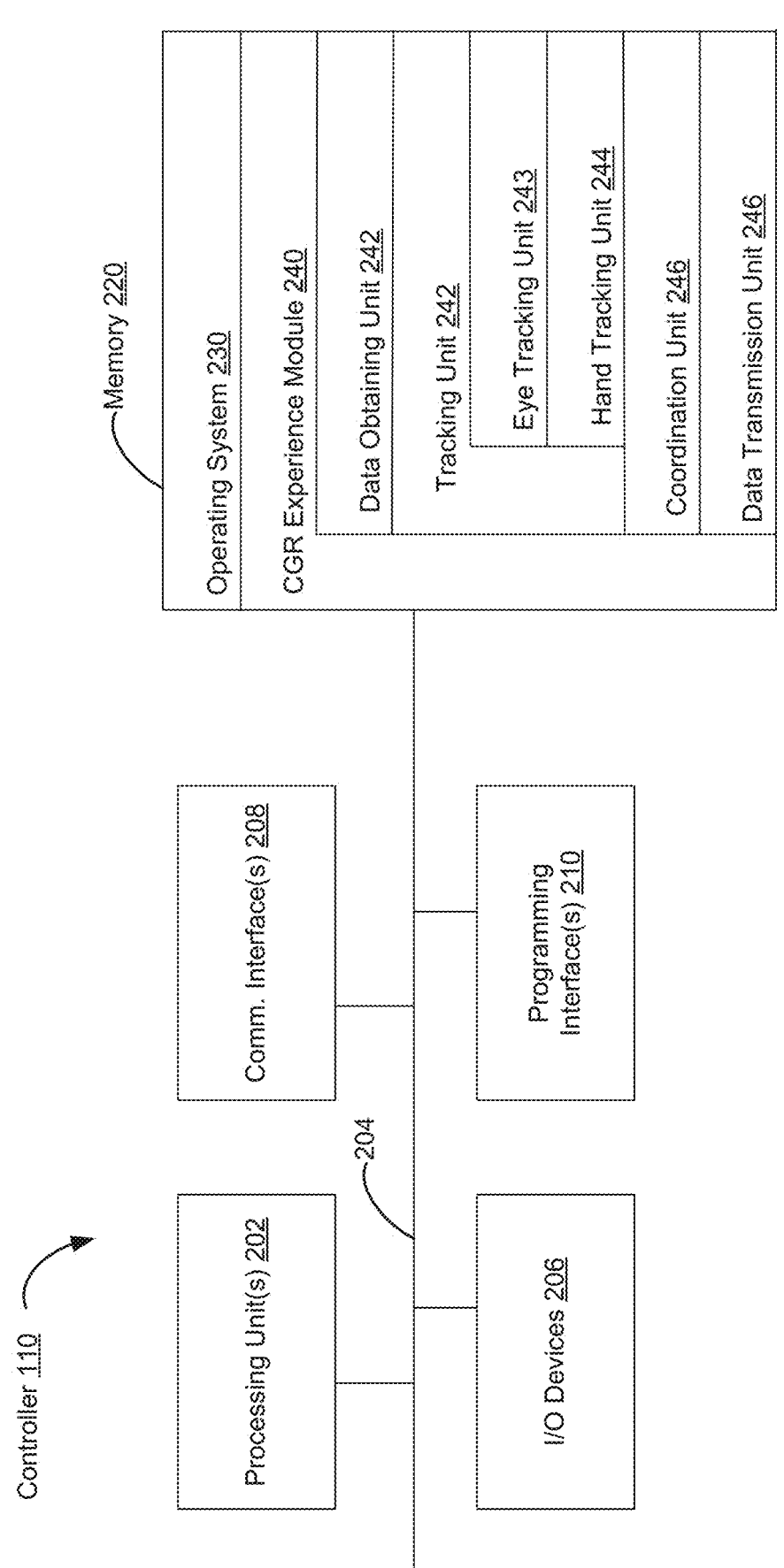
FIG. 2 is a block diagram illustrating a controller of a computer system that is configured to manage and coordinate a XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1A, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1A, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1A, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
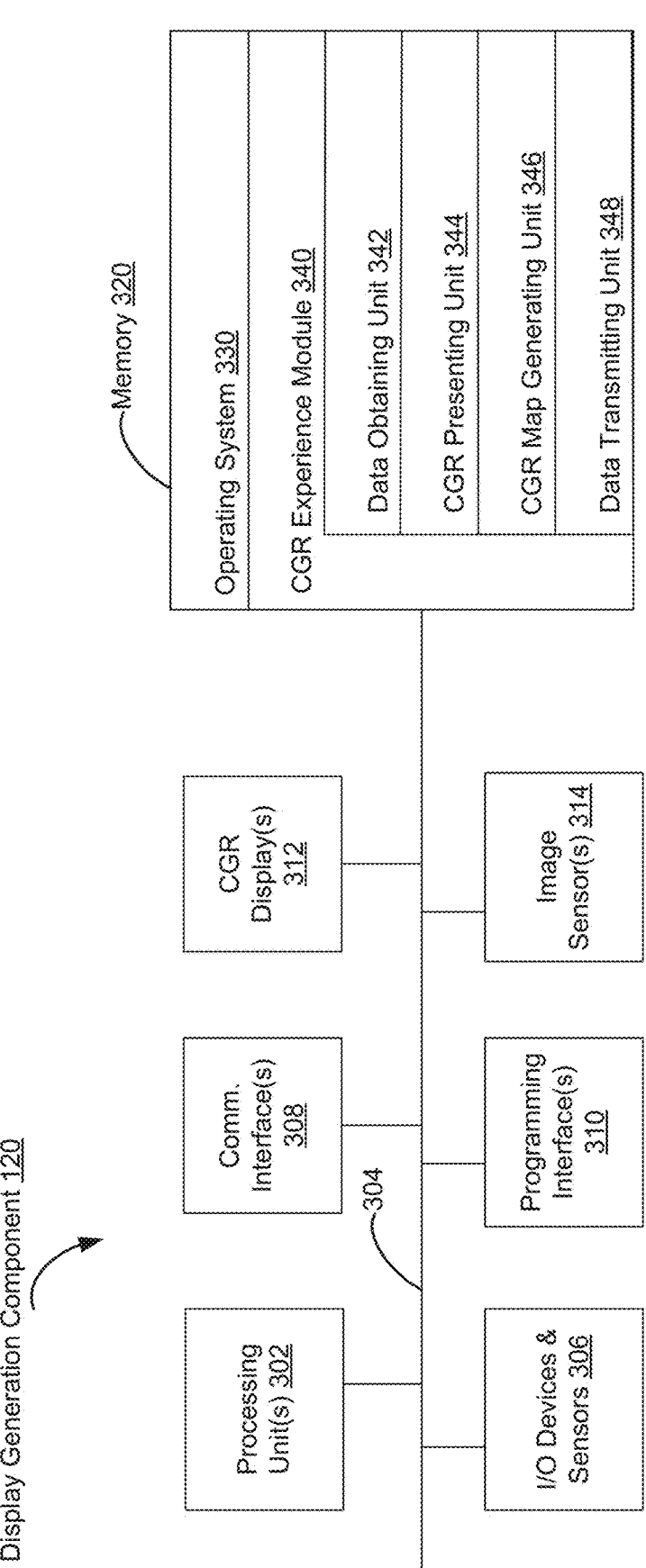
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1A. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1A), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
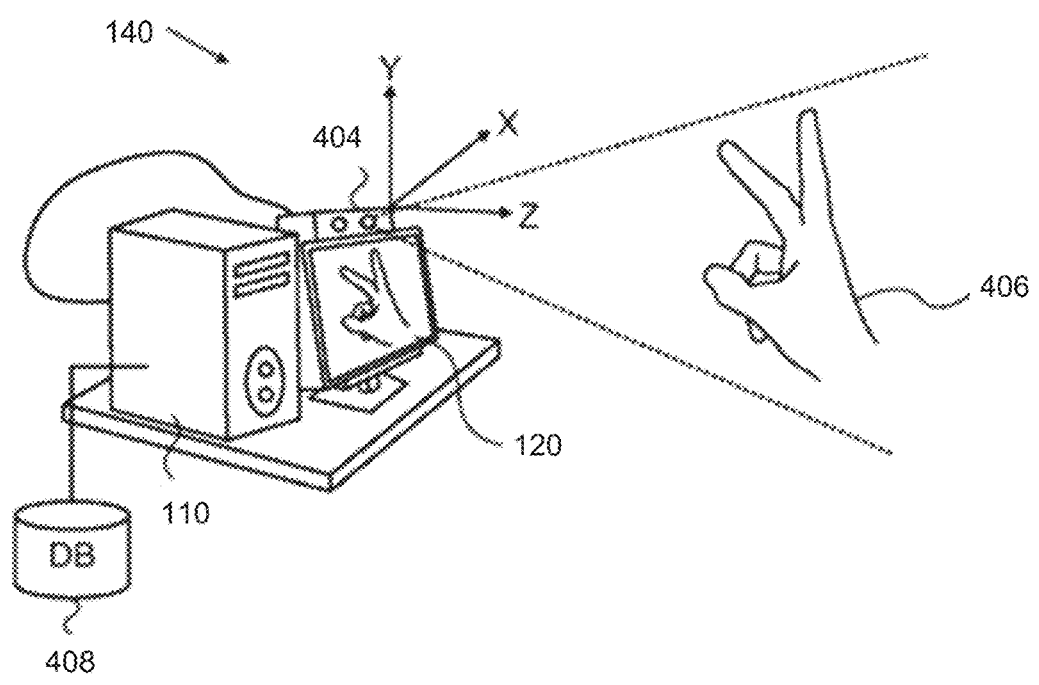
FIG. 4 is a block diagram illustrating a hand tracking unit of a computer system that is configured to capture gesture inputs of the user in accordance with some embodiments.
Figure 4:
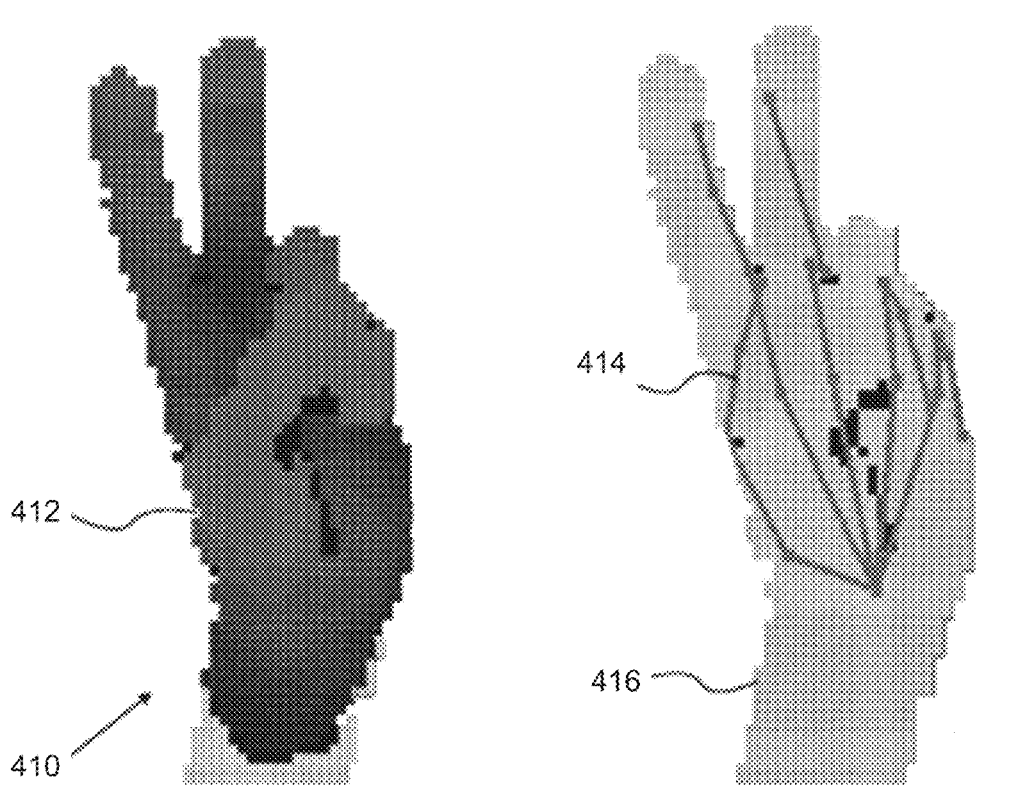

FIG. 4 is a schematic, pictorial illustration of an example embodiment of the hand tracking device 140. In some embodiments, hand tracking device 140 (FIG. 1A) is controlled by hand tracking unit 244 (FIG. 2) to track the position/location of one or more portions of the user's hands, and/or motions of one or more portions of the user's hands with respect to the scene 105 of FIG. 1A (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device).

In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand. In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user. User inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, where the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
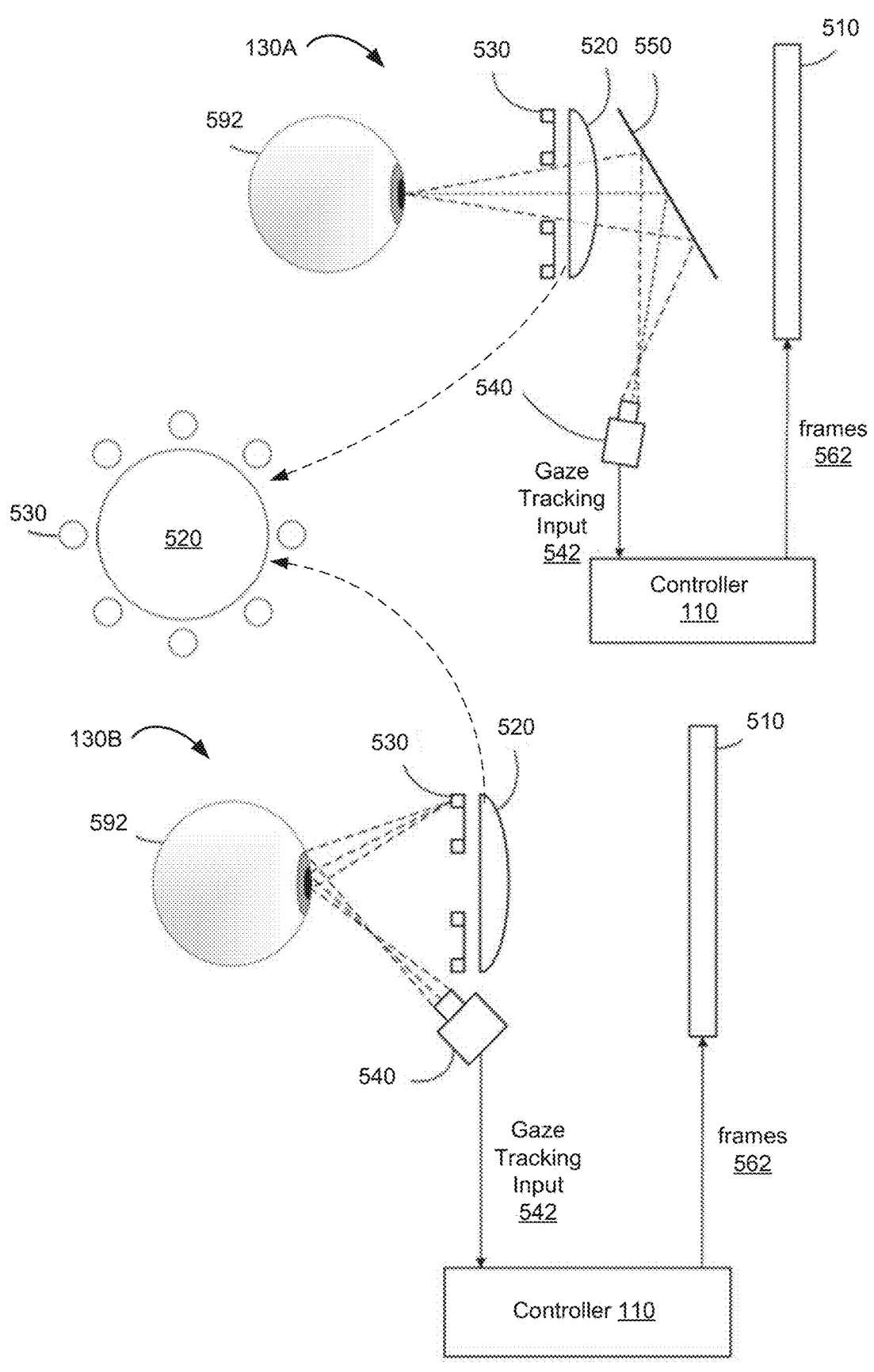
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1A). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., illumination sources 530 (e.g., IR or NIR LEDs), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight illumination sources 530 (e.g., LEDs) are arranged around each lens 520 as an example. However, more or fewer illumination sources 530 may be used, and other arrangements and locations of illumination sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
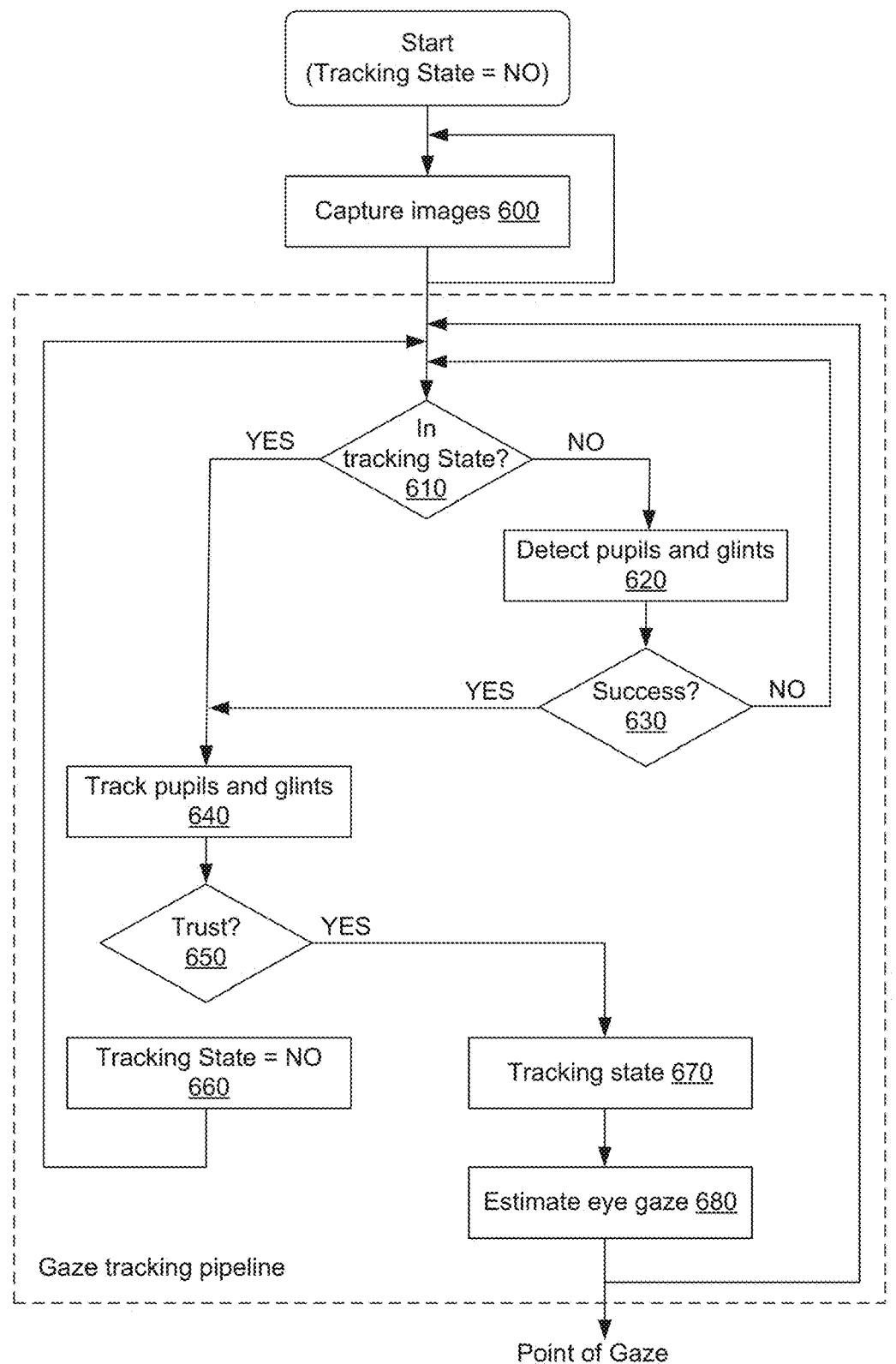
FIG. 6 is a flowchart illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1A and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In some embodiments, the captured portions of real world environment 602 are used to provide a XR experience to the user, for example, a mixed reality environment in which one or more virtual objects are superimposed over representations of real world environment 602.

Thus, the description herein describes some embodiments of three-dimensional environments (e.g., XR environments) that include representations of real world objects and representations of virtual objects. For example, a three-dimensional environment optionally includes a representation of a table that exists in the physical environment, which is captured and displayed in the three-dimensional environment (e.g., actively via cameras and displays of a computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

In a three-dimensional environment (e.g., a real environment, a virtual environment, or an environment that includes a mix of real and virtual objects), objects are sometimes referred to as having a depth or simulated depth, or objects are referred to as being visible, displayed, or placed at different depths. In this context, depth refers to a dimension other than height or width. In some embodiments, depth is defined relative to a fixed set of coordinates (e.g., where a room or an object has a height, depth, and width defined relative to the fixed set of coordinates). In some embodiments, depth is defined relative to a location or viewpoint of a user, in which case, the depth dimension varies based on the location of the user and/or the location and angle of the viewpoint of the user. In some embodiments where depth is defined relative to a location of a user that is positioned relative to a surface of an environment (e.g., a floor of an environment, or a surface of the ground), objects that are further away from the user along a line that extends parallel to the surface are considered to have a greater depth in the environment, and/or the depth of an object is measured along an axis that extends outward from a location of the user and is parallel to the surface of the environment (e.g., depth is defined in a cylindrical or substantially cylindrical coordinate system with the position of the user at the center of the cylinder that extends from a head of the user toward feet of the user). In some embodiments where depth is defined relative to viewpoint of a user (e.g., a direction relative to a point in space that determines which portion of an environment that is visible via a head mounted device or other display), objects that are further away from the viewpoint of the user along a line that extends parallel to the direction of the viewpoint of the user are considered to have a greater depth in the environment, and/or the depth of an object is measured along an axis that extends outward from a line that extends from the viewpoint of the user and is parallel to the direction of the viewpoint of the user (e.g., depth is defined in a spherical or substantially spherical coordinate system with the origin of the viewpoint at the center of the sphere that extends outwardly from a head of the user). In some embodiments, depth is defined relative to a user interface container (e.g., a window or application in which application and/or system content is displayed) where the user interface container has a height and/or width, and depth is a dimension that is orthogonal to the height and/or width of the user interface container. In some embodiments, in circumstances where depth is defined relative to a user interface container, the height and or width of the container are typically orthogonal or substantially orthogonal to a line that extends from a location based on the user (e.g., a viewpoint of the user or a location of the user) to the user interface container (e.g., the center of the user interface container, or another characteristic point of the user interface container) when the container is placed in the three-dimensional environment or is initially displayed (e.g., so that the depth dimension for the container extends outward away from the user or the viewpoint of the user). In some embodiments, in situations where depth is defined relative to a user interface container, depth of an object relative to the user interface container refers to a position of the object along the depth dimension for the user interface container. In some embodiments, multiple different containers can have different depth dimensions (e.g., different depth dimensions that extend away from the user or the viewpoint of the user in different directions and/or from different starting points). In some embodiments, when depth is defined relative to a user interface container, the direction of the depth dimension remains constant for the user interface container as the location of the user interface container, the user and/or the viewpoint of the user changes (e.g., or when multiple different viewers are viewing the same container in the three-dimensional environment such as during an in-person collaboration session and/or when multiple participants are in a real-time communication session with shared virtual content including the container). In some embodiments, for curved containers (e.g., including a container with a curved surface or curved content region), the depth dimension optionally extends into a surface of the curved container. In some situations, z-separation (e.g., separation of two objects in a depth dimension), z-height (e.g., distance of one object from another in a depth dimension), z-position (e.g., position of one object in a depth dimension), z-depth (e.g., position of one object in a depth dimension), or simulated z dimension (e.g., depth used as a dimension of an object, dimension of an environment, a direction in space, and/or a direction in simulated space) are used to refer to the concept of depth as described above.

In some embodiments, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as portable multifunction device or a head-mounted device, with a display generation component, one or more input devices, and (optionally) one or cameras.

FIGS. 7A-7D illustrate examples of virtual object manipulation operations using respective portions of the user's body and/or input device(s) in accordance with some embodiments.

Figure 7A:
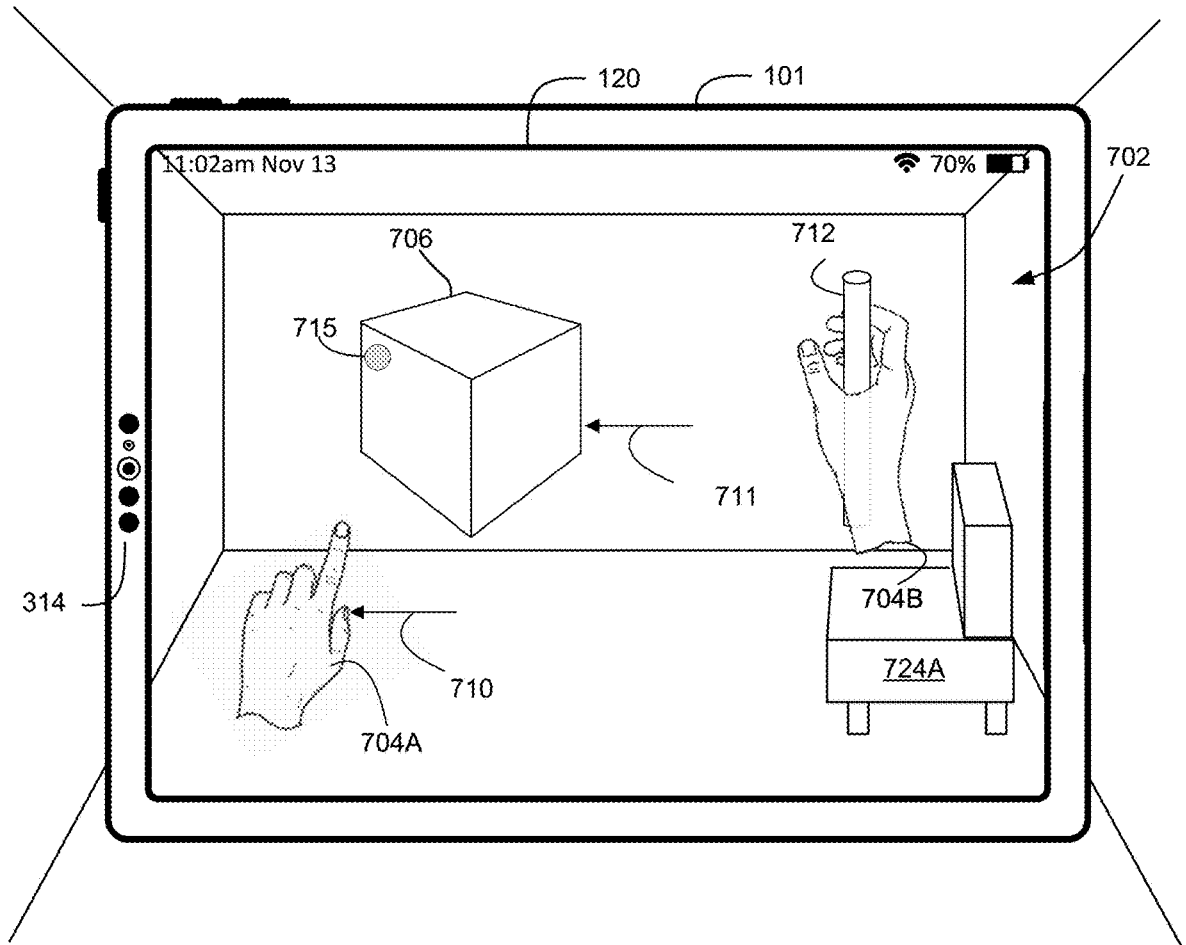
FIGS. 7A-7D illustrate examples of a computer system performing virtual object manipulation operations using respective portions of the user's body and/or input device(s) in accordance with some embodiments.

FIG. 7A illustrates a computer system 101 displaying, via a display generation component (e.g., display generation component 120 of FIG. 1), a three-dimensional environment 702. As described above with reference to FIGS. 1-6, the computer system 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user) such as movements that are interpreted by the computer system as gestures such as air gestures, and/or gaze of the user (e.g., internal sensors facing inwards towards the face of the user).

As shown in FIG. 7A, computer system 101 captures one or more images of the physical environment around computer system 101 (e.g., operating environment 100), including one or more objects in the physical environment around computer system 101. In some embodiments, computer system 101 displays representations of the physical environment in three-dimensional environment 702 or portions of the physical environment that are visible via the display generation component 120 of computer system 101. For example, three-dimensional environment 702 includes portions of the left and right walls, the ceiling, and the floor in the physical environment of the user. For example physical object 724A, which is a couch, is visible via display generation component 120. In some embodiments, computer system 101 optionally captures representations of the user's body, such as hand 704A and hand 704B. It is understood that the representations of the user's body optionally are digital renderings of the user's body and/or views of the user's body (e.g., through a passive lens included in computer system 101). Description of respective portions of the user's body (e.g., hands) is made herein, but it is understood that description of the respective portions of the user's body similarly apply to representations of the portions of the user's body. For example, if movement of a user's real-world hand optionally scales virtual content, and then in some embodiments, movement of a digital representation of the user's real-world hand scales the virtual content in similar or the same manner as described with respect to the user's real world hand.

The three-dimensional environment 702 in FIG. 7A optionally also includes representations of input devices in communication with computer system 101, such as device 712 held by hand 704B. In some embodiments, device 712 is referred to as a wand device, but it is understood that such description of a wand device and/or a wand optionally are used for brevity and interchangeably with device 712. In some embodiments, device 712 is a glove, a stylus, a ring, a wristband, a thimble, a microdevice attached to a respective portion of the user's body, and/or other suitable devices optionally coupled to hand 704B. Additional details about device 712 are provided with reference to method 800.

In FIG. 7A, three-dimensional environment 702 also includes virtual content, such as virtual content 706. Virtual content 706 is optionally one or more of a user interface of an application (e.g., messaging user interface, or content browsing user interface), a three-dimensional object (e.g., virtual clock, virtual ball, virtual block, or virtual car), a virtual environment (e.g., as described with reference to method 800) or any other element displayed by computer system 101 that is not included in the physical environment of computer system 101. It is understood that the embodiments described herein with reference to virtual content 706 optionally also apply to other respective virtual objects within three-dimensional environment 702 that are not shown and/or not expressly described.

In some embodiments, computer system 101 is configured to manipulate virtual content in accordance with input including input(s) based on movements, poses, gestures, and/or a combination of input thereof of a respective portion of the user's body. Although embodiments described herein make extensive reference to movements, poses, gestures, and combinations of such inputs of the user's hand and/or fingers, it is that understood that computer system 101 can detect input based on any suitable portion of the user's body, such as the user's wrist, arm, elbow, legs, and/or feet. In some embodiments, the computer system detects movements, poses, and gestures of one or more respective portions of the user's body, such as movements and/or poses of one or more fingers of a hand of the user. It is understood that a respective portion or respective portions of the user's body are merely placeholder terms, and embodiments referring to such placeholder terms are broadly applicable to any suitable portion of the user's body. For example, computer system 101 optionally performs a scaling operation based on movement of the user's hand and/or based on movement of the user's foot, optionally interchangeably. Thus, it can be appreciated that computer system 101 generally is configured to use respective portions of the user's body as a source of input to manipulate virtual content in any suitable manner.

In some embodiments, virtual content 706 is moved and/or translated based on movement of the user's hand 704A. For example, in FIG. 7A, computer system 101 optionally detects an air gesture such as movement of hand 704A and/or movement of hand 704A while hand 704A assumes an air pose, such as a pinching of an index finger and a thumb, a splaying of fingers, a pointing of an index finger, and/or another suitable air gesture. In some embodiments, while displaying virtual content 706, computer system 101 detects a first user input corresponding to manipulation of virtual content 706 including the air gesture. For example, computer system 101 optionally detects a target of the user's attention, as indicated by attention 715 overlaid over a portion of virtual content 706. In some embodiments, an indication of attention 715 is displayed in three-dimensional environment 702, and in some embodiments, the indication is not displayed. In some embodiments, while attention 715 corresponds to virtual content 706, computer system 101 detects input associated with hand 704A of the user. For example, as described previously, virtual content 706 optionally is manipulated in accordance with movement of hand 704A. For example, a magnitude of movement 711 of virtual content 706 optionally is based on a magnitude of movement 710 of hand 704A. In some embodiments, the magnitude of movement 711 is directly or inversely proportional, or nearly directly or nearly inversely proportional to the magnitude of movement 710. In some embodiments, the magnitude of movement 711 is non-linearly related to the magnitude of movement 710. In some embodiments, a direction of movement 711 is based on a direction of movement 710. For example, in response to movement 710 of hand 704A in a leftward direction, virtual content 706 optionally is moved leftward (e.g., as shown in FIG. 7A) or rightward, optionally based on predetermined system behavior of computer system 101 and/or in accordance with one or more user preferences designating as such. For example, the user of the computer system 101 optionally designates a desire for a direction of movement of their hand to match a direction of movement of virtual content, or to oppose the direction of movement of their hand. In some embodiments, if hand 704A is not within the field of view of computer system 101, the first manipulation operation (e.g., movement) is forgone. Thus, computer system 101 allows an intuitive manipulation of virtual content based on an input including movement of a respective portion of the users body.

In some embodiments, the manipulation based on hand movement is another manipulation operation different from translation of virtual content 706. For example, the manipulation operation optionally is a rotation of virtual content 706, a scaling of virtual content 706, and/or a modification in visual appearance of virtual content 706 (e.g., translucency and/or a drawing over of the virtual content).

In some embodiments, the first user input does not include input from a second portion of the user's body directed to an input device (e.g., device 712) in communication with computer system 101. For example, in FIG. 7A, computer system 101 optionally detects that at the time and/or throughout a period of time an air gesture is being performed by hand 704A and the attention 715 of the user is directed to virtual content 706, computer system 101 detects that hand 704B has not provided an input to device 712. For example, computer system 101 optionally determines that hand 704B optionally is not pointing device 712 toward virtual content 706. Additionally or alternatively, computer system 101 optionally detects that a virtual button, a physical button, one or more hovering inputs over a housing of device 712, one or more contacts along a surface of the housing, a squeezing gesture of device 712, and/or another suitable input is not directed to the device 712 using hand 704B (and/or using hand 704A). As such, computer system 101 optionally determines that the first input corresponds to a request to perform a first manipulation operation (e.g., translation and/or movement of virtual content 706) and in response optionally performs the first manipulation operation.

FIG. 7A1 illustrates similar and/or the same concepts as those shown in FIG. 7A (with many of the same reference numbers). It is understood that unless indicated below, elements shown in FIG. 7A1 that have the same reference numbers as elements shown in FIGS. 7A-7D have one or more or all of the same characteristics. FIG. 7A1 includes computer system 101, which includes (or is the same as) display generation component 120. In some embodiments, computer system 101 and display generation component 120 have one or more of the characteristics of computer system 101 shown in FIGS. 7A and 7A-7D and display generation component 120 shown in FIGS. 1 and 3, respectively, and in some embodiments, computer system 101 and display generation component 120 shown in FIGS. 7A-7D have one or more of the characteristics of computer system 101 and display generation component 120 shown in FIG. 7A1.

In FIG. 7A1, display generation component 120 includes one or more internal image sensors 314a oriented towards the face of the user (e.g., eye tracking cameras 540 described with reference to FIG. 5). In some embodiments, internal image sensors 314a are used for eye tracking (e.g., detecting a gaze of the user). Internal image sensors 314a are optionally arranged on the left and right portions of display generation component 120 to enable eye tracking of the user's left and right eyes. Display generation component 120 also includes external image sensors 314b and 314c facing outwards from the user to detect and/or capture the physical environment and/or movements of the user's hands. In some embodiments, image sensors 314a, 314b, and 314c have one or more of the characteristics of image sensors 314 described with reference to FIGS. 7A-7D.

In FIG. 7A1, display generation component 120 is illustrated as displaying content that optionally corresponds to the content that is described as being displayed and/or visible via display generation component 120 with reference to FIGS. 7A-7D. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 7A1.

Display generation component 120 has a field of view (e.g., a field of view captured by external image sensors 314b and 314c and/or visible to the user via display generation component 120, indicated by dashed lines in the overhead view) that corresponds to the content shown in FIG. 7A1. Because display generation component 120 is optionally a head-mounted device, the field of view of display generation component 120 is optionally the same as or similar to the field of view of the user.

In FIG. 7A1, the user is depicted as performing an air pinch gesture (e.g., with hand 704A) to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 7A-7D.

In some embodiments, computer system 101 responds to user inputs as described with reference to FIGS. 7A-7D.

In the example of FIG. 7A1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 7A-7D and/or described with reference to the corresponding method(s) are optionally implemented on computer system 101 and display generation unit 120 in a manner similar or analogous to that shown in FIG. 7A1.

Figure 7B:
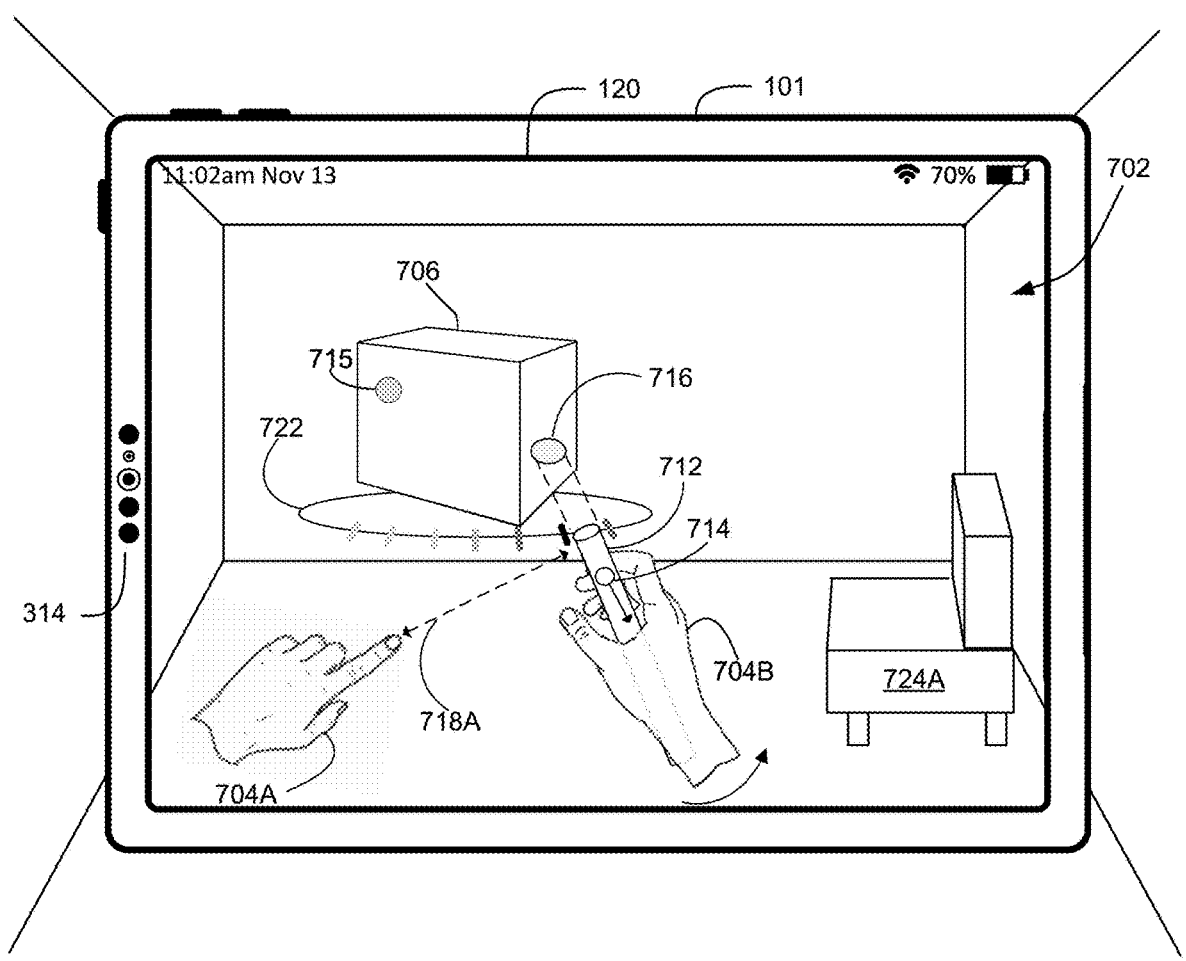

FIG. 7B illustrates manipulation of virtual content based on input from a first and a second respective portion of the user including rotation of the virtual content. In FIG. 7B, computer system 101 detects a concurrent input from hand 704A and a second input from hand 704B directed to device 712 while attention 715 is directed to virtual content 706, and in response, initiates a rotation of virtual content 706. For example, computer system 101 optionally detects that hand 704A assumes a first air pose such as a pointing of an index finger (e.g., detects an air gesture based on movement of the first portion of the user's body), while also detecting hand 704B twisting device 712, thus optionally axially rotating device 712 in accordance with the twisting of device 712. In response to the twisting, computer system 101 optionally rotates the virtual content 706 in accordance with the twisting. For example, computer system optionally detects an axial rotation of 30 degrees caused by hand 704B twisting/rotating device 712, and optionally rotates virtual content 706 by 30 degrees along a respective axis of rotation. In some embodiments, the axial rotation includes a negative amount of angular rotation, and virtual content 706 optionally is rotated in an opposite direction. For example, if computer system 101 detects a clockwise twisting of device 712, computer system 101 optionally rotates virtual content 706 in a clockwise direction around its axis of rotation. If computer system 101 detects a counterclockwise twisting of device 712, computer system 101 optionally rotates virtual content 706 in a counterclockwise direction around its axis of rotation. In some embodiments, the axis of rotation corresponds to a vector extending normal from a portion of a floor (e.g., physical floor or virtual floor) beneath virtual content 706 and intersecting a center of virtual content 706. In some embodiments, the axis of rotation is based on a respective portion of the virtual content. For example, virtual content 706 optionally is a cube, and the axis of rotation optionally is an axis that is normal to a first surface of the cube, independent of an orientation of the cube relative to three-dimensional environment 702. In some embodiments, the axis of rotation is an axis defined by device 712, such as an axis extending along a length of a wand-like device or other device, as described further below.

In some embodiments, computer system 101 detects input from hand 704B other than movement of device 712. For example, computer system 101 detects an indication of contact 714 on a housing of device 712 provided by hand 704B. For example, the indication optionally includes contact of one or more fingers touching the housing of device 712 and sliding along the housing. In some embodiments, at least a portion of the housing is touch-sensitive (e.g., a trackpad portion of device 712). In some embodiments, the housing is non-touch sensitive, but device 712 and/or computer system 101 are configured to detect touch on the housing regardless (e.g., using one or more images sensors). In some embodiments, a magnitude and/or direction of the rotation of virtual content 706 is based on a magnitude and/or direction of movement of contact 714. For example, upwards movement along the housing of a first magnitude optionally rotates virtual content 706 by a respective amount in a first direction (e.g., clockwise) along its axis of rotation, and downwards movement toward along the housing having the first magnitude optionally rotates virtual content 706 by the respective amount in a second direction, different from the first (e.g., counterclockwise) along its axis of rotation. In some embodiments, an amount of rotation of virtual content 706 optionally is based on an amount of time hand 704B contacts the surface of device 712. For example, virtual content 706 is optionally rotated a greater amount the longer a finger of hand 704B contacts a portion the housing of device 712.

In some embodiments, visual feedback is displayed to indicate a degree of rotation performed. For example, platter 722 optionally is displayed intersecting with virtual content 706 and/or at a distance away from (e.g., below) virtual content 706 that optionally is normal to an axis of rotation of virtual content 706 during a rotation manipulation operation. Platter 722 optionally has one or more of the characteristics of the virtual surface described with reference to method 1200. In some embodiments, platter 722 includes a plurality of visual elements (e.g., lines, notches, ovals, and/or pill-shaped indicators) arranged radially symmetric around a periphery of platter 722. In some embodiments, a respective opacity and/or brightness of a respective visual element of the plurality of visual elements optionally is based on an amount of rotation of virtual content 706. For example, in response to initiating rotation, first one or more visual elements displayed on a respective portion of platter 722 that is closest to the user's viewpoint are displayed with a dark color and/or a high degree of opacity, and respective visual elements adjacent to the first one or more visual elements are successively lighter in color and/or less opaque as the respective position of such respective elements is further away from the location of the closest respective visual elements, such that one or more visual elements along the rear of platter 722, for example, are optionally not visible. In response to input rotating virtual content 706, second one or more elements corresponding to a position related to the amount of rotation are optionally displayed with the darkest color and/or the highest degree of opacity, and adjacent third one or more elements are optionally displayed with a decrease of brightness and/or degree of opacity. For example, in response to a rotation of virtual content 706 by 30 degrees, respective notches displayed 30 degrees from the respective portion of platter 722 that is closest to the user are optionally displayed with the darkest color and/or highest degree of opacity. Therefore, the brightening and/or darkening of the visual elements communicates an amount of rotation of platter 722—and thus virtual content 706—even if platter 722 is circular in shape. Thus, platter 722 indicates visual feedback as to the amount of rotation in addition the rotation of virtual content 706 displayed by computer system 101. In some embodiments, in response to a termination of the rotation manipulation operation, display of platter 722 is ceased.

In some embodiments, input from the second portion of the user's body directed to the first input device includes a pointing of the first input device toward virtual content 706. For example, hand 704B optionally points a tip of device 712 toward a respective portion of virtual content 706. In some embodiments, while device 712 is oriented toward virtual content 706, computer system 101 displays a visual indication reflecting the pointing location of device 712 overlaid on virtual content 706. For example, indication 716 optionally is displayed on a respective surface of virtual content 706 at a respective location corresponding to an intersection between the respective surface of the virtual object and a vector that extends from a respective portion of device 712 (e.g., a tip, optionally centered on an axis of the housing of device 712). In some embodiments, the visual appearance of indication 716 optionally corresponds to a currently active tool. For example, computer system 101 optionally displays indication 716 with a visual appearance during the rotation operation optionally corresponding to an oval or a circle having a circumference similar to a circumference of device 712. In some embodiments, device 712 is additionally or alternatively used to indicate attention of the user. For example, if device 712 is directed toward first virtual content other than virtual content 706 while hand 704A performs an air gesture moving the first virtual content, computer system 101 optionally translates a position of the first virtual content in accordance with the movement. In such an example, if computer system 101 detects an input from hand 704B directed to device 712 while device 712 is directed to the first virtual content, the computer system optionally performs a second manipulation operation other than the movement of the first virtual content.

In some embodiments, computer system 101 optionally performs differing manipulation operations based on user preferences. For example, computer system 101 optionally stores indications of user preferences mapping one or more air gestures performed by hand 704A to one more manipulation operations. Such a mapping optionally includes a designation that if computer system 101 detects a pointing air gesture of hand 704A toward virtual content 706, computer system 101 should perform a translation of virtual content 706. Further, the mapping optionally also designates that if hand 704A performs an air pinching gesture, a rotation of virtual content 706 should be performed. In some embodiments, the user preferences include a mapping between respective air gestures of hand 704A to a scaling, a translation/movement, and/or a rotation operations of respective virtual content. Similarly, computer system 101 optionally stores indications of user preferences mapping inputs performed by hand 704B and directed to input device 712 to one or more similar operations. For example, a sliding contact along a housing of device 712 optionally is mapped to a rotation operation, and a movement of device 712 by hand 704B optionally is mapped to a scaling operation of respective virtual content. In some embodiments, computer system 101 similarly stores indications of user preferences for combination inputs including an air gesture performed by hand 704A and/or by hand 704B directed to device 712, similarly as described to the other user preferences. For example, rightward movement of device 712 by hand 704B optionally initiates a first operation if computer system 101 detects hand 704A as providing a first input (e.g., a first pose, movement, and/or gesture), and optionally initiates a second operation, different from the first operation, if computer system 101 detects hand 704A providing a second input, different from the first input (e.g., a second pose, second movement, and/or second gesture).

In some embodiments, computer system 101 does not provide full flexibility mapping between user preferences and hand-related inputs, but allows the user to perform multiple operations based on satisfaction of a criterion associated with a modality of input performed by the hand. For example, computer system 101 optionally is configured to recognize an air pointing gesture corresponds to initiation of a scaling of respective virtual content, and optionally is configured to recognize an air pinching gesture as corresponding to an initiation of a translation/movement of respective virtual content. Computer system 101 optionally maps between such inputs from hands to respective manipulation functions, optionally without presenting the user with an opportunity to modify such a mapping, at least between one or more manipulation operations and one or more inputs based on hands of the user.

In some embodiments, the second input from hand 704B directed to virtual content 706 interrupts and/or or is received after a conclusion of a first manipulation operation (e.g., the movement of virtual content 706 described with reference FIG. 7A). For example, while moving the virtual content 706 in accordance with movement of hand 704A, computer system 101 optionally detects the second input from hand 704B pointing device 712 toward virtual content 706 and/or twisting device 712 to initiate a rotation manipulation operation. In response to detecting the second input, computer system 101 optionally ceases the movement manipulation operation of virtual content 706. For example, while device 712 remains oriented toward virtual content 706, computer system 101 optionally forgoes movement of virtual content 706, even if hand 704A optionally maintains an air gesture and moves in a way that would otherwise be recognized as a request to move virtual content 706. Thus, detecting the input of hand 704B directed to device 712 optionally serves as a mechanism to interrupt a previously ongoing manipulation operation. As alluded to previously, in some embodiments, computer system 101 provides a grace period for detecting input of a respective portion of a user's body such as hand 704B interacting with device 712 after a conclusion of a first manipulation operation. For example, computer system 101 optionally detects that a first manipulation operation (e.g., movement of virtual content 706 based on movement of hand 704A) has ceased within a threshold amount of time (e.g., 0.01, 0.05, 0.1, 0.5, 1, 5, 10, 15, 25, 50, 100, 500, or 1000 seconds) of detecting an indication of the second input of hand 704B directed to device 712, and in response to detecting that the indication of the second input is received within the threshold amount of time, computer system 101 optionally initiates a second manipulation as if the computer system had detected a concurrent input from hand 704A including an air gesture and second input from hand 704B directed to device 712. For example, computer system 101 optionally initiates the rotation manipulation operation, despite momentarily not detecting maintenance of an air gesture included in a first input provided by hand 704A. Distance 718A optionally indicates a distance between a respective portion of hand 704A (e.g., tip of index finger) and a respective portion (e.g., a tip) of device 712.

Figure 7C:
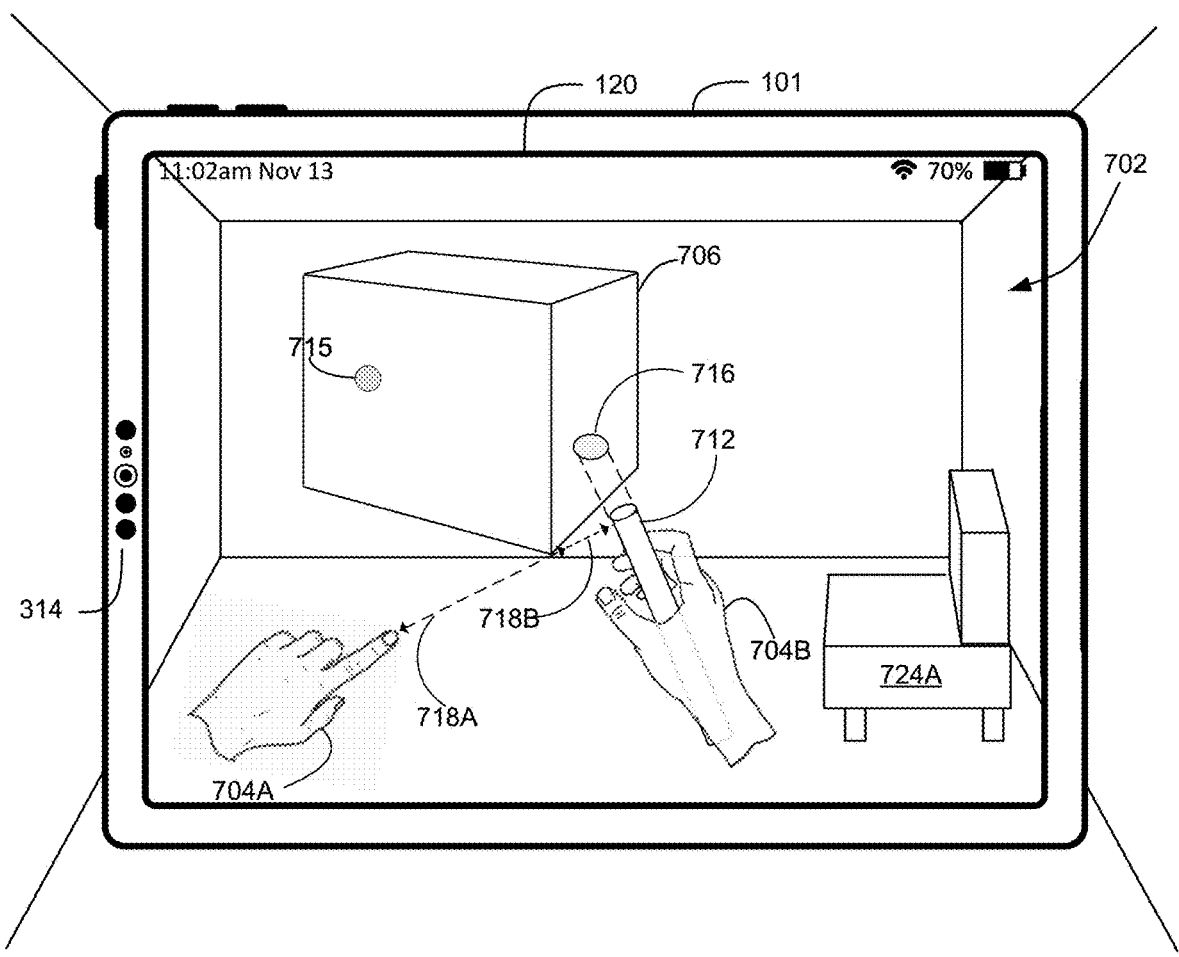

FIG. 7C illustrates manipulation of virtual content based on input from a first and a second respective portion of the user including scaling of the virtual content. In some embodiments, in addition to the air gesture of hand 704A described with reference to FIG. 7B, computer system 101 detects one or more inputs from hand 704B directed to device 712 to initiate scaling operations of virtual content 706. For example, computer system 101 optionally detects attention 715 is directed to virtual content 706, and optionally also detects hand 704B move device 712 away from hand 704A. In response to the movement of device 712, computer system 101 scales the virtual content 706. In some embodiments, a magnitude of the scaling and/or direction of the scaling is based on the respective locations of device 712 and/or hand 704A. For example, computer system 101 optionally detects a respective location of a respective portion of hand 704A (e.g., a fingertip) and optionally determines a scaling reference point before initiating scaling of virtual content 706. For example, computer system 101 optionally determines a midpoint of distance 718A between the device 712 and hand 704A, and determines an amount of scaling of virtual content 706 based on movement of hand 704A and/or device 712 away from the scaling reference point. In some embodiments, the respective portion of the hand includes a respective portion of an air gesture such as the point of an air pinch gesture where a thumb of hand 704A meets the index finger of hand 704A. It is understood that any suitable respective portion of the user's body, alone or in combination with another respective portion, optionally is used to at least partially establish the scaling reference point. In some embodiments, the input corresponding to the request to scale virtual content 706 optionally has one or more of the characteristics of the input of hand 704B directed to input device 712 described with reference to the rotation manipulation operation. For example, alternatively to movement of device 712 away from hand 704A, computer system 101 optionally determines that hand 704A assumes an air gesture pose such as an air pointing pose of hand 704A including a pointing of an index finger toward virtual content 706, and optionally detects a sliding contact from hand 704B on device sliding along a housing of device 712. In response, computer system 101 optionally scales virtual content 706 in accordance with a magnitude and direction of the sliding contact, similar or in a same manner as described with reference to FIG. 7B. In some embodiments, the scaling operation includes scaling virtual content 706 to a size determined by computer system 101, and optionally not entirely based on movement of device 712. For example, computer system 101 optionally resizes virtual content 706 to its initial size, and/or arranges respective sizes of a plurality of virtual content to have a uniform size, and/or consume a similar relative portion of the user's field of view (e.g., three respective virtual objects are displayed to each consume approximately 30% of the user's field of view).

Figure 7D:
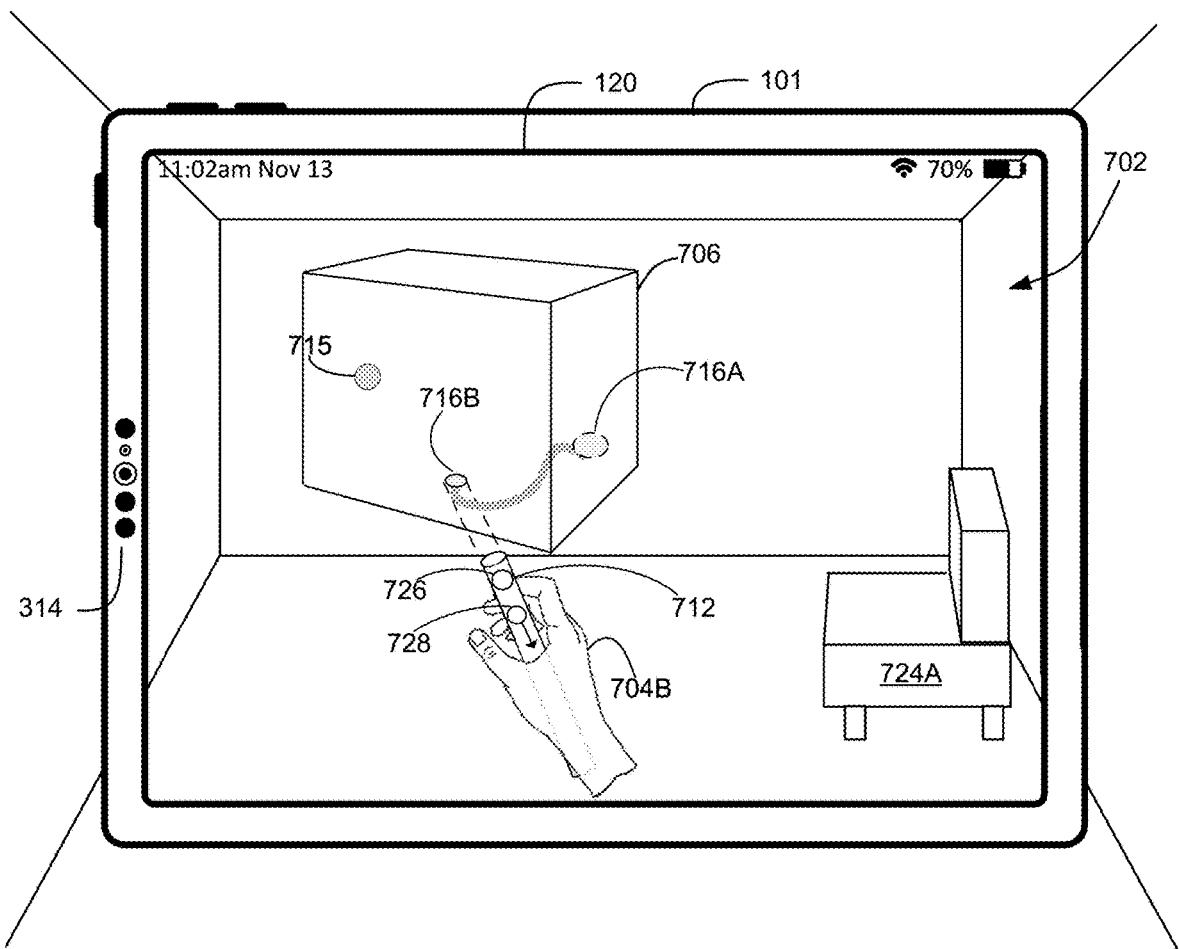
Figure 8A:
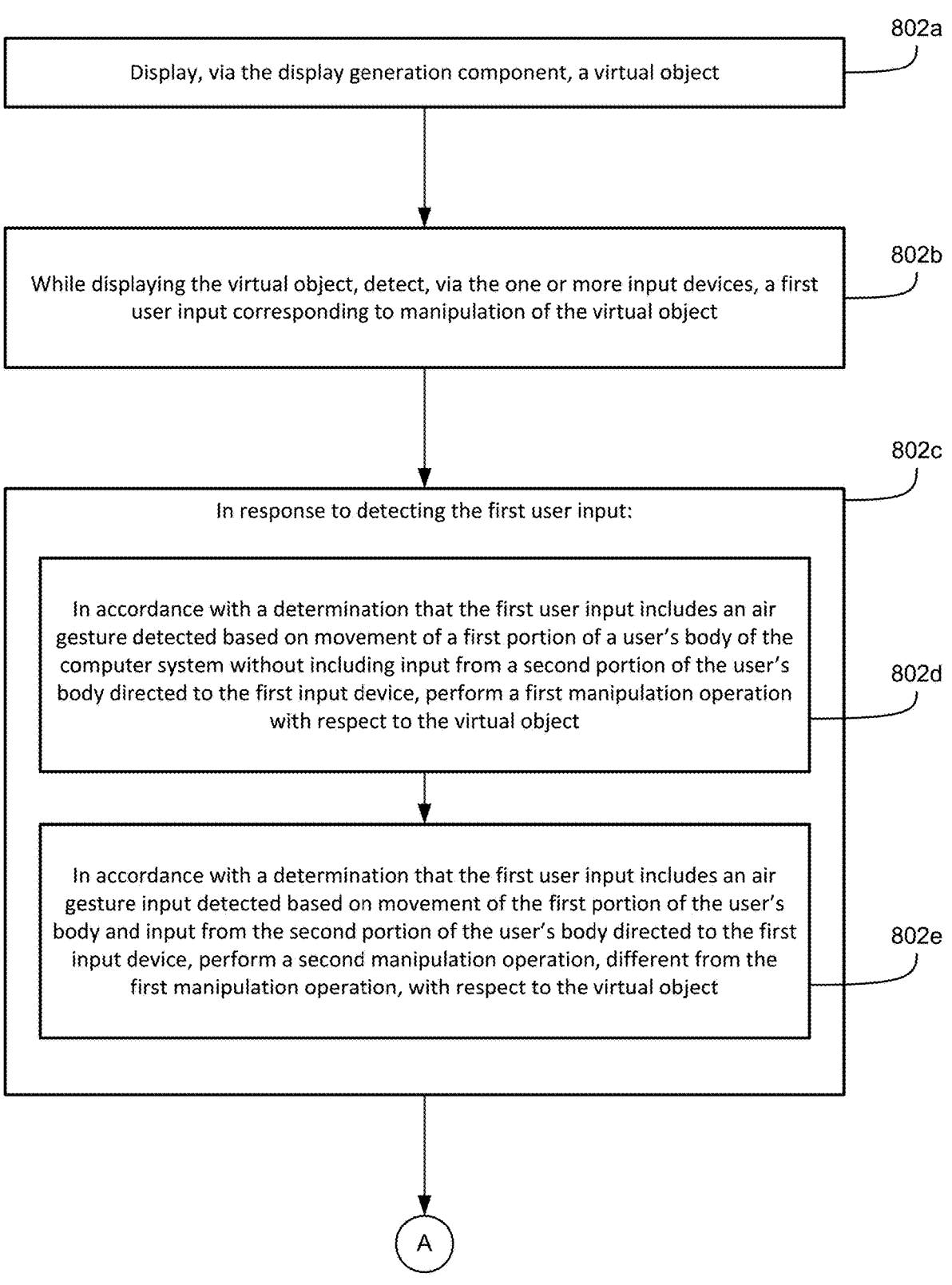
Figure 8B:
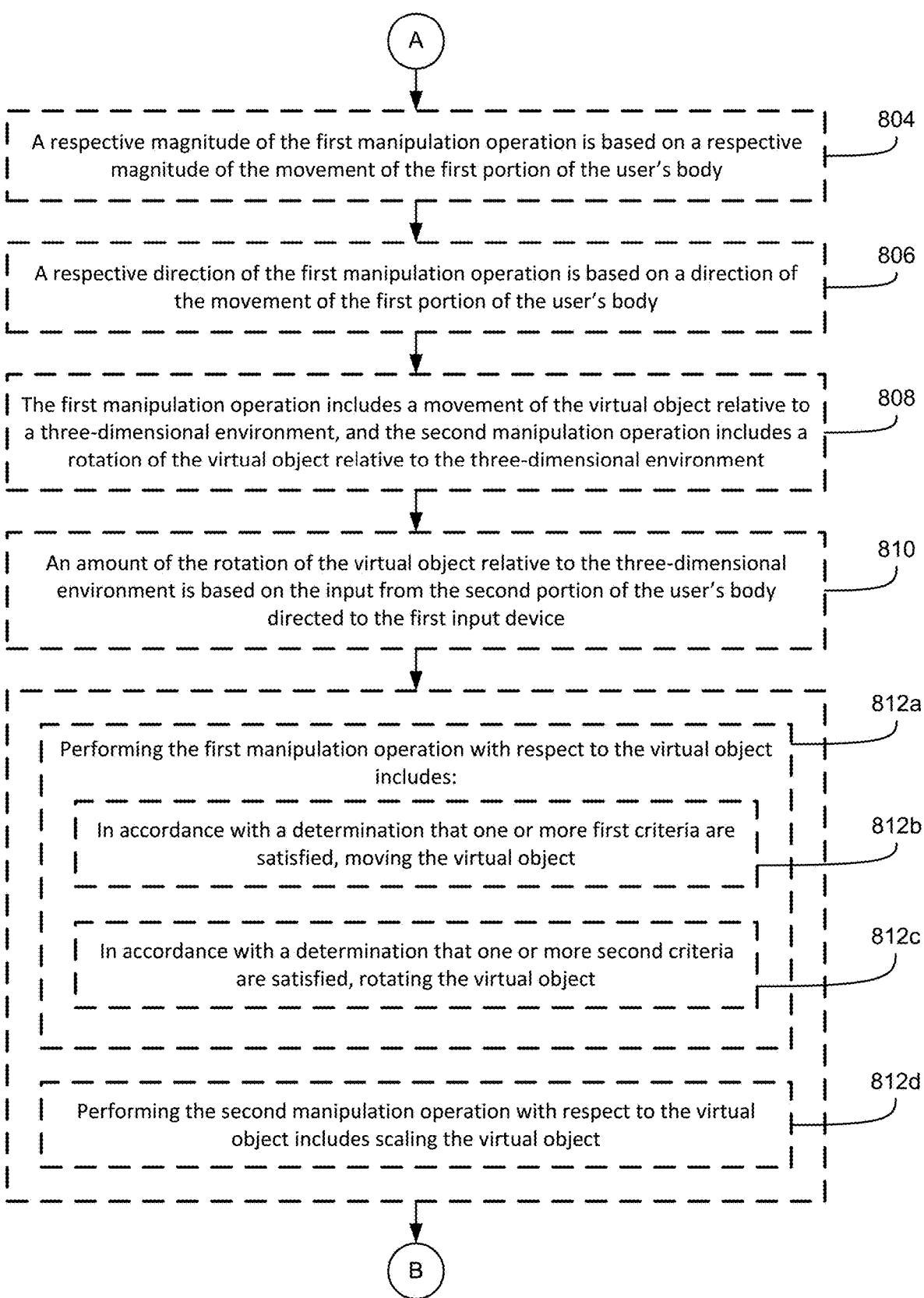

FIG. 7D illustrates a virtual drawing or markup operation according to embodiments of the disclosure. After the scaling operation shown in FIG. 7C, computer system 101 optionally detects a second user input that includes input from hand 704B directed to device 712, and optionally does not include input from hand 704A (not shown). For example, in response to contact 726 (e.g., a contact of hand 704B on a housing of device 712), computer system 101 optionally initiates the drawing operation manipulation operation. It is understood alternative inputs optionally cause initiation of the drawing operation, such as a squeezing of device 712, a shaking of device 712, a double-contact (e.g., double-tap in rapid succession) on a housing of device 712, a plurality of near simultaneous contacts on the housing of device 712, and/or another similar input performed by hand 704B. In response to the initiation of the drawing operation, computer system 101 initiates display of a drawing overlaid over a respective virtual surface of virtual content 706, such as shown in FIG. 7D, where the markings made by the drawing operation are based on movement of device 712. In some embodiments, the second user input does not include input from hand 704A. For example, computer system 101 optionally does not detect that hand 704A is within the field of view of computer system 101, and thus optionally forgoes consideration of input from hand 704A. In some embodiments, computer system 101 optionally determines that hand 704A has assumed an air pose that is interpreted as an express request to forgo consideration of input from hand 704A and/or has not assumed a particular air pose, and thus forgoes consideration of input from hand 704A. For example, an air pose including the hand in a neutral form (e.g., fingers generally extended with a minor curl and generally evenly spaced) optionally is interpreted as a request to ignore input from hand 704A by computer system 101.

In some embodiments, indication 716A-which is not necessarily displayed-illustrates an initial position of drawings at the start of a drawing operation (e.g., corresponding to the position of indication 716 illustrated in FIG. 7C). In response to movement of device 712, computer system 101 optionally displays respective portions of virtual content 706 with markings including a color based on a simulated drawing implement and one or more user preferences based on a path following previous movement of device 712. For example, as described with reference to FIG. 7B, indication 716B optionally indicates where device 712 is directed to relative to virtual content 706. As shown, computer system 101 has displayed a trail of markings caused by previous movement of device 712 toward its current position are shown by indication 716B. In some embodiments, markings made during the drawing operation are displayed overlaid over respective portions of virtual content 706. For example, computer system 101 optionally determines drawing input corresponding to device 712 moving from a far left to a far right edge of the object, and in response, optionally displays a mark extending across virtual content 706 in accordance with the movement. Computer system 101 optionally further detects a request to display additional marks (e.g., a maintenance of contact 726) while device 712 is moved and/or oriented toward a space not including respective virtual content. In response to the request to display the additional marks, computer system 101 optionally forgoes display of additional marks, at least because the respective portions of the three-dimensional environment 702 corresponding to the further movement of device 712 do not include respective content.

In some embodiments, the appearance of markings made during the drawing operation are based on a currently selected simulated drawing implement. The simulated drawing implement optionally corresponds to a simulated marker, chisel-tip highlighter, pencil, pen, airbrush, paintbrush, and/or another similar drawing implement. In some embodiments, characteristics of marking caused by the drawing operation are determined in accordance with the simulated drawing implemented that is currently selected. For example, a thickness, opacity, color, a visual effect such as a feathered edge, a virtual simulation of breaks in bristles of a paintbrush lifting off a physical surface thereby causing breaks in marks made, and/or other suitable visual effects optionally are included in the marks caused by the drawing operations. In some embodiments, in response to determining that hand 704B has ceased providing input directed to device 712 such as a ceasing of a contact on a touch-sensitive surface of device 712 or a ceasing of a squeezing of device 712, computer system 101 at least temporarily ceases the drawing operation. For example, computer system 101 ceases the drawing operation in response to determining hand 704B has ceased squeezing device 712, and initiates the drawing operation again in response to determining hand 704B has begun squeezing device 712 again.

In some embodiments, computer system 101 detects an input from hand 704B to modify a currently selected drawing implement. For example, sliding contact 728 optionally corresponds to a contacting and sliding of a respective portion of hand 704B along a housing of device 712. In response to sliding contact 728 computer system 101 optionally modifies the currently selected drawing implement to correspond to a next or previous drawing implement in a queue of a plurality of drawing implements, a last used drawing implement, and/or a user defined drawing implement (e.g., in a stored user preference).

FIGS. 8A-8E is a flowchart illustrating an exemplary method 800 of performing virtual object manipulation operations using respective portions of the user's body and/or input device(s) in accordance with some embodiments. In some embodiments, the method 800 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 800 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 800 are, optionally, combined and/or the order of some operations is, optionally, changed.

In some embodiments, method 800 is performed at a computer system, such as computer system 101, in communication with a display generation component, such as display generation component 120, and one or more input devices including a first input device, such as device 712 in FIGS. 7A and 7A1. For example, a mobile device (e.g., a tablet, a smartphone, a media player, or a wearable device), or a computer or other computer system. In some embodiments, the display generation component is a display integrated with the computer system (optionally a touch screen display), external display such as a monitor, projector, television, or a hardware component (optionally integrated or external) for projecting a user interface or causing a user interface to be visible to one or more users. In some embodiments, the one or more input devices include a computer system or component capable of receiving a user input (e.g., capturing a user input and/or detecting a user input) and transmitting information associated with the user input to the computer system. Examples of input devices include a touch screen, mouse (e.g., external), trackpad (optionally integrated or external), touchpad (optionally integrated or external), remote control device (e.g., external), another mobile device (e.g., separate from the computer system), a handheld device (e.g., external), a controller (e.g., external), a camera, a depth sensor, an eye tracking device, and/or a motion sensor (e.g., a hand tracking device, a hand motion sensor). In some embodiments, the computer system is in communication with a hand tracking device (e.g., one or more cameras, depth sensors, proximity sensors, touch sensors (e.g., a touch screen, trackpad). In some embodiments, the hand tracking device is a wearable device, such as a smart glove. In some embodiments, the hand tracking device is a handheld input device, such as a remote control or stylus.

In some embodiments, the computer system displays (802a), via the display generation component, a virtual object, such as virtual content 706 in FIGS. 7A and 7A1. For example, the virtual object is a user interface of an application, a representation of content (e.g., image, video, and/or audio), and/or a three-dimensional representation of an object (e.g., a building, a car, or an avatar, or any other object not existing in a physical environment of a user of the computer system.). For example, the virtual object optionally is visible or displayed within the user's field-of-view (FOV) at a position in a three-dimensional environment. In some embodiments, the three-dimensional environment is an extended reality (XR) environment or a virtual reality (VR) environment. In some embodiments, the virtual object has one or more of the characteristics of the virtual objects of methods 1000 and/or 1200. In some embodiments, the three-dimensional environment has one or more of the characteristics of the three-dimensional environments of methods 1000 and/or 1200.

In some embodiments, while displaying the virtual object, the computer system detects (802b), via the one or more input devices, a first user input corresponding to manipulation of the virtual object, such as movement 710 of hand 704A. In some embodiments, the first user input includes detecting a single movement or air gesture, or a sequence of movements and/or air gestures performed by one or more portions of the user (e.g., one or more hands of the user). In some embodiments, the user input additionally or alternatively includes a movement and/or air gesture, or a sequence of movements and/or gestures of the first input device, such as a handheld input device in communication with the computer system, such as a wand-like input device that the computer system is able to track and for which the computer system is able to detect a pointing direction (e.g., where a tip of the wand-like input device is pointing with respect to virtual or physical content visible via the display generation component) and/or on which the computer system is able to detect inputs (e.g., touch inputs, such as tap or swipe inputs, from a hand of the user holding the wand-like input device). Additionally or alternatively, the actuation of one or more physical or virtual buttons, or other interactions (e.g., contact and/or movement along a touch-sensitive surface included at the computer system and/or an input device in communication with the computer system) are optionally included in the first user input.

In some embodiments, in response to detecting the first user input (802c) (e.g., In some embodiments, in accordance with a determination that a portion of the user interacting with the virtual object and/or the first device is not within the user's FOV—partially or entirely—the computer system forgoes performance of one or operations described below with respect to the virtual object (e.g., forgoes manipulation operations associated with the virtual object) and/or with respect to methods 1000 and/or 1200.) in accordance with a determination that the first user input includes an air gesture detected based on movement, such as movement 710, of a first portion of a user's body, such as hand 704A, of the computer system without including input from a second portion of the user's body, such as hand 704B directed to the first input device, the computer system performs (802d) a first manipulation operation with respect to the virtual object, such as movement 711 of virtual content 706. For example, the first portion of the user optionally is a hand of a user of the computer system, and the first user input optionally corresponds to detection of a pinching air gesture and/or movement of the hand of the user while in a pinch hand shape (e.g., holding the pinch air gesture) in which the tip of the index finger and thumb remain in contact with one another. In some embodiments, in accordance with a determination that the user's attention was, currently is, or soon will be directed to the virtual object (e.g., within a threshold amount of time (e.g., 0.01, 0.1, 0.5, 1, 2.5, or 5 seconds)) when the first user input is detected, the first manipulation operation (e.g., a scrolling operation, a scaling operation, or a translation operation) is performed. For example, the computer system optionally detects or receives an indication of detection of a pinching air gesture performed by a first hand of the user, optionally while the user's gaze is directed to the virtual object, without detecting input from a second portion of the user's body (e.g., a finger of a hand optionally opposite of the hand performing the air pinch gesture) directed to the first input device, and in response to the pinching air gesture (and optionally while the pinching gesture is maintained in the form of a pinch hand shape) movement of the first hand optionally translates the virtual object within the three-dimensional environment in accordance with the movement of the first hand (e.g., the magnitude and/or direction of the translation of the virtual object optionally corresponds to the magnitude and/or direction of the movement of the first hand). For example, the computer system optionally detects moves the virtual object based on the movement of the first hand, forgoing the consideration of and/or without detecting an input such as one or more taps, swipes, squeezes, double-taps, and/or other suitable gestures directed to (e.g., directed via a housing of) the first input device (e.g., a wand-like device). In some embodiments, the computer system treats one or more portions of the user's body interchangeably. For example, the computer system optionally performs the same first manipulation operation regardless of whether a left hand of the user or the right hand of the user is detected as performing the above-described input while the input from the opposing hand optionally is not directed to the first input device. In some embodiments, if the computer system does not detect, receive an indication of, and/or elects to ignore input(s) from the first input device while the first hand of the user is interacting with the virtual object, the first manipulation is performed.

In some embodiments, in accordance with a determination that the first user input includes an air gesture input detected based on movement of the first portion of the user's body and input from the second portion of the user's body directed to the first input device, such as movement of hand 704B rotating device 712 as shown in FIG. 7B, the computer system performs (802c) a second manipulation operation, different from the first manipulation operation, with respect to the virtual object, such as the rotating of virtual content 706 as shown in FIG. 7B. For example, while the user's attention optionally is directed towards the virtual object, the computer system optionally detects that a second portion of the user (e.g., a second hand) of the first input device is engaging with the virtual object in addition to a hand of the user engaging with the virtual object. In some embodiments, the computer system detects movement of the second portion of the user interacting with the first input device as input directed to the first input device. For example, the second portion of the user optionally rotates, translates, moves, swipes, contacts (e.g., taps) and/or applies pressure to the first input device. As described previously, in some embodiments, the first input device is a handheld device; although description of the first input device presented herein will refer to a "wand" device or a "wand-like" device, it is understood that such description is for brevity and convenience and is not limiting in any way. For example, the first input device optionally is a ring, bracelet, stylus, thimble, glove, or any other suitable electronic device in communication with the computer system. Moreover, it is understood that description of inputs based on the first input device such as movement, re-orienting, and/or stillness of the first input device optionally are based upon input from the second portion of the user's body directed to the first input device. For example, the computer system detects input including the second hand of the user optionally maintaining a grip on a housing of the first input device rotating the first input device. In some embodiments, if the computer system determines that the first portion of the user (e.g., the first hand) and the second portion of the user (e.g., the second hand) engaging with the first input device are simultaneously engaging with the virtual object, a second manipulation operation is performed, optionally for the same input provided by the portion of the user. For example, if the computer system detects a first set of poses, movements, and/or interactions with the virtual object from the hand of the user while the first input device is not providing input (e.g., is not oriented towards the virtual object, is not within the user's field of view, has not detected user input on touch sensitive surfaces included at the first input device or actuated mechanical buttons on the first input device, or otherwise is not directed towards the first input device), the computer system optionally performs the first manipulation operation and forgoes performing the second manipulation operation. However, if the computer system optionally detects the same first set of poses, movements, and/or interactions with the virtual object from the hand of the user while the first input device is providing input (e.g., via input of the second portion of the user directed to the first input device) and/or is otherwise directed to the virtual object, the computer system optionally performs the second manipulation operation and optionally forgoes the performing of the first operation. For example, while the computer system optionally detects a wand device (e.g., a computer system having an oblong, semi-cylindrical housing) is pointed towards the virtual object, the computer system rotates the virtual object in accordance with movement of a hand not holding the wand device (e.g., the magnitude and/or direction of the rotation of the virtual object optionally correspond to the magnitude and/or direction of the movement of the hand of the user). On the other hand, while the computer system optionally detects the wand device is not pointed towards the virtual object, the computer system optionally translates the virtual object in space in accordance with the movement of the hand. In some embodiments, the second manipulation operation includes not performing the first manipulation operation without further manipulating the virtual object. For example, while the wand device optionally is directed towards the virtual object, movement of the user's hand and movement of the wand device optionally do not manipulate (e.g., scale, rotate, and/or transform) the virtual object, such that the user of the computer system may reposition their hand without erroneously manipulating the virtual object. Initiating a process to perform a first or a second manipulation operation in accordance with a determination that a first user input includes—or does not include—input from a first input device reduces the amount of user interaction and/or cognitive load to select between performing the first or the second manipulation operations.

In some embodiments, a respective magnitude of the first manipulation operation, such as movement 711 is based on a respective magnitude of the movement, such as movement 710, of the first portion of the user's body, such as hand 704A (804). For example, the first manipulation operation is a translation, scaling, and/or rotation operation further described with respect to step(s) 806-814 and/or step(s) 826 based on an amount of movement of the first portion (e.g., the hand) of the user of the computer system. In some embodiments, the magnitude of movement of the first portion of the user is determined based on a relative displacement from an initial position to a second, different position. In some embodiments, the magnitude of movement is determined relative to a respective portion of the user's body (e.g., a head of the user and/or the second portion of the user's body) other than the first portion of the body. In some embodiments, the magnitude of the first manipulation operation is based on a current viewpoint of the user, the virtual object, and/or the three-dimensional environment. For example, the amount (e.g., magnitude) that a virtual object is scaled along one or more dimensions is optionally determined relative to movement of the first portion of the user's body and the three-dimensional environment and/or relative to the current viewpoint of the user. For example, the computer system optionally detects the first portion of the user move leftward by a first amount, and in response to the movement, scales the virtual object by a first amount (e.g., scales upwards or downwards by 1%, 5%, 10%, 15%, 20%, 25%, 40%, or 50%). In some embodiments, the computer system determines a scaling polarity (e.g., upwards or downwards) of the virtual object in accordance with the direction of displacement (e.g., scaling the virtual object downwards in response to leftward movement and/or scaling the virtual upwards in response to rightward movement). In some embodiments, the second manipulation operation has a second respective magnitude based on a respective magnitude of movement of the second portion of the user relative to the first portion of the user, the virtual object, and/or the three-dimensional environment. In some embodiments, the second respective magnitude is additionally based on movement of the first portion of the user. In some embodiments, the relative movement of the first portion of the user's body and/or the first input device (e.g., a wand device) is independent of a pose (e.g., orientation) of the first input device relative to the virtual object and/or relative to an initial position of the first portion of the user's body. For example, movement of a wand device from a first position relative to the first portion of the user's body to a second position while the wand maintains a first orientation (e.g., normal and pointed toward a floor of the three-dimensional environment) optionally corresponds to a first magnitude of movement, which optionally is the same as a second magnitude of movement of the wand device determined based on movement from the first to the second position while the wand maintains a second orientation (e.g., normal and pointed away from the floor of the three-dimensional environment). In some embodiments, the second manipulation and/or the second respective magnitude has one or more characteristics of the first manipulation operation and/or the first respective magnitude. Manipulating virtual objects with a magnitude based on a magnitude of movement reduces user inputs otherwise required to cause such a manipulation and improves user intuition as to a manipulation to be performed.

In some embodiments, a respective direction of the first manipulation operation, such as the leftward movement 710 of virtual content 706 in FIGS. 7A and 7A1, is based on a direction of the movement of the first portion of the user's body, such as leftward movement 711 of hand 704A as shown in FIGS. 7A and 7A1 (806). For example, the computer system optionally translates the virtual object upwards in accordance with a movement of the first portion of the user's body (e.g., a first hand) upwards relative to the user's viewpoint (e.g., vertically relative to the three-dimensional environment). In some embodiments, the respective direction of the first manipulation operation is directly or inversely related to the direction of movement of the first portion of the user's body. In some embodiments, the direction of the first manipulation operation is based on a current viewpoint of the user, a respective position of the virtual object, and/or the three-dimensional environment. In some embodiments, the second manipulation operation has a second respective direction, different from the respective direction of the first manipulation operation, based on a second respective direction of movement of the second portion of the user relative to the first portion of the user, the virtual object, and/or the three-dimensional environment. In some embodiments, the second respective direction is based additionally based on a movement of the first portion of the user. Manipulating virtual objects with a direction based on a direction of movement of a portion of the user's body reduces inputs otherwise required to cause such a manipulation of the virtual objects.

In some embodiments, the first manipulation operation includes a movement of the virtual object relative to a three-dimensional environment, such as shown by movement 710 in FIGS. 7A and 7A1, and the second manipulation operation includes a rotation of the virtual object relative to the three-dimensional environment, such as shown by rotation of virtual content 706 in FIG. 7B (808). For example, the first operation optionally includes a translation of the virtual object towards, away from the user's viewpoint, laterally, and/or vertically, relative to the user's viewpoint and the three-dimensional environment, and/or some combination thereof. In some embodiments, the translation includes movement of the virtual object outside of the user's viewpoint. In some embodiments, the second manipulation operation includes a rotation of the virtual object while a respective portion (e.g., a center) of the object maintains at a respective position within the three-dimensional environment. For example, the virtual object optionally rotates along an axis orthogonal to a portion of a floor (real world or virtual) beneath a respective portion (e.g., the center) of the virtual object. In some embodiments, the axis is defined by a pose and/or orientation of the first input device as described further herein (e.g., in step(s) 810). In some embodiments, the second manipulation operation includes the rotation of the virtual object if the user maintains a first pose of the first portion (e.g., hand) of the user. The first pose optionally has one or more characteristics described with respect to step(s) 802, and optionally includes an air pinching pose (e.g., contacting and maintaining contact between respective fingers of a hand), an air pointing gesture with a respective finger towards the virtual object, and/or an air squeezing gesture including a determination of a plurality of the user's fingers pointing towards the virtual object and moved and/or curled towards a palm of the hand of the user. Moving virtual objects as a part of a first manipulation operation and rotating the virtual objects as a part of a second manipulation operation reduces inputs required to alternatively select between a movement and a rotation of the virtual objects.

In some embodiments, an amount of the rotation of the virtual object, such as shown in FIG. 7B, relative to the three-dimensional environment is based on the input from the second portion of the user's body directed to the first input device, such as hand 704B rotating device 712 in FIG. 7B (810). As described in step(s) 802, the second portion of the user's body optionally is one or more fingers, a palm, a portion of the user's hand, and/or another suitable portion of the user's body interacting with (hovering over, tapping, double-tapping, squeezing, sliding across) a respective portion of the input device. For example, the first input device optionally includes a surface (e.g., a portion of a housing) such as a touch sensitive surface such as a trackpad or a non-touch sensitive surface, wherein the first input device and/or computer system optionally is configured to detect input directed towards the surface. In response to detecting the input directed towards the surface and/or an indication of such input received from the first input device, the computer system optionally manipulates (e.g., rotates) the virtual object in accordance with such input. For example, the computer system optionally rotates the virtual object in a first direction along an axis of rotation (e.g., clockwise) in accordance with a determination that the first input includes a sliding of the second portion of the user's body along the surface in a first direction, and optionally rotates the virtual object in a second direction along the axis of rotation (e.g., counter-clockwise) in accordance with a determination that the first input includes a sliding of the second portion of the user's body along the surface in a second direction, optionally different from (e.g., opposing) the first direction. In some embodiments, the axis of rotation is based on a pose of the input device relative to the virtual object (described in step(s) 816). For example, the axis of rotation optionally is parallel to an axis running parallel along a dimension (e.g., along a barrel of a wand device) of the first input device relative to the three-dimensional environment. In some embodiments, the axis of rotation is established in response to detecting an input (e.g., the first user input). In some embodiments, the rotation operation is based on a movement of the first input device performed by the second portion of the user's body. As described with respect to step(s) 802, in some embodiments, computer system detects one or more inputs (e.g., poses, gestures, and/or movements, individually or collectively corresponding to the input from the second portion of the user's body) of the first input device. Such a gesture optionally includes a rotating of the first input device (e.g., a wand) relative to the three-dimensional environment (e.g., rotating around an axis that extends along the length of the input device, rotating around an axis that extends perpendicular to the axis extending alone the length of the input device, and/or rotating within a plane that intersects and runs parallel to the length of the input device). In some embodiments, the input from the second portion of the user's body includes a pointing of a respective portion (e.g., a tip) of the input device (e.g., a wand, a glove). In some embodiments, the gesture rotates the virtual object based on a magnitude and/or direction of the gesture as described with respect to step(s) 804 and step(s) 806. Rotating the virtual object based on input from the second portion of the user directed to the first input device simplifies and reduces user inputs otherwise required to rotate the virtual object, and provides a more efficient, intuitive, and granular rotation operation, thereby additionally reducing erroneous input under or over rotating the virtual objects.

In some embodiments, performing the first manipulation operation, such as movement 710 of virtual content 706 in FIGS. 7A and 7A1, with respect to the virtual object (812*a*) includes, in accordance with a determination that one or more first criteria are satisfied, moving the virtual object, such as shown by movement 710 (812*b*) (e.g., optionally with or without rotation of the virtual object optionally based on whether the one or more second criteria are satisfied as well or optionally independent of whether the one or more second criteria are satisfied as well); and (e.g., the one or more first criteria optionally include a respective criterion that is satisfied in accordance with a determination that a first pose of the first portion of the user is maintained while the movement of the first portion is performed, in accordance with a determination that a virtual or physical button has been actuated to enable the movement, in accordance with a determination that one or more user preferences have designated that the first manipulation operation corresponds to movement of the virtual object, and/or some combination thereof.) in accordance with a determination that one or more second criteria are satisfied, rotating the virtual object, as shown by rotation of virtual content 706 from FIGS. 7A and 7A1 to FIG. 7B (812*c*) (e.g., optionally with or without translation of the virtual object optionally based on whether the one or more first criteria are satisfied as well or optionally independent of whether the one or more first criteria are satisfied as well). For example, the second one or more criteria optionally include a criterion that is satisfied in accordance with a determination that a second pose, different from the first pose, of the first portion of the user is maintained while moving the virtual object, a criterion that is satisfied in accordance with a determination that the virtual or physical button has been actuated to enable the rotation, a criterion that is satisfied that one or more user preferences have designated that the first manipulation operation corresponds to the rotation of the virtual object, and/or some combination thereof.

In some embodiments, performing the second manipulation operation with respect to the virtual object includes scaling the virtual object, such as shown by virtual content 706 in FIG. 7C (812*d*) (e.g., as described with respect to step(s) 804, 806, 814, and 826). Providing multiple entry points into multiple manipulation operations reduces user input required to initiate such manipulation operations.

In some embodiments, scaling the virtual object includes scaling the virtual object by a scaling magnitude (e.g., as described with respect to step(s) 804), and the scaling magnitude is based on a relative movement between the first portion of the user's body, such as hand 704A, and a respective portion (e.g., the tip) of the first input device, such as device 712 as shown in FIG. 7C (814). In some embodiments, the computer system determines a reference point from which further relative movement of the first portion of the user's body and/or movement of the respective portion of the first input device is measured. For example, the scaling operation optionally is based on movement of respective point of the first portion of the user (e.g., a fingertip of a first finger) and a respective portion of the first input device (e.g., a tip of the input device) away from the reference point. In some embodiments, the computer system determines the references point in response to receiving input from the second portion of the user's body directed towards the virtual object. In some embodiments, the scaling magnitude directly and/or inversely modifies based on a total amount of displacement of the first portion of the user and/or the respective portion of the first input device away from the reference point. In some embodiments, the scaling magnitude modifies non-linearly based on the total amount of displacement. For example, the computer system optionally scales the virtual object based on a first gesture including a first portion of relative movement (e.g., 0.01, 0.05, 0.1, 0.5, 1, 5, 10, 50, or 100 cm of total displacement from the reference point) in a first direction and a second portion of relative movement continuously following the first portion of the relative movement in the first direction; the computer system optionally scales the virtual object at a first rate during the first portion of the gesture and optionally at a second rate, greater than the first rate, during the second portion of the gesture. Scaling the virtual object based on relative movement between the first portion of the user's body and the respective portion of the first input device improves user intuition about the scaling operation and improves granularity of the scaling operation, thereby reducing user errors in excessively or insufficiently scaling the virtual object.

In some embodiments, while displaying, via the display generation component, the virtual object, the computer system detects (816*a*), via the one or more input devices, a respective location of attention of the user of the computer system, such as attention 715 in FIG. 7C in a three-dimensional environment. In some embodiments, detecting the respective location of the attention of the user includes determining an orientation of the first input device relative to the three-dimensional environment.

In some embodiments, in accordance with a determination that the first input device, such as device 712, has a first pose relative to the virtual object, such as shown in FIG. 7C, the respective location is a first location (816*b*). For example, the computer system optionally determines that the first input device (e.g., a wand) optionally has a first pose, such as a pose pointed towards a respective portion of the virtual object. The computer system optionally determines that projection of a respective portion (e.g., a tip) of the first input device onto a plane intersecting the virtual object oriented towards (e.g., normal to) the viewpoint of the user corresponds to (e.g., overlays) a respective portion of the virtual object, or within a threshold distance (0.05, 0.1, 0.5, 1, 5, 10, 50, 100, or 1000 cm) of a respective portion (e.g., a border) of the virtual object. In response to determining the first input device has the first pose (e.g., pointing towards the virtual object), the computer system determines that the respective location of the user's attention is a first location (e.g., corresponding to the virtual object). In some embodiments, while the user's attention is at the first location, the computer system initiates one or more operations in response to one or more inputs directed towards the first location in the virtual object, and while the user's attention is at a second location and in response to the one or more inputs, the computer system forgoes initiation of the one or more operations. In some embodiments, in response to determining the first input device has a third pose corresponding to an orientation directed towards a respective virtual object other than the virtual object, the computer system determines the respective location of attention of the user corresponds to a third location corresponding to the respective virtual object.

In some embodiments, in accordance with a determination that the first input device has a second pose, such as indicated by indication 716 in FIG. 7D, different from the first pose, relative to the virtual object, the respective location is a second location, different from the first location (816c). For example, the second pose optionally corresponds to an orientation of the first input device such that the first input device is not directed towards the virtual object. In some embodiments, the computer system determines the orientation of the first input device does not correspond to a respective virtual object (e.g., the virtual object), and in response, determines that the respective location of the attention of the user does not correspond to a respective virtual object (e.g., to the second location). Detecting attention of the user based on the pose first input device provides clear physical feedback as to the recipient (e.g., the respective location) of the user's attention, thereby reducing erroneous input due to mistaken assumptions about a respective location of the user's attention as determined by the computer system.

In some embodiments, while detecting the respective location of the attention of the user, such as attention 715, of the computer system in the three-dimensional environment (818a) (e.g., as described in step(s) 816), in accordance with a determination that the respective location of the attention of the user is the first location, such as shown by indication 716 in FIG. 7C, and in accordance with a determination that the first location corresponds to a first respective portion of the virtual object (e.g., as described in step(s) 816), the computer system displays, via the display generation component, a visual indication of the attention the user at the first respective portion of the virtual object, such as shown by indication 716 in FIG. 7 (818b). In some embodiments, the visual indication corresponds to simulated light (e.g., a spotlight) based on a direction of the respective orientation of the first respective portion of the first input device (e.g., a wand tip). In some embodiments, an intensity and/or brightness of the visual indication is increased by the computer system in accordance with a determination that the respective portion of the first input device is brought closer toward the virtual object and decreased when the respective portion of the first input device is moved away from the virtual object relative to the user's viewpoint and/or the three-dimensional environment. In some embodiments, the visual indication varies in appearance in accordance with virtual contours of the first virtual object. As described with respect to step(s) 816, in some embodiments, if the user's attention corresponds to a respective virtual object (e.g., a first respective portion of the respective virtual object) other than the virtual object, the computer system displays the visual indication at the first respective portion of the respective virtual object and forgoes displaying of the visual indication at the first respective portion of the virtual object. In some embodiments, in accordance with a determination that the attention of the user corresponds to respective portions of respective virtual objects (e.g., virtual objects overlapping or bordering each other from the user viewpoint), the computer system displays the visual indication overlapping the respective virtual objects or on a first or a second respective virtual object of the respective virtual objects.

In some embodiments, in accordance with a determination that the respective location of the attention of the user is the second location, different from the first location, such as shown by device 712 in FIGS. 7A and 7A1, the computer system forgoes (818c) the displaying of the visual indication of the attention of the user at the first respective portion of the virtual object, such as shown FIGS. 7A and 7A1 (e.g., as described previously). In some embodiments, the computer system displays the visual indication at a respective location of the three-dimensional environment not including a respective virtual object. In some embodiments, the computer system forgoes display of the visual indication if the second location does not include a respective portion of a respective virtual object. Displaying or forgoing display of the visual indication based on a respective location of the user's attention provides visual feedback about a recipient of the user's attention, thereby reducing inputs targeting erroneous targets of inputs in the three-dimensional environment.

In some embodiments, while displaying, via the display generation component, the virtual object and the visual indication of the attention of the user, such as indication 716 in FIG. 7C, at the first respective portion of the virtual object, wherein the visual indication of the attention of the user has a first visual appearance, such as shown in FIG. 7C (e.g., a first shape having one or more respective visual characteristics such as a first level of brightness, saturation, hue, a first lighting effect, feathering effect, blurring effect, and/or opacity)), the computer system detects (820a), via the one or more input devices, an indication of a second user input, different from the first user input, at the first input device, such as sliding contact 728 in FIG. 7D. For example, the computer system optionally receives an indication from the first input device indicating the second user input was received at the first input device, such as the input(s) performed by the second portion of the user's body directed to the first input device as described in step(s) 802, such as tap and hold, tap or swipe inputs on the first input device.

In some embodiments, in response to detecting the indication of the second input, the computer system updates display of the visual indication of the attention of the user to have a second visual appearance, different from the first visual appearance, such as shown in FIG. 7D, while visual indication of the attention of the user remains displayed at the first respective portion of the virtual object, such as a position of indication 716 in FIG. 7D (820b). For example, the second visual appearance optionally includes a second shape optionally different form the first shape and/or a second, optionally different respective one or more respective visual characteristics similar to and/or the same as described with respect to the first visual appearance. In some embodiments, the first and/or second visual appearance mimic and/or have a profile of an active simulated tool that is controlled by the first input device (e.g., a cursor, a paintbrush, and/or a pencil). Providing a modifiable visual appearance of the visual indication foreshadows possible interactions performed in response to user input from the first input device and/or indicates a current state of the first input device such as an active tool of the input device, thereby reducing the likelihood the user provides input incongruous with the first input device.

In some embodiments, while performing the second manipulation operation, wherein the second manipulation operation includes a rotation operation of the virtual object, such as shown in FIG. 7B, the computer system displays (822), via the display generation component, a visual representation of a plane of rotation, such as platter 722, corresponding to the rotation operation. In some embodiments, the rotation operation has one or more characteristics of the rotation of the virtual object described in step(s) 808-812. In some embodiments, the visual representation of the plane of rotation has one or more characteristics of the plane of rotation (e.g., "platter") described with respect to methods 1000 and/or 1200. For example, the visual representation optionally is a disc or elliptic shaped visual indication that optionally is displayed intersecting or non-intersecting with the virtual object, such as below the virtual object and parallel to the plane of rotation of the virtual object. As referred to herein, the visual representation optionally is a "platter" that is orthogonal to an axis of the rotation of the virtual object. Displaying a plane of rotation assists in visualization of current and potential rotation of the virtual object, thereby reducing errors in undesirably rotating the virtual object.

In some embodiments, the visual representation of the plane of the rotation, such as platter 722 in FIG. 7B, intersects with a respective portion of the virtual object, such as virtual content 706 in FIG. 7B (824) (e.g., as described in step(s) 822). For example, the platter optionally bisects the virtual object, or is tangent to a respective portion of the virtual object (e.g., the lowest point on the object) distal from a second respective portion (e.g., a center) of the virtual object. Displaying a plane of rotation assists in visualization of current and potential rotation of the virtual object, thereby reducing errors in undesirably rotating the virtual object.

In some embodiments, the first operation includes one or more of a first translation (e.g., movement) operation of the virtual object, such as shown in FIGS. 7A and 7A1, a first rotation operation of the virtual object, such as shown in FIG. 7B, or a first scaling operation of the virtual object, such as shown in FIG. 7C (826a). For example, the computer system optionally selects between the respective operations (e.g., translation, rotation, and/or scaling) in accordance with a pose and/or gesture of the first portion of the user described with respect to step(s) 802 and satisfaction of one or more criteria, such as the first one or more criteria described with respect to step(s) 812. In some embodiments, the computer system concurrently performs one or more operations simultaneously (e.g., a translation of the virtual object relative to the three-dimensional object and a scaling of the virtual object).

In some embodiments, the second operation includes one or more of a second translation operation of the virtual object, such as shown in FIGS. 7A and 7A1, a second rotation operation of the virtual object, such as shown in FIG. 7B, or a second scaling operation of the virtual object, such as shown in FIG. 7C (826b) (e.g., similar or the same as described with respect to the first operation and as described with respect to the satisfaction of second one or more criteria in step(s) 812). Performing one or more operations as part of respective manipulation operations reduces inputs required to individually perform the operations and/or prepare to perform the operations.

In some embodiments, while performing the first manipulation operation, such as movement 710 shown in FIGS. 7A and 7A1, in accordance with input from the first portion of the user's body (e.g., and not having detected input from the second portion of the user's body directed to the first input device), the computer system detects (828a), via the one or more input devices, a second user input, different from the first user input, from the second portion of the user's body, such as hand 704B moving device 712 in FIG. 7B. For example, while performing a translation (e.g., first manipulation operation) of the virtual object with a hand (e.g., first portion) of the user, the computer system optionally detects an input (e.g., a second user input) from the second portion of the user's body (e.g., a second hand of the user) optionally directed toward the first input device.

In some embodiments, in response to detecting, via the one or more input devices, the second user input, in accordance with a determination that one or more criteria are satisfied, including a criterion that is satisfied when the second user input includes a second input from the second portion of the user's body directed to the first input device, such as hand 704B moving device 712 in FIG. 7B, the computer system ceases (828b) performing the first manipulation operation and performs a third manipulation operation (e.g., optionally the same as the second manipulation operation, and optionally different from the second manipulation operation), different from the first manipulation operation, with respect to the virtual object, such as the rotation of virtual content 706 shown in FIG. 7B. For example, the computer system interrupts performance of the translation operation previously described in response to the input from the second portion of the user's body directed toward the first input device (e.g., as described with respect to step(s) 802), and initiates a third manipulation operation. The third operation optionally has one or more characteristics of the first and/or second manipulation operations described in step(s) 826. In some embodiments, the one or more criteria include a criterion that is satisfied when a second input corresponding to one or more movements, gestures, and or poses of the second portion of the user (e.g., a second hand) are detected (e.g., not directed toward the first input device). In some embodiments, the results of the first manipulation operation with respect to the virtual object are maintained or discarded in response to initiating the third manipulation operation. For example, in response to the second user input satisfying the one or more criteria, a previous scaling of the virtual object included in the first manipulation operation is maintained or discarded (e.g., the virtual object reverts to an initial size it had prior to initiating the scaling operation). Subsequent to the maintaining or discarding of the results of the first manipulation operation, further input received from the first portion of the user and/or the second portion of the user directed to the first input device are used to perform the third manipulation operation. In some embodiments, if the results of the first manipulation are discarded, the first user input (e.g., the air gesture detected based on movement of the first portion of the user) is used as respective input toward the third manipulation operation. For example, movement of a hand of the user included in the first user input optionally is used to calculate a displacement between the hand of the user and movement of a respective portion (e.g., a wand tip) of the first input device to optionally determine a magnitude of the third manipulation operation. Interrupting the performance of the first manipulation operation in response to the second user input allows for seamless transitions between the first manipulation and the third manipulation operation, thereby reducing user input to terminate the first manipulation operation and thereafter initiate the third manipulation operation.

In some embodiments, the one or more criteria include a criterion that is satisfied in accordance with a determination that the second user input, such as movement of device 712 as shown in FIG. 7B, is received within a threshold amount of time (e.g., 0.01, 0.05, 0.1, 0.5, 1, 2.5, 5, or 10 seconds) from an initiation of the first manipulation operation, such as movement 710 as shown in FIGS. 7A and 7A1 (830*a*). For example, the computer system optionally determines that a translation operation performed in response to movement of the first portion of the user has initiated at a time within the threshold amount of time when the second user input is detected, and thus initiates performance of the third manipulation operation (e.g., in a similar manner as if the translation operation was ongoing when the second user input was received). Thus, in some embodiments, the computer system provides a grace period such that the user can initiate the third manipulation operation despite incidentally or intentionally initiating the first manipulation operation.

In some embodiments, in response to the detecting, via the one or more input devices, the second user input, in accordance with a determination that one or more criteria are not satisfied, the computer system forgoes (830*b*) the performing of the third manipulation operation with respect to the virtual object, such as forgoing the rotation of virtual content 706 in FIG. 7B. For example, the computer system determines that the second user input was received after the threshold amount of time, and in response, optionally forgoes the third manipulation operation and in some embodiments, initiates another manipulation operation as described with respect to step(s) 832. Performing the third manipulation operation in accordance with a determination that the second user input was received within the threshold amount of time of the initiation of the first manipulation operation reduces user input otherwise required to initiate the third manipulation operation, such as an additional air gesture input from the first portion of the user.

In some embodiments, in response to detecting the first user input (832*a*) in accordance with a determination that the first user input does not include the air gesture input detected based on movement of the first portion of the user's body, such as movement 711 of hand 704A, and includes the input from the second portion of the user's body directed to the first input device, such as hand 704A moving device 712 as shown in FIG. 7D, the computer system performs (832*b*) a third manipulation operation, different from the first manipulation operation and the second manipulation operation, with respect to the virtual object, such as the drawing operation as shown in FIG. 7D. For example, the computer system optionally detects a user input described in step(s) 802 with respect to the second portion of the user's body directed toward the first input device described (e.g., a gesture associated with a wand device), optionally detects that the first portion of the user's body (e.g., hand) is not performing the air gesture (e.g., is static, or is not performing the air gesture or another air gesture interpreted by the computer system as a respective air gesture that triggers the first manipulation operation) and performs the third manipulation operation. The third manipulation operation optionally corresponds to one or more of the manipulation operations described with respect to step(s) 802. Additionally or alternatively, the third manipulation operation optionally includes a markup or drawing operation. For example, while an input and/or an indication of the input (e.g., contact) is detected at the first input device and/or received from the first input device, the computer system optionally creates visual representations of drawings in the three-dimensional environment having shapes or profiles corresponding to the movement of the first input device while the input (e.g., contact) on the first input device is maintained. In some embodiments, while the computer system is receiving indications that input is detected at the first input device and the air gesture is not detected, the computer system displays a visual indication associated with the first input device (e.g., a virtual spotlight as described with respect to step(s) 816 and step(s) 818) and initiates a drawing operation in accordance with movement of the first input device relative to the three-dimensional environment. In some embodiments, if the visual indication corresponds to a respective portion of a respective virtual object, the computer system displays visual representations of the drawings in accordance (e.g., at or trailing) the current position of the visual indication over the virtual object. In some embodiments, the computer system draws in accordance with the movement of the first input device even if the first input device is not directed towards a respective portion of a respective virtual object. In some embodiments, the computer system receives the same indication of the input detected performed by the second portion of the user directed towards the first input device while the air gesture is detected (e.g., as described in step(s) 802), and in response to the same indication, initiates the second manipulation operation and forgoes performance of the third manipulation operation. Performing a third manipulation operation in accordance with a determination that the first input does not include the air gesture reduces user input to manually select and initiate the third manipulation operation.

FIGS. 9A-9F illustrate examples of manipulating a virtual object based on input from a hand of the user and/or a handheld device in accordance with some embodiments.

Figure 9A:
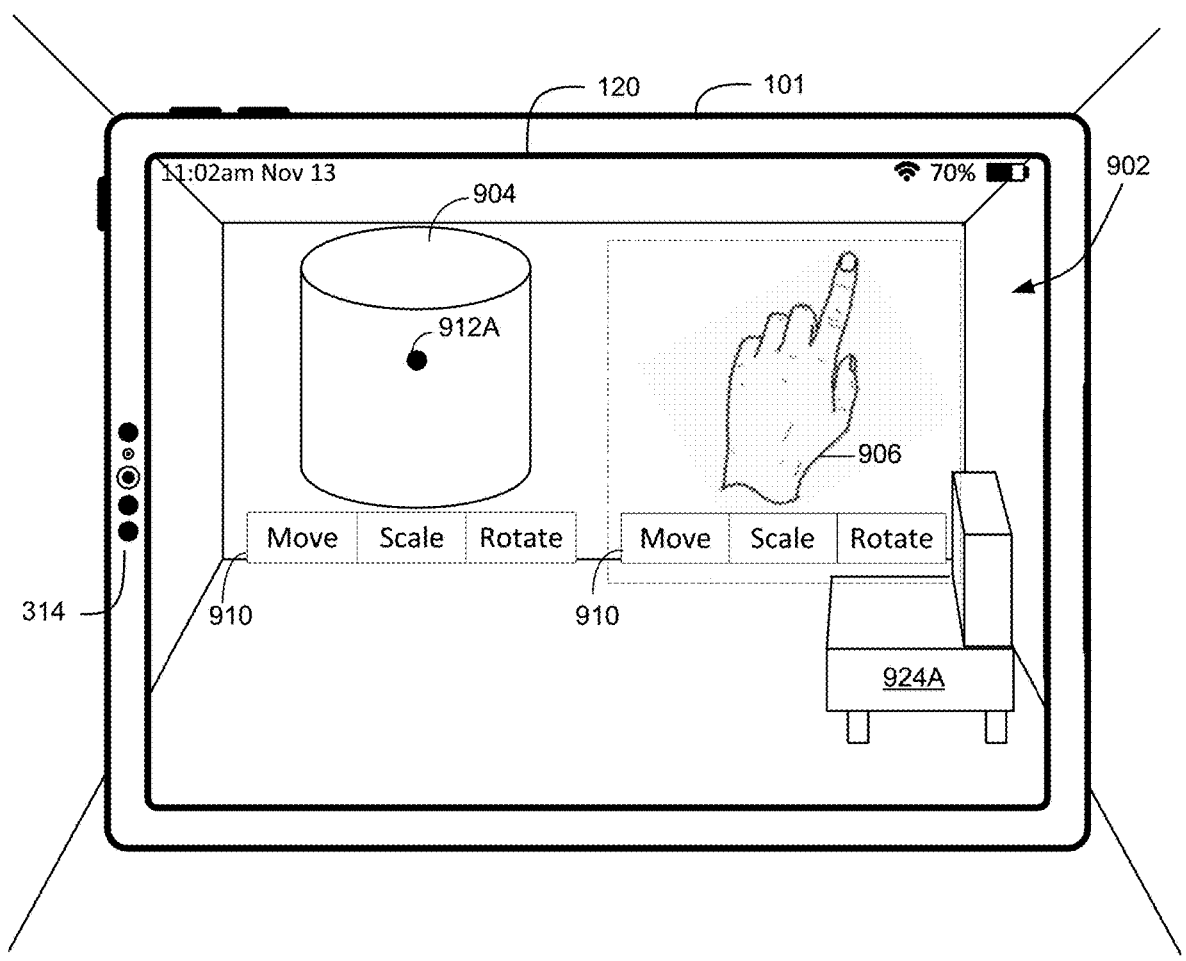

FIG. 9A illustrates a computer system 101 displaying, via a display generation component (e.g., display generation component 120 of FIG. 1), a three-dimensional environment 902. As described above with reference to FIGS. 1-6, the computer system 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user) such as movements that are interpreted by the computer system as gestures such as air gestures, and/or gaze of the user (e.g., internal sensors facing inwards towards the face of the user).

As shown in FIG. 9A, the computer system 101 captures one or more images of the physical environment around computer system 101 (e.g., operating environment 100), including one or more objects (e.g., couch 924A) in the physical environment around computer system 101. In some embodiments, the computer system 101 displays representations of the physical environment in three-dimensional environment 902 or portions of the physical environment are visible via the display generation component 120 of computer system 101. For example, three-dimensional environment 902 includes the couch 924A, portions of the left and right walls, the ceiling, and the floor in the physical environment of the user.

In FIG. 9A, three-dimensional environment 902 includes a virtual object 904 (e.g., such as a virtual cylinder, virtual clock, virtual ball, virtual car or any other virtual object that is manipulable), a virtual object manipulation user interface 910, and a physical object associated with the user (e.g., such as a left hand 906, a right hand of the user, or a handheld device), as described with reference to method 1000. In some embodiments, the virtual object manipulation user interface 910 includes one or more options for manipulating (e.g., moving, scaling, and/or rotating) the virtual object 904. In some embodiments, the computer system 101 presents the virtual object manipulation user interface 910 near (e.g., below) the virtual object 904 with or without the attention of the user 912A being directed towards the virtual object 904. Alternatively, the computer system 101 optionally presents the virtual object manipulation user interface 910 near (e.g., below) the physical object associated with the user (e.g., such as a left hand 906 of the user, a right hand of the user, or a handheld device). The dashed box around the left hand 906 indicates an alternative example, in which the virtual object manipulation user interface 910 is presented near the left hand 906.

Figure 9B:
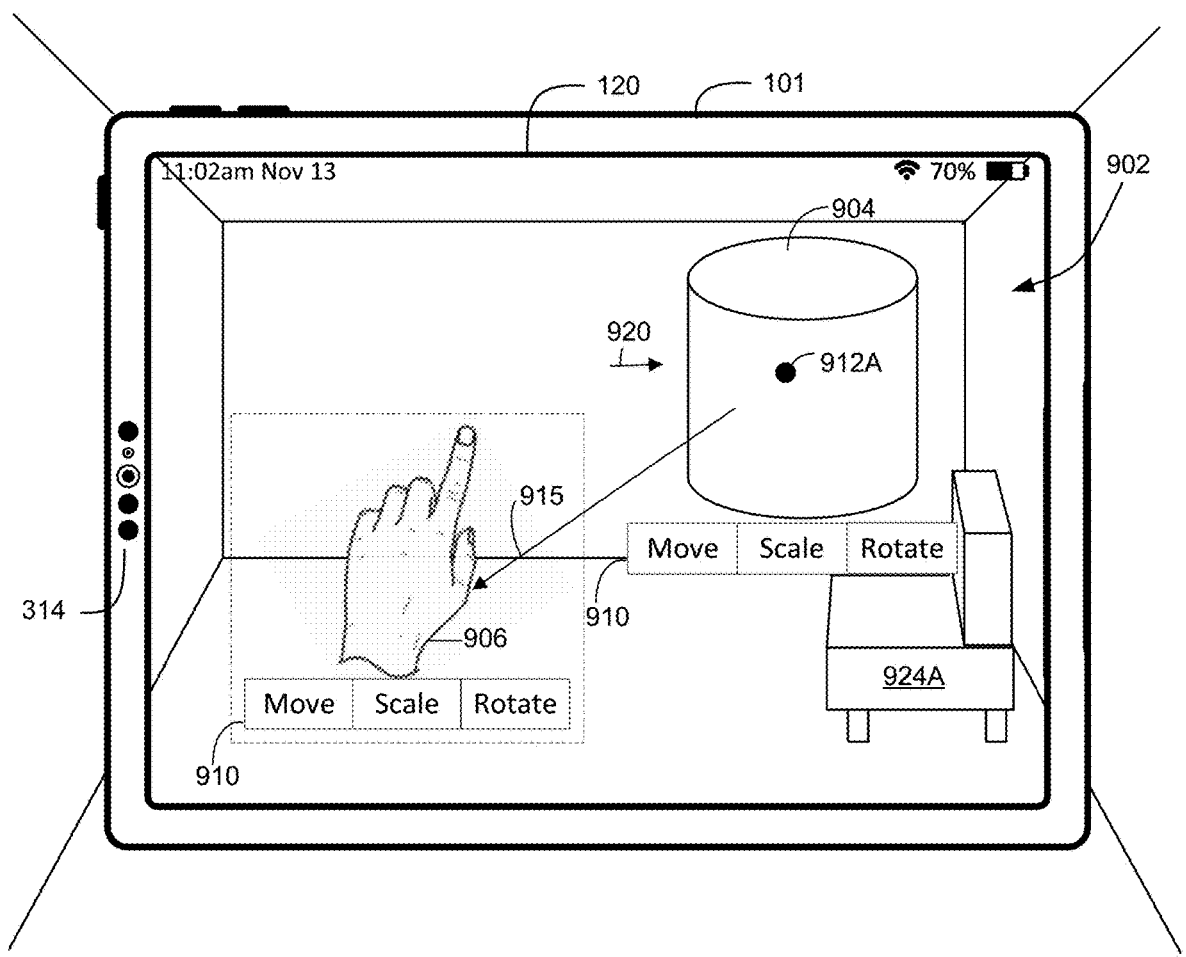

From FIG. 9A to 9B, the computer system 101 receives input corresponding to movement of the physical object (e.g., the left hand 906 of the user) and/or input corresponding to movement of the virtual object 904. For example, the left hand 906 of the user in FIG. 9B has translated downwards and to the left relative to a position of the left hand 906 in FIG. 9A (shown by arrow 915). Based on the first input and/or the second input as described with reference to method 1000, the virtual object 904 of the user in FIG. 9B has translated to the right relative to a position of the virtual object 904 in FIG. 9A (shown by arrow 920). Alternatively as illustrated by the dashed box around the left hand 906, based on movement of the left hand 906 of the user in FIG. 9B, the computer system 101 optionally moves the virtual object manipulation user interface 910 corresponding to the movement of the left hand 906 of the user such that virtual object manipulation user interface 910 remains near (e.g. below) the left hand 906. In some embodiments, based on movement of the virtual object 904 in FIG. 9B, the computer system 101 moves the virtual object manipulation user interface 910 corresponding to the movement of the virtual object 904 such that virtual object manipulation user interface 910 remains near (e.g., below) the virtual object 904.

Figure 9C:
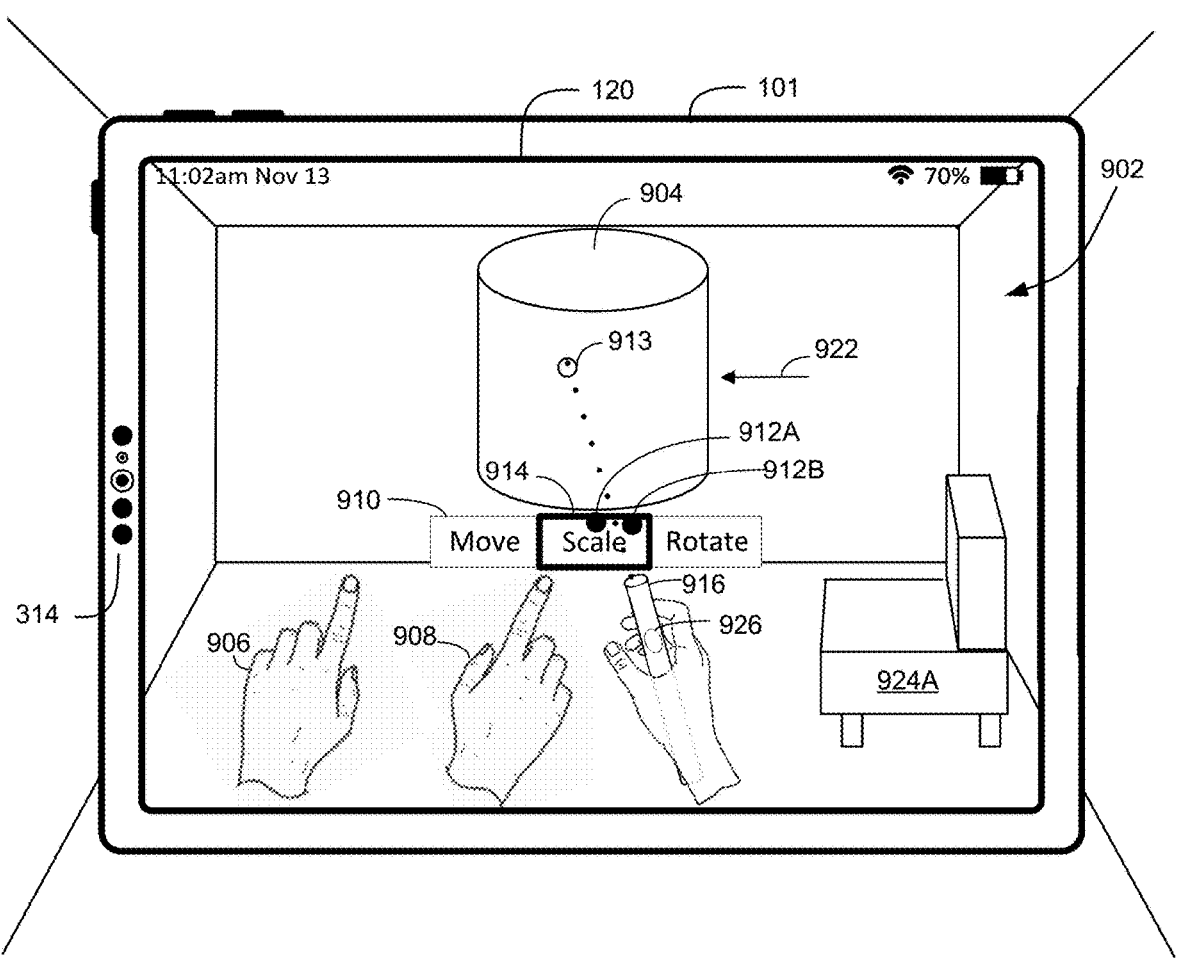

From FIG. 9B to 9C, the computer system 101 optionally receives input corresponding to a scale input mode 914 of the virtual object manipulation user interface 910. Further, the computer system 101 has optionally translated the virtual object 904 in FIG. 9C to the left relative to a position of the virtual object 904 in FIG. 9B (as shown by arrow 922). In some embodiments, the input corresponding to the scale input mode 914 includes attention of the user 912A directed towards the scale input mode 914. In some embodiments, the input includes a right hand 908 of the user directed (e.g., pointing or oriented) towards the scale input mode 914. In some embodiments, the input includes a handheld device 916 (e.g., a wand or a wand-like device) of the user directed (e.g., pointing or oriented) towards the scale input mode 914. In some embodiments, the input includes the right hand 908 of the user or the handheld device 916 directed (e.g., pointing or oriented) towards the scale input mode 914 while the attention of the user 912B is directed towards the scale input mode 914. In some embodiments, the input includes a pinching on a button or a touch-sensitive surface 926 of the handheld device 916 via the right hand 908 of the user while the attention of the user 912B is directed towards the scale input mode 914. In some embodiments, the input includes the right hand 908 of the user in an air pinch gesture (e.g., by the thumb and index finger of the right hand 908 moving together and touching) while the attention of the user 912B is directed towards the scale input mode 914. Based on receiving the input directed towards the scale input mode 914, the computer system 101 updates a visual appearance of the scale input mode 914 (as shown by the black outline around the scale input mode 914) as described with reference to method 1000. In some embodiments, as illustrated by the dotted line in FIG. 9C, the computer system 101 presents a visual indication 913 (e.g., simulated light such as a spotlight or a colored marker) at a location on the virtual object 904 indicating that the handheld device 916 is directed (e.g., pointing) to that location on the virtual object 904. In some embodiments, the computer system 101 presents the visual indication 913 at a location on scale input mode 914 indicating that the handheld device 916 is directed (e.g., pointing) to the scale input mode 914.

Figure 9D:
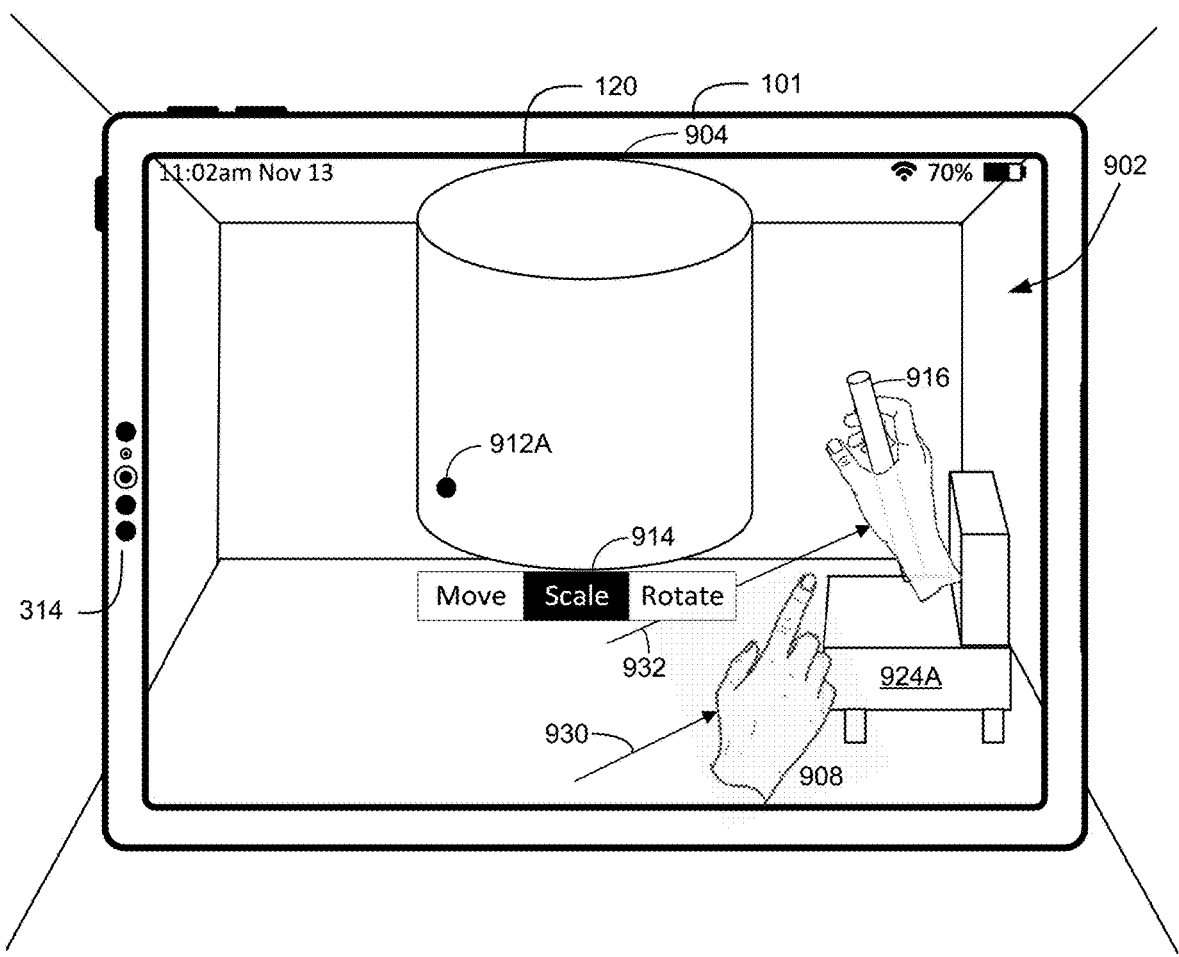

After receiving input corresponding to the scale input mode 914, the computer system 101 optionally receives additional input corresponding to manipulating the virtual object 904 according to the scale input mode 914 (as described with reference to method 1000). In some embodiments, the additional input includes movement of the right hand 908 of the user or movement of the handheld device 916. For example, as shown by arrow 930, based on the right hand 908 of the user in FIG. 9D moving to the right relative to a position of the right hand 908 of the user in FIG. 9C, the computer system 101 optionally increases the size of the virtual object in FIG. 9D compared to FIG. 9C. For example, as shown by arrow 932, based on the handheld device 916 in FIG. 9D moving to the right relative to a position of the handheld device 916 in FIG. 9C, the computer system 101 optionally increases the size of the virtual object in FIG. 9D compared to FIG. 9C. In some embodiments, based on the right hand 908 of the user or the handheld device 916 moving to the left, the computer system 101 optionally decreases the size of the virtual object in FIG. 9D compared to FIG. 9C (as described with reference to method 1000). In some embodiments, despite the attention of the user 912A moving away from the scale input mode 914 as shown in FIG. 9D as directed to object 904, manipulation (e.g., increasing size) of the virtual object 904 according to the scale input mode 914 continues because the right hand 908 of the user or the handheld device 916 is already locked in or engaged with the scale input mode 914 (e.g., the right hand 908 of the user is in an air pinch hand shape such that the thumb and index finger of the right hand 908 are touching, or the right hand 908 of the user is pressing a button or touch-sensitive surface 926 on the handheld device 916). In some embodiments, when the right hand 908 of the user or the handheld device 916 is already locked in or engaged with the scale input mode 914, a visual appearance of the scale input mode 914 is updated (shown by the black fill in FIG. 9D) compared to the visual appearance of the scale input mode 914 in FIG. 9C. In some embodiments, manipulation of the virtual object 904 according to the scale input mode 914 continues until the right hand 908 of the user or the handheld device 916 is no longer engaged with the scale input mode 914 (e.g., the right hand 908 of the user release an air pinch hand shape by the thumb and index finger of the hand moving apart and no longer touching, or the right hand 908 of the user releases a press of the button or touch-sensitive surface on the handheld device 916).

Figure 9E:
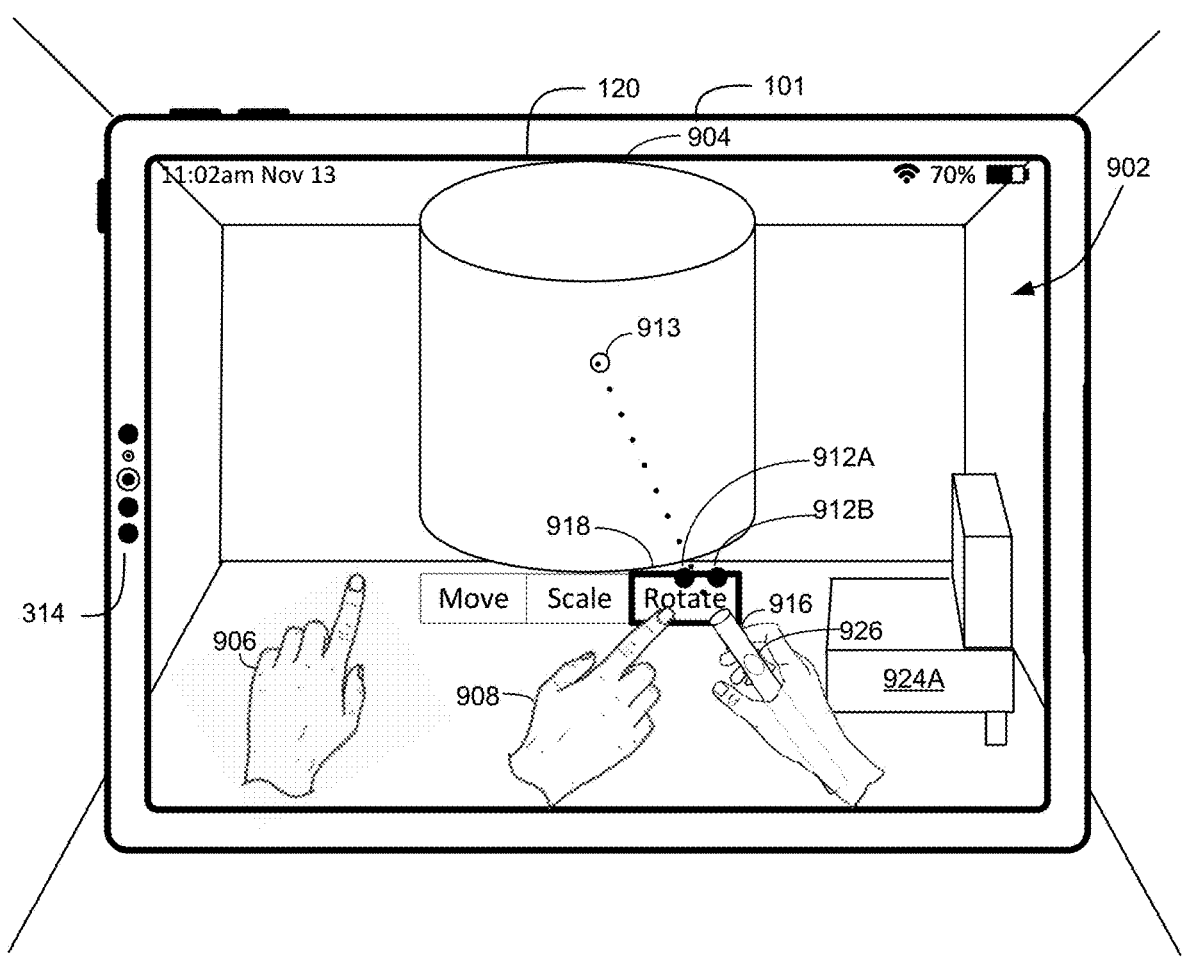

From FIG. 9D to 9E, the computer system 101 optionally receives input corresponding to a rotate input mode 918 of the virtual object manipulation user interface 910. In some embodiments, the input corresponding to the rotate input mode 918 includes attention of the user 912A directed towards the rotate input mode 918. In some embodiments, the input includes the right hand 908 of the user directed (e.g., pointing or oriented) towards the rotate input mode 918. In some embodiments, the input includes the handheld device 916 directed (e.g., pointing or oriented) towards the rotate input mode 918. In some embodiments, the input includes the right hand 908 of the user or the handheld device 916 directed towards the rotate input mode 918 while the attention of the user 912B is directed towards the rotate input mode 918. In some embodiments, the input includes a pinching on a button or a touch-sensitive surface 926 of the handheld device 916 via the right hand 908 of the user while the attention of the user 912B is directed towards the rotate input mode 918. In some embodiments, the input includes the right hand 908 of the user in an air pinch gesture while the attention of the user 912B is directed towards the rotate input mode 918. Based on receiving the input directed towards the rotate input mode 918, the computer system 101 updates a visual appearance of the rotate input mode 918 (as shown by the black outline around the rotate input mode 918) as described with reference to method 1000. In some embodiments, as illustrated by the dotted line in FIG. 9C, the computer system 101 presents the visual indication 913 (e.g., simulated light such as a spotlight or a colored marker) at a location on the virtual object 904 indicating that the handheld device 916 is directed (e.g., pointing) to that location on the virtual object 904. In some embodiments, the computer system 101 presents the visual indication 913 at a location on the rotate input mode 918 indicating that the handheld device 916 is directed (e.g., pointing) to the rotate input mode 918.

Figure 9F:
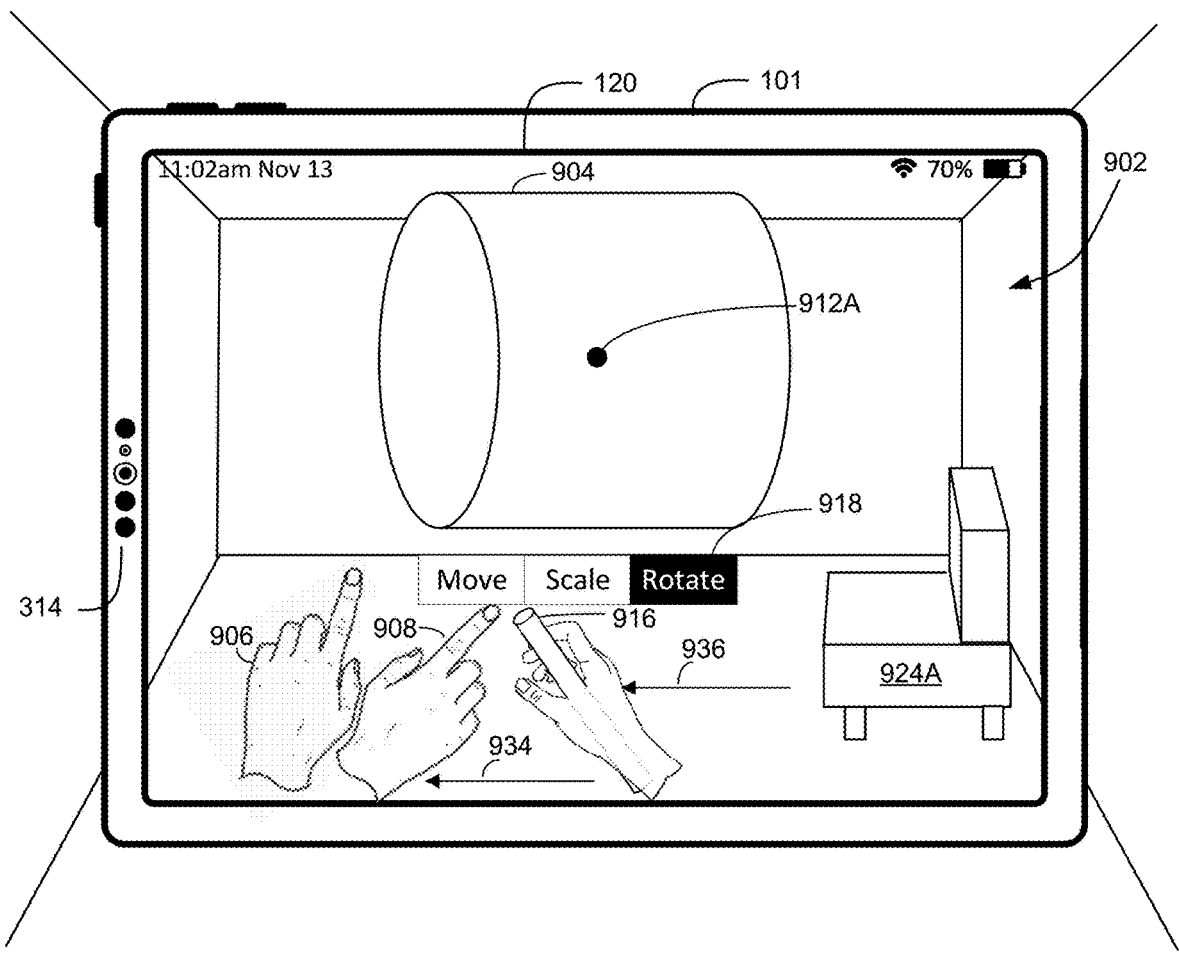
Figure 10A:
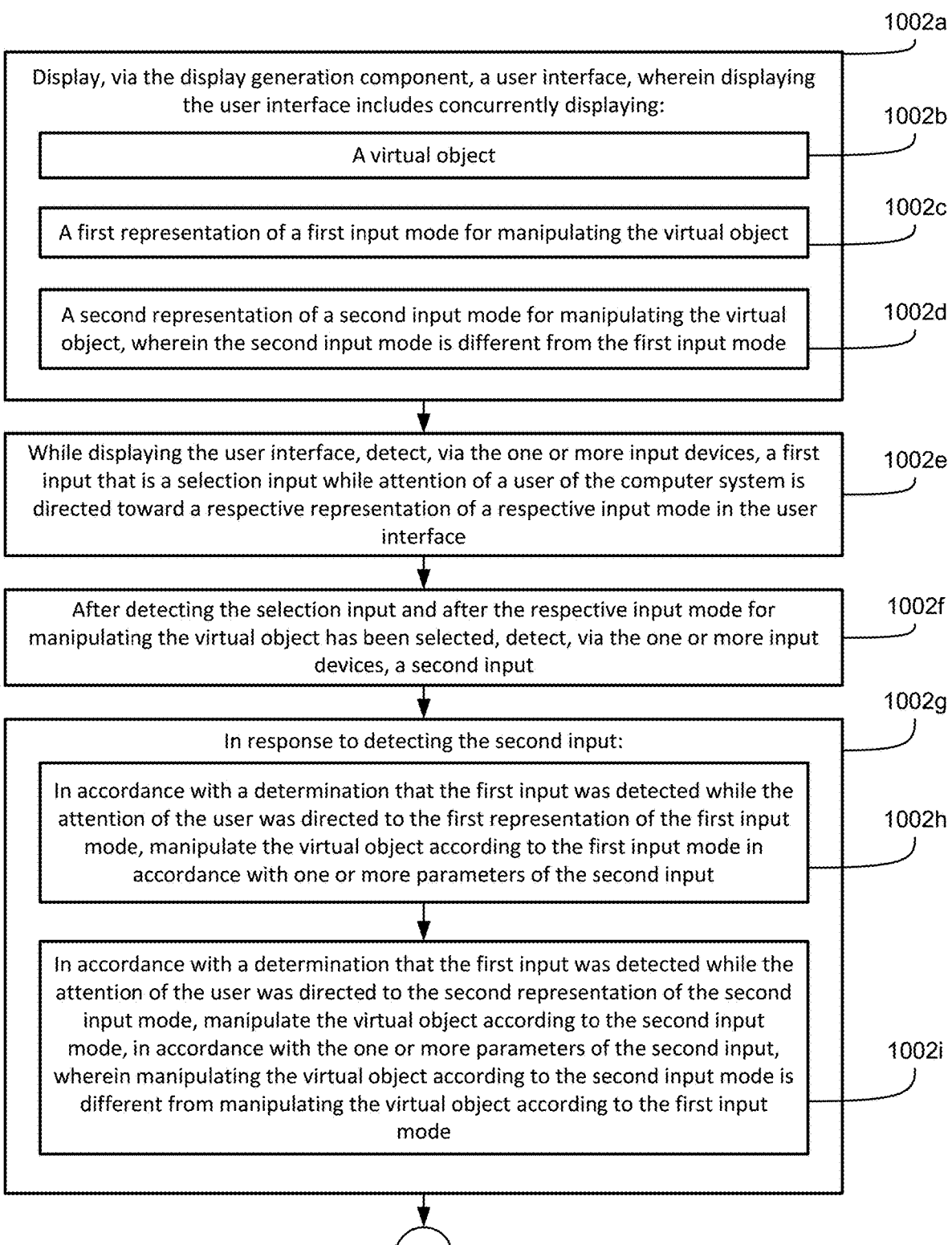
Figure 10B:
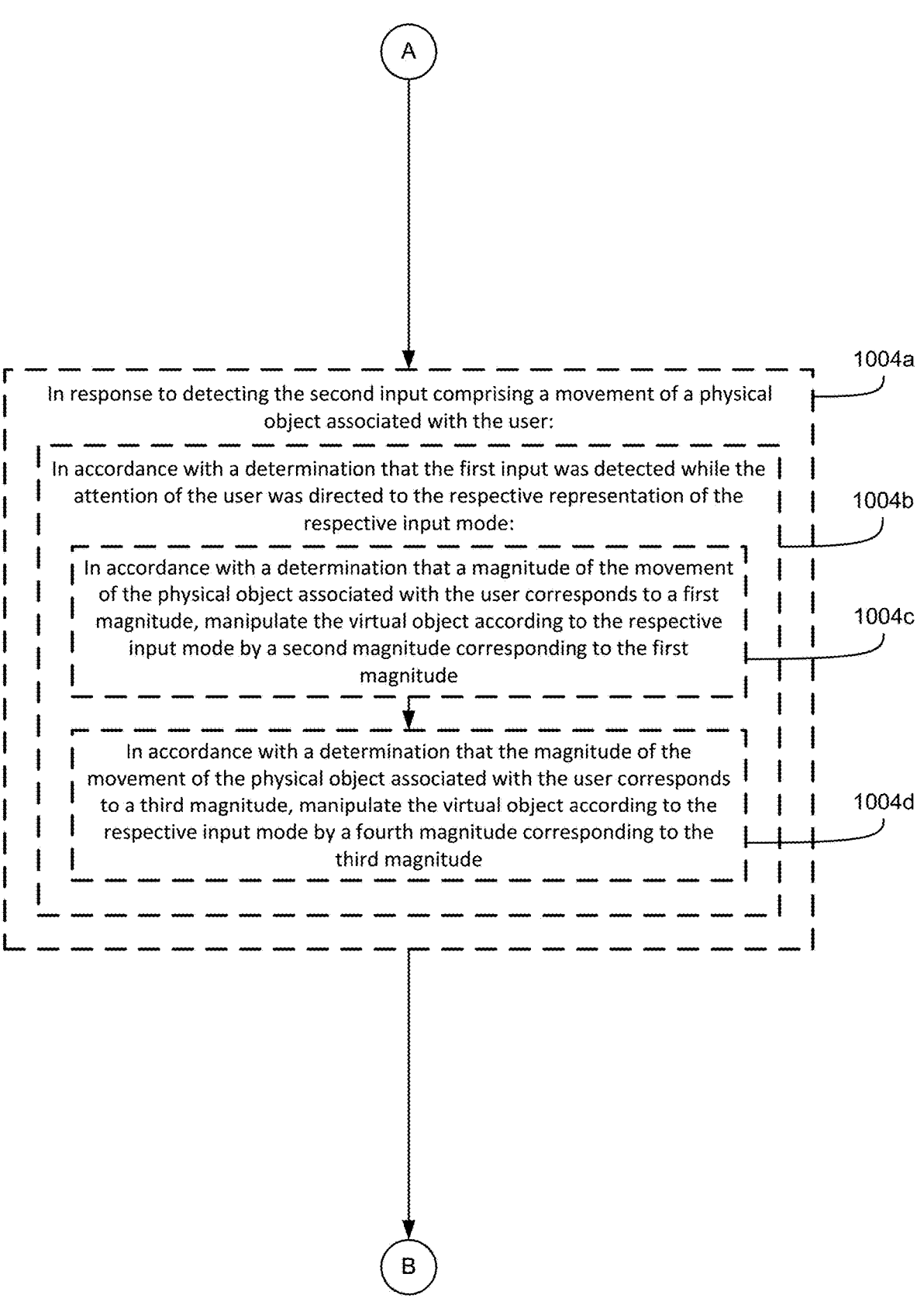
Figure 10D:
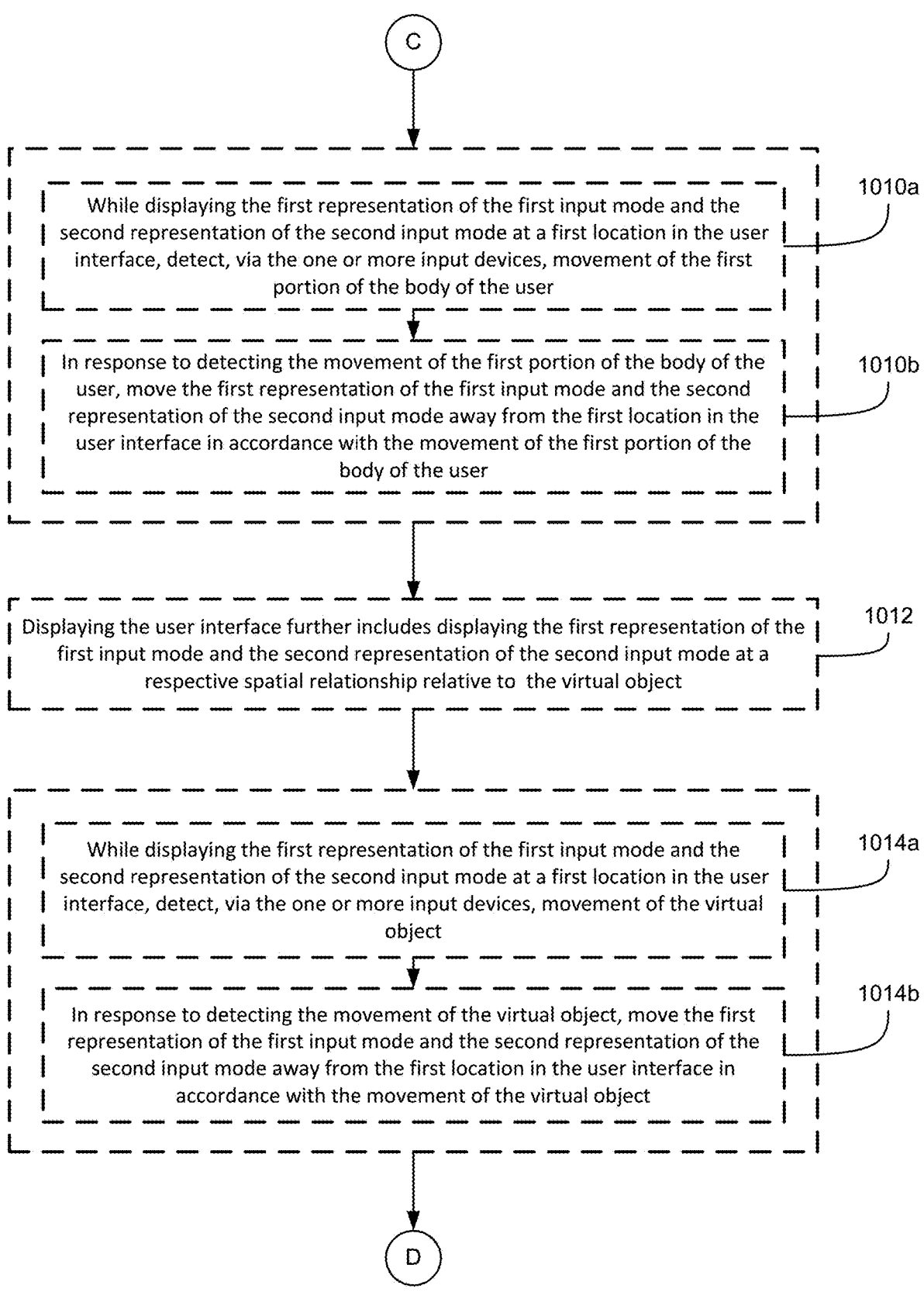
Figure 10F:
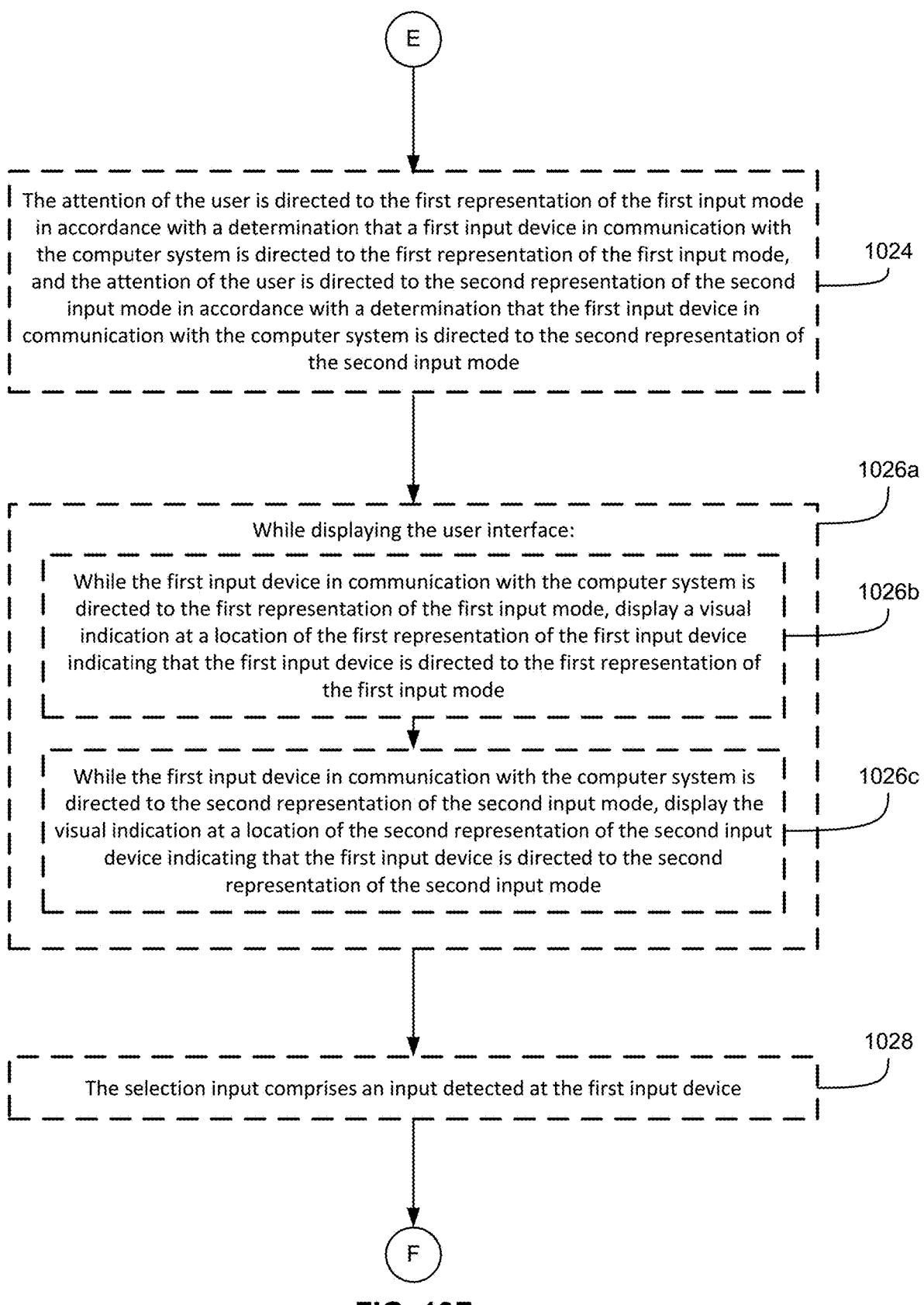
Figure 10H:
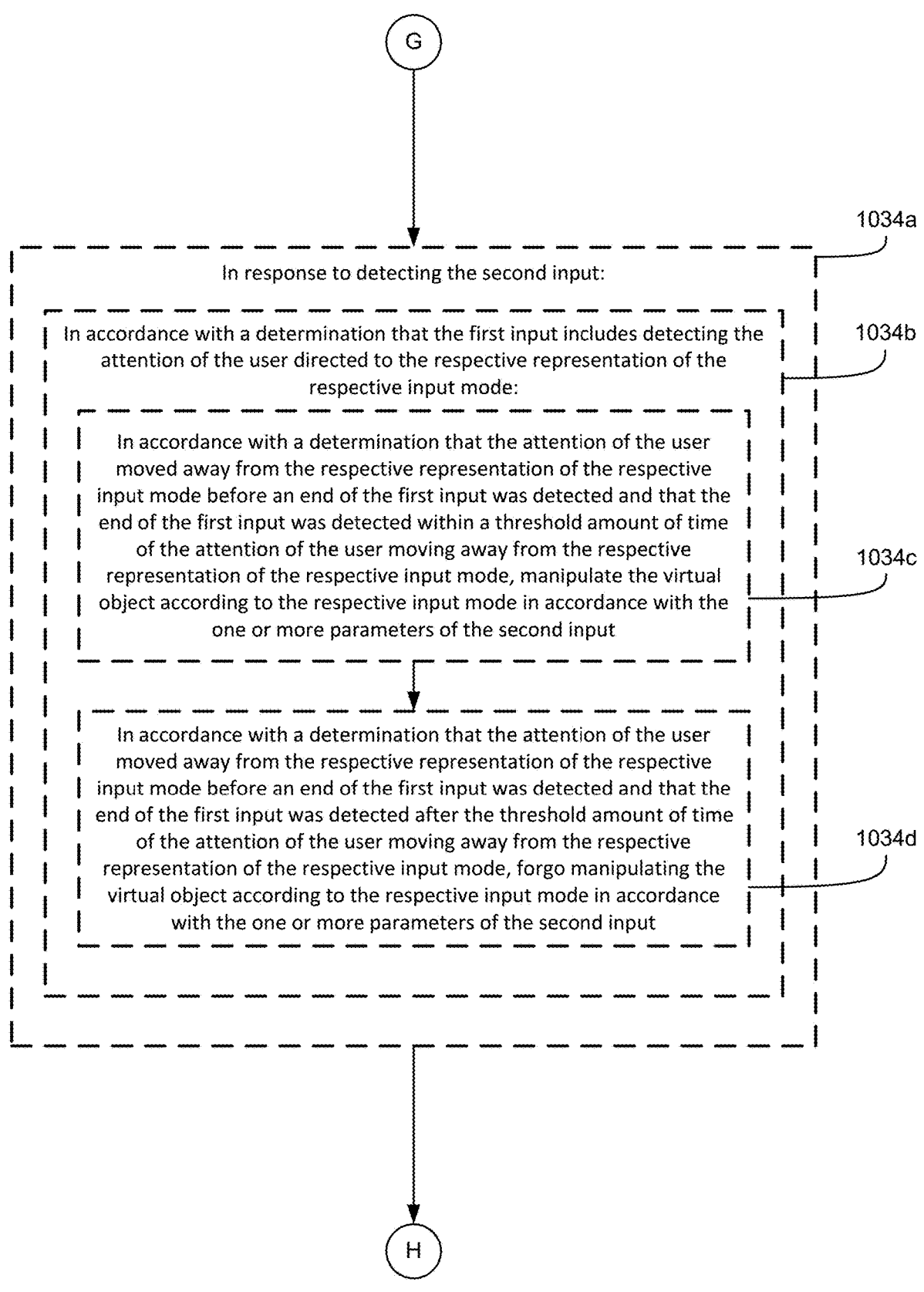

After receiving input corresponding to the rotate input mode 918, the computer system 101 optionally receives additional input corresponding to manipulating the virtual object 904 according to the rotate input mode 918 (as described with reference to method 1000). In some embodiments, the additional input includes movement of the right hand 908 of the user or movement of the handheld device 916. For example, as shown by arrow 934, based on the right hand 908 of the user in FIG. 9F moving to the left relative to a position of the right hand 908 of the user in FIG. 9E, the computer system 101 optionally rotates the virtual object 904 to the left or counterclockwise in FIG. 9F compared to FIG. 9E. For example, as shown by arrow 936, based on the handheld device 916 in FIG. 9F moving to the left relative to a position of the handheld device 916 in FIG. 9E, the computer system 101 optionally rotates the virtual object 904 to the left or counterclockwise in FIG. 9F compared to FIG. 9E. In some embodiments, based on the right hand 908 of the user or the handheld device 916 moving to the right, the computer system 101 optionally rotates the virtual object

904 to the right or clockwise in FIG. 9F compared to FIG. 9E (as described with reference to method 1000). In some embodiments, despite the attention of the user 912A moving away from the rotate input mode 918 (e.g., shown as directed to virtual object 904 in FIG. 9F), manipulation of (e.g., rotating) the virtual object 904 according to the rotate input mode 918 continues because the right hand 908 of the user or the handheld device 916 is already locked in or engaged with the rotate input mode 918. In some embodiments, when the right hand 908 of the user or the handheld device 916 is already locked in or engaged with the scale input mode 914, a visual appearance of the rotate input mode 918 is updated (shown by the black fill in FIG. 9F) compared to the visual appearance of the rotate input mode 918 in FIG. 9E. In some embodiment, manipulation of the virtual object 904 according to the rotate input mode 918 continues until the right hand 908 of the user or the handheld device 916 is no longer engaged with the rotate input mode 918 (e.g., as described previously with respect to the scale input mode).

FIG. 9F1 illustrates similar and/or the same concepts as those shown in FIG. 9F (with many of the same reference numbers). It is understood that unless indicated below, elements shown in FIG. 9F1 that have the same reference numbers as elements shown in FIGS. 9A-9F have one or more or all of the same characteristics. FIG. 9F1 includes computer system 101, which includes (or is the same as) display generation component 120. In some embodiments, computer system 101 and display generation component 120 have one or more of the characteristics of computer system 101 shown in FIGS. 9F and 9A-9F and display generation component 120 shown in FIGS. 1 and 3, respectively, and in some embodiments, computer system 101 and display generation component 120 shown in FIGS. 9A-9F have one or more of the characteristics of computer system 101 and display generation component 120 shown in FIG. 9F1.

In FIG. 9F1, display generation component 120 includes one or more internal image sensors 314a oriented towards the face of the user (e.g., eye tracking cameras 540 described with reference to FIG. 5). In some embodiments, internal image sensors 314a are used for eye tracking (e.g., detecting a gaze of the user). Internal image sensors 314a are optionally arranged on the left and right portions of display generation component 120 to enable eye tracking of the user's left and right eyes. Display generation component 120 also includes external image sensors 314b and 314c facing outwards from the user to detect and/or capture the physical environment and/or movements of the user's hands. In some embodiments, image sensors 314a, 314b, and 314c have one or more of the characteristics of image sensors 314 described with reference to FIGS. 9A-9F.

In FIG. 9F1, display generation component 120 is illustrated as displaying content that optionally corresponds to the content that is described as being displayed and/or visible via display generation component 120 with reference to FIGS. 9A-9F. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 9F1.

Display generation component 120 has a field of view (e.g., a field of view captured by external image sensors 314b and 314c and/or visible to the user via display generation component 120, indicated by dashed lines in the overhead view) that corresponds to the content shown in FIG. 9F1. Because display generation component 120 is optionally a head-mounted device, the field of view of display generation component 120 is optionally the same as or similar to the field of view of the user.

In FIG. 9F1, the user is depicted as performing an air pinch gesture (e.g., with hand 908) to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 9A-9F.

In some embodiments, computer system 101 responds to user inputs as described with reference to FIGS. 9A-9F.

In the example of FIG. 9F1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 9A-9F and/or described with reference to the corresponding method(s) are optionally implemented on computer system 101 and display generation unit 120 in a manner similar or analogous to that shown in FIG. 9F1.

FIGS. 10A-10I is a flowchart illustrating a method 1000 of manipulating a virtual object based on input from a hand of the user and/or a handheld device in accordance with some embodiments. In some embodiments, the method 1000 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 1000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1000 are, optionally, combined and/or the order of some operations is, optionally, changed.

In some embodiments, method 1000 is performed at a computer system, such as computer system 101 in FIG. 1, in communication with a display generation component and one or more input devices. In some embodiments, the computer system has one or more of the characteristics of the computer systems of methods 800 and/or 1200. In some embodiments, the display generation component has one or more of the characteristics of the display generation component of methods 800 and/or 1200. In some embodiments, the one or more input devices have one or more of the characteristics of the one or more input devices of methods 800 and/or 1200.

In some embodiments, the computer system displays (1002*a*), via the display generation component, a user interface, wherein displaying the user interface includes concurrently displaying a virtual object, such as virtual object 904 in FIG. 9A (1002*b*), a first representation of a first input mode, such as a scale input mode 914 in FIG. 9C, for manipulating the virtual object (1002*c*), and a second representation of a second input mode, such as a rotate input mode 918 in FIG. 9E, for manipulating the virtual object (1002*d*), wherein the second input mode is different from the first input mode. In some embodiments, the user interface includes a user interface or representation of an application, a representation of a content item (e.g., image and/or video), and/or a three-dimensional representation of an object that does not exist in a physical environment of the computer system, the display generation component and/or user). In some embodiments, the virtual object is displayed in a three-dimensional environment, such as a virtual reality (VR) environment, a mixed reality (MR) environment, or an augmented reality (AR) environment. In some embodiments, the three-dimensional environment has one or more of the characteristics of the three-dimensional environments of methods 800 and/or 1200. In some embodiments, the virtual object has one or more of the characteristics of the virtual objects of methods 800 and/or 1200. In some embodiments, the first representation of the first input mode includes a first user interface element corresponding to a move, scale, or rotate operation. In some embodiments, the second representation of the second input mode includes a second user interface element corresponding to a move, scale, or rotate operation.

In some embodiments, while displaying the user interface, the computer system detects (1002*e*), via the one or more input devices, a first input that is a selection input while attention of a user, such as attention of the user 912A in FIG. 9C and FIG. 9E, of the computer system is directed toward a respective representation of a respective input mode in the user interface. In some embodiments, the first input is from a first physical object, an air gesture, or both. In some embodiments, the first physical object includes a hand of a user of the computer system or a handheld device such as a wand, a wand-like device, a remote control, or a stylus. In some embodiments, the wand-like input device of the computer system has one or more of the characteristics of the wand-like input devices of methods 800 and/or 1200. In some embodiments, the attention of the user is directed at a location in the user interface based on the first physical object (e.g., wand or wand-like device) directed towards the location. For example, the attention of the user directed towards the respective representation of the respective input mode is optionally based on the first physical object (e.g., wand or wand-like device) pointing at or directed towards the respective representation of the respective input mode. In some embodiments, the first input is an air gesture input provided by a portion (e.g., hand) of the user and is directed to the virtual object (e.g., because it is detected while attention of the user is directed to a representation of an input mode corresponding to a move, rotate, or scale operation). In some embodiments, the air gesture input provided by the hand of the user includes a pinching gesture in which a thumb and index finger of the hand move toward each other and touch. In some embodiments, the first input is an air gesture input provided by a handheld device (e.g., wand) in the direction of the virtual object (e.g., the tip of the handheld device is pointed towards the virtual object). In some embodiments, the first input includes the handheld device being a threshold distance (e.g., 0.1, 1, 10, 100, 1,000 or 10,000 cm) away from the virtual object but oriented (e.g., pointing) towards the virtual object. In some embodiments, varying first inputs correspond to different input modes. In some embodiments, the first input includes an air pinching gesture by the user's hand that causes a menu to be displayed in the three-dimensional environment. In some embodiments, the menu includes one or more respective representations of respective input modes (e.g., options to scale, move, and/or rotate the virtual object). In some embodiments, the first input (e.g., air pinching gesture) and attention of the user towards the respective representation (e.g., option) in the menu correspond to the selection of a respective input mode, such as a first input mode. In some embodiments, the first input includes the user's hand being raised, the user's hand approaching the virtual object, or the user's hand being within a threshold distance (e.g., 0.001, 0.01, 0.1, 1, 10, or 100 cm) of the virtual object, which causes a menu with options to scale, move, and/or rotate the virtual object to be displayed in the three-dimensional environment. In some embodiments, the user's hand being raised, the user's hand approaching the virtual object, or the user's hand being within a threshold distance (e.g., 0.001, 0.01, 0.1, 1, 10, or 100 cm) of the virtual object while attention of the user towards the option in the menu optionally correspond to the selection of a different input mode, such as a second input mode. In some embodiments, the first input includes attention of the user towards the virtual object for a threshold amount of time (e.g., 0.5, 1, 2, 3, 4, 5, 10, 30, or 60 s), which causes a menu to be displayed in the three-dimensional environment. In some embodiments, the menu includes options to scale, move, and/or rotate the virtual object. In some embodiments, after the attention of the user is directed towards the virtual object, the attention of the user moves to an option in the menu for a threshold amount of time (e.g., 0.5 1, 2, 3, 4, 5, 10, 30, or 60 s). Accordingly, the attention of the user towards the virtual object and subsequently the attention of the user towards the option in the menu optionally correspond to the selection of another respective input mode, such as a third input mode.

In some embodiments, after detecting the selection input and after the respective input mode for manipulating the virtual object has been selected, the computer system detects (1002f), via the one or more input devices, a second input, such as from right hand 908 or the handheld device 916 in FIG. 9D. In some embodiments, the second input (e.g., air input gesture) is provided only by a handheld device (e.g., wand) or hand of a user. In some embodiments, the second input includes pinching on the handheld device (e.g., a button of the handheld device). In some embodiments, the second input includes moving the handheld device while pinching on the handheld device (e.g., pinching on the button or touch-sensitive surface of the handheld device via the hand). In some embodiments, the second input includes moving the hand while the hand is in a pinch hand shape. In some embodiments, the second input includes a spreading gesture in which a thumb and fingers of the user's hand move apart from each other.

In some embodiments, in response to detecting the second input (1002g), in accordance with a determination that the first input was detected while the attention of the user, such as attention of the user 912A in FIG. 9C, was directed to the first representation of the first input mode, the computer system manipulates (1002h) the virtual object according to the first input mode, such as a scale input mode 914 in FIG. 9C, in accordance with one or more parameters of the second input (e.g., a direction, duration, speed, or other parameter of the second input). In some embodiments, based on the required input from a handheld device or the user's hand and/or attention of the user for the first input mode, the virtual object is manipulated (e.g., scaled, rotated, or moved) based on the first input mode and the second input. In some embodiments, if the first input includes the pinching gesture while attention of the user is towards a first option, in the menu, such as a scaling option, then the virtual object is manipulated according to the first input mode and the second input. For example, based on the first input including the pinching gesture while attention of the user is directed towards the scaling option and the second input including moving the handheld device in an outward direction while pinching on a button or touch-sensitive surface of the handheld device, the virtual object is optionally enlarged in accordance with the movement of the handheld device (e.g., with a magnitude corresponding to the magnitude of movement of the handheld device, and/or a direction corresponding to the direction of the movement of the handheld device).

In some embodiments, in accordance with a determination that the first input was detected while the attention of the user, such as attention of the user 912A in FIG. 9E, was directed to the second representation of the second input mode, the computer system manipulates (1002i) the virtual object according to the second input mode, such as a rotate input mode 918 in FIG. 9E (e.g., the second input mode has optionally one or more characteristics of the first input mode), in accordance with the one or more parameters of the second input, wherein manipulating the virtual object according to the second input mode is different from manipulating the virtual object according to the first input mode. In some embodiments, based on the required input from a handheld device or the user's hand and/or attention of the user for the second input mode, the virtual object is manipulated (e.g., scaled, rotated, or moved) based on the second input mode and the second input. In some embodiments, if the first input includes the pinching gesture while attention of the user is towards a second option in the menu, such as a rotate option, then the virtual object is manipulated according to the second input mode and the second input. For example, based on the first input including the pinching gesture while attention of the user is directed towards the rotate option and the second input including moving the handheld device in an outward direction while pinching on a button or touch-sensitive surface of the handheld device, the virtual object is optionally rotated in accordance with the movement of the handheld device (e.g., with a magnitude corresponding to the magnitude of movement of the handheld device, and/or a direction corresponding to the direction of the movement of the handheld device). Manipulating a virtual object in accordance with different types of inputs (e.g., attention of a user and/or gesture from a physical object) provides more flexibility and options for manipulating the virtual object, thereby improving user-device interaction.

In some embodiments, in response to detecting the second input comprising a movement of a physical object (1004a) (e.g., a hand of the user or a handheld device such as a wand, a wand-like device, a remote control, or a stylus) associated with the user, in accordance with a determination that the first input was detected while the attention of the user was directed to the respective representation of the respective input mode (1004b), in accordance with a determination that a magnitude of the movement (e.g., displacement), such as shown by arrows 930 and 932 in FIG. 9D, of the physical object associated with the user corresponds to a first magnitude, the computer system manipulates (1004c) (e.g., moving, rotating, and/or scaling) the virtual object according to the respective input mode by a second magnitude corresponding to (e.g., proportional to) the first magnitude. In some embodiments, the virtual object is moved (e.g., translated), rotated, and/or scaled based on an amount of displacement of the physical object from an initial position to a final position. For example, based on the physical object being displaced by a first magnitude (e.g., 0.1 cm, 1 cm, 10 cm, or 100 cm), the virtual object is optionally translated (e.g., moved left, right, up, or down) by a second magnitude (e.g., 0.1 cm, 1 cm, 10 cm, or 100 cm). The second magnitude is optionally the same or different than the first magnitude. In some embodiments, the second magnitude is proportional to the first magnitude. For example, the virtual object is optionally translated by the second magnitude, which is 0.5, 1, 1.5, or 10 times the first magnitude corresponding to the displacement of the physical object. In some embodiments, based on the physical object being displaced by a first magnitude, the virtual object is rotated by a second magnitude (e.g., 30, 60, 90, 120, 180, or 360 degrees). In some embodiments, based on the physical object being displaced by a first magnitude, the virtual object is optionally scaled by a second magnitude (e.g., increase or decrease in size by 0.5%, 1%, 10%, 20%, 50%, 100%, or 200%). In some embodiments, based on the physical object being displaced by a first magnitude, the virtual object is rotated by a second magnitude (e.g., 30, 60, 90, 120, 180, or 360 degrees).

In some embodiments, in accordance with a determination that the magnitude of the movement (e.g., displacement), such as shown by arrows 934 and 936 in FIGS. 9F and 9F1, of the physical object associated with the user corresponds to a third magnitude (e.g., different than the first magnitude), the computer system manipulates (1004*d*) (e.g., moving, rotating, and/or scaling) the virtual object according to the respective input mode by a fourth magnitude (e.g., different than the second magnitude) corresponding to (e.g., proportional to) the third magnitude. The fourth magnitude is optionally the same or different as the third magnitude, as described above. In some embodiments, the fourth magnitude is proportional to the third magnitude, as described above. Manipulating a virtual object in accordance with a magnitude of movement of the physical object provides more flexibility and ease of use when manipulating the virtual object, without the need for extra input to control the operation, thereby improving user-device interaction.

In some embodiments, in response to detecting the second input comprising a movement of a physical object (e.g., a hand of the user or a handheld device such as a wand, a wand-like device, a remote control, or a stylus) associated with the user (1006*a*), in accordance with a determination that the first input was detected while the attention of the user was directed to the respective representation of the respective input mode (1006*b*), in accordance with a determination that a direction (e.g., up, down, left, right, clockwise, or counterclockwise) of the movement of the physical object, such as shown by arrows 930 and 932 in FIG. 9D, associated with the user corresponds to a first direction, the computer system manipulates (1006*c*) (e.g., moving, rotating, and/or scaling) the virtual object according to the respective input mode in a second direction corresponding (e.g., proportional to) to the first direction. In some embodiments, the virtual object is moved (e.g., translated), rotated, and/or scaled based on a direction of displacement of the physical object from an initial position to a final position. For example, based on the physical object moving in a leftward direction (e.g., first direction), the virtual object is optionally moved to the left (e.g., second direction) from an initial position. Based on the physical object moving in a rightward direction (e.g., first direction), the virtual object is optionally moved to the right (e.g., second direction) from an initial position. Based on the physical object moving in an upward direction (e.g., first direction), the virtual object is optionally moved up (e.g., second direction) from an initial position. Based on the physical object moving in a downward direction (e.g., first direction), the virtual object is optionally moved down (e.g., second direction) from an initial position. In some embodiments, based on the physical object moving in a leftward direction (e.g., first direction), the virtual object rotates in a counterclockwise direction (e.g., second direction). Based on the physical object moving in a rightward direction (e.g., first direction), the virtual object optionally rotates in a clockwise direction (e.g., second direction). In some embodiments, based on the physical object moving in a leftward direction (e.g., first direction), the virtual object is scaled down (e.g., decreases in size corresponding to a second direction). Based on the physical object moving in a rightward direction (e.g., first direction), the virtual object is optionally scaled up (e.g., increases in size corresponding to a second direction).

In some embodiments, in accordance with a determination that the direction (e.g., up, down, left, right, clockwise, or counterclockwise) of the movement of the physical object), such as shown by arrows 934 and 936 in FIGS. 9F and 9F1, associated with the user corresponds to a third direction (e.g., different than the first direction), the computer system manipulates (1006*d*) (e.g., moving, rotating, and/or scaling) the virtual object according to the respective input mode in a fourth direction (e.g., different than the second direction) corresponding (e.g., proportional to) to the third direction (e.g., similar to as described above). Manipulating a virtual object in accordance with a direction of movement of the physical object provides more flexibility and ease of use when manipulating the virtual object, without the need for extra input to control the operation, thereby improving user-device interaction.

In some embodiments, displaying the user interface further includes displaying the first representation of the first input mode and the second representation of the second input mode, such as in virtual object manipulation user interface 910 in FIG. 9A, at a respective spatial relationship relative to (e.g., within a threshold distance such as 0.1, 1, 2, 3, 4, 5, or 10 cm of) a first portion (e.g., hand), such as left hand 906 in FIG. 9A, of a body of the user (1008). In some embodiments, the first representation of the first input mode and the second representation of the second input mode are displayed in a virtual object manipulation user interface (e.g., menu). The menu with options to manipulate (e.g., move, rotate, and/or scale) the virtual object is optionally displayed within the threshold distance of a hand of the user (e.g., menu displayed above, below, to the left of, or to the right of the hand of the user). Displaying a menu with options for manipulating a virtual object within a threshold distance of a hand of a user ensures efficient access to the menu, thereby improving user-device interaction.

In some embodiments, while displaying the first representation of the first input mode and the second representation of the second input mode at a first location in the user interface, the computer system detects (1010*a*), via the one or more input devices, movement of the first portion of the body of the user, such as shown by arrow 915 in FIG. 9B. In some embodiments, in response to detecting the movement of the first portion (e.g., hand) of the body of the user, the computer system moves (1010*b*) the first representation of the first input mode and the second representation of the second input mode away from the first location in the user interface in accordance with the movement of the first portion of the body of the user (e.g., while maintaining the respective spatial relationship relative to the first portion of the body of the user). As mentioned above, in some embodiments, the first representation of the first input mode and the second representation of the second input mode are displayed in a virtual object manipulation user interface (e.g., menu). Movement of the hand of the user optionally causes corresponding movement of the menu with options to manipulate (e.g., move, rotate, and/or scale) the virtual object. Moving a menu with options for manipulating a virtual object based on movement of a hand of a user ensures efficient access to the menu even when the hand of the user moves, thereby improving user-device interaction.

In some embodiments, displaying the user interface further includes displaying the first representation of the first input mode and the second representation of the second input mode, such as in virtual object manipulation user interface 910 in FIG. 9A, at a respective spatial relationship relative to (e.g., within a threshold distance such as 0.1, 1, 2, 3, 4, 5, or 10 cm of) the virtual object, such as virtual object 904 in FIG. 9A (1012). In some embodiments, the first representation of the first input mode and the second representation of the second input mode are displayed in a virtual object manipulation user interface (e.g., menu). The menu with options to manipulate (e.g., move, rotate, and/or scale) the virtual object is optionally displayed within the threshold distance of the virtual object (e.g., menu displayed above, below, to the left of, or to the right of the virtual object). Displaying a menu with options for manipulating a virtual object within a threshold distance of the virtual object ensures consistent access to the menu, thereby improving user-device interaction.

In some embodiments, while displaying the first representation of the first input mode and the second representation of the second input mode at a first location in the user interface, the computer system detects (1014a), via the one or more input devices, movement of the virtual object, such as shown by arrow 920 in FIG. 9B. In some embodiments, an input for moving the virtual object is optionally from a hand of the user or a handheld device (e.g., a wand or a wand-like device) while attention of the user is directed towards the virtual object. For example, the input including movement of the hand optionally causes (e.g., corresponds) to movement of the virtual while attention of the user is directed towards the virtual object. In some embodiments, the input optionally includes movement of the handheld device, which causes (e.g., corresponds) to movement of the virtual while attention of the user is directed towards the virtual object. In some embodiments, the input for moving the virtual object includes attention directed to the virtual object while a hand of the user performs an air pinch gesture, and while holding the air pinch gesture moves. In some embodiments, the input for moving the virtual object includes attention directed to the virtual object while a hand of the user selects a button or touch-sensitive surface on the wand, and movement of the wand while maintaining the selection.

In some embodiments, in response to detecting the movement of the virtual object, the computer system moves (1014b) the first representation of the first input mode and the second representation of the second input mode away from the first location in the user interface, such as virtual object manipulation menu 910 moving to the left in FIG. 9B from an initial location in FIG. 9A, in accordance with the movement of the virtual object, such as virtual object 904 moving to the left in FIG. 9B (e.g., while maintaining the respective spatial relationship relative to the first portion of the body of the user). As mentioned above, in some embodiments, the first representation of the first input mode and the second representation of the second input mode are displayed in a virtual object manipulation user interface (e.g., menu). Movement of the hand of the user optionally causes corresponding movement of the menu with options to manipulate (e.g., move, rotate, and/or scale) the virtual object. Moving a menu with options for manipulating a virtual object based on movement of the virtual object ensures efficient access to the menu even when the virtual object moves, thereby improving user-device interaction.

In some embodiments, the attention of the user is directed to the first representation of the first input mode in accordance with a determination that a gaze of the user, such as attention of the user 912A in FIG. 9C, is directed to the first representation of the first input mode, such as a scale input mode 914 in FIG. 9C (e.g., optionally for longer than a threshold amount of time such as 0.5, 1, 2, 3, 4, 5, 10, or 30 s), and the attention of the user, such as attention of the user 912A in FIG. 9E, is directed to the second representation of the second input mode in accordance with a determination that the gaze of the user is directed to the second representation of the second input mode, such as a rotate input mode 918 in FIG. 9E (1016) (e.g., optionally for longer than the threshold amount of time). In some embodiments, prior to detecting attention directed to a respective representation of a respective mode, the respective representation has a first visual appearance. In some embodiments, in response to detecting attention directed to a respective representation of a respective mode, a visual appearance of the respective representation is updated from the first visual appearance to a second visual appearance. The second visual appearance is optionally more prominent (e.g., brighter, larger, more opaque, or a different color) than the first visual appearance. Moving between options in a menu for manipulating a virtual object based on attention of a user reduces user inputs and provides case of use when selecting options to manipulate the virtual object, thereby improving user-device interaction.

In some embodiments, the selection input comprises input from a first input device (e.g., a wand or a wand-like device), such as handheld device 916 in FIG. 9C, in communication with the computer system (1018). In some embodiments, the selection input includes an air gesture input from the wand of the user (e.g., twirling or rotating the wand or raising the wand). In some embodiments, the first input is an air gesture input provided by the wand of the user and directed to a respective representation of a respective input mode corresponding to a move, rotate, or scale operation. In some embodiments, the wand (e.g., a tip of the wand) is in direct interaction with (e.g., tapping) the respective representation of a respective input mode. In some embodiments, the wand is a threshold distance (e.g., 0.5, 1, 2, 3, 4, 5, 10, or 100 cm) away from a respective representation of a respective input mode while the tip of the want is pointing towards the respective representation of the respective input mode. In some embodiments, the selection input includes detecting pinching on the wand (e.g., a button or touch-sensitive surface of the wand) while attention of the user is directed to a respective representation of a respective input mode corresponding to a move, rotate, or scale operation. Selecting an option for manipulating a virtual object using a handheld device of a user provides flexibility and provides more precise control when manipulating the virtual object, thereby improving user-device interaction.

In some embodiments, the selection input comprises input from a first portion (e.g., hand), such as right hand 908 in FIG. 9C, of a body of the user (1020). In some embodiments, the selection input includes an air gesture input from the hand of the user. In some embodiments, the first input is an air gesture input provided by the hand of the user and directed to a respective representation of a respective input mode corresponding to a move, rotate, or scale operation. In some embodiments, the hand of the user is in direct interaction with (e.g., tapping) the respective representation of a respective input mode. In some embodiments, the hand of the user is a threshold distance (e.g., 0.5, 1, 2, 3, 4, 5, 10, or 100 cm) away from a respective representation of a respective input mode while pointing towards the respective representation of the respective input mode (e.g., with an index finger of the hand). In some embodiments, the air gesture input provided by the hand of the user includes a pinching air gesture in which a thumb and index finger of the hand move toward each other and touch while attention of the user is directed to a representation of an input mode corresponding to a move, rotate, or scale operation. Selecting an option for manipulating a virtual object using a hand of a user provides flexibility and provides more precise control when manipulating the virtual object, thereby improving user-device interaction.

In some embodiments, before detecting the selection input while the attention of the user is directed to the respective representation of the respective input mode, the computer system displays (1022a) the respective representation of the respective input mode with a first visual appearance, such as visual appearance of scale input mode in FIG. 9B.

In some embodiments, in response to detecting the selection input while the attention of the user is directed to the respective representation of the respective input mode, the computer system updates (1022b) a visual appearance of the respective representation of the respective input mode, such as a visual appearance of a scale input mode in FIG. 9B (e.g., to indicate that a hand of the user or a wand or a wand-like device of the user is engaged with the respective input mode or to indicate that the respective input mode is locked in) to have a second visual appearance, such as a visual appearance of a scale input mode 914 in FIG. 9C, different from the first visual appearance. In some embodiments, the second visual appearance is different than the first visual appearance. In some embodiments, the second visual appearance is more prominent (e.g., brighter, larger, more opaque, or a different color) than the first visual appearance. In some embodiments, the second visual appearance corresponding to the hand of the user or a wand or a wand-like device of the user being engaged with the respective input mode is different than the second visual appearance corresponding to the attention (e.g., gaze or first input device) of the user directed to the respective representation of the respective input mode, as described in step(s) 1016 and later described in step(s) 1024. In some embodiments, the second visual appearance corresponding to the hand of the user or a wand or a wand-like device of the user being engaged with the respective input mode is more prominent (e.g., brighter, larger, more opaque, or a different color) than the second visual appearance corresponding to the attention (e.g., gaze or first input device) of the user directed to the respective representation of the respective input mode, as described in step(s) 1016 and later described in step(s) 1024. Updating a visual appearance of a respective representation of a respective input mode when a first input device (e.g., a wand) or a first portion (e.g., a hand) of a body of a user is engaged with the respective input mode provides visual feedback, thereby informing the user of a current status associated with user input and preventing the user from providing future input resulting in potential errors.

In some embodiments, the attention of the user, such as attention of the user 912b in FIG. 9C, is directed to the first representation of the first input mode in accordance with a determination that a first input device (e.g., a wand or wand-like device), such as the handheld device 916 in FIG. 9C, in communication with the computer system is directed to (e.g., pointed at) the first representation of the first input mode (e.g., for longer than a threshold amount of time such as 0.5, 1, 2, 3, 4, 5, 10, or 30 s), and the attention of the user, such as attention of the user 912b in FIG. 9E, is directed to the second representation of the second input mode in accordance with a determination that the first input device (e.g., a wand or wand-like device), such as the handheld device 916 in FIG. 9E, in communication with the computer system is directed to (e.g., pointed at) the second representation of the second input mode (1024) (e.g., for longer than the threshold amount of time). Moving between options in a menu for manipulating a virtual object based on orientation of a first input device (e.g., a wand or a wand-like device) of a user reduces user inputs and provides ease of use when selecting options to manipulate the virtual object, thereby improving user-device interaction.

In some embodiments, while displaying the user interface (1026a), while the first input device in communication with the computer system is directed to the first representation of the first input mode, the computer system displays (1026b) a visual indication (e.g., simulated light such as a spotlight or a colored marker), such as visual indication 913 in FIG. 9C, at a location of the first representation of the first input device indicating that the first input device is directed to (e.g., pointing at, in direct interaction with, or within a threshold distance such as 0.5, 1, 2, 3, 4, 5, 10, or 100 cm of) the first representation of the first input mode (e.g., selection of the first input mode via a wand or wand-like device). In some embodiments, while the first input device in communication with the computer system is directed to the second representation of the second input mode, the computer system displays (1026c) the visual indication, such as visual indication 913 in FIG. 9E, at a location of the second representation of the second input device indicating that the first input device is directed to (e.g., pointing at, in direct interaction with, or within the threshold distance of) the second representation of the second input mode (e.g., selection of the second input mode via a wand or wand-like device). In some embodiments, the visual indication is overlaid on the first representation of the first input mode or the second representation of the second input mode. Displaying a visual indication corresponding to an orientation of a first input device (e.g., a wand) provides visual feedback, thereby informing the user of a current status associated with user input and preventing the user from providing future input resulting in potential errors.

In some embodiments, the selection input comprises an input detected, such as at a button or touch-sensitive surface 926, at the first input device (1028) (e.g., a wand or a wand-like device). In some embodiments, the selection input includes detecting pinching on the wand (e.g., a button or touch-sensitive surface of the wand) while attention of the user is directed to a virtual object and/or a respective representation of a respective input mode corresponding to a move, rotate, or scale operation. Selecting an option for manipulating a virtual object using a handheld device of a user provides flexibility and provides more precise control when manipulating the virtual object, thereby improving user-device interaction.

In some embodiments, in response to detecting the second input (1030a), in accordance with a determination that the first input was detected while the attention of the user was directed to the respective representation of the respective input mode, the computer system manipulates (1030*b*) the virtual object according to the respective input mode in accordance with one or more parameters of the second input, wherein manipulating the virtual object according to the respective input mode in accordance with the one or more parameters of the second input comprises translating (e.g., moving the virtual object with respect to the x-axis, y-axis, or z-axis, such as up, down, left, or right relative to the user interface), rotating (e.g., with respect the to the x-axis, y-axis, or z-axis such as clockwise or counterclockwise relative to the user interface), and/or scaling (e.g., with respect to the x-axis, y-axis, or z-axis such as an increase or decrease in size relative to the user interface) the virtual object, such as the moving, scaling, and/or rotating options in a virtual object manipulation user interface 910 in FIG. 9A. In some embodiments, while attention of the user is directed towards the virtual object, the virtual object is manipulated (e.g., moved, rotated, and/or scaled) based on movement of a physical object such as a hand of the user or a handheld device (e.g., a wand or a wand-like device). In some embodiments, virtual object is manipulated relative to a starting orientation of the physical object relative to the user interface when attention of the user is initially detected at the virtual object. Manipulating a virtual object in accordance with different types of operations (e.g., move, rotate, and/or scale) provides more flexibility and options for manipulating the virtual object, thereby improving user-device interaction.

In some embodiments, in response to detecting the second input (1032*a*), in accordance with a determination that the first input was detected while the attention of the user was directed to the respective representation of the respective input mode, the computer system manipulates (1032*b*) the virtual object according to the respective input mode in accordance with one or more parameters of the second input (e.g., such as described with reference to step(s) 1028). In some embodiments, while manipulating the virtual object according to the respective input mode in accordance with the one or more parameters of the second input, in accordance with a determination that the attention of the user, such as attention of the user 912A in FIG. 9D, has moved away from the respective representation of the respective input mode after the first input was detected, the computer system continues (1032*c*) manipulating the virtual object according to the respective input mode, such as scale input mode 914 in FIG. 9D, in accordance with the one or more parameters of the second input. As mentioned above, detecting (e.g., receiving) the first input (e.g., selection input) is optionally indicative of a hand of a user or a handheld device (e.g., a wand or a wand-like device) engaged with the respective input mode. In some embodiments, despite gaze of the user having moved away from a respective representation of the respective input mode, manipulation of the virtual object according to the respective input mode optionally continues because the hand of the user or the handheld device is already locked in or engaged with the respective input mode, and optionally continues until the hand of the user of the handheld device is no longer engaged with the respective input mode (e.g., the hand of the user release an air pinch gesture by the thumb and index finger of the hand moving apart and no longer touching, or the hand of the user releases a press of a button or touch-sensitive surface on the handheld device). Continuing manipulation of a virtual object despite attention of a user having moved away from a respective input mode indication allows the user to focus on how the manipulation is affecting the virtual object, thereby reducing errors in manipulation and improving user-device interaction.

In some embodiments, in response to detecting the second input (1034*a*) (e.g., movement of a hand of a user or the handheld device such as a wand for manipulating the virtual object), in accordance with a determination that the first input includes detecting the attention of the user directed to the respective representation of the respective input mode (1034*b*), in accordance with a determination that the attention of the user moved away from the respective representation of the respective input mode before an end of the first input was detected and that the end of the first input was detected within a threshold amount of time (e.g., 0.1, 1, 10, or 100 s) of the attention of the user, such as the attention of the user 912A in FIG. 9D, moving away from the respective representation of the respective input mode, the computer system manipulates (1034*c*) the virtual object according to the respective input mode, such as scale input mode 914 in FIG. 9D, in accordance with the one or more parameters of the second input. Detecting (e.g., receiving) the first input (e.g., selection input) is optionally indicative of a hand of a user or a handheld device (e.g., a wand or a wand-like device) engaged with the respective input mode. In some embodiments, the end of the first input including a pinch from the hand of user (e.g., pinching air gesture in which a thumb and index finger of the hand move toward each other and touch) or the handheld device (e.g., pinch at least a portion such as a button of the handheld device), as described with respect to step(s) 1018 and 1020, is not received when the attention of the user is directed to the respective representation. In some embodiments, even though the pinch from the hand of user or the handheld device is received after the attention of the user is directed away from the respective representation, if the pinch from the hand of the user or the handheld device is received within the threshold amount of time of the attention of the user moving away from the respective representation, then the hand of the user or handheld device of the user is engaged with the respective input mode (e.g., respective input mode is locked in) for manipulation of the virtual object.

In some embodiments, in accordance with a determination that the attention of the user moved away from the respective representation of the respective input mode before an end of the first input was detected and that the end of the first input was detected after the threshold amount of time (e.g., 0.1, 1, 10, or 100 s) of the attention of the user, such as the attention of the user 912A in FIG. 9D, moving away from the respective representation of the respective input mode (e.g., if the end of the first input including the completion of the pinch from the hand of the user or the handheld device is not received or received after the threshold amount of time of the attention of the user moving away from the respective representation), the computer system forgoes (1034*d*) manipulating the virtual object, such as forgoing manipulating virtual object 904 if the end of a first input from right hand 908 and/or handheld device 916 is received after a threshold amount of time in FIG. 9D, according to the respective input mode in accordance with the one or more parameters of the second input. Manipulating a virtual object despite receiving the first input after the attention of the user moved away from the respective input mode but within a threshold time of the attention of the user moving away from the respective input mode allows the user to focus on how the manipulation is affecting the virtual object rather than having to maintain attention at the respective representation during and/or after the first input is detected, thereby reducing errors in manipulation and improving user-device interaction.

In some embodiments, before displaying the first representation of the first input mode and the second representation of the second input mode (e.g., the first representation and the second representation are optionally displayed in a menu such as a virtual object manipulation user interface), the computer system detects (1036*a*) that the attention of the user is directed to the virtual object. In some embodiments, while (and/or in response to) the attention of the user is directed to the virtual object, in accordance with a determination that one or more criteria are satisfied, including a criterion that is satisfied when a first portion (e.g., hand) of a body of the user is in a first pose, such as a pose of the left hand 906 in FIG. 9A (e.g., hand is raised or an index finger of the hand is raised and/or the hand is in a ready state), the computer system displays (1036*b*), in the user interface, the first representation of the first input mode and the second representation of the second input mode, such as in virtual object manipulation user interface 910 in FIG. 9A. In some embodiments, the menu with options to manipulate (e.g., move, rotate, and/or scale) the virtual object is displayed when detecting a handheld device (e.g., a wand or a wand-like device) in a first pose (e.g., pointing at the virtual object). Displaying a menu with options for manipulating a virtual object based on detecting a pose associated with a hand of a user reduces user input needed to display the menu and simplifies the process of selecting manipulation options, thereby improving user-device interaction.

In some embodiments, while displaying the first representation of the first input mode and the second representation of the second input mode, such as in a virtual object manipulation user interface 910 in FIG. 9A, in accordance with a determination that the one or more criteria are no longer satisfied, the computer system ceases (1038) display of the first representation of the first input mode and the second representation of the second input mode in the user interface, such as ceasing display of a virtual object manipulation user interface 910 if left hand 906 is not in first pose in FIG. 9A. In some embodiments, the one or more criteria are not satisfied when the hand of the user or the handheld device is not in the first pose (e.g., the hand or the handheld device are not raised in front of the user) for initiating display of the menu with options to manipulate (e.g., move, rotate, and/or scale) the virtual object. Ceasing displaying of an unnecessary user interface element (e.g., menu with options for manipulating a virtual object) when a pose associated with a hand of a user is not detected frees up space for display in a user interface, and reduces clutter.

It should be understood that the particular order in which the operations in method 1000 have been described is merely exemplary and is not intended to indicate that the described order is the only order in which the operations could be performed. One of ordinary skill in the art would recognize various ways to reorder the operations described herein.

FIGS. 11A-11H illustrate examples of a computer system manipulating a virtual object directly or indirectly in accordance with some embodiments.

Figure 11A:
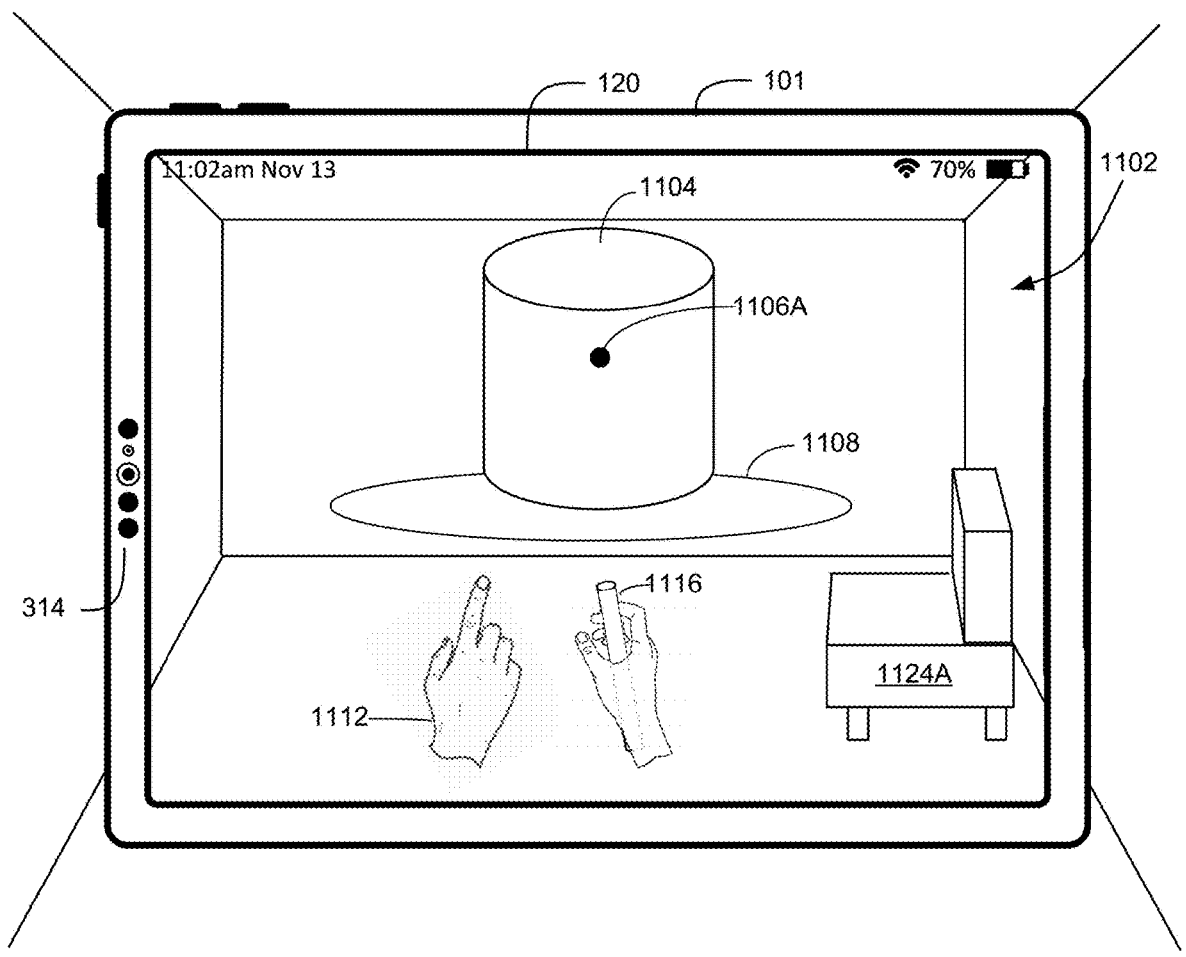
FIGS. 11A-11H illustrate manipulating a virtual object directly or indirectly in accordance with some embodiments.

FIG. 11A illustrates a computer system 101 displaying, via a display generation component (e.g., display generation component 120 of FIG. 1), a three-dimensional environment 1102. As described above with reference to FIGS. 1-6, the computer system 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user) such as movements that are interpreted by the computer system as gestures such as air gestures, and/or gaze of the user (e.g., internal sensors facing inwards towards the face of the user).

As shown in FIG. 11A, the computer system 101 captures one or more images of the physical environment around computer system 101 (e.g., operating environment 100), including one or more objects (e.g., couch 1124A) in the physical environment around computer system 101. In some embodiments, the computer system 101 displays representations of the physical environment in three-dimensional environment 1102 or portions of the physical environment are visible via the display generation component 120 of computer system 101. For example, three-dimensional environment 1102 includes the couch 1124A, portions of the left and right walls, the ceiling, and the floor in the physical environment of the user.

In FIG. 11A, three-dimensional environment 1102 includes a virtual object 1104 (e.g., such as a virtual cylinder, virtual clock, virtual ball, virtual car, or any other virtual object that is manipulable), a virtual surface 1108 (e.g., platter), and a physical object associated with the user (e.g., such as a right hand 1112 of the user and a handheld device 1116), as described with reference to method 1200. In some embodiments, the computer system 101 displays the virtual surface 1108 (e.g., platter) relative to (e.g., below) the virtual object 1104 with or without the attention of the user 1106A being directed towards the virtual object 1104. In some embodiments, the computer system 101 displays the virtual surface 1108 (e.g., platter) relative to (e.g., below) the virtual object 1104 based on the right hand 1112 of the user and/or a handheld device 1116 being outside a threshold distance with reference to method 1200 (e.g., the right hand 1112 of the user and/or a handheld device 1116 being 0.1, 1, 10, 100, 1,000 or 10,000 cm away from the virtual object 1104). The handheld device 1116 optionally includes a wand or a wand-like device (e.g., as described with respect to a physical object of method 1200).

From FIG. 11A to 11B, the computer system 101 receives input corresponding to the attention of the user 1106A directed to a region associated with the virtual surface 1108 (e.g., a region slightly below the virtual surface 1108). Based on the attention of the user 1106A directed to the region associated with the virtual surface 1108, the computer system 101 displays a virtual object manipulation user interface 1110 including one or more options, such as a move option, a scale option, and/or a rotate option 1114, as shown in FIG. 11B.

Figure 11B:
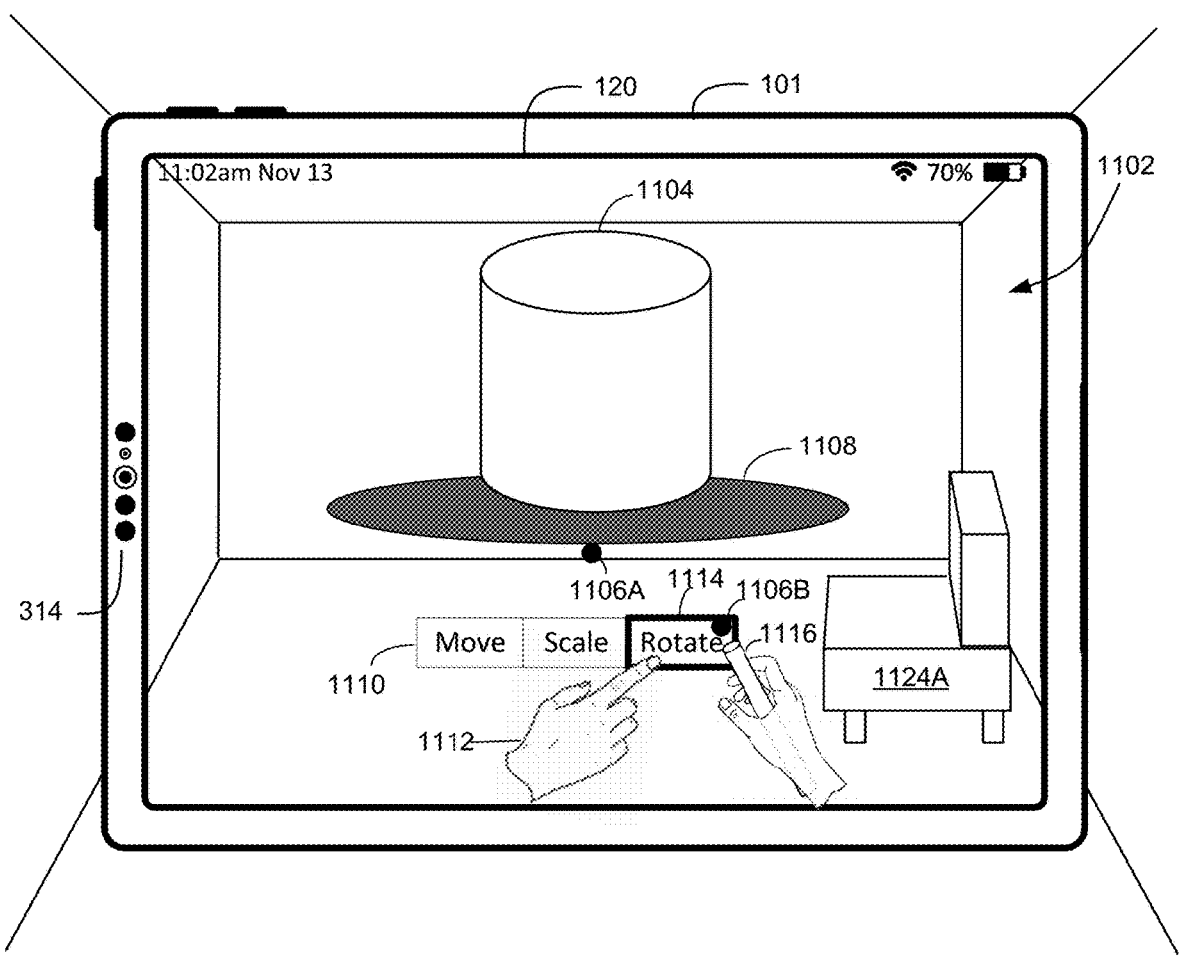

FIG. 11B illustrates the computer system 101 receive input corresponding to the rotate option 1114 from the virtual object manipulation user interface 1110. In some embodiments, the input includes the right hand 1112 of the user directed (e.g., pointing or oriented) towards the rotate option 1114. In some embodiments, the input includes the handheld device 1116 (e.g., a wand or a wand-like device)

of the user directed (e.g., pointing or oriented) towards the rotate option 1114. In some embodiments, the input includes the right hand 1112 of the user or the handheld device 1116 directed (e.g., pointing or oriented) towards the rotate option 1114 while the attention of the user 1106B is directed towards the rotate option 1114. In some embodiments, the input includes a pinching on a button or a touch-sensitive surface of the handheld device 1116 via the right hand 1112 of the user while the attention of the user 1106B is directed towards the rotate option 1114. In some embodiments, the input includes the right hand 1112 of the user in an air pinch gesture (e.g., the thumb and index finger of the right hand 1112 moving together and touching) while the attention of the user 1106B is directed towards the rotate option 1114. Based on receiving the input directed towards the rotate option 1114, the computer system 101 updates a visual appearance of the rotate option 1114 (as shown by the black outline around the rotate option 1114) as described with reference to method 1200.

After receiving input corresponding to the rotate option 1114, the computer system 101 optionally manipulates the virtual object 1104 based on receiving additional input corresponding to manipulating the virtual object 1104 according to the rotate option 1114 (as described with reference to method 1200). In some embodiments, the additional input includes movement of the right hand 1112 of the user or movement of the handheld device 1116. For example, based on the right hand 1112 of the user in FIG. 11C moving to the left relative to a position of the right hand 1112 of the user in FIG. 11B (as shown by arrow 1120), the computer system 101 optionally rotates the virtual object 1104 to the left or counterclockwise in FIG. 11C (as shown by arrow 1107) compared to FIG. 11B. For example, based on the handheld device 1116 in FIG. 11C moving to the left relative to a position of the handheld device 1116 in FIG. 11B (as shown by arrow 1122), the computer system 101 optionally rotates the virtual object 1104 to the left or counterclockwise in FIG. 11C (as shown by arrow 1107) compared to FIG. 11B. It can be appreciated that when the right hand 1112 of the user and/or the handheld device 1116 are away from the virtual object 1104 (e.g., the right hand 1112 of the user and/or the handheld device are outside the threshold distance (e.g., 0, 0.01, 0.1, 1, 10, or 100 cm) with reference to method 1200), the computer system 101 optionally manipulates the virtual object 1104 with a second degree of constraint on the movement of the virtual object 1104 as described with reference to method 1200. For example, the computer system 101 optionally manipulates the virtual object in up to three degrees of freedom (as shown by 1118). In some embodiments, manipulating the virtual object 1104 from a distance or indirectly includes rotating the virtual object 1104. In some embodiments, the computer system 101 rotates the virtual object 1104 with respect to the x-axis, rotates the virtual object 1104 with respect to the y-axis, and/or rotates the virtual object 1104 with respect to the z-axis. However, in some embodiments, manipulating the virtual object 1104 from a distance or indirectly when the rotation input mode is selected does not include translating the virtual object 1104 (e.g., with respect to the x-axis, y-axis, and/or z-axis).

In some embodiments, despite the attention of the user moving away from the rotate option 1114, rotation of the virtual object 1104 continues because the right hand 1112 of the user or the handheld device 1116 is already locked in or engaged with the scale input mode 1114 (e.g., the right hand 1112 of the user is in an air pinch hand shape such that the thumb and index finger of the right hand 1112 are together and touching, or the right hand 1112 of the user is pressing a button or touch-sensitive surface on the handheld device 1116). In some embodiments, when the right hand 1112 of the user or the handheld device 1116 is already locked in or engaged with the rotate option 1114, a visual appearance of the rotate option 1114 is updated (shown by the black fill in FIG. 11C) compared to the visual appearance of the rotate option 1114 in FIG. 11B. In some embodiment, manipulation of the virtual object 1104 according to the rotate option 1114 continues until the right hand 1112 of the user or the handheld device 1116 is no longer engaged with the rotate option 1114 (e.g., the right hand 1112 of the user release an air pinch hand shape by the thumb and index finger of the hand moving apart and no longer touching, or the right hand 1112 of the user releases a press of the button or touch-sensitive surface on the handheld device 1116).

Figure 11C:
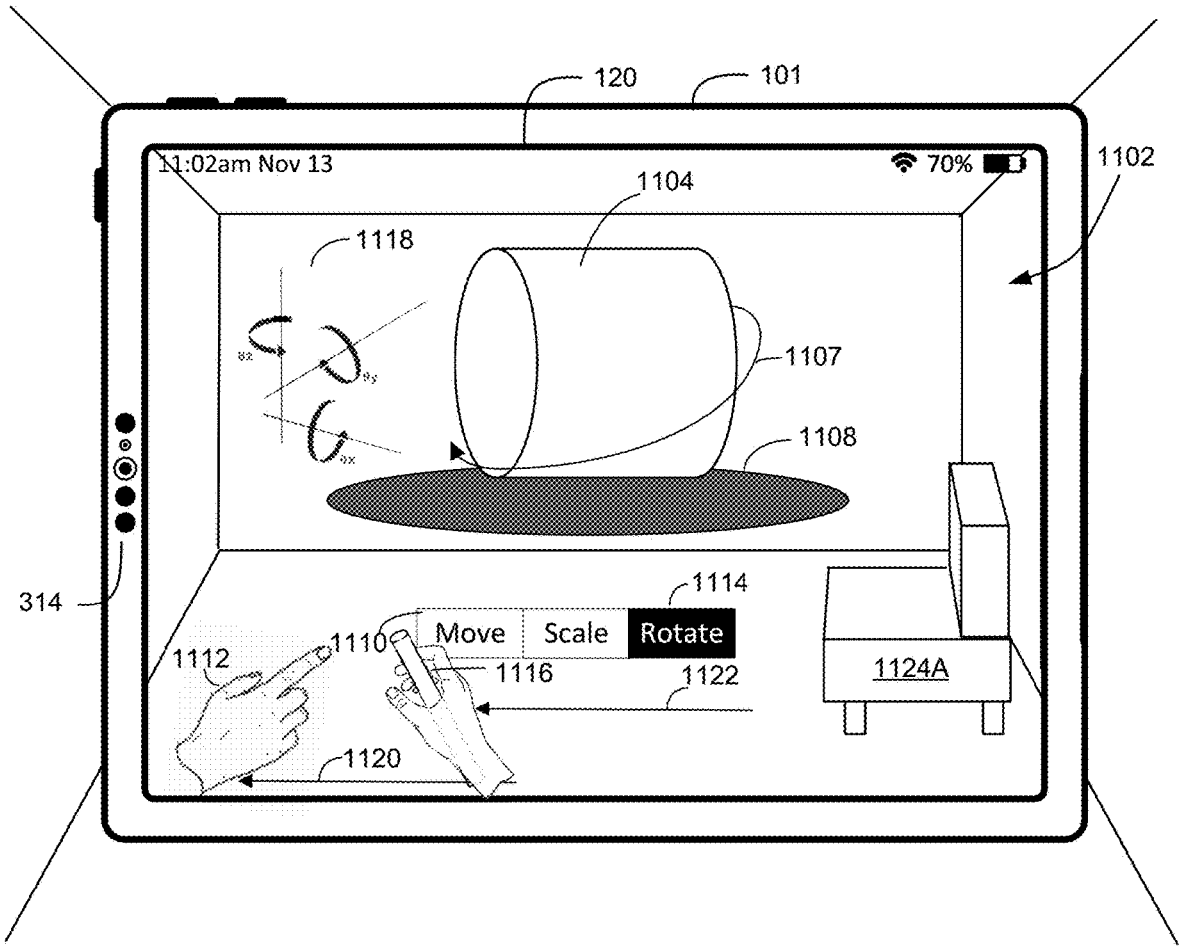
Figure 11D:
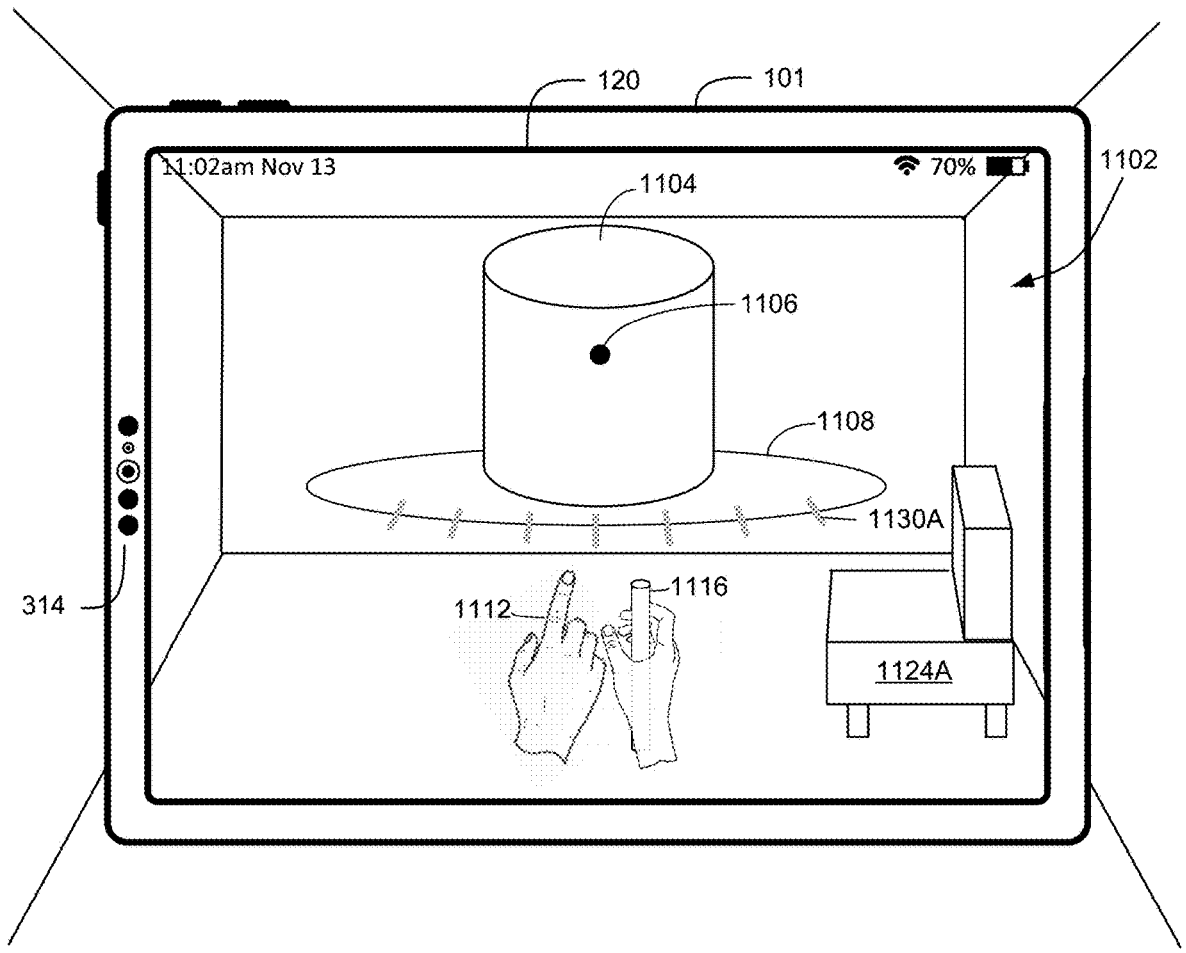

Based on the virtual surface 1108 being displayed according to the attention of the user 1106 directed to the virtual object 1104, FIG. 11D illustrates the attention of the user 1106 remaining at the virtual object 1104 rather than being directed to the region associated with the virtual surface 1108 as described in FIG. 11B. When the attention of the user 1106 remains at the virtual object 1104 (e.g., and the right hand 1112 of the user and/or the handheld device 1116 are outside the threshold distance with reference to method 1200 or away from the virtual object 1104), the computer system 101 optionally displays visual indications 1130A (e.g., rotation notches) along an edge (e.g., bottom edge) of the virtual surface 1108. As illustrated in FIG. 11D, when the right hand 1112 of the user and/or the handheld device 1116 are directed (e.g., pointed) towards a center of the bottom edge of the virtual surface 1108, the computer system 101 displays the visual indications 1130A at a first position relative to the virtual surface 1108 such that the visual indications 1130A are equally spaced along (e.g., the bottom edge of) the virtual surface 1108, centered around the location to which the right hand 1112 of the user and/or the handheld device 1116 is directed.

Figure 11E:
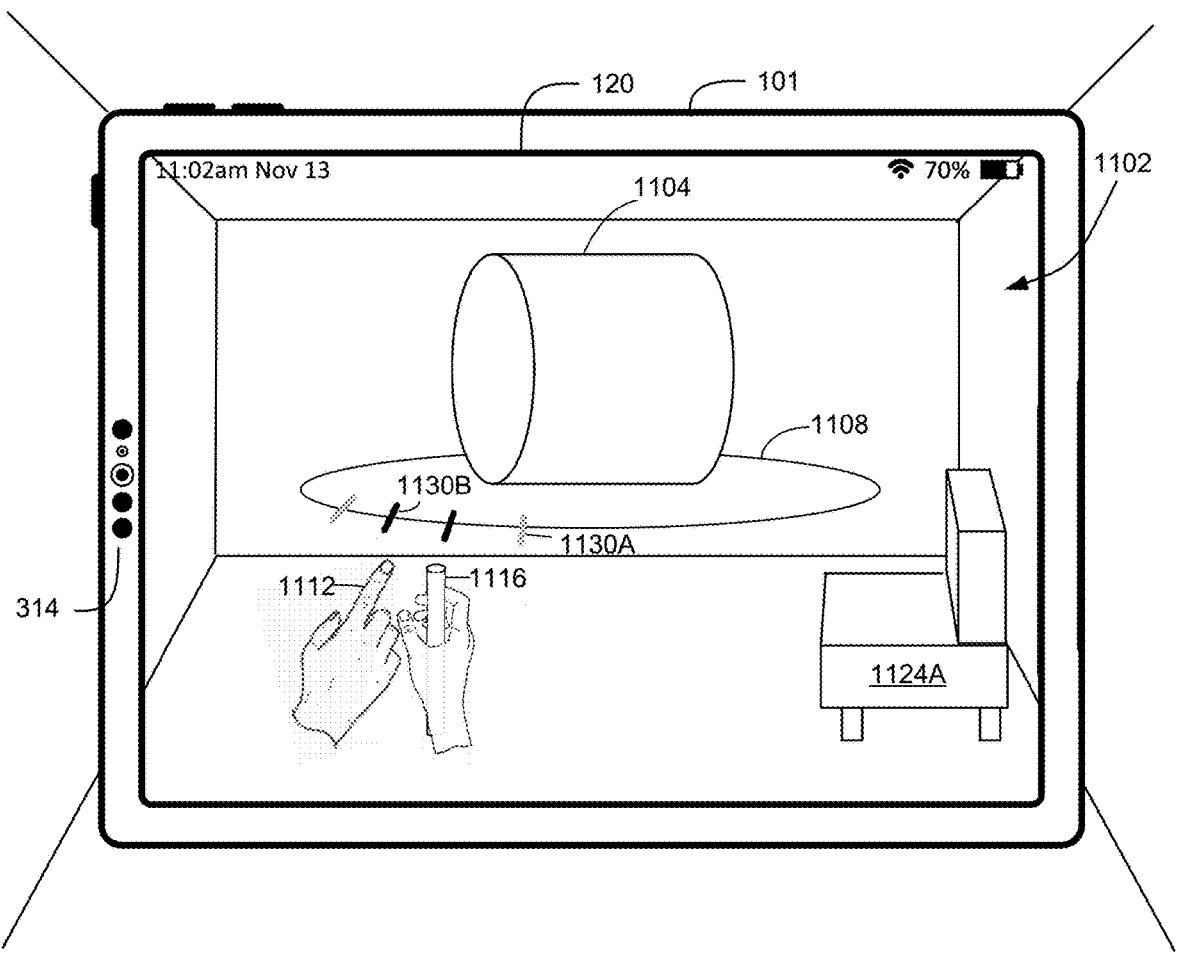

From FIG. 11D to FIG. 11E, the computer system 101 receives input corresponding to movement of the right hand 1112 of the user and/or the handheld device 1116. For example, the right hand 1112 of the user in FIG. 11E has translated to the left relative to a position of the right hand 1112 of the user in FIG. 11D. Additionally or alternatively, the handheld device 1116 in FIG. 11E has translated to the left relative to a position of the left handheld device 1116 in FIG. 11D. In some embodiments, when the right hand 1112 of the user and/or the handheld device 1116 are directed towards a left portion of the virtual surface 1108, the visual indications 1130A are displayed at a second position relative to the virtual surface 1108, such that the left portion of the virtual surface 1108 includes all the visual indications 1130 (as illustrated in FIG. 11E) or a higher number of visual indications 1130A compared to other (e.g., center and/or right) portions of the virtual surface 1108. In some embodiments, when the right hand 1112 of the user and/or the handheld device 1116 are directed towards a left portion of the virtual surface 1108 and a selection input described with reference to method 1200 is detected (e.g., the right hand 1112 of the user in an air pinch hand shape in which the thumb and index finger of the right hand 1112 move toward each other and touch or the right hand 1112 of the user is pinching on a button or a touch-sensitive surface of the handheld device 1116), the visual appearance of at least one of the visual indications 1130A displayed at the left portion of the virtual surface 1108 is updated (e.g., optionally brighter, more opaque, a different color, and/or larger). For example, the visual indications 1130B to which the right hand 1112 of the user and/or the handheld device 1116 are directed, are illustrated with a black fill. Other visual indications 1130A in the left portion of the virtual surface 1108 are not illustrated with a black fill, indicating that the right hand 1112 of the user and/or the handheld device 1116 are not directed to the other visual indications 1130A.

In some embodiments, movement of the right hand 1112 and/or the handheld device 1116 to the left while the selection input is maintained causes virtual surface 1108 to rotate in a counterclockwise direction relative to three-dimensional environment 1102. In some embodiments, the virtual object 1104 correspondingly rotates to the left or counterclockwise based on movement of the right hand 1112 and/or the handheld device 1116 to the left while the selection input is maintained.

From FIG. 11E to FIG. 11F, the computer system 101 receives input corresponding to the right hand 1112 of the user and/or the handheld device 1116 being within the threshold distance (e.g., 0, 0.01, 0.1, 1, 10, or 100 cm) of the virtual object 1104 as described with reference to method 1200. Because the right hand 1112 of the user and/or the handheld device 1116 are within the threshold distance of the virtual object 1104, the computer system 101 in FIG. 11F does not display the virtual surface 1108 from FIGS. 11A-11E. Rather than manipulating the virtual object 1104 from a distance via the virtual surface 1108, the computer system 101 optionally manipulates the virtual object 1104 directly (e.g., without the virtual surface 1108), as will be shown in FIG. 11G.

FIG. 11E1 illustrates similar and/or the same concepts as those shown in FIG. 11E (with many of the same reference numbers). It is understood that unless indicated below, elements shown in FIG. 11E1 that have the same reference numbers as elements shown in FIGS. 11A-11H have one or more or all of the same characteristics. FIG. 11E1 includes computer system 101, which includes (or is the same as) display generation component 120. In some embodiments, computer system 101 and display generation component 120 have one or more of the characteristics of computer system 101 shown in FIGS. 11E and 11A-11H and display generation component 120 shown in FIGS. 1 and 3, respectively, and in some embodiments, computer system 101 and display generation component 120 shown in FIGS. 11A-11H have one or more of the characteristics of computer system 101 and display generation component 120 shown in FIG. 11E1.

In FIG. 11E1, display generation component 120 includes one or more internal image sensors 314a oriented towards the face of the user (e.g., eye tracking cameras 540 described with reference to FIG. 5). In some embodiments, internal image sensors 314a are used for eye tracking (e.g., detecting a gaze of the user). Internal image sensors 314a are optionally arranged on the left and right portions of display generation component 120 to enable eye tracking of the user's left and right eyes. Display generation component 120 also includes external image sensors 314b and 314c facing outwards from the user to detect and/or capture the physical environment and/or movements of the user's hands. In some embodiments, image sensors 314a, 314b, and 314c have one or more of the characteristics of image sensors 314 described with reference to FIGS. 11A-11H.

In FIG. 11E1, display generation component 120 is illustrated as displaying content that optionally corresponds to the content that is described as being displayed and/or visible via display generation component 120 with reference to FIGS. 11A-11H. In some embodiments, the content is displayed by a single display (e.g., display 510 of FIG. 5)

included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 11E1.

Display generation component 120 has a field of view (e.g., a field of view captured by external image sensors 314b and 314c and/or visible to the user via display generation component 120, indicated by dashed lines in the overhead view) that corresponds to the content shown in FIG. 11E1. Because display generation component 120 is optionally a head-mounted device, the field of view of display generation component 120 is optionally the same as or similar to the field of view of the user.

In FIG. 11E1, the user is depicted as performing an air pinch gesture (e.g., with hand 908) to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 11A-11H.

In some embodiments, computer system 101 responds to user inputs as described with reference to FIGS. 11A-11H.

In the example of FIG. 11E1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 11A-11H and/or described with reference to the corresponding method(s) are optionally implemented on computer system 101 and display generation unit 120 in a manner similar or analogous to that shown in FIG. 11E1.

Figure 11F:
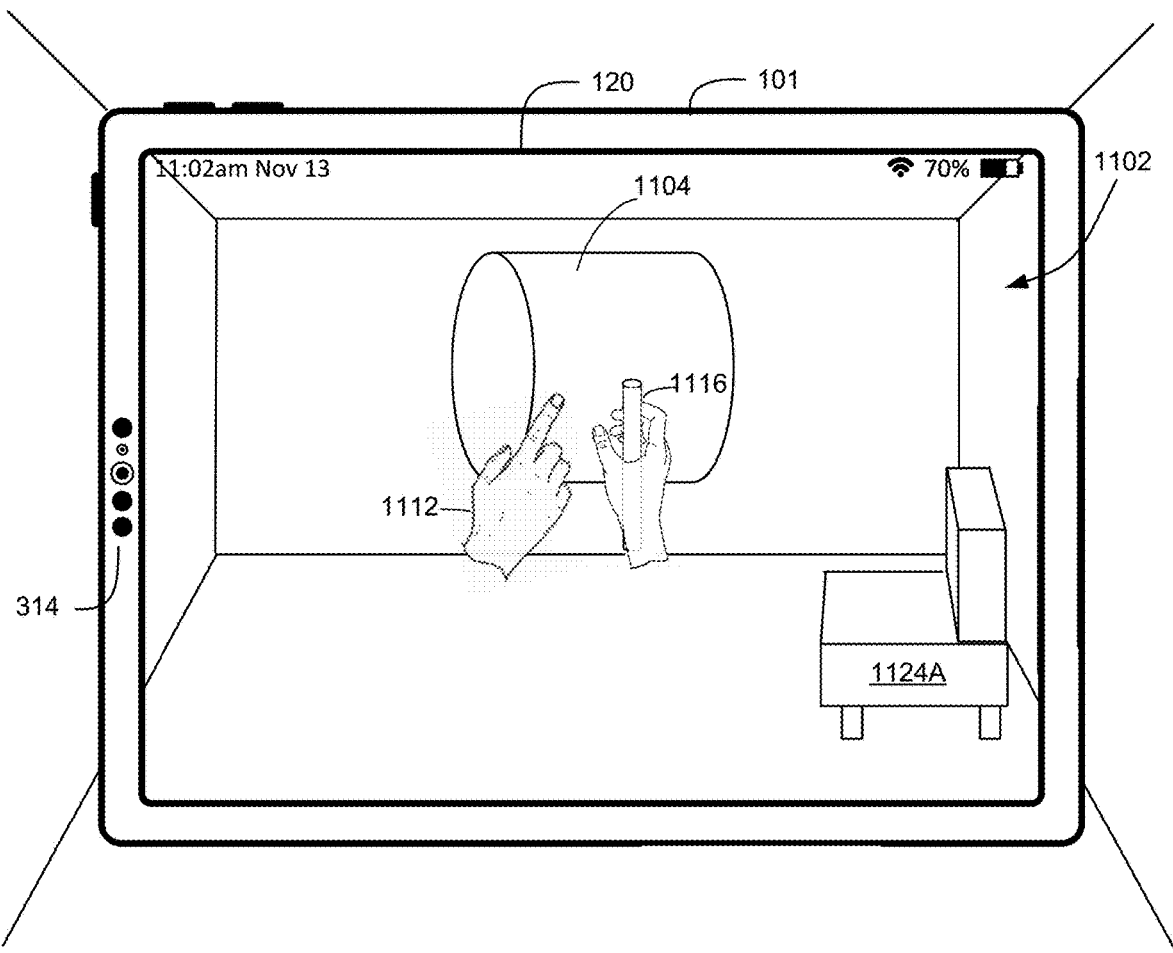
Figure 11G:
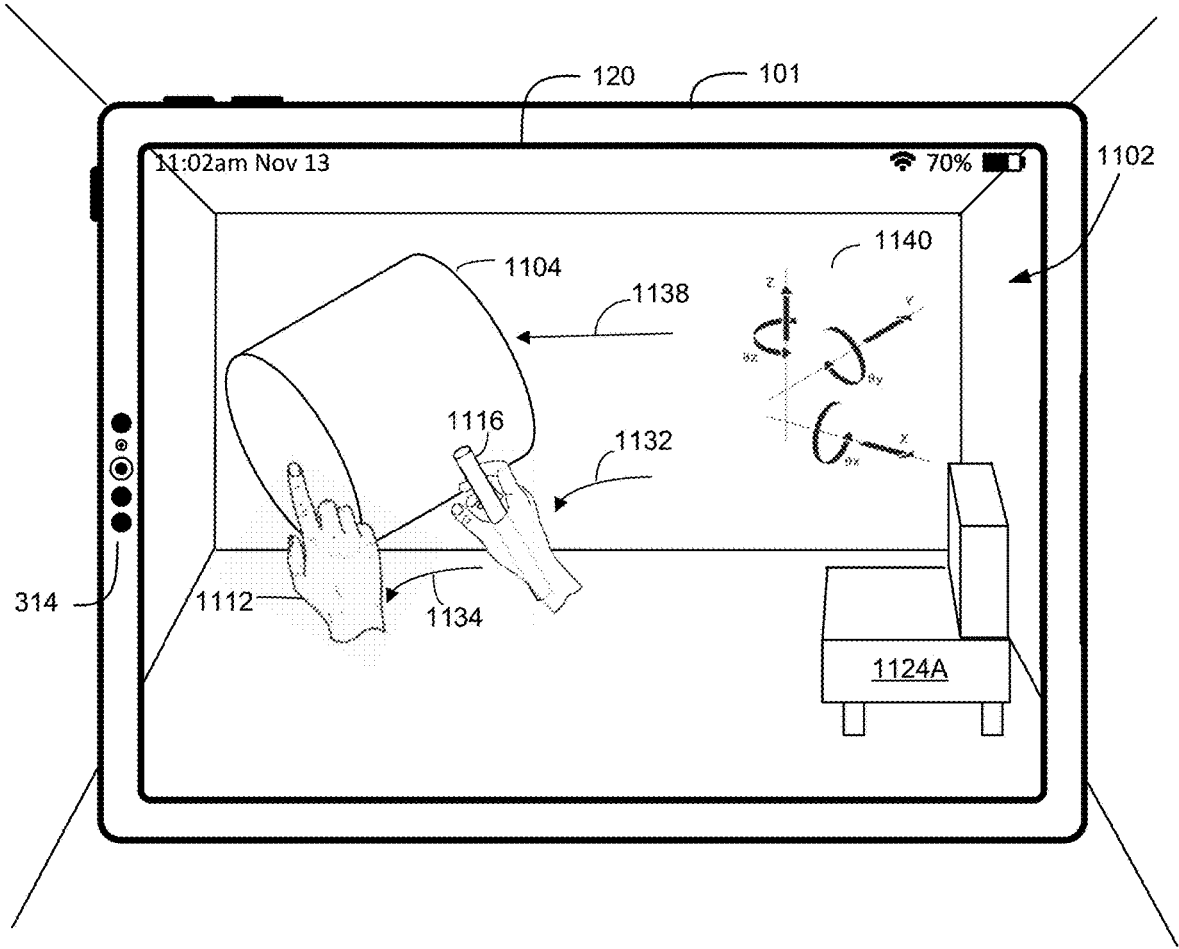

FIG. 11G illustrates movement of the right hand 1112 of the user and/or the handheld device 1116 while the right hand 1112 of the user and/or the handheld device 1116 are within the threshold distance (e.g., 0, 0.01, 0.1, 1, 10, or 100 cm) of the virtual object 1104. While the right hand 1112 of the user and/or the handheld device 1116 are within the threshold distance (e.g., 0, 0.01, 0.1, 1, 10, or 100 cm) of the virtual object 1104, the computer system 101 optionally detects the selection input (e.g., the right hand 1112 of the user in an air pinch hand shape in which the thumb and index finger of the right hand 1112 move toward each other and touch or the right hand of the user 1112 pinching on the button or the touch-sensitive surface of the handheld device 1116), directed towards the virtual object 1104. In some embodiments, the computer system 101 optionally manipulates the virtual object 1104 according to the movement of the right hand 1112 of the user and/or the handheld device 1116. For example, based on the right hand 1112 of the user and/or the handheld device 1116 in FIG. 11G translating to the left and rotating counterclockwise relative to a position of the right hand 1112 and/or the handheld device 1116 in FIG. 11F (as shown by arrows 1132 and 1134), the computer system 101 optionally rotates the virtual object 1104 to the left and counterclockwise in FIG. 11G (as shown by arrow 1138) compared to FIG. 11F. It can be appreciated that when the right hand 1112 of the user and/or the handheld device 1116 are near the virtual object 1104 (e.g., the right hand 1112 of the user and/or the handheld device are within the threshold distance with reference to method 1200), the computer system 101 optionally manipulates the virtual object 1104 with a first degree of constraint on the movement of the virtual object 1104 as described with reference to method 1200. For example, the computer system 101 optionally manipulates the virtual object 1104 in up to six degrees of freedom (as shown by 1140). In some embodiments, manipulating the virtual object 1104 directly includes rotating and/or translating the virtual object 1104. In some embodiments, the computer system 101 rotates the virtual object 1104 with respect to the x-axis, rotates the virtual object 1104 with respect to the y-axis, rotates the virtual object 1104 with respect to the z-axis, translates the virtual object 1104 with respect to the x-axis, translates the virtual object 1104 with respect to the y-axis, and/or translates the virtual object 1104 with respect to the z-axis based on the input from the right hand 1112 of the user and/or the handheld device 1116.

Figure 11H:
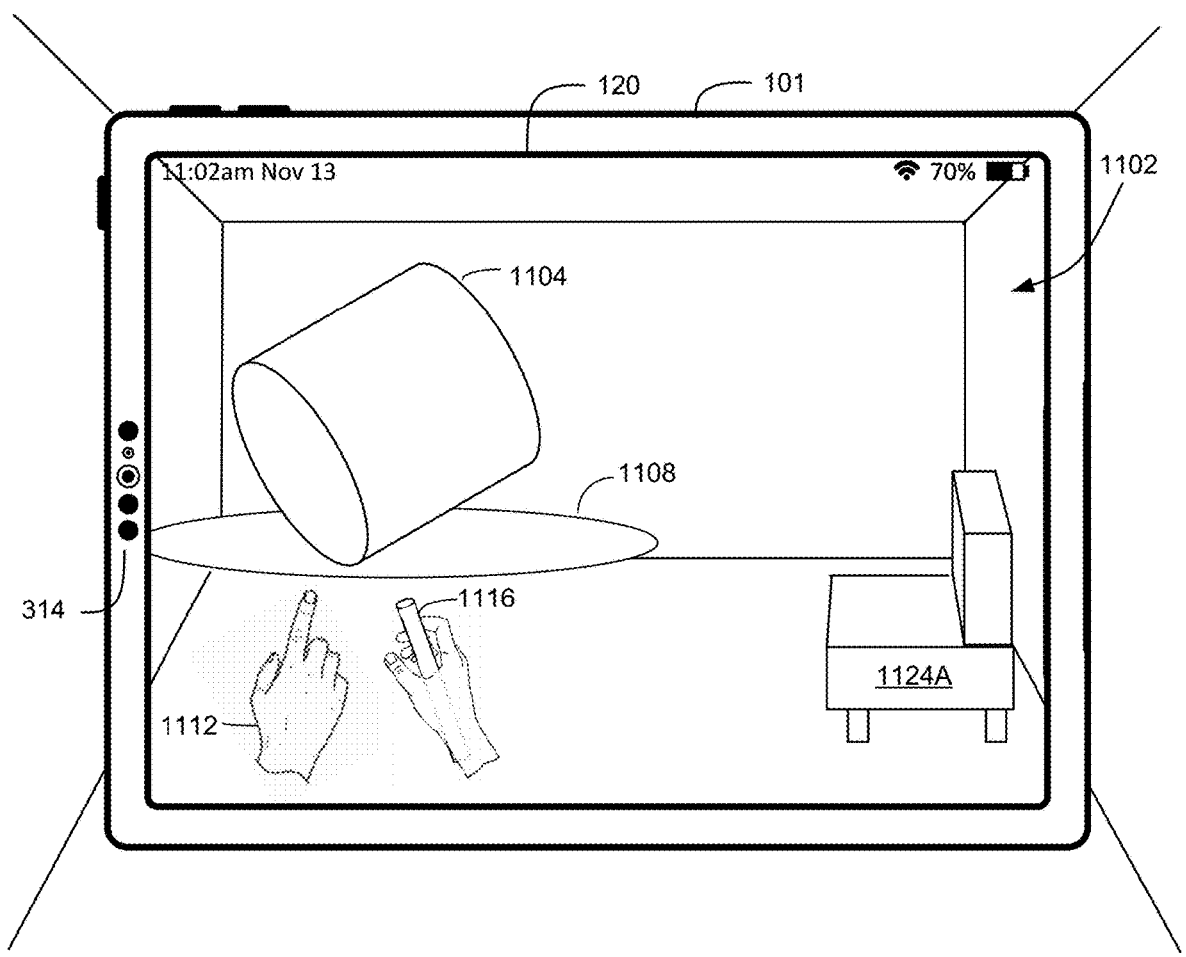
Figure 12A:
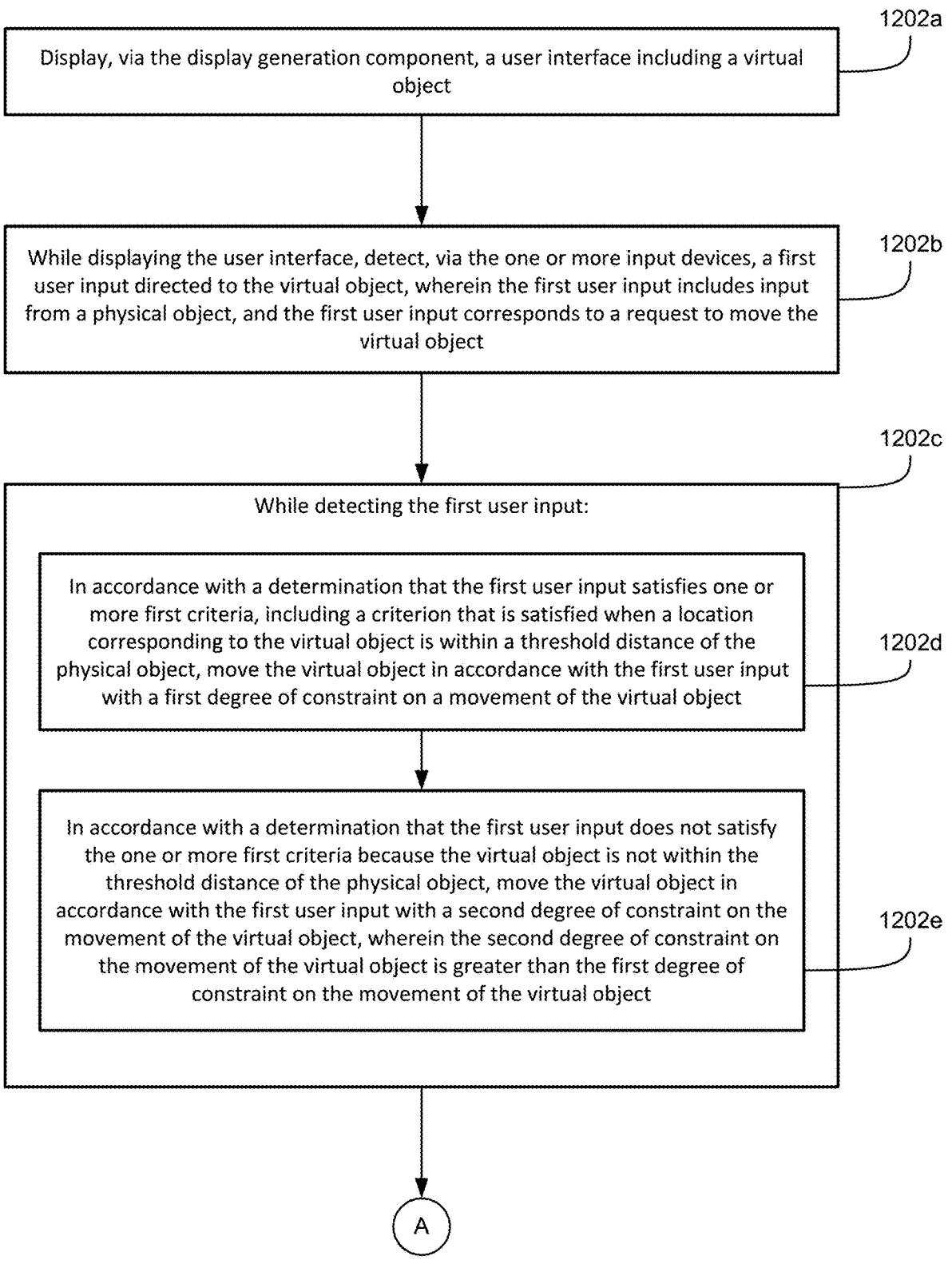
Figure 12B:
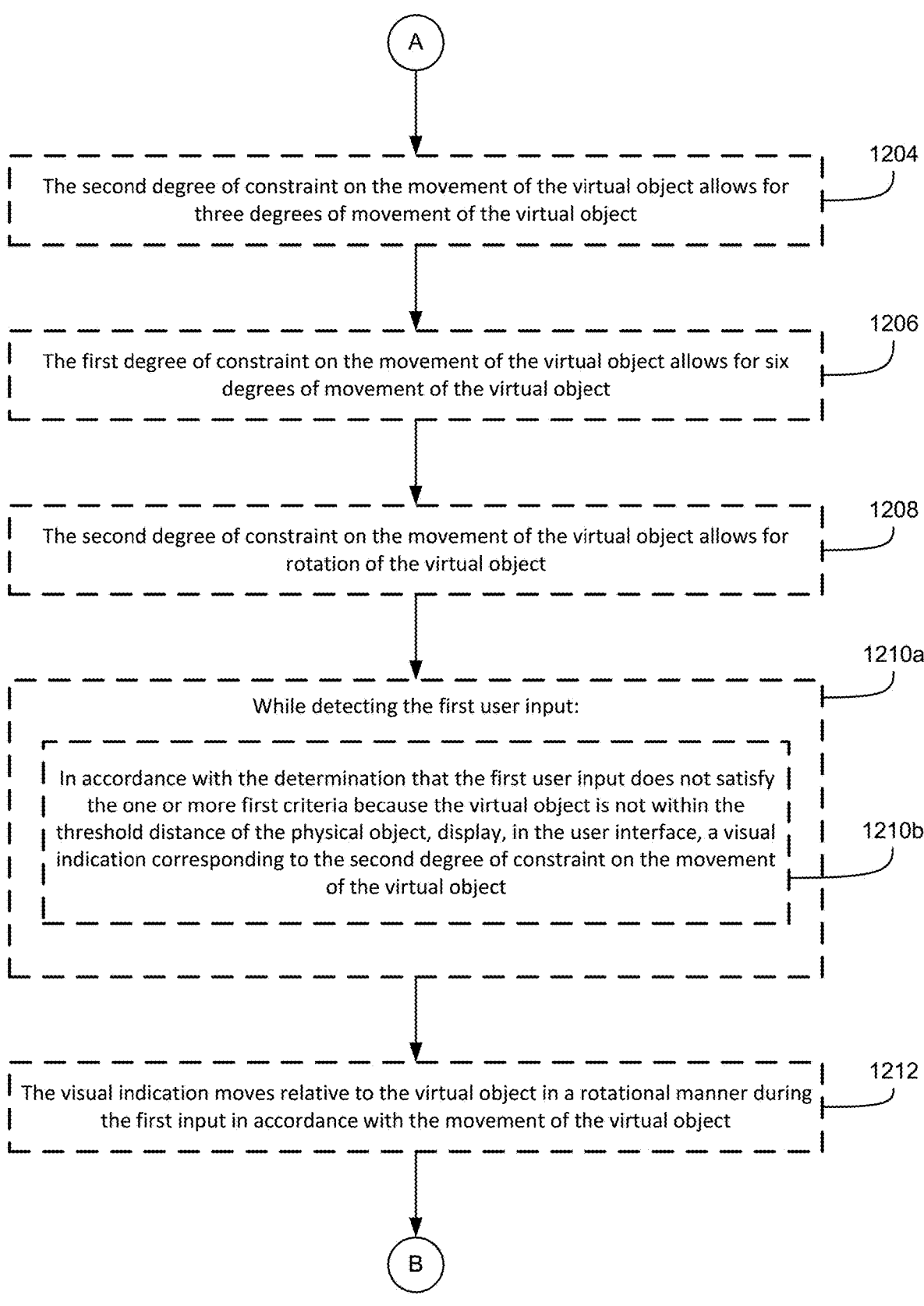
Figure 12E:
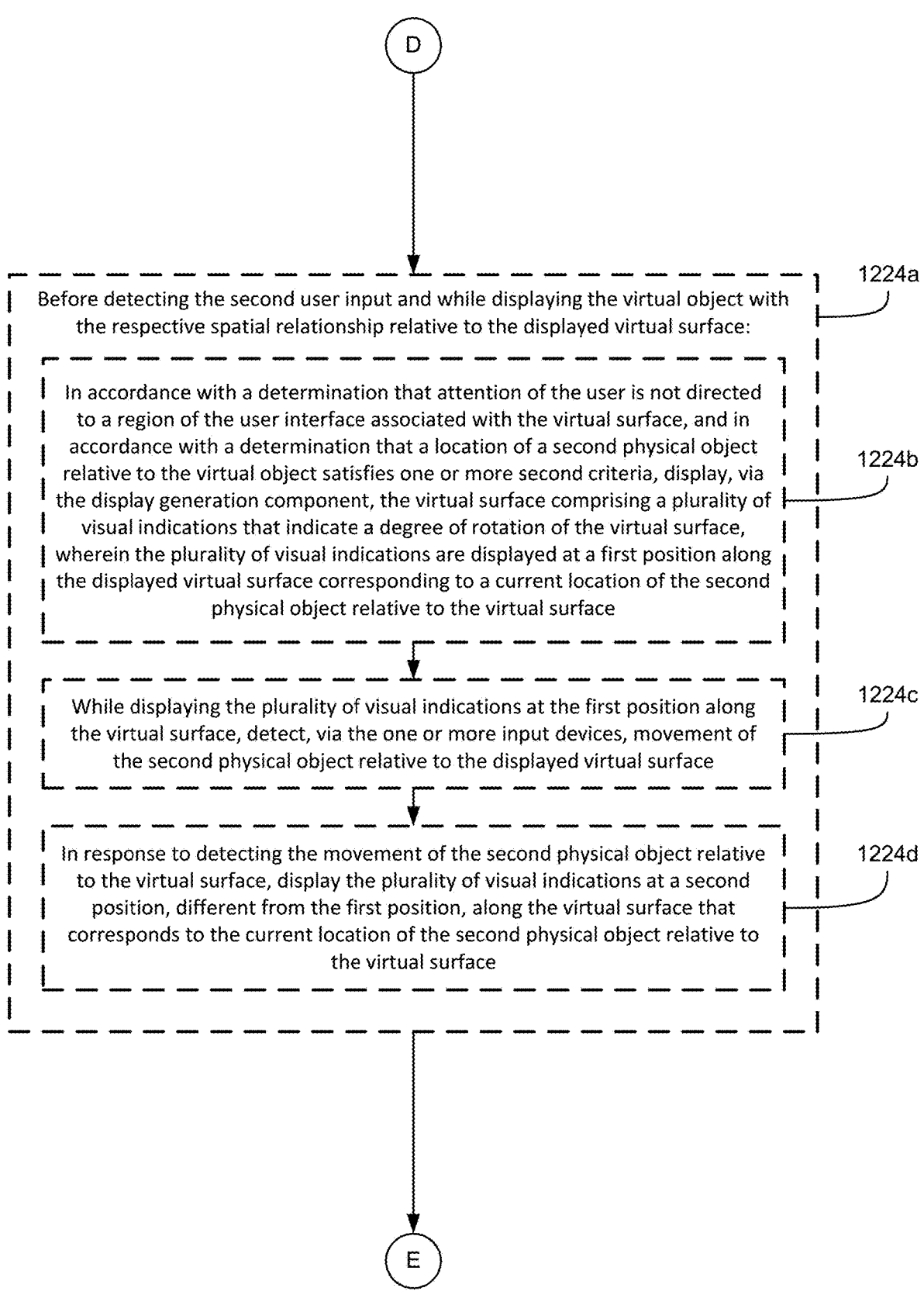
Figure 12F:
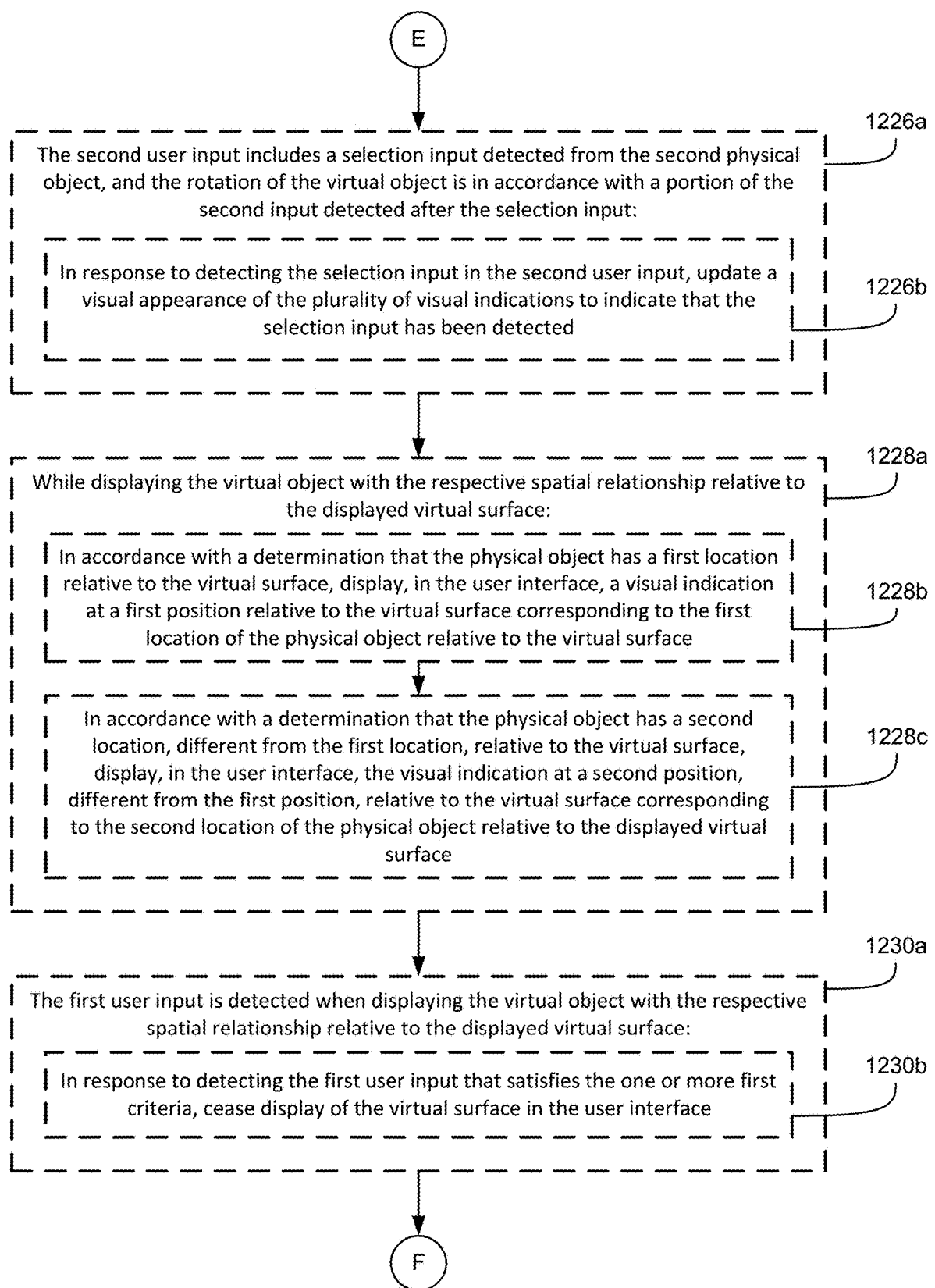

From FIG. 11G to FIG. 11H, the computer system 101 detects an end of the selection input (e.g., the right hand 1112 of the user releases an air pinch hand shape by the thumb and index finger of the hand moving apart and no longer touching, or the right hand 1112 of the user releases a press of the button or touch-sensitive surface on the handheld device 1116) and the right hand 1112 of the user and/or the handheld device 1116 having moved away from the virtual object 1104 (e.g., outside the threshold distance from the virtual object 1104). Based on the end of the selection input, the right hand 1112 of the user and/or the handheld device 1116 being outside the threshold distance from the virtual object 1104, and attention of the user directed towards the virtual object 1104, the computer system optionally redisplays the virtual surface 1108 relative to the virtual object 1104. In some embodiments, as described with reference to method 1200, the computer system 101 redisplays the virtual surface 1108 relative to the virtual object 1104 in the same relative placement that is had prior to direct manipulation of the virtual object 1104 (e.g., virtual surface 1108 is redisplayed parallel to the ground, and below object 1104).

FIGS. 12A-12H is a flowchart illustrating a method 1200 of manipulating a virtual object directly or indirectly in accordance with some embodiments. In some embodiments, the method 1200 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 1200 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1200 are, optionally, combined and/or the order of some operations is, optionally, changed.

In some embodiments, method 1200 is performed at a computer system, such as computer system 101 in FIG. 1, in communication with a display generation component and one or more input devices. In some embodiments, the computer system has one or more of the characteristics of the computer systems of methods 800 and/or 1000. In some embodiments, the display generation component has one or more of the characteristics of the display generation component of methods 800 and/or 1000. In some embodiments, the one or more input devices have one or more of the characteristics of the one or more input devices of methods 800 and/or 1000.

In some embodiments, the computer system displays (1202a), via the display generation component, a user interface including a virtual object, such as virtual object 1104 in FIG. 11A (e.g., a user interface or representation of an application, a representation of a content item (e.g., image and/or video), and/or a three-dimensional representation of an object that does not exist in a physical environment of the computer system, the display generation component and/or user). In some embodiments, the virtual object is displayed in a three-dimensional environment, such as a virtual reality (VR) environment, a mixed reality (MR) environment, or an augmented reality (AR) environment. In some embodiments, the three-dimensional environment has one or more of the characteristics of the three-dimensional environments of methods 800 and/or 1000. In some embodiments, the virtual object has one or more of the characteristics of the virtual objects of methods 800 and/or 1000.

In some embodiments, while displaying the user interface, the computer system detects (1202b), via the one or more input devices, a first user input directed to the virtual object, wherein the first user input includes input from a physical object, such as right hand 1112 and/or handheld device 1116 in FIG. 9A (e.g., hand of a user of the computer system or a handheld device such as a wand, a wand-like device, a remote control, or a stylus. In some embodiments, the wand-like input device of the computer system has one or more of the characteristics of the wand-like input devices of methods 800 and/or 1000), and the first user input corresponds to a request to move the virtual object. In some embodiments, the first user input is an air gesture input provided by a portion (e.g., hand) of the user and is directed to the virtual object (e.g., because it is detected while attention of the user is directed to the virtual object). In some embodiments, the air gesture input provided by the hand of the user includes a grabbing gesture in which a thumb and number of fingers of the hand encircle the virtual object, followed by movement of the hand in the grabbing gesture (e.g., with the thumb any number of fingers remaining around the virtual object). In some embodiments, the first input includes attention of the user directed to the virtual object when the grabbing gesture is detected. The air gesture input provided by the hand of the user optionally includes a pinching gesture in which a thumb and index finger of the hand move toward each other and touch, followed by movement of the hand in the pinch hand shape (e.g., with the index finger and the thumb remaining in contact with one another). In some embodiments, the first input includes attention of the user directed to the virtual object when the pinching gesture is detected. In some embodiments, the first user input is an air gesture input provided by a handheld device (e.g., wand) in the direction of the virtual object. In some embodiments, the first input includes the handheld device being in direct contact with the virtual object, followed by movement of the handheld device while the handheld device is touching the virtual object. In some embodiments, the first input includes attention of the user directed to the virtual object when the handheld device is in direct contact with the virtual object. In some embodiments, the first input includes the handheld device being a threshold distance (e.g., 0.1, 1, 10, 100, 1,000 or 10,000 cm) away from the virtual object but oriented (e.g., pointing) towards the virtual object, followed by movement of the handheld device while the handheld device is pointed towards the virtual object. In some embodiments, the first input includes attention of the user directed to the virtual object when the handheld device is pointed towards the virtual object while being a threshold distance (e.g., 0.1, 1, 10, 100, 1,000 or 10,000 cm) away from the virtual object. In some embodiments, the computer system moves the virtual object in accordance with a single movement or a sequence of movements of the hand of the user or the handheld device.

In some embodiments, while detecting the first user input (1202c), in accordance with a determination that the first user input satisfies one or more first criteria, including a criterion that is satisfied when a location corresponding to the virtual object is within a threshold distance (e.g., 0, 0.01, 0.1, 1, 10, or 100 cm) of the physical object (e.g., when the hand of the user or the handheld device is relatively close to the virtual object), such as virtual object 1104 is near right hand 1112 and/or handheld device 1116 in FIG. 11F, the computer system moves (1202d) the virtual object (e.g., free manipulation or reduced-constraint) in accordance with the first user input with a first degree of constraint on a movement of the virtual object, such as shown by 1140 in FIG. 11G. In some embodiments, the first degree of constraint on the movement of the virtual object includes rotation (e.g., tilt, orientation, axial rotation) and/or displacement of the virtual object. In some embodiments, the first degree of constraint on the movement of the virtual object includes translation of the virtual object with respect to the x-axis, translation of the virtual object with respect to the y-axis, translation of the virtual object with respect to the z-axis, rotation of the virtual object with respect to the x-axis, rotation of the virtual object with respect to the y-axis, and/or rotation of the virtual object with respect to the z-axis. The computer system optionally moves the virtual object in up to six degrees of freedom based on the movement of the physical object providing the input (e.g., the magnitude, direction and/or manner of movement of the virtual object optionally correspond to the magnitude, direction and/or manner of movement of the physical object providing the input).

In some embodiments, in accordance with a determination that the first user input does not satisfy the one or more first criteria because the virtual object is not within the threshold distance of the physical object (e.g., when the hand of the user or the handheld device is not within the threshold distance of the virtual object), such as virtual object 1104 is far from right hand 1112 and/or handheld device 1116 in FIG. 11A, the computer system moves (1202c) the virtual object in accordance with the first user input with a second degree of constraint on the movement of the virtual object, such as shown by 1118 in FIG. 11C, wherein the second degree of constraint on the movement of the virtual object is greater than the first degree of constraint on the movement of the virtual object. In some embodiments, the second degree of constraint on the movement of the virtual object includes rotation (e.g., tilt, orientation, axial rotation) and/or displacement of the virtual object. In some embodiments, the second degree of constraint on the movement of the virtual object includes only rotation of the virtual object (rotation of the virtual object with respect to the x-axis, rotation of the virtual object with respect to the y-axis, and/or rotation of the virtual object with respect to the z-axis). In some embodiments, the second degree of constraint on the movement of the virtual object includes only translation of the virtual object (translation of the virtual object with respect to the x-axis, translation of the virtual object with respect to the y-axis, and/or translation of the virtual object with respect to the z-axis). According to the second degree of constraint on the movement of the virtual object, the computer system optionally moves the virtual object in fewer degrees of freedom compared to the first degree of constraint on the movement of the virtual object based on the movement of the physical object providing the input (e.g., the magnitude, direction and/or manner of movement of the virtual object optionally correspond to the magnitude, direction and/or manner of movement of the physical object providing the input). Moving a virtual object in accordance with different degrees of freedom depending on the distance of the physical object from the virtual object provides more precise control of the movement of the virtual object, thereby improving user experience, and reduces the number of inputs needed to control the type of movement of the virtual object.

In some embodiments, the second degree of constraint on the movement of the virtual object allows for three degrees of movement of the virtual object, such as shown by 1118 in FIG. 11C (1204). In some embodiments, the three degrees of freedom include rotation of the virtual object as described with respect to step(s) 1202. In some embodiments, the three degrees of freedom include translation of the virtual object as described with respect to step(s) 1202. In some embodiments, the three degrees of freedom include a combination of rotation and translation of the virtual object. Moving a virtual object in accordance with three degrees of freedom provides control of the movement of the virtual object while simplifying the number of movements needed from a hand or handheld device of a user to control movement of the virtual object.

In some embodiments, the first degree of constraint on the movement of the virtual object allows for six degrees of movement of the virtual object, such as shown by 1140 in FIG. 11G (1206). In some embodiments, the six degrees of freedom include rotation of the virtual object with respect to the x-axis, rotation of the virtual object with respect to the y-axis, rotation of the virtual object with respect to the z-axis, translation of the virtual object with respect to the x-axis, translation of the virtual object with respect to the y-axis, and translation of the virtual object with respect to the z-axis. Moving a virtual object in accordance with six degrees of freedom provides more precise control of the movement of the virtual object, thereby improving user experience.

In some embodiments, the second degree of constraint on the movement of the virtual object allows for rotation of the virtual object, such as shown by 1118 in FIG. 11C (1208). In some embodiments, the second degree of constraint includes rotation of the virtual object as described with respect to step(s) 1202. Rotating a virtual object provides control of the movement of the virtual object while simplifying the number of movements needed from a hand or handheld device of a user to control movement of the virtual object, thereby avoiding imprecise rotation resulting from unintentional translation of the virtual object or input from the hand being applied for translation rather than rotation.

In some embodiments, while detecting the first user input (1210a), in accordance with the determination that the first user input does not satisfy the one or more first criteria because the virtual object is not within the threshold distance of the physical object, the computer system displays (1210b), in the user interface, a visual indication, such as virtual surface 1108 in FIG. 11A, corresponding to the second degree of constraint on the movement of the virtual object. In some embodiments, the visual indication is a displayed virtual surface (e.g., platter) in the user interface, as described in step(s) 1216-1224. In some embodiments, the visual indication is displayed based on the virtual object not being within the threshold distance of the physical object and when the attention of the user is directed towards the virtual object. In some embodiments, the visual indication is displayed based on the virtual object not being within the threshold distance of the physical object without the attention of the user is directed towards the virtual object. Displaying a visual indication while a hand of the user is away from the virtual object enables the user to still manipulate the virtual object, and also indicates the type of manipulation that will occur in response to input, such as rotating the virtual object.

In some embodiments, the visual indication, such as virtual surface 1108 in FIG. 11A, moves relative to the virtual object, such as virtual object 1104 in FIG. 11A, in a rotational manner during the first input in accordance with the movement of the virtual object (1212). In some embodiments, input from the physical object such as the handheld device (e.g., a wand or wand-like device) or the hand of the user causes the visual indication to move relative to the virtual object. For example, movement of the handheld device or the hand of the user in a leftward direction optionally causes the visual indication to rotate in a counterclockwise direction relative to the virtual object. In some embodiments, the handheld device or the hand of the user pointing (e.g., with or without direct interaction) towards a left region of the visual indication optionally causes the visual indication to rotate in a counterclockwise direction relative to the virtual object. For example, movement of the handheld device or the hand of the user in a rightward direction optionally causes the visual indication to rotate in a clockwise direction relative to the virtual object. In some embodiments, the handheld device or the hand of the user pointing (e.g., with or without direct interaction) towards a right region of the visual indication optionally causes the visual indication to rotate in a clockwise direction relative to the virtual object. Rotating a visual indication relative to the virtual object clearly indicates how the virtual object is being or will be manipulated in response to further input.

In some embodiments, the first user input includes a selection input detected from the physical object (e.g., hand of the user or handheld device), such pinching of handheld device 1116 in FIG. 11B, and the movement of the virtual object, such as moving the virtual object 1104 as indicated by arrow 1107 in FIG. 11C, is in accordance with a portion of the first input detected after the selection input (1214*a*). In some embodiments, the selection input includes a grabbing gesture in which a thumb and number of fingers of the hand encircle the virtual object. In some embodiments, the selection input includes attention of the user directed to the virtual object when the grabbing gesture is detected. In some embodiments, the portion of the first input detected after the selection input includes movement of the hand in the grabbing gesture (e.g., with the thumb any number of fingers remaining around the virtual object). In some embodiments, the selection input includes an air pinching gesture in which a thumb and index finger of the hand move toward each other and touch. In some embodiments, the selection input includes attention of the user directed to the virtual object when the air pinching gesture is detected. In some embodiments, the portion of the first input detected after the selection input includes movement of the hand in the pinch hand shape (e.g., with the index finger and the thumb remaining in contact with one another). In some embodiments, the selection input includes detecting pinching on the handheld device (e.g., a button or touch-sensitive surface of the handheld device) while attention of the user is directed to virtual object. In some embodiments, the selection input includes the handheld device being in direct contact with the virtual object. In some embodiments, the selection input includes attention of the user directed to the virtual object when the handheld device is in direct contact with the virtual object. In some embodiments, the portion of the first input detected after the selection input includes movement of the handheld device while the handheld device is touching the virtual object. In some embodiments, the selection input includes the handheld device being a threshold distance (e.g., 0.1, 1, 10, 100, 1,000 or 10,000 cm) away from the virtual object but oriented (e.g., pointing) towards the virtual object. In some embodiments, the selection input includes attention of the user directed to the virtual object when the handheld device is pointed towards the virtual object while being a threshold distance (e.g., 0.1, 1, 10, 100, 1,000 or 10,000 cm) away from the virtual object. In some embodiments, the portion of the first input detected after the selection input includes movement of the handheld device while the handheld device is pointed towards the virtual object.

In some embodiments, in response to detecting the selection input from the physical object, the computer system updates (1214*b*) a visual appearance of the visual indication, such as visual appearance of rotate option 1114 in FIG. 11B, in accordance with the selection input (e.g., such that the visual indication is optionally more opaque, brighter, larger, or a different color than before the selection input). Updating a visual appearance of the visual indication when detecting the selection input from a hand or a handheld device of the user provides visual feedback that movement input will cause manipulation of the virtual object, thereby informing the user of a current status associated with user input and preventing the user from providing future input resulting in potential errors.

In some embodiments, before detecting the first user input (1216*a*), the computer system displays (1216*b*), via the display generation component, the virtual object with a respective spatial relationship relative to a displayed virtual surface, such as virtual surface 1108 in FIG. 11A, (e.g., visual indication as described in step(s) 1210-1214) in the user interface. In some embodiments, the virtual object is displayed on top of the displayed virtual surface (e.g., platter). In some embodiments, the virtual object is displayed below, to the left of, or to the right of the displayed virtual surface. In some embodiments, the virtual object is in direct contact with the displayed virtual surface. In some embodiments, the virtual object is a threshold distance (e.g., 0.1, 1, 10, 100, or 1000 cm) away from displayed virtual surface (e.g., the virtual object hovering above the platter). The displayed virtual surface is optionally more opaque, brighter, larger, or a different color than before the selection input as described with respect to step(s) 1212 when attention of the user is directed towards the visual indication. Displaying a virtual object on a visual indication (e.g., platter) clearly indicates that the virtual object can be manipulated and how the virtual object can be manipulated, and serves as a reference point for the manipulation, thereby reducing errors in manipulation.

In some embodiments, while displaying the virtual object with the respective spatial relationship relative to the displayed virtual surface, the computer system detects (1218*a*), via the one or more input devices, the first user input that satisfies the one or more first criteria (because a location corresponding to the virtual object is within a threshold distance of the physical object). In some embodiments, in response to detecting the first user input, the computer system moves (1218*b*) the virtual object, such as shown by arrow 1138 in FIG. 11G, in accordance with the first user input with the first degree of constraint on the movement (e.g., free manipulation or up to six degrees of movement) of the virtual object. In some embodiment, the virtual object is optionally manipulated (e.g., up to six degrees of movement) after being grabbed or lifted off the displayed virtual surface via the hand of the user. Moving a virtual object in accordance with direct manipulation provides more precise control of the movement of the virtual object, thereby improving user experience.

In some embodiments, while displaying the virtual object with the respective spatial relationship relative to the displayed virtual surface, the computer system detects (1220a), via the one or more input devices, attention of the user directed to a region of the user interface associated with the displayed virtual surface (e.g., a region slightly below, above, to the left, or to the right of the platter or a region of the platter itself). In some embodiments, in response to detecting the attention of the user, such as attention of the user 1106A in FIG. 11B, directed to the region associated with the virtual surface, the computer system displays (1220b), in the user interface, a virtual element (e.g., grabber bar) that is interactable to move the virtual surface and the virtual object relative to the user interface, such as displaying a virtual element when attention of the user 1106A is directed to virtual surface 1008 in FIG. 11B. In some embodiment, the hand of the user can grab or otherwise provide inputs directed to the virtual element (e.g., a thumb and number of fingers of the hand encircle the virtual element). In some embodiments, while the attention of the user is directed to the virtual element, the hand of the user performs an air pinching gesture in which a thumb and index finger of the hand move toward each other and touch, followed by movement of the hand in the pinch hand shape (e.g., with the index finger and the thumb remaining in contact with one another) to move the virtual surface. In some embodiments, the hand of the user can interact directly or indirectly with the virtual element to move the virtual object. Movement of the virtual element while the hand of the user is grabbing the virtual element optionally causes movement of the virtual surface, and thereby the virtual object. Movement of the hand in the pinch shape relative to the virtual element optionally causes movement of the virtual surface, and thereby the virtual object. For example, if the hand of the user while in the pinch shape moves leftward, the virtual object is moved leftward according to the movement of the hand. The computer system optionally moves the virtual object based on the movement of the virtual element (e.g., the magnitude, direction and/or manner of movement of the virtual object optionally corresponds to the magnitude, direction and/or manner of movement of the virtual element). Interacting with the virtual element enables the user to precisely control movement of the displayed virtual surface and subsequently the virtual object.

In some embodiments, while displaying the virtual object with the respective spatial relationship relative to the displayed virtual surface, the computer system detects (1222a), via the one or more input devices, a second user input that corresponds to a request to rotate, such as selection of rotate option 1114 in FIG. 11B, the displayed virtual surface. In some embodiments, the second user input includes one or more characteristics of the first user input described in step(s) 1202.

In some embodiments, in response to detecting the second user input, the computer system rotates (1222b) the virtual surface and the virtual object in the user interface in accordance with the second user input. As discussed with respect to step(s) 1216, the virtual object optionally moves in accordance with movement (e.g., rotation) of the virtual surface (e.g., visual indication). In some embodiments, the second input optionally includes movement of a handheld device or a hand of the user in a leftward direction, which causes the displayed virtual surface to rotate in a counterclockwise direction relative to the virtual object. In some embodiments, the second input optionally includes the handheld device or the hand of the user directed towards visual indications located in a left portion of the displayed virtual surface (e.g., pointing towards the visual indications, pinching hand while attention is direction towards the visual indications, and/or pinching a button on the handheld device while attention is directed towards the visual indications), which causes the displayed virtual surface to rotate in a counterclockwise direction relative to the virtual object as described below with respect to step(s) 1216 and 1218. In some embodiments, the second input optionally includes movement of a handheld device or a hand of the user in a rightward direction, which causes the displayed virtual surface to rotate in a clockwise direction relative to the virtual object. In some embodiments, the second input optionally includes the handheld device or the hand of the user directed towards visual indications located in a right portion of the displayed virtual surface (e.g., pointing towards the visual indications, pinching hand while attention is direction towards the visual indications, and/or pinching a button on the handheld device while attention is directed towards the visual indications), which causes the displayed virtual surface to rotate in a clockwise direction relative to the virtual object as described below with respect to step(s) 1216 and 1218. Rotating a virtual object via distance manipulation provides control of the movement of the virtual object while simplifying the number of movements needed from a hand or handheld device of a user to control movement of the virtual object.

In some embodiments, before detecting the second user input and while displaying the virtual object with the respective spatial relationship relative to the displayed virtual surface (1224a), in accordance with a determination that attention of the user is not directed to a region of the user interface associated with the virtual surface (e.g., attention of the user is directed to the virtual object), and in accordance with a determination that a location of a second physical object relative to the virtual object satisfies one or more second criteria (e.g., the one or more second criteria include one or more characteristics of the one or more first criteria described in step(s) 1202) (because the virtual object is not within the threshold distance of the physical object), the computer system displays (1224b), via the display generation component, the virtual surface comprising a plurality of visual indications, such as visual indications 1130A in FIG. 11D (e.g., simulated notches in the virtual surface or other indications of distance and/or rotation on the virtual surface) that indicate a degree of rotation of the virtual surface, wherein the plurality of visual indications are displayed at a first position along the displayed virtual surface corresponding to a current location of the second physical object, such as right hand 1112 and handheld device 1116 in FIG. 11D, relative to the virtual surface. In some embodiments, the second physical object has one or more characteristics of the physical object described with respect to step(s) 1202. In some embodiments, the second physical object does not have one or more characteristics of the physical object described with respect to step(s) 1202. In some embodiments, the visual indications are located at a bottom edge of the displayed virtual surface (e.g., platter). In some embodiments, if the second physical object (e.g., a hand of the user) is currently directed (e.g., pointed) towards a center of the displayed virtual surface, then the visual indications are displayed at the first position such that the visual indications are equally spaced along (e.g., the bottom edge of) the displayed virtual surface, centered around the current location to which the second physical object is directed.

In some embodiments, while displaying the plurality of visual indications at the first position along the virtual surface, the computer system detects (1224c), via the one or more input devices, movement of the second physical object, such as right hand 1112 and handheld device 1116 in FIGS. 11E and 11E1, relative to the displayed virtual surface (e.g., the hand of the user moves left or right relative to the platter).

In some embodiments, in response to detecting the movement of the second physical object relative to the virtual surface, the computer system displays (1224d) the plurality of visual indications, such as visual indications 1130A in FIGS. 11E and 11E1, at a second position, different from the first position, along the virtual surface that corresponds to the current location of the second physical object relative to the virtual surface. In some embodiments, if the second physical object moved leftwards from an initial position and is directed towards a left portion of the displayed virtual surface, then the visual indications are displayed at the second position such that the left portion of the displayed virtual surface includes a higher number of visual indications compared to other portions of the displayed virtual surface. In some embodiments, densely populated visual indications or visual indications displayed close together at the left portion of the display virtual surface indicate that the second physical object is currently directed towards the left portion of the display virtual surface. In some embodiments, if the second physical object moved rightwards from an initial position and is directed towards a right portion of the displayed virtual surface, then the visual indications are displayed at the second position such that the right portion of the displayed virtual surface includes a higher number of visual indications compared to other portions of the displayed virtual surface. In some embodiments, densely populated visual indications or visual indications displayed close together at the right portion of the display virtual surface indicate that the second physical object is currently directed towards the right portion of the display virtual surface. Displaying visual indications (e.g., notches) along the displayed virtual surface (e.g., platter) clearly indicates the relative placement of the second physical object relative to the virtual surface and/or how the virtual object will be rotated.

In some embodiments, the second user input includes a selection input (optionally including ones or more characteristics of the selection input as described with respect to step(s) 1214) detected from the second physical object, and the rotation of the virtual object is in accordance with a portion of the second input detected after the selection input (1226a) (optionally including one or more characteristics of the portion of the first input detected after the selection input as described with respect to step(s) 1214). In some embodiments, in response to detecting the selection input in the second user input, the computer system updates (1226b) a visual appearance of the plurality of visual indications, such as visual indication 1130B in FIGS. 11E and 11E1, (such that the visual appearance is optionally brighter, more opaque, a different color, and/or larger) to indicate that the selection input has been detected. In some embodiments, if the second physical object is directed towards a left portion of the displayed virtual surface when the selection input is detected, then the visual appearance of the visual indications displayed at the left portion of the displayed virtual surface is updated. In some embodiments, if the second physical object is directed towards a right portion of the displayed virtual surface when the selection input is detected, then the visual appearance of the visual indications displayed at the right portion of the displayed virtual surface is updated. In some embodiments, while the selection input is maintained (e.g., hand in pinch shape or pinching on the handheld device), the relative positions of the visual indications relative to the displayed virtual surface (e.g., platter) remain fixed. In some embodiments, while the selection input is maintained, movement of the hand or the handheld device causes the displayed virtual surface (e.g., platter) and the visual indications relative to the displayed virtual surface (e.g., platter) to move together (e.g., while the visual indications maintain respective positions relative to the displayed virtual surface). Updating a visual appearance of the visual indications (e.g., simulated notches) when detecting the selection input from a hand or a handheld device of the user provides visual feedback, thereby informing the user of a current status associated with user input and preventing the user from providing future input resulting in potential errors.

In some embodiments, while displaying the virtual object with the respective spatial relationship relative to the displayed virtual surface (1228a), in accordance with a determination that the physical object has a first location relative to the virtual surface (e.g., near a left portion of the virtual surface), such as right hand 1112 and handheld device 1116 in FIG. 11D, the computer system displays (1228b), in the user interface, a visual indication (e.g., one or more rotation notches), such as visual indication 1130A in FIG. 11D, at a first position relative to the virtual surface (e.g. left portion of the platter,) corresponding to the first location of the physical object relative to the virtual surface. In some embodiments, in accordance with a determination that the physical object has a second location (e.g., near a right portion of the virtual surface)), such as right hand 1112 and handheld device 1116 in FIGS. 11E and 11E1, different from the first location, relative to the virtual surface, the computer system displays (1228c), in the user interface, the visual indication, such as visual indication 1130A in FIGS. 11E and 11E1, at a second position (e.g., right portion of the platter), different from the first position, relative to the virtual surface corresponding to the second location of the physical object relative to the displayed virtual surface. In some embodiments, as the physical object moves towards a left portion of the displayed virtual surface, the visual indication is displayed near the left portion of the displayed virtual surface. In some embodiments, as the physical object moves towards a left portion of the displayed virtual surface, the visual prominence of the left portion of the displayed virtual surface is brighter, thicker, and/or a different color. In some embodiments, as the physical object moves towards a right portion of the displayed virtual surface, the visual indication is displayed near the right portion of the displayed virtual surface. In some embodiments, as the physical object moves towards a right portion of the displayed virtual surface, a visual prominence of the right portion of the displayed virtual surface is brighter, thicker, and/or a different color. Displaying a visual indication corresponding to a location of a hand or handheld device provides visual feedback, thereby informing the user of a current status associated with user input and preventing the user from providing future input resulting in potential errors.

In some embodiments, the first user input is detected when displaying the virtual object with the respective spatial relationship relative to the displayed virtual surface (1230*a*). In some embodiments, in response to detecting the first user input that satisfies the one or more first criteria (because a location corresponding to the virtual object is within a threshold distance of the physical object), the computer system ceases (1230*b*) display of the virtual surface in the user interface, such as ceasing display of the virtual surface in FIG. 11F (e.g., platter disappears). In some embodiments, the virtual object is still displayed when the virtual surface (e.g., platter) disappears. Ceasing displaying of an unnecessary user interface element (e.g., the platter) during direct manipulation frees up space for display in the user interface, and reduces clutter.

In some embodiments, while display of the virtual surface is ceased in the user interface (e.g., platter disappears), the computer system detects (1232*a*), via the one or more input devices, an end of the first user input (e.g., after manipulation of the virtual object is complete). In some embodiments, the end of the first user input includes physical object (e.g., the hand or the handheld device) no longer directed towards the virtual object (e.g., with or without direct interface). In some embodiments, the end of the first user input includes the hand of the user no longer in the air pinching gesture nor the air grabbing gesture. In some embodiments, if the first user input includes a hand of the user in an air pinching gesture (e.g., in which a thumb and index finger of the hand move toward each other and touch to form a pinch hand shape (e.g., with the index finger and the thumb remaining in contact with one another)), then the end of the first user input corresponds to the thumb and index finger of the hand in the pinch hand shape moving away from each other (e.g., the index finger and the thumb are not in contact with one another). In some embodiments, if the first user input includes a hand of the user in a grabbing gesture (e.g., in which a thumb and number of fingers of the hand encircle the virtual object), then the end of the first user input corresponds to the thumb and number of fingers moving apart to no longer encircle the virtual object. In some embodiments, the end of the first user input includes removal (e.g., liftoff) of contact of the hand of the user from a touch-sensitive surface.

In some embodiments, in response to detecting the end of the first user input, the computer system (automatically, without additional user input) redisplays (1232*b*), in the user interface, the virtual surface, wherein the virtual object and the end of the first user input has the respective spatial relationship relative to the redisplayed virtual surface, such as virtual surface 1108 in FIG. 11H (e.g., platter reappears). Redisplaying the virtual surface (e.g., platter) after manipulation facilitates subsequent manipulation using the platter without the need for additional input to redisplay the platter.

In some embodiments, when the first user input is detected, the virtual surface has a second respective spatial relationship relative to the user interface, such as virtual surface 1108 in FIG. 11B (e.g., before manipulation of the virtual object and/or when the manipulation input is first detected, the platter is displayed parallel to a ground surface of the physical environment and/or the three-dimensional environment, and/or perpendicular to gravity), and redisplaying the virtual surface in the user interface in response to the end of the first user input includes displaying the virtual surface, such as virtual surface 1108 in FIG. 11H, with the second respective spatial relationship relative to the user interface (1234). In some embodiments, in response to receiving the first user input (e.g., before the end of the first user input), the displayed virtual surface optionally includes a first respective spatial relationship relative to the user interface different than the second respective spatial relationship relative to user interface. For example, in response to receiving the first user input and/or during manipulation of the virtual object, the displayed virtual surface is an orientation relative to an orientation of the virtual object during manipulation (e.g., not parallel to a ground surface). After manipulation of the virtual object is complete, the displayed virtual surface is redisplayed parallel to the ground surface. In some embodiments, the first respective spatial relationship relative to the user interface is the same as the second respective spatial relationship relative to user interface. Redisplaying the virtual surface (e.g., platter) with the same spatial relationship relative to the user interface before and after manipulation of the virtual object ensures consistent display of the user interface, and reduces errors in interaction with the user interface.

In some embodiments, while detecting the first user input, in accordance with the determination that the first user input does not satisfy the one or more first criteria because the virtual object is not within the threshold distance of the physical object, the computer system maintains (1236) displaying of the virtual surface, such as virtual surface 1108 in FIGS. 11A-11E and 11E1, in the user interface (e.g., until detection of the virtual object within the threshold distance of the physical object). Maintaining the virtual surface (e.g., platter) during distance manipulation helps the user clearly visualize how the virtual object is being manipulated relative to the visual indication, which serves as a reference point.

In some embodiments, moving the virtual object with the second degree of constraint in accordance with the first user input includes moving the virtual object, such as indicated by arrow 1107 in FIG. 11C, based on a first simulated physical property associated with the virtual object (1238) (e.g., moving the virtual object with simulated inertia, simulated momentum, and/or simulated acceleration). In some embodiments, when moving the virtual object with inertia, there is greater resistance in changing the motion of the virtual object and/or the motion of the virtual object continues based on the inertia after the end of the first user input. In some embodiments, when moving the virtual object with momentum, there is greater resistance in ceasing the motion of the virtual object and/or the motion of the virtual object continues based on the momentum after the end of the first user input. In some embodiments, when moving the virtual object with acceleration, the virtual object will change speed and/or direction while moving. Moving the virtual object with inertia and/or other simulated physical properties during distance manipulation facilitates expected or familiar results of movement of the virtual object, thereby reducing errors and the need for inputs to correct those errors.

In some embodiments, moving the virtual object with the first degree of constraint in accordance with the first user input includes moving the virtual object, such as indicated by arrow 1138 in FIG. 11G, in a manner that is not based on the first simulated physical property (1240) (e.g., moving the virtual object with reduced or no simulated inertia, simulated momentum, and/or simulated acceleration). In some embodiments, when moving the virtual object with reduced or no inertia, there is less resistance to changing the motion of the virtual object. In some embodiments, when moving the virtual object with reduced or no momentum, there is less resistance to ceasing the motion of the virtual object. In some embodiments, when moving the virtual object with reduced or no acceleration, the virtual object will move with a constant speed and direction. Moving the virtual object with reduced or no inertia during direct manipulation facilitates more precise movement of the virtual object.

In some embodiments, the one or more first criteria include a criterion that is satisfied when the physical object, such as right hand 1112 and handheld device 1116 in FIGS. 11A-11H, is within a field of view of a viewpoint of a user of the computer system (1242) (e.g., the hand of the user or the handheld device that is used as part of manipulation of the virtual object is visible within the user interface and/or three-dimensional environment that is visible via the display generation component before, during, and/or after manipulating the virtual object). In some embodiments, if the hand or handheld device is down by the side of the waist of the user, the one or more first criteria are not satisfied. Allowing manipulation of the virtual object when a hand or handheld device is within the field of view displayed by the computer system avoids unintentional manipulation of the virtual object, thereby reducing the need for inputs to correct such unintentional manipulations. It should be understood that the particular order in which the operations in method 1200 have been described is merely exemplary and is not intended to indicate that the described order is the only order in which the operations could be performed. One of ordinary skill in the art would recognize various ways to reorder the operations described herein.

In some embodiments, aspects/operations of methods 800, 1000 and/or 1200 may be interchanged, substituted, and/or added between these methods. For example, various object manipulation techniques of methods 800, 1000, and/or 1200 are optionally interchanged, substituted, and/or added between these methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can be generated by inferring preferences based on non-personal information data or a bare minimum amount of personal information, such as the content being requested by the device associated with a user, other non-personal information available to the service, or publicly available information.

The invention claimed is:

1. A method comprising:

at a computer system in communication with a display generation component and one or more input devices:

displaying, via the display generation component, a user interface including a virtual object;

while displaying the user interface, detecting, via the one or more input devices, a first user input directed to the virtual object, wherein the first user input includes input from a physical object, and the first user input corresponds to a request to move the virtual object; and while detecting the first user input:

in accordance with a determination that the first user input satisfies one or more first criteria, including a criterion that is satisfied when a location corresponding to the virtual object is within a threshold distance of the physical object, moving the virtual object in accordance with the first user input with a first degree of constraint on a movement of the virtual object; and in accordance with a determination that the first user input does not satisfy the one or more first criteria because the virtual object is not within the threshold distance of the physical object, moving the virtual object in accordance with the first user input with a second degree of constraint on the movement of the virtual object, wherein the second degree of constraint on the movement of the virtual object is greater than the first degree of constraint on the movement of the virtual object.

2. The method of claim 1, wherein the second degree of constraint on the movement of the virtual object allows for three degrees of movement of the virtual object.

3. The method of claim 1, wherein the first degree of constraint on the movement of the virtual object allows for six degrees of movement of the virtual object.

4. The method of claim 1, wherein the second degree of constraint on the movement of the virtual object allows for rotation of the virtual object.

5. The method of claim 1, comprising while detecting the first user input:

in accordance with the determination that the first user input does not satisfy the one or more first criteria because the virtual object is not within the threshold distance of the physical object, displaying, in the user interface, a visual indication corresponding to the second degree of constraint on the movement of the virtual object, Indication rotates around object with movement.

6. The method of claim 5, wherein the visual indication moves relative to the virtual object in a rotational manner during the first user input in accordance with the movement of the virtual object.

7. The method of claim 5, wherein the first user input includes a selection input detected from the physical object, and the movement of the virtual object is in accordance with a portion of the first user input detected after the selection input, the method further comprising:

in response to detecting the selection input from the physical object, updating a visual appearance of the visual indication in accordance with the selection input.

8. The method of claim 1, comprising before detecting the first user input:

displaying, via the display generation component, the virtual object with a respective spatial relationship relative to a displayed virtual surface in the user interface.

9. The method of claim 8, comprising:

while displaying the virtual object with the respective spatial relationship relative to the displayed virtual surface, detecting, via the one or more input devices, the first user input that satisfies the one or more first criteria; and in response to detecting the first user input, moving the virtual object in accordance with the first user input with the first degree of constraint on the movement of the virtual object.

10. The method of claim 8, comprising:

while displaying the virtual object with the respective spatial relationship relative to the displayed virtual surface, detecting, via the one or more input devices, attention of a user directed to a region of the user interface associated with the displayed virtual surface; and in response to detecting the attention of the user directed to the region associated with the virtual surface, displaying, in the user interface, a virtual element that is interactable to move the virtual surface and the virtual object relative to the user interface.

11. The method of claim 8, comprising:

while displaying the virtual object with the respective spatial relationship relative to the displayed virtual surface, detecting, via the one or more input devices, a second user input that corresponds to a request to rotate the displayed virtual surface; and in response to detecting the second user input, rotating the virtual surface and the virtual object in the user interface in accordance with the second user input.

12. The method of claim 11, comprising:

before detecting the second user input and while displaying the virtual object with the respective spatial relationship relative to the displayed virtual surface:

in accordance with a determination that attention of a user of the computer system is not directed to a region of the user interface associated with the virtual surface, and in accordance with a determination that a location of a second physical object relative to the virtual object satisfies one or more second criteria, displaying, via the display generation component, the virtual surface comprising a plurality of visual indications that indicate a degree of rotation of the virtual surface, wherein the plurality of visual indications are displayed at a first position along the displayed virtual surface corresponding to a current location of the second physical object relative to the virtual surface;

while displaying the plurality of visual indications at the first position along the virtual surface, detecting, via the one or more input devices, movement of the second physical object relative to the displayed virtual surface; and in response to detecting the movement of the second physical object relative to the virtual surface, displaying the plurality of visual indications at a second position, different from the first position, along the virtual surface that corresponds to the current location of the second physical object relative to the virtual surface.

13. The method of claim 12, wherein the second user input includes a selection input detected from the second physical object, and the rotation of the virtual object is in accordance with a portion of the second user input detected after the selection input, the method further comprising:

in response to detecting the selection input in the second user input, updating a visual appearance of the plurality of visual indications to indicate that the selection input has been detected.

14. The method of claim 8, comprising:

while displaying the virtual object with the respective spatial relationship relative to the displayed virtual surface:

in accordance with a determination that the physical object has a first location relative to the virtual surface, displaying, in the user interface, a visual indication at a first position relative to the virtual surface corresponding to the first location of the physical object relative to the virtual surface; and in accordance with a determination that the physical object has a second location, different from the first location, relative to the virtual surface, displaying, in the user interface, the visual indication at a second position, different from the first position, relative to the virtual surface corresponding to the second location of the physical object relative to the displayed virtual surface.

15. The method of claim 8, wherein the first user input is detected when displaying the virtual object with the respective spatial relationship relative to the displayed virtual surface, the method further comprising:

in response to detecting the first user input that satisfies the one or more first criteria, ceasing display of the virtual surface in the user interface.

16. The method of claim 15, comprising:

while display of the virtual surface is ceased in the user interface, detecting, via the one or more input devices, an end of the first user input; and in response to detecting the end of the first user input, redisplaying, in the user interface, the virtual surface, wherein the virtual object and the end of the first user input has the respective spatial relationship relative to the redisplayed virtual surface.

17. The method of claim 16, wherein when the first user input is detected, the virtual surface has a second respective spatial relationship relative to the user interface, and redisplaying the virtual surface in the user interface in response to the end of the first user input includes displaying the virtual surface with the second respective spatial relationship relative to the user interface.

18. The method of claim 8, comprising:

while detecting the first user input, in accordance with the determination that the first user input does not satisfy the one or more first criteria because the virtual object is not within the threshold distance of the physical object, maintaining displaying of the virtual surface in the user interface.

19. The method of claim 8, wherein moving the virtual object with the second degree of constraint in accordance with the first user input includes moving the virtual object based on a first simulated physical property associated with the virtual object.

20. The method of claim 19, wherein moving the virtual object with the first degree of constraint in accordance with the first user input includes moving the virtual object in a manner that is not based on the first simulated physical property.

21. The method of claim 1, wherein the one or more first criteria include a criterion that is satisfied when the physical object is within a field of view of a viewpoint of a user of the computer system.

22. A computer system that is in communication with a display generation component and one or more input devices, the computer system comprising:

one or more processors;

memory; and one or more programs, wherein the one or more programs are stored in the memory and configured to be executed by the one or more processors, the one or more programs including instructions for:

displaying, via the display generation component, a user interface including a virtual object;

while displaying the user interface, detecting, via the one or more input devices, a first user input directed to the virtual object, wherein the first user input includes input from a physical object, and the first user input corresponds to a request to move the virtual object; and while detecting the first user input:

in accordance with a determination that the first user input satisfies one or more first criteria, including a criterion that is satisfied when a location corresponding to the virtual object is within a threshold distance of the physical object, moving the virtual object in accordance with the first user input with a first degree of constraint on a movement of the virtual object; and in accordance with a determination that the first user input does not satisfy the one or more first criteria because the virtual object is not within the threshold distance of the physical object, moving the virtual object in accordance with the first user input with a second degree of constraint on the movement of the virtual object, wherein the second degree of constraint on the movement of the virtual object is greater than the first degree of constraint on the movement of the virtual object.

23. A non-transitory computer readable storage medium storing one or more programs, the one or more programs comprising instructions, which when executed by one or more processors of a computer system that is in communication with a display generation component and one or more input devices, cause the computer system to perform a method comprising:

displaying, via the display generation component, a user interface including a virtual object;

while displaying the user interface, detecting, via the one or more input devices, a first user input directed to the virtual object, wherein the first user input includes input from a physical object, and the first user input corresponds to a request to move the virtual object; and while detecting the first user input:

in accordance with a determination that the first user input satisfies one or more first criteria, including a criterion that is satisfied when a location corresponding to the virtual object is within a threshold distance of the physical object, moving the virtual object in accordance with the first user input with a first degree of constraint on a movement of the virtual object; and in accordance with a determination that the first user input does not satisfy the one or more first criteria because the virtual object is not within the threshold distance of the physical object, moving the virtual object in accordance with the first user input with a second degree of constraint on the movement of the virtual object, wherein the second degree of constraint on the movement of the virtual object is greater than the first degree of constraint on the movement of the virtual object.

24. The computer system of claim 22, wherein the one or more programs further include instructions for, while detecting the first user input:

in accordance with the determination that the first user input does not satisfy the one or more first criteria because the virtual object is not within the threshold distance of the physical object, displaying, in the user interface, a visual indication corresponding to the second degree of constraint on the movement of the virtual object.

25. The computer system of claim 22, wherein the one or more programs further include instructions for, before detecting the first user input:

displaying, via the display generation component, the virtual object with a respective spatial relationship relative to a displayed virtual surface in the user interface.

26. The computer system of claim 25, wherein the one or more programs further include instructions for:

while displaying the virtual object with the respective spatial relationship relative to the displayed virtual surface, detecting, via the one or more input devices, a second user input that corresponds to a request to rotate the displayed virtual surface; and in response to detecting the second user input, rotating the virtual surface and the virtual object in the user interface in accordance with the second user input.

27. The computer system of claim 26, wherein the one or more programs further include instructions for:

before detecting the second user input and while displaying the virtual object with the respective spatial relationship relative to the displayed virtual surface:

in accordance with a determination that attention of a user of the computer system is not directed to a region of the user interface associated with the virtual surface, and in accordance with a determination that a location of a second physical object relative to the virtual object satisfies one or more second criteria, displaying, via the display generation component, the virtual surface comprising a plurality of visual indications that indicate a degree of rotation of the virtual surface, wherein the plurality of visual indications are displayed at a first position along the displayed virtual surface corresponding to a current location of the second physical object relative to the virtual surface;

while displaying the plurality of visual indications at the first position along the virtual surface, detecting, via the one or more input devices, movement of the second physical object relative to the displayed virtual surface; and in response to detecting the movement of the second physical object relative to the virtual surface, displaying the plurality of visual indications at a second position, different from the first position, along the virtual surface that corresponds to the current location of the second physical object relative to the virtual surface.

28. The computer system of claim 25, wherein the one or more programs further include instructions for:

while displaying the virtual object with the respective spatial relationship relative to the displayed virtual surface:

in accordance with a determination that the physical object has a first location relative to the virtual surface, displaying, in the user interface, a visual indication at a first position relative to the virtual surface corresponding to the first location of the physical object relative to the virtual surface; and in accordance with a determination that the physical object has a second location, different from the first location, relative to the virtual surface, displaying, in the user interface, the visual indication at a second position, different from the first position, relative to the virtual surface corresponding to the second location of the physical object relative to the displayed virtual surface.

29. The computer system of claim 25, wherein the one or more programs further include instructions for:

while detecting the first user input, in accordance with the determination that the first user input does not satisfy the one or more first criteria because the virtual object is not within the threshold distance of the physical object, maintaining displaying of the virtual surface in the user interface.

30. The non-transitory computer readable storage medium of claim 23, wherein the method further comprises, while detecting the first user input:

in accordance with the determination that the first user input does not satisfy the one or more first criteria because the virtual object is not within the threshold distance of the physical object, displaying, in the user interface, a visual indication corresponding to the second degree of constraint on the movement of the virtual object.

31. The non-transitory computer readable storage medium of claim 23, wherein the method further comprises, before detecting the first user input:

displaying, via the display generation component, the virtual object with a respective spatial relationship relative to a displayed virtual surface in the user interface.

32. The non-transitory computer readable storage medium of claim 31, wherein the method further comprises:

while displaying the virtual object with the respective spatial relationship relative to the displayed virtual surface, detecting, via the one or more input devices, a second user input that corresponds to a request to rotate the displayed virtual surface; and in response to detecting the second user input, rotating the virtual surface and the virtual object in the user interface in accordance with the second user input.

33. The non-transitory computer readable storage medium of claim 32, wherein the method further comprises:

before detecting the second user input and while displaying the virtual object with the respective spatial relationship relative to the displayed virtual surface:

in accordance with a determination that attention of a user of the computer system is not directed to a region of the user interface associated with the virtual surface, and in accordance with a determination that a location of a second physical object relative to the virtual object satisfies one or more second criteria, displaying, via the display generation component, the virtual surface comprising a plurality of visual indications that indicate a degree of rotation of the virtual surface, wherein the plurality of visual indications are displayed at a first position along the displayed virtual surface corresponding to a current location of the second physical object relative to the virtual surface;

while displaying the plurality of visual indications at the first position along the virtual surface, detecting, via the one or more input devices, movement of the second physical object relative to the displayed virtual surface; and in response to detecting the movement of the second physical object relative to the virtual surface, displaying the plurality of visual indications at a second position, different from the first position, along the virtual surface that corresponds to the current location of the second physical object relative to the virtual surface.

34. The non-transitory computer readable storage medium of claim 31, wherein the method further comprises:

while displaying the virtual object with the respective spatial relationship relative to the displayed virtual surface:

in accordance with a determination that the physical object has a first location relative to the virtual surface, displaying, in the user interface, a visual indication at a first position relative to the virtual surface corresponding to the first location of the physical object relative to the virtual surface; and in accordance with a determination that the physical object has a second location, different from the first location, relative to the virtual surface, displaying, in the user interface, the visual indication at a second position, different from the first position, relative to the virtual surface corresponding to the second location of the physical object relative to the displayed virtual surface.

35. The non-transitory computer readable storage medium of claim 31, wherein the method further comprises:

while detecting the first user input, in accordance with the determination that the first user input does not satisfy the one or more first criteria because the virtual object is not within the threshold distance of the physical object, maintaining displaying of the virtual surface in the user interface.

* * * * *